(12) United States Patent
Lohman et al.

(10) Patent No.: US 12,435,332 B2
(45) Date of Patent: Oct. 7, 2025

(54) ORDERED ASSEMBLY OF MULTIPLE DNA FRAGMENTS

(71) Applicant: New England Biolabs, Inc., Ipswich, MA (US)

(72) Inventors: Gregory Lohman, Cambridge, MA (US); John M. Pryor, Gerogetown, MA (US); Rebecca Kucera, Hamilton, MA (US); Vladimir Potapov, Auburndale, MA (US); Katharina Bilotti, Burlington, MA (US); Richard D. Morgan, Middleton, MA (US)

(73) Assignee: New England Biolabs, Inc., Ipswich, MA (US)

( * ) Notice: Subject to any disclaimer, the term of this patent is extended or adjusted under 35 U.S.C. 154(b) by 876 days.

(21) Appl. No.: 17/644,516

(22) Filed: Dec. 15, 2021

(65) Prior Publication Data

US 2022/0098577 A1 Mar. 31, 2022

Related U.S. Application Data

(63) Continuation-in-part of application No. 17/286,066, filed as application No. PCT/US2019/056670 on Oct. 17, 2019.

(60) Provisional application No. 63/213,859, filed on Jun. 23, 2021, provisional application No. 63/213,807, filed on Jun. 23, 2021, provisional application No. 63/125,530, filed on Dec. 15, 2020, provisional application No. 62/909,641, filed on Oct. 2, 2019, provisional application No. 62/820,435, filed on Mar. 19, 2019, provisional application No. 62/747,874, filed on Oct. 19, 2018.

(51) Int. Cl.
C12N 15/10 (2006.01)
C12Q 1/6869 (2018.01)

(52) U.S. Cl.
CPC ..... *C12N 15/1065* (2013.01); *C12N 15/1044* (2013.01); *C12Q 1/6869* (2013.01)

(58) Field of Classification Search
CPC ............ C12N 15/1065; C12N 15/1031; C12Q 1/6869
See application file for complete search history.

(56) References Cited

U.S. PATENT DOCUMENTS 7,435,572 B2   10/2008  Bitinaite
2014/0038240 A1*  2/2014  Temme ............... C12P 19/34
                                                435/196

FOREIGN PATENT DOCUMENTS

WO    2013032850 A2   3/2013
WO    2014004393 A1   1/2014
WO    2015081114 A3   11/2015
WO    2016176325 A1   11/2016
WO    2020081768 A1   4/2020
WO    2022132198 A2   6/2022

OTHER PUBLICATIONS

Williams, Moleuclar Biotechnology, 23, 225-243, 2003.
Grigaite, et al., NAR, 30, 21, e123, 2002.
Pein, et al., NAR, 19, 19, 5139-5142, 1991.
Senesac, et al., BioTechniques, 22, 6, 1166-1168, 1997.
Senesac, et al., BioTechniques, 19, 6, 990-993, 1995.
Conrad, et al., NAR, 20, 19, 5127-5130, 1992.
Reuter, et al., Analytical Biochemistry, 209, 232-237, 1993.
New England Biolabs Product Specification, PaqCI, Dec. 1, 2020.
Kucera, et al., Technical Note, Jan. 1, 2018.
Gormley, et al., The Journal of Biologial Chemistry, 277, 6, 4034-4041, 2002.
Database UniProt, Database assession No. A0A2N8KYF9, Apr. 25, 2018.
Li, et al., Metabolic Engineering, 49, 13-20, 2018.
Potapov, et al., bioRxiv 322297, 2018.
Andreou, et al., PLoS One 13, 1, e0189892, 2018.
Ng, et al., J Mol. Biol., 426, 1861-1869, 2014.
Ng, et al., Protein Engineering, Design and Selection, 25, 10, 669-678, 2012.
Potapov, et al., ACS Synthetic Biology, 7, 2665-2674, 2018.
Potapov, et al., Nucleic Acids Research, 46, 13, e79, 2018.
Sarrion-Perdigones, et al., PLoS One, 6, 7, e21622, 2011.
Van Dollerweerd, et al., ACS Synthetic Biology, 7, 1018-1029, 2018.
Weber, et al., PLoS One 6, 2, e16765, 2011.
Li et al. Nat. Methods Res vol. 4, 251-256 (2007).
Engler, et al. PLOS one 3, e3647 (2008).
Engler, et al. PLOS One e5553 (2009).
Quan, et al. PlosOne 4, e 6441(2009).

(Continued)

*Primary Examiner* — Sahana S Kaup

(74) *Attorney, Agent, or Firm* — New England Biolabs, Inc

(57) ABSTRACT

A composition and its uses and additionally a kit are provided. The composition is a synthetic self-complementary oligonucleotide that has a double-stranded region and a loop, wherein the double-stranded region contains a binding sequence for PaqCI. Additionally, the oligonucleotide includes unligatable 3' and 5' ends that cannot be cleaved by PaqCI. This oligonucleotide composition has been combined with PaqCI or a variant of PaqCI Type IIS restriction endonuclease in a reaction mixture, where the reaction mixture includes PaqCI or variant that can further be combined with a ligase and optionally a deadenylase, crowding molecule such as PEG and/or a repair enzyme such as Endo MS. The kit includes the oligonucleotide and Type IIS restriction endonuclease in the same or different containers.

12 Claims, 32 Drawing Sheets

Specification includes a Sequence Listing.

(56) References Cited

OTHER PUBLICATIONS

Zhang, et al. NAR 40, e55 (2012).
Tsuge, et al. Scientific Reports, 5, 10655 (2015).
Smolke, Nat. Biotechnol. 27: 1099-1102 (2009).
Engler, et al. Methods Mol. Biol., 729:167-181 (2011).
Marillonnet, et al. Methods Mol. Biol. 1321: 269-284 (2015).
Nilsson, et al. Nucleic Acids Res. 10:1425-1437 (1982).
Goffin, et al. Nucleic Acids Res. 15:8755-8771 (1987).
Wu, et al. Gene, 76: 245-254 (1989).
Harada, et al. Nucleic Acids Res., 21, 2287-2291 (1993).
Showalter, et al. Chem Rev. 106: 340-360 (2006).
Engler, et al. Methods Mol. Biol., 1116, 119-131 (2014).
Ellenberger, et al. Annual Review in Biochemistry, 77, 313-338 (2008).

* cited by examiner

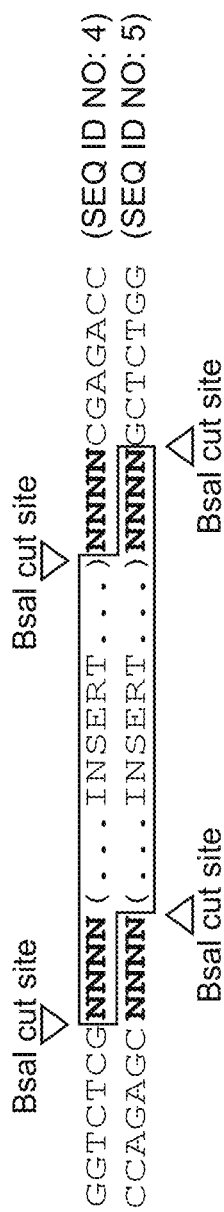
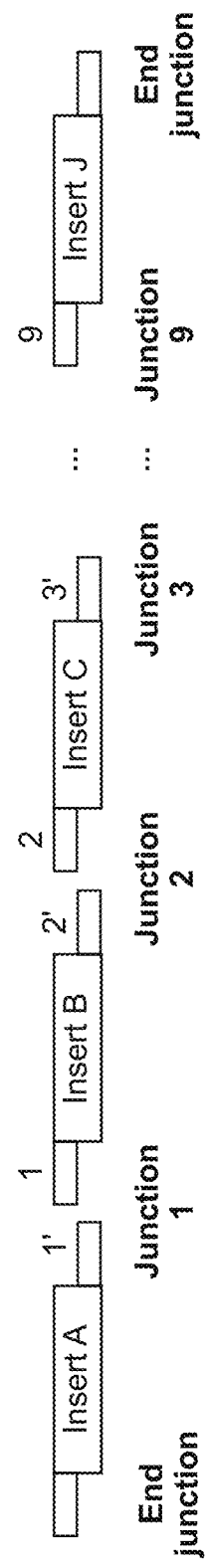
FIG. 1A
FIG. 1B

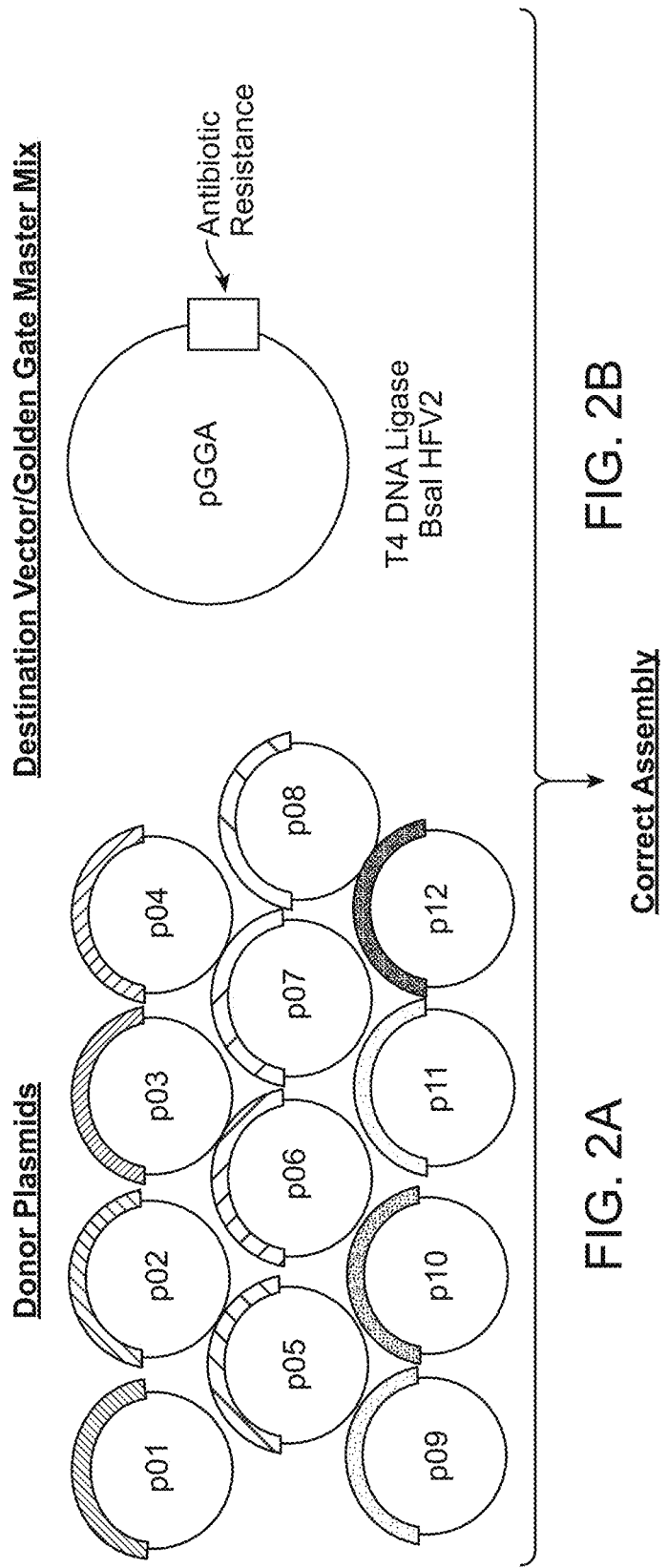

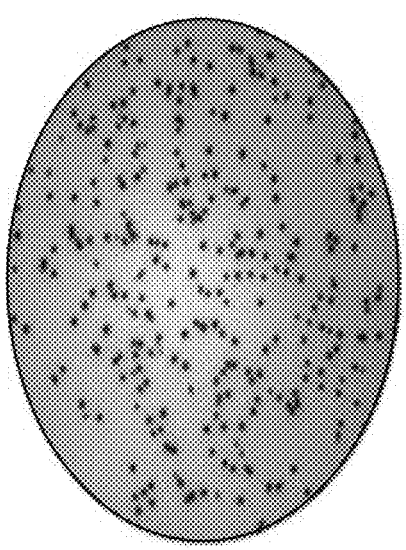
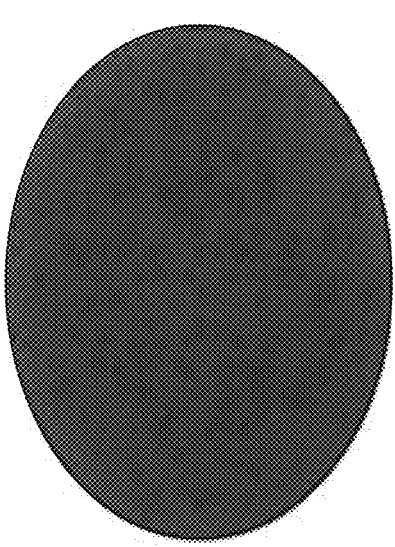
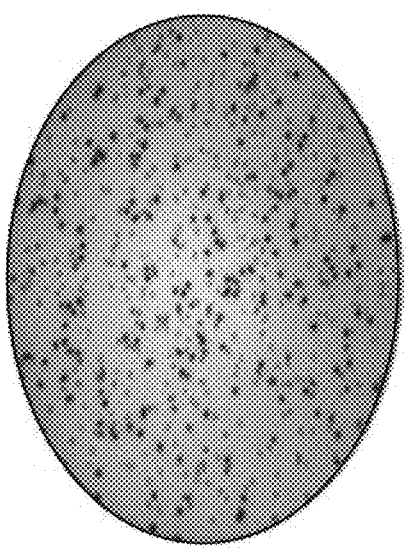
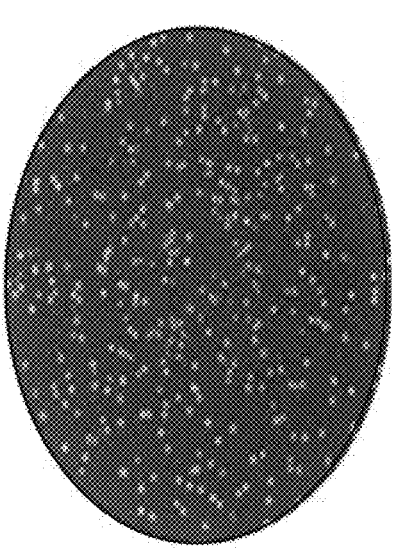
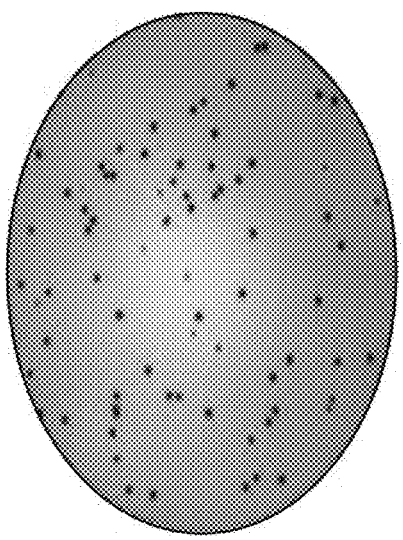
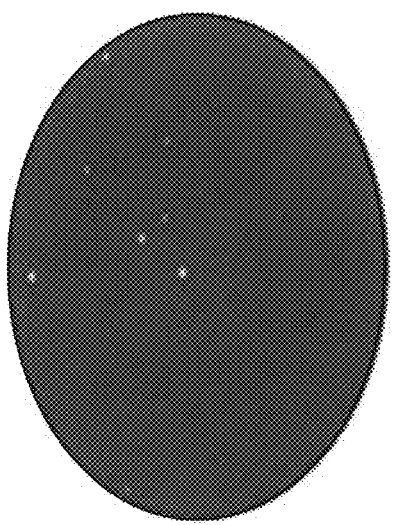
FIG. 3A
FIG. 3B
FIG. 3C

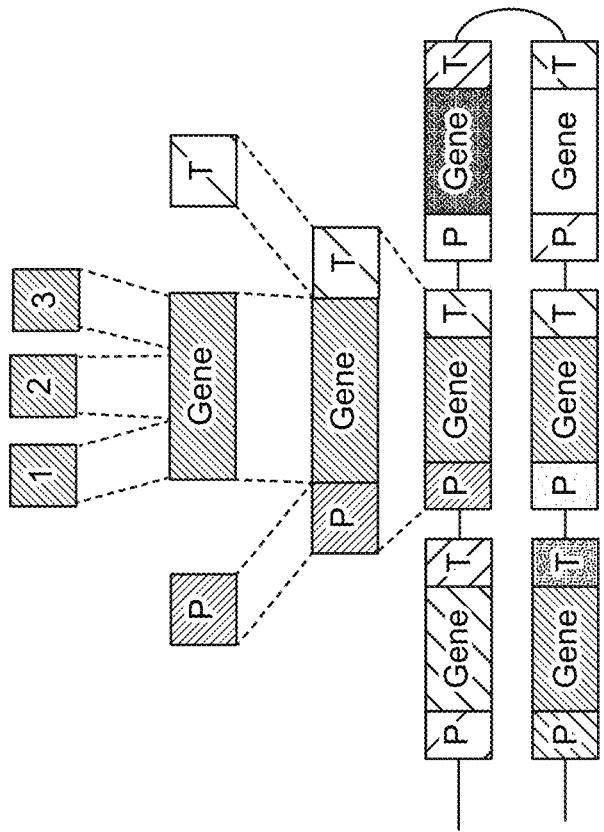
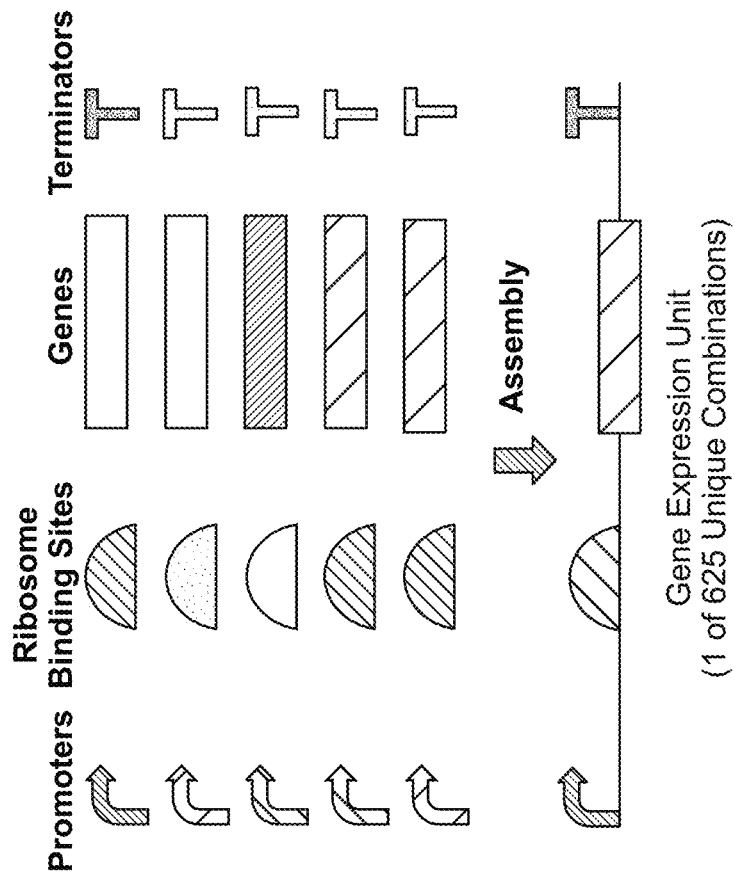
FIG. 4B
FIG. 4A

FIG. 11B

| Fragment | Primers | Overhangs |
|---|---|---|
| A | CCAGAGC/AAGG..., GGTCTCGC/ACTC.... (SEQ ID NO: 6)  (SEQ ID NO: 7) | TTCC, TGAG |
| B | CCAGAG/TGAG..., GGTCTCGC/AGTG... (SEQ ID NO:8)  (SEQ ID NO:9) | ACTC, TCAC |
| ⋮ | ⋮ | ⋮ |
| G | CCAGAG/N'N'N'N', GGTCTCG/Y'Y'Y'Y' (SEQ ID NO:10)  (SEQ ID NO: 11) | NNNN, YYYY |
| ⋮ | ⋮ | ⋮ |

Sequence fragments ⟵ Resulting fragments for Golden Gate assembly

```
>F1 length=596 coord=1..596 5'-overhang=none 3'-overhang=AAGA                              (SEQ ID NO: 13)
ACCATGATTACGGATTCACTGGCCGTCGTTTTACAACGTCGTGACTGGGAAAACCTGGCGTTACCCAACTTAATCGCCTTGCAGCACATCCCC
CTTTCGCCAGCTGGCGTAATAGCGAAGAGGCCCGCACCGATCGCCCTTCCCAACAGTTGCGCAGCCTGA
>F2 length=661 coord=593..1253 5'-overhang=AAGA 3'-overhang=CCCA                          (SEQ ID NO: 14)
AAGATCAGGATATGTGGCGGATGAGCGGCATTTCAGCGTGACCGCTACACAAATCAGGATTTCCATGTTGCCAC
TCGCTTTAATGATGATTTCAGCCGCGCTGTACTGGAGGCTGAAGTTCAGATGTGCGGCGAGTTGCGTGA
>F3 length=608 coord=1250..1857 5'-overhang=CCCA 3'-overhang=GGAA                         (SEQ ID NO: 15)
CCCACGGCATGGTGCCAATGAATCGTCTGACCGGATGATCCGGCTACCGGGCTGAAGGCCGTAACGCGGAATGGTGCAGCGCGATCG
TAATCACCCGAGTGTGATCATCTGGTCGCTGGGGAATGAATCAGGCCACGGCGCTAATCACGACGCGCT
>F4 length=620 coord=1854..2473 5'-overhang=GGAA 3'-overhang=CAGT                         (SEQ ID NO: 16)
GGAAGCAAAACACCAGCAGCAGTTTTCCAGTTCCGTTTATCCGGCAAACCATGGAAGTGACCAGCGAATACCTGTTCCGTCATAGCGATAAC
GAGCTCCTGCACTGGATGGTGGCCGATGCCTGGAAGCCGGTAAGCCGGTGAAGTGCCTCTGGATGTC
>F5 length=609 coord=2470..3079 5'-overhang=CAGT 3'-overhang=none                         (SEQ ID NO: 17)
CAGTGCACGGCAGATACACTTGCTGATGCGGTGCTGATTACGACCGGTGATGTGCTGCCAGCATCAGGGGAAAACCTTATTTATCAGCCCGGAAAA
CCTACCCGGATTGATGGTAGTGGTTCAAATGGCGATTACCGTTGATGTTGAAGTGGCGAGCGATACACCGC
```

FIG. 17 (Cont.)

LacZ Cassette 24 Fragment Assembly
by BsmBIv2-T4 DNA Ligase (65 cycles)

96% fidelity of assembly
1100 colonies (per 1/10 outgrowth)
High efficiency assembly; 137,500 colonies per 25 μl reaction

*50-fragment assembly plaque forming units**

| | Plaques |
|---|---|
| Replicate #1 | 46 |
| Replicate #2 | 6 |
| Replicate #3 | 23 |
| Replicate #4 | 18 |
| Average | 23 |

*per µL of assembly reaction

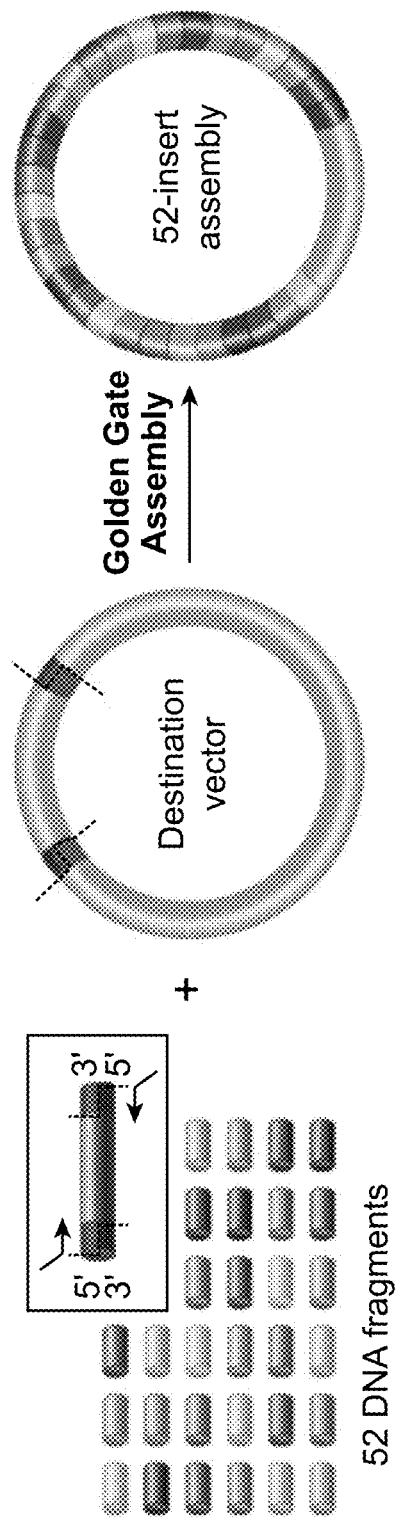
FIG. 22A
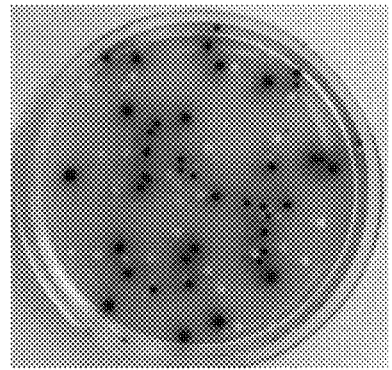
FIG. 22B
52-fragment assembly colony forming units
|  | Correct | Incorrect | % Correct |
|---|---|---|---|
| Replicate #1 | 520 | 580 | 47 |
| Replicate #2 | 760 | 740 | 51 |
| Replicate #3 | 900 | 880 | 51 |
| Average | 720 | 740 | 49 |
FIG. 22C

SEQUENCE LISTING

<160> NUMBER OF SEQ ID NOS: 26

<210> SEQ ID NO 1
<211> LENGTH: 100
<212> TYPE: DNA
<213> ORGANISM: Artificial Sequence
<220> FEATURE:
<223> OTHER INFORMATION: Synthetic construct
<220> FEATURE:
<221> NAME/KEY: misc_feature
<222> LOCATION: (7)..(9)
<223> OTHER INFORMATION: n is a, c, g, or t
<220> FEATURE:
<221> NAME/KEY: misc_feature
<222> LOCATION: (52)..(57)
<223> OTHER INFORMATION: n is a, c, g, or t

<400> SEQUENCE: 1
tcaggtnnnc gaagagctgc gatccagtgc gccgtgcatt gatcaacgca annnnnnatc    60
tctctctttt cctcctcctc cgttgttgtt gttgagagag                          100

<210> SEQ ID NO 2
<211> LENGTH: 144
<212> TYPE: DNA
<213> ORGANISM: Artificial Sequence
<220> FEATURE:
<223> OTHER INFORMATION: Synthetic construct
<220> FEATURE:
<221> NAME/KEY: misc_feature
<222> LOCATION: (1)..(3)
<223> OTHER INFORMATION: n is a, c, g, or t
<220> FEATURE:
<221> NAME/KEY: misc_feature
<222> LOCATION: (46)..(51)

<223> OTHER INFORMATION: n is a, c, g, or t
<220> FEATURE:
<221> NAME/KEY: misc_feature
<222> LOCATION: (97)..(102)
<223> OTHER INFORMATION: n is a, c, g, or t

<400> SEQUENCE: 2
nnncgaagag ctgcgatcca gtgcgccgtg cattgatcaa cgcaannnnn natctctctc    60
ttttcctcct cctccgttgt tgttgttgag agagatnnnn nnttgcgttg atcaatgcac   120
ggcgcactgg atcgcagctc ttcg                                          144

<210> SEQ ID NO 3
<211> LENGTH: 99
<212> TYPE: DNA
<213> ORGANISM: Artificial Sequence
<220> FEATURE:
<223> OTHER INFORMATION: Synthetic construct
<220> FEATURE:
<221> NAME/KEY: misc_feature
<222> LOCATION: (1)..(6)
<223> OTHER INFORMATION: n is a, c, g, or t
<220> FEATURE:
<221> NAME/KEY: misc_feature
<222> LOCATION: (49)..(51)
<223> OTHER INFORMATION: n is a, c, g, or t
<220> FEATURE:
<221> NAME/KEY: misc_feature
<222> LOCATION: (94)..(99)
<223> OTHER INFORMATION: n is a, c, g, or t

<400> SEQUENCE: 3
nnnnnnttgc gttgatcaat gcacggcgca ctggatcgca gctcttcgnn ncgaagagct    60
gcgatccagt gcgccgtgca ttgatcaacg caannnnnn                          99

<210> SEQ ID NO 4
<211> LENGTH: 22
<212> TYPE: DNA
<213> ORGANISM: Artificial Sequence
<220> FEATURE:
<223> OTHER INFORMATION: Synthetic construct
<220> FEATURE:
<221> NAME/KEY: misc_feature
<222> LOCATION: (8)..(15)
<223> OTHER INFORMATION: n is a, c, g, or t

<400> SEQUENCE: 4
ggtctcgnnn nnnncgaga cc                                             22

<210> SEQ ID NO 5
<211> LENGTH: 22
<212> TYPE: DNA
<213> ORGANISM: Artificial Sequence
<220> FEATURE:
<223> OTHER INFORMATION: Synthetic construct
<220> FEATURE:
<221> NAME/KEY: misc_feature
<222> LOCATION: (8)..(15)
<223> OTHER INFORMATION: n is a, c, g, or t

<400> SEQUENCE: 5
ccagagcnnn nnnnngctct gg                                            22

<210> SEQ ID NO 6
<211> LENGTH: 11
<212> TYPE: DNA
<213> ORGANISM: Artificial Sequence
<220> FEATURE:
<223> OTHER INFORMATION: Synthetic construct

```
<400> SEQUENCE: 6
ccagagcaag g                                                          11

<210> SEQ ID NO 7
<211> LENGTH: 12
<212> TYPE: DNA
<213> ORGANISM: Artificial Sequence
<220> FEATURE:
<223> OTHER INFORMATION: Synthetic construct

<400> SEQUENCE: 7
ggtctcgcac tc                                                         12

<210> SEQ ID NO 8
<211> LENGTH: 10
<212> TYPE: DNA
<213> ORGANISM: Artificial Sequence
<220> FEATURE:
<223> OTHER INFORMATION: Synthetic construct

<400> SEQUENCE: 8
ccagagtgag                                                            10

<210> SEQ ID NO 9
<211> LENGTH: 12
<212> TYPE: DNA
<213> ORGANISM: Artificial Sequence
<220> FEATURE:
<223> OTHER INFORMATION: Synthetic construct

<400> SEQUENCE: 9
ggtctcgcag tg                                                         12

<210> SEQ ID NO 10
<211> LENGTH: 10
<212> TYPE: DNA
<213> ORGANISM: Artificial Sequence
<220> FEATURE:
<223> OTHER INFORMATION: Synthetic construct
<220> FEATURE:
<221> NAME/KEY: misc_feature
<222> LOCATION: (7)..(10)
<223> OTHER INFORMATION: n is a, c, g, or t

<400> SEQUENCE: 10 ccagagnnnn                                                            10

<210> SEQ ID NO 11
<211> LENGTH: 11
<212> TYPE: DNA
<213> ORGANISM: Artificial Sequence
<220> FEATURE:
<223> OTHER INFORMATION: Synthetic construct

<400> SEQUENCE: 11
ggtctcgyyy y                                                          11

<210> SEQ ID NO 12
<211> LENGTH: 1629
<212> TYPE: DNA
<213> ORGANISM: Artificial Sequence
<220> FEATURE:
<223> OTHER INFORMATION: Synthetic construct

<400> SEQUENCE: 12
```

-continued

```
accatcatta cccattcact gccctcctt ttacaacctc ctcactccca aaaccctggc      60
cttacccaac ttaatcccct tccaccacat cccccttcc ccacctcccc taatagccaa     120
cacgccccca cccatcgccc ttcccaacag ttgcgcagcc tgaatggcga atggcgcttt    180
gcctcctttc ccccaccaca agccgtcccg caaagctggc tggagtgcga tcttcctcac    240
ccccatactc tcctcgtccc ctcaaactgc cacatccacg gttaccatgc gcccatctac    300
accaacctaa cctatcccat taccctcaat ccgccgtttc ttcccaccca caatccgacc    360
cgttcttact cgctcacatt taatgttcat caaacctccc tacaccaacc ccacacccca    420
attatttttc atcccgttaa ctccgcgttt catctctcct gcaaccccc ctccctcct    480 tacccccacc acagtcgttt gccgtctgaa tttgacctca gcgcattttt acgcccccca    540
caaaaccccc tcgccctcat cgtcctccct tgcagtgacc ccagttatct cgaagatcac    600
gatatctccc ccatcaccc cattttccct cacctctcct tcctcataa acccactaca    660 caaatcagcg atttccatgt tgccactccc tttaatgatc atttcagccc cgctgtactg    720
caggctgaag ttcagatgtc ccgcgacttc cctcactacc tacgcctaac actttcttta    780
tggcaccctc aaaccacct ccccaccccgc accccccctt tcccgctca aattatccat    840 caccctcctc cttatcccca tccctcaca ctacctctca acctcaaaa cccaaaactc    900 tccaccccc aaatcccaa tctctatcct ccctccttg aactccacac ccccaccc      960 accctgattc aaccacaacc ctcccatctt ccctttcccc cacctcccca ttgaaaatcc   1020
tctcctcctc ctgaacccca accctcct cattccaccc cttaacctc accaccatca   1080 tcctctccat cctcacgtca tccatcacca caccatcctc caccatatcc tcctcatcaa   1140
ccacaacaac tttaacccc tcccctgttc ccattatccc aaccatcccc tctgctacac    1200
cctctccgac cgctaccccc tctatctcct ccatgaaccc aatattcaaa cccaccgcat   1260
cctcccaatc aatcctctca cccatcatcc ccgctcccta cccccatca cccaaccct   1320 aaccccaatc ctccacccc atcctaatca ccccactctc atcatctcct ccctcgccaa   1380
tcaatcaccc cacccccta atcaccaccc gctctatccc tgcatcaaat ctctccatcc   1440 ttccccccc ctgcactatc aaccccccc acccacacc accccaccc atattatttc    1500 ccccatctac cccccctcc atcaacacca cccttcccc cctctcccca aatcctccat   1560
caaaaaatcc ctttccctac ctccacacac ccccccctc atcctttccc aatacccca   1620 ccccatccc                                                           1629
```

<210> SEQ ID NO 13
<211> LENGTH: 163
<212> TYPE: DNA
<213> ORGANISM: Artificial Sequence
<220> FEATURE:
<223> OTHER INFORMATION: Synthetic construct

<400> SEQUENCE: 13

```
accatcatta cccattcact ccccctcctt ttacaacctc ctcactccca aaaccctgcc      60
gttacccaac ttaatcccct tccaccacat ccccctttcc ccacctcgcc taataccgaa    120 cacccccca ccgatccccc ttcccaacac ttccccaccc tga                       163
```

<210> SEQ ID NO 14
<211> LENGTH: 162
<212> TYPE: DNA
<213> ORGANISM: Artificial Sequence
<220> FEATURE:
<223> OTHER INFORMATION: Synthetic construct

<400> SEQUENCE: 14

```
aacatcagga tatctccccc atcagcccca ttttccctca cctctcgttc ctccataaac    60
ccactacaca aatcacccat ttccatcttc ccactccctt taatcatgat ttcacccgcc   120
ctctactcca ccctcaacmc acatctcccc ccacttccct ca                      162
```

<210> SEQ ID NO 15
<211> LENGTH: 163
<212> TYPE: DNA
<213> ORGANISM: Artificial Sequence
<220> FEATURE:
<223> OTHER INFORMATION: Synthetic construct

<400> SEQUENCE: 15

```
cccaccccat cctcccaatc aatcctctca cccatgatcc gccctgccta ccgcccatca    60
cccaacccct aaccccaatc ctgcagcgcc atcctaatca cccgactctc atcatctcgt   120
ccctggccaa tgaatcaccc caccccgcta atcaccaccc cct                     163
```

<210> SEQ ID NO 16
<211> LENGTH: 163
<212> TYPE: DNA
<213> ORGANISM: Artificial Sequence
<220> FEATURE:
<223> OTHER INFORMATION: Synthetic construct

<400> SEQUENCE: 16

```
ccaaccaaaa caccagcagc acttttttcca cttcccttta tcccgccaaa ccatccaact    60
caccacccaa tacctcttcc ctcatacccca taaccacctc ctccactcca tcctccccct   120
ccatcctaac cccctcccaa cccctcaact ccctctccat ctc                      163
```

<210> SEQ ID NO 17
<211> LENGTH: 163
<212> TYPE: DNA
<213> ORGANISM: Artificial Sequence
<220> FEATURE:
<223> OTHER INFORMATION: Synthetic construct

<400> SEQUENCE: 17

```
cactccaccc cacatacact tcctcatccg ctcctcatta ccaccccctca cccctcccac    60 catcacccca aaaccttatt tatcaccccc aaaacctacc ccattcatcc tactgctcaa   120
atccccatta cccttcatct tcaactcccc agccatacac cgc                     163
```

<210> SEQ ID NO 18
<211> LENGTH: 356
<212> TYPE: PRT
<213> ORGANISM: Homo sapiens
<220> FEATURE:
<221> NAME/KEY: MISC_FEATURE
<223> OTHER INFORMATION: Deadenylase-Aprataxin

<400> SEQUENCE: 18

```
Met Ser Asn Val Asn Leu Ser Val Ser Asp Phe Trp Arg Val Met Met
1               5                   10                  15

Arg Val Cys Trp Leu Val Arg Gln Asp Ser Arg His Gln Arg Ile Arg
                20                  25                  30

Leu Pro His Leu Glu Ala Val Val Ile Gly Arg Gly Pro Glu Thr Lys
            35                  40                  45

Ile Thr Asp Lys Lys Cys Ser Arg Gln Gln Val Gln Leu Lys Ala Glu
        50                  55                  60
```

```
Cys Asn Lys Gly Tyr Val Lys Gln Val Gly Val Asn Pro Thr
 65                  70                  75                  80

Ser Ile Asp Ser Val Ile Gly Lys Asp Gln Glu Val Lys Leu Gln
                 85                  90                  95

Pro Gly Gln Val Leu His Met Val Asn Glu Leu Tyr Pro Tyr Ile Val
            100                 105                 110

Glu Phe Glu Glu Glu Ala Lys Asn Pro Gly Leu Glu Thr His Arg Lys
            115                 120                 125

Arg Lys Arg Ser Gly Asn Ser Asp Ser Ile Glu Arg Asp Ala Ala Gln
        130                 135                 140

Glu Ala Glu Ala Gly Thr Gly Leu Glu Pro Gly Ser Asn Ser Gly Gln
145                 150                 155                 160

Cys Ser Val Pro Leu Lys Lys Gly Lys Asp Ala Pro Ile Lys Lys Glu
                165                 170                 175

Ser Leu Gly His Trp Ser Gln Gly Leu Lys Ile Ser Met Gln Asp Pro
            180                 185                 190

Lys Met Gln Val Tyr Lys Asp Glu Gln Val Val Ile Lys Asp Lys
        195                 200                 205

Tyr Pro Lys Ala Arg Tyr His Trp Leu Val Leu Pro Trp Thr Ser Ile
210                 215                 220

Ser Ser Leu Lys Ala Val Ala Arg Glu His Leu Glu Leu Leu Lys His
225                 230                 235                 240

Met His Thr Val Gly Glu Lys Val Ile Val Asp Phe Ala Gly Ser Ser
                245                 250                 255

Lys Leu Arg Phe Arg Leu Gly Tyr His Ala Ile Pro Ser Met Ser His
            260                 265                 270

Val His Leu His Val Ile Ser Gln Asp Phe Asp Ser Pro Cys Leu Lys
        275                 280                 285

Asn Lys Lys His Trp Asn Ser Phe Asn Thr Glu Tyr Phe Leu Glu Ser
        290                 295                 300

Gln Ala Val Ile Glu Met Val Gln Glu Ala Gly Arg Val Thr Val Arg
305                 310                 315                 320

Asp Gly Met Pro Glu Leu Leu Lys Leu Pro Leu Arg Cys His Glu Cys
                325                 330                 335

Gln Gln Leu Leu Pro Ser Ile Pro Gln Leu Lys Glu His Leu Arg Lys
            340                 345                 350

His Trp Thr Gln
        355

<210> SEQ ID NO 19
<211> LENGTH: 217
<212> TYPE: PRT
<213> ORGANISM: Saccharomyces cerevisiae
<220> FEATURE:
<221> NAME/KEY: misc_feature
<223> OTHER INFORMATION: Deadenylase

<400> SEQUENCE: 19

Met Ser Trp Arg Tyr Ala Leu Lys Asn Tyr Val Thr Ser Pro Glu Thr
 1               5                  10                  15

Val Asn Asp Asp Thr Val Thr Tyr Phe Asp Lys Val Ser Ile Ile
             20                  25                  30

Arg Asp Ser Phe Pro Lys Ser Glu Cys His Leu Leu Ile Leu Pro Arg
         35                  40                  45

Thr Met Gln Leu Ser Arg Ser His Pro Thr Lys Val Ile Asp Ala Lys
```

```
                50                  55                  60
Phe Lys Asn Glu Phe Glu Ser Tyr Val Asn Ser Ala Ile Asp His Ile
 65                  70                  75                  80

Phe Arg His Phe Gln Glu Lys Phe Arg Ile Lys Lys Ser Asp Asp
                 85                  90                  95

Lys Asp Pro Cys Trp Asp Asp Ile Leu Lys Asp Lys Asn Lys Phe Val
            100                 105                 110

Arg Asn Phe Val Gln Val Gly Ile His Ser Val Pro Ser Met Ala Asn
            115                 120                 125

Leu His Ile His Val Ile Ser Lys Asp Phe His Ser Val Arg Leu Lys
        130                 135                 140

Asn Lys Lys His Tyr Asn Ser Phe Asn Thr Gly Phe Phe Ile Ser Trp
145                 150                 155                 160

Asp Asp Leu Pro Leu Asn Gly Lys Asn Leu Gly Thr Asp Lys Glu Ile
                165                 170                 175

Glu Thr Thr Tyr Leu Lys Glu His Asp Leu Leu Cys Cys Tyr Cys Gln
                180                 185                 190

Arg Asn Phe Ser Asn Lys Phe Ser Leu Leu Lys Lys His Leu Glu Leu
                195                 200                 205

Glu Phe Asn Ser His Phe Glu Leu Lys
        210                 215

<210> SEQ ID NO 20
<211> LENGTH: 232
<212> TYPE: PRT
<213> ORGANISM: Schizosaccharomyces pombe
<220> FEATURE:
<221> NAME/KEY: MISC_FEATURE
<223> OTHER INFORMATION: Deadenylase

<400> SEQUENCE: 20

Met Ser Val His Lys Thr Asn Asp Ala Phe Lys Val Leu Met Asn Ser
 1               5                  10                  15

Ala Lys Glu Pro Ile Val Glu Asp Ile Pro Lys Lys Tyr Arg Lys Gln
            20                  25                  30

Ser Phe Arg Asp Asn Leu Lys Val Tyr Ile Glu Ser Pro Glu Ser Tyr
        35                  40                  45

Lys Asn Val Ile Tyr Tyr Asp Asp Asp Val Val Leu Val Arg Asp Met
    50                  55                  60

Phe Pro Lys Ser Lys Met His Leu Leu Leu Met Thr Arg Asp Pro His
 65                  70                  75                  80

Leu Thr His Val His Pro Leu Glu Ile Met Met Lys His Arg Ser Leu
                 85                  90                  95

Val Glu Lys Leu Val Ser Tyr Val Gln Gly Asp Leu Ser Gly Leu Ile
            100                 105                 110

Phe Asp Glu Ala Arg Asn Cys Leu Ser Gln Gln Leu Thr Asn Glu Ala
        115                 120                 125

Leu Cys Asn Tyr Ile Lys Val Gly Phe His Ala Gly Pro Ser Met Asn
130                 135                 140

Asn Leu His Leu His Ile Met Thr Leu Asp His Val Ser Pro Ser Leu
145                 150                 155                 160

Lys Asn Ser Ala His Tyr Ile Ser Phe Thr Ser Pro Phe Phe Val Lys
                165                 170                 175

Ile Asp Thr Pro Thr Ser Asn Leu Pro Thr Arg Gly Thr Leu Thr Ser
            180                 185                 190
```

Leu Phe Gln Glu Asp Leu Lys Cys Trp Arg Cys Gly Glu Thr Phe Gly
            195                 200                 205

Arg His Phe Thr Lys Leu Lys Ala His Leu Gln Glu Glu Tyr Asp Asp
        210                 215                 220

Trp Leu Asp Lys Ser Val Ser Met
225                 230

<210> SEQ ID NO 21
<211> LENGTH: 291
<212> TYPE: PRT
<213> ORGANISM: Thermothelomyces thermophilus
<220> FEATURE:
<221> NAME/KEY: misc_feature
<223> OTHER INFORMATION: Deadenylase

<400> SEQUENCE: 21

Met Ala Glu Arg Ala Glu Asp Ala Asp Ile Pro Gln Pro Glu Ser
1               5                   10                  15

Ala Pro Pro Thr Thr Asp Gln Gln Gln Gln Gln His Asp Ser Pro
            20                  25                  30

Pro Pro Lys Ala Pro Ala Lys Arg Asn Ala Phe Glu Glu Leu Met Ala
            35                  40                  45

Pro Lys Pro Lys Ala Pro Ile Ser Gln Ala Pro Gln Phe Leu Ala His
        50                  55                  60

Lys Ala Ser Gln Val Ile Arg Gly Val Trp Arg Gly Ala Leu Ile Glu
65                  70                  75                  80

Tyr Ile Glu His Pro Glu Arg Phe Pro Asp Lys Val Leu Arg Val Thr
                85                  90                  95

Ala Asp Thr Val Leu Ile Lys Asp Ala Phe Pro Lys Ala Thr Val His
            100                 105                 110

Leu Leu Leu Leu Pro Arg Ser Pro Ala His Tyr Leu Val His Pro His
            115                 120                 125

Asp Ala Phe Ala Asp Pro Ala Phe Leu Ala Met Met Arg Gly Glu Ala
130                 135                 140

Ala Val Ala Ala Glu Leu Ala Ala Glu Leu Ala Arg Arg Leu Gly
145                 150                 155                 160

Ser Phe Ser Ala Ser Asn Arg Ala Arg Asp Glu Ala Met Ser Arg Gly
                165                 170                 175

Val Gly Pro Asp Gln Leu Pro Pro Gly Arg Asp Tyr Ser Arg Asp Ile
            180                 185                 190

Arg Val Gly Thr His Ala His Pro Ser Met Ala His Leu His Val His
            195                 200                 205

Val Ile Ser Arg Asp Met Arg Ser Glu Lys Leu Lys His Arg Lys His
        210                 215                 220

Tyr Asn Ser Phe Asn Thr Pro Phe Phe Val Pro Leu Glu Asp His Pro
225                 230                 235                 240

Leu Ala Gln Asp Asp Val Arg Arg Gln Thr Gly Tyr Gln Asn Gly Asn
                245                 250                 255

Leu Ala Lys Asp Leu Val Cys Trp Arg Cys Gly Lys Gly Phe Gly Asn
            260                 265                 270

Arg Phe Ala Glu Leu Lys Arg His Leu Glu Asp Glu Phe Glu Lys Trp
            275                 280                 285

Arg Ala Glu
    290

<210> SEQ ID NO 22

```
<211> LENGTH: 303
<212> TYPE: PRT
<213> ORGANISM: Thermothielavoides terrestris
<220> FEATURE:
<221> NAME/KEY: MISC_FEATURE
<223> OTHER INFORMATION: Deadenylase

<400> SEQUENCE: 22
```

Met Ala Glu Thr Ala Glu Asp Leu Glu Asp Leu Thr Arg Thr Glu Ser
1               5                   10                  15

Val Ala Ser Ser Ala Asp Ser Pro Glu Ser Thr Pro Lys Gln Asp Glu
            20                  25                  30

Ala Gln Thr Pro Thr Ala Arg Ala Asn Thr Thr Lys Pro Ser Lys Pro
        35                  40                  45

Glu Thr Lys Arg Asn Ala Phe Thr Glu Leu Met Ala Pro Lys Pro Arg
    50                  55                  60

Ala Pro Ile Ser Gln Ala Pro Gln Ser Leu Ala Ser Lys Ala Ser Gln
65                  70                  75                  80

Val Ile Arg Gly Val Trp Arg Gly Ala Leu Ile Glu Tyr Ile Glu His
                85                  90                  95

Pro Glu Arg Phe Pro Asn Gln Val Leu Arg Val Thr Ala His Thr Val
            100                 105                 110

Leu Ile Lys Asp Ala Phe Pro Lys Ser Thr Ile His Leu Leu Leu Leu
        115                 120                 125

Pro Arg Ser Pro Ala His Tyr Leu Leu His Pro His Thr Ala Phe Ala
    130                 135                 140

Asp Ala Ser Phe Leu Thr Thr Ile Arg Ala Glu Ala Ala Glu Ala Ala
145                 150                 155                 160

Arg Leu Ala Ala Ala Glu Leu Ala Arg Gln Leu Gly Ser Phe Ser Ala
                165                 170                 175

Ser Asn Arg Ala Arg Asp Glu Ala Val Gly Arg Gly Val Pro Pro Asp
            180                 185                 190

Arg Leu Pro Pro Gly Arg Asp Tyr Ala Arg Glu Ile Arg Val Gly Thr
        195                 200                 205

His Ala His Pro Ser Met Ala His Leu His Val His Ile Ile Ser Arg
    210                 215                 220

Asp Met Arg Ser Glu Arg Val Lys His Arg Lys His Tyr Asn Ser Phe
225                 230                 235                 240

Asn Thr Pro Phe Phe Val Pro Leu Ala Asp Tyr Pro Leu Ala Glu Asp
                245                 250                 255

Asp Val Arg Arg Glu Thr Gly Tyr Gln Asn Ala Asn Leu Arg Arg Glu
            260                 265                 270

Leu Val Cys Trp Arg Cys Gly Arg Thr Phe Gly Asn Arg Phe Ala Glu
        275                 280                 285

Leu Lys Arg His Leu Glu Glu Glu Phe Val Glu Trp Arg Ala Glu
    290                 295                 300

```
<210> SEQ ID NO 23
<211> LENGTH: 358
<212> TYPE: PRT
<213> ORGANISM: Thermothielavoides terrestris
<220> FEATURE:
<221> NAME/KEY: MISC_FEATURE
<223> OTHER INFORMATION: Deadenylase

<400> SEQUENCE: 23
```

Met Arg Val Tyr Val His Val Gly Gly Pro Leu His Ala Gly Leu Asp
1               5                   10                  15

Glu Val Pro Val Cys Val Asp Leu Ile Thr Glu Ala Phe Leu Gly Ala
            20                  25                  30

Pro Val Asn Thr Leu Glu Ala Ser Glu Val Glu Gly Val Thr Lys
    35                  40                  45

Glu Gly Thr Arg Thr Tyr Arg Leu Ile Asp Ile Gln His Ile Leu Ala
50                  55                  60

Ser Lys Leu Ala Ala Phe Cys Ala Arg Gly Asp Leu Asp Ser His Asp
65                  70                  75                  80

Phe Leu Asp Leu Met Trp Leu Leu Ile Lys Ser Pro Tyr Ser Val Lys
                85                  90                  95

Leu Arg Glu Gly Ser Val Asn Val Pro Leu Asp Gln Arg Gln Ala Phe
            100                 105                 110

Leu Ala Ala Ala Ser Thr Glu Ser Pro His Ile Pro Ser Pro Gln Ser
            115                 120                 125

Leu Ala Ser Lys Ala Ser Gln Val Ile Arg Gly Val Trp Arg Gly Ala
130                 135                 140

Leu Ile Glu Tyr Ile Glu His Pro Glu Arg Phe Pro Asn Gln Val Leu
145                 150                 155                 160

Arg Val Thr Ala His Thr Val Leu Ile Lys Asp Ala Phe Pro Lys Ser
                165                 170                 175

Thr Ile His Leu Leu Leu Pro Arg Ser Pro Ala His Tyr Leu Leu
            180                 185                 190

His Pro His Thr Ala Phe Ala Asp Ala Ser Phe Leu Thr Thr Ile Arg
            195                 200                 205

Ala Glu Ala Glu Ala Ala Arg Leu Ala Ala Glu Leu Ala Arg
            210                 215                 220

Gln Leu Gly Ser Phe Ser Ala Ser Asn Arg Ala Arg Asp Glu Ala Val
225                 230                 235                 240

Gly Arg Gly Val Pro Pro Asp Arg Leu Pro Pro Gly Arg Asp Tyr Ala
                245                 250                 255

Arg Glu Ile Arg Val Gly Thr His Ala His Pro Ser Met Ala His Leu
            260                 265                 270

His Val His Ile Ile Ser Arg Asp Met Arg Ser Glu Arg Val Lys His
            275                 280                 285

Arg Lys His Tyr Asn Ser Phe Asn Thr Pro Phe Phe Val Pro Leu Ala
290                 295                 300

Asp Tyr Pro Leu Ala Glu Asp Asp Val Arg Arg Glu Thr Gly Tyr Gln
305                 310                 315                 320

Asn Ala Asn Leu Arg Arg Glu Leu Val Cys Trp Arg Cys Gly Arg Ala
                325                 330                 335

Phe Gly Asn Arg Phe Ala Glu Leu Lys Arg His Leu Glu Glu Glu Phe
            340                 345                 350

Val Glu Trp Arg Ala Glu
        355

<210> SEQ ID NO 24
<211> LENGTH: 302
<212> TYPE: PRT
<213> ORGANISM: Chaetomium thermophilum var. thermophilum
<220> FEATURE:
<221> NAME/KEY: MISC_FEATURE
<223> OTHER INFORMATION: Deadenylase

<400> SEQUENCE: 24

Met Pro Glu Ala Glu Ile Pro Glu Glu Met Asp Glu Phe Val Gln Pro

```
              1               5                  10                 15
        Glu Ser Ala Pro Pro Thr Val Asp Ser Pro Glu Val Pro Val Asp His
                            20                  25                 30

Asp Ala Thr Lys Thr Val Ser Ser Val Leu Glu Thr Phe Thr Ser Thr
                        35                  40              45

Lys Lys Asp Ala Phe Ala Glu Leu Met Ser His Lys Gln Pro Ser Lys
                    50                  55                  60

Lys Leu Met Lys Pro Pro Arg Ser Leu Ala Glu Lys Ala Gly Lys Val
         65                  70                  75                  80

Ile Gly Gly Val Trp Arg Gly Ala Leu Gly Pro Phe Ile Glu His Pro
                                85                  90                  95

Glu Lys Tyr Pro Asp Gln Val Leu Arg Val Thr Glu His Thr Val Leu
                        100                 105                 110

Ile Lys Asp Arg Tyr Pro Lys Ala Thr Ile His Leu Leu Leu Leu Pro
                    115                 120                 125

Arg Ser Lys Glu His Asn Leu Leu His Pro His Thr Ala Met Ala Asp
                130                 135                 140

Pro Ala Phe Leu Lys Ile Met Arg Ala Glu Ala Glu Thr Ala Ala Gln
        145                 150                 155                 160

Leu Ala Ala Ala Glu Leu Gln Arg Leu Leu Gly Arg Phe Ser Glu Lys
                            165                 170                 175

Asn Arg Ser Arg Asn Glu Ala Ile Asp Ala Cys Val Pro Phe Asp Glu
                        180                 185                 190

Leu Pro Pro Gly Arg Asp Tyr Arg Lys Asp Ile Arg Val Gly Thr His
                    195                 200                 205

Ala His Pro Ser Met Ala His Val His Val His Ile Ile Ser Arg Asp
                210                 215                 220

Met Arg Ser Glu Ser Leu Lys Arg Val Lys His Tyr Asn Ser Phe Asn
        225                 230                 235                 240

Thr Pro Phe Phe Ile Pro Leu Glu Asp Tyr Pro Leu Gly Glu Glu Asp
                            245                 250                 255

Glu Arg Trp Ser Thr Ser Tyr Gln Asn Asn Asn Leu Thr Gly Asp Met
                        260                 265                 270

Val Cys Trp Arg Cys Lys Lys Asn Phe Gly His Lys Phe Ala Glu Leu
                    275                 280                 285

Lys Arg His Leu Glu Glu Glu Phe Glu Ala Trp Lys Arg Glu
                290                 295                 300

<210> SEQ ID NO 25
<211> LENGTH: 635
<212> TYPE: PRT
<213> ORGANISM: Thermothelomyces thermophilus

<400> SEQUENCE: 25

Met Val Arg Pro Tyr Asp Pro Thr Leu Thr Glu Thr Ala Val Arg Val
 1               5                  10                  15

Asp Pro Arg Asp Ser Arg Glu Tyr Ala Gly Asn Gln Glu Ala Ser Pro
                20                  25                  30

Leu Tyr Asp Ile Cys His His Pro Glu Lys Tyr Thr Asn Val Arg Tyr
            35                  40                  45

Phe Asp Arg Glu Met Val Val Leu Asp Asp Ala Asn Ala Lys Ser Pro
        50                  55                  60

Asp His Val Ile Leu Met Pro Arg Asp Thr Ser Ile Lys Glu Met Ala
 65                  70                  75                  80
```

```
Cys Leu Lys Thr Lys His Leu Pro Leu Leu Tyr Arg Phe Arg Asp Gln
                85              90                  95

Ala His Arg Glu Ile Glu Arg Met Met Arg Val Asp Pro Gly Arg Ile
            100                 105             110

Pro Met Phe Arg Val Gly Phe His Thr Ile Pro Ser Leu Phe Pro Leu
            115                 120                 125

His Cys His Val His Asp Cys Ser Leu Ser Thr Asp Lys Met Phe His
            130             135             140

Ala Arg His Trp Lys Val Asn Phe Ser Asn Met Phe Val Ala Leu Asp
145             150                 155                     160

Arg Val Ile Glu Glu Ile Glu Arg Thr Gly Arg Ile Glu Val Asp Ala
                165                 170                 175

Asp Ala Tyr Arg His Asp Trp Arg Thr Arg Pro Ile Arg Cys Pro Val
            180                 185             190

Cys Pro Gly Arg Gln Pro Gln Trp Glu Ala Asp Ile Thr Glu Leu Ala
            195                 200             205

Ala His Trp Arg Arg His Val Asp Glu Trp Lys Ser Gly Arg Ala Pro
            210                 215             220

Leu Pro Pro Asn Val Thr Pro Ala Arg Leu Trp Glu Pro Ser Tyr Pro
225             230                 235                 240

Val Ile Leu Thr Thr Arg Arg Ser Gly Phe Leu Gly Leu Leu Gly
                245                 250                 255

Asp Glu Leu Asp His Leu Lys Ala Glu Phe Pro Gly Leu Glu Ile His
            260                 265             270

Ser Tyr Tyr Thr Asp Glu Trp Pro Arg Ile Pro Lys Tyr Val Leu Asp
        275                 280             285

Lys Thr Thr Val Tyr Leu Ser Ala Ala Glu Leu Pro Pro Gly Tyr
290                 295             300

Ser Leu Pro Arg Leu Glu Trp Val His Leu Gly Ser Ser Gly Leu Asp
305             310                 315                 320

Leu Leu Ala Ala His Pro Tyr Asn Thr His His Arg Gly Leu Arg
            325                 330             335

Val Thr Ser Ser Thr Gly Ser Gly Ser Glu Ala Val Ala Glu Trp Val
            340                 345             350

Leu Met Asn Thr Met Phe Leu Thr Arg Arg Met Gly Ala Ala Leu Arg
        355                 360             365

Asn Gln Ala Gly Arg Glu Trp Ala Pro Arg Ala Leu Thr Gly Phe Arg
        370                 375             380

Thr Ile Ser Gln Leu Ser Val Gly Ile Val Gly Phe Gly Ser Ile Gly
385                 390                 395             400

Arg His Val Ala Glu Arg Phe Leu Ala Leu Gly Ala Arg Lys Val Thr
            405                 410                 415

Ala Val Asn Thr Thr Gly Pro Pro Leu Ser Ser Ser Ser Ser Ser
            420                 425             430

Pro Cys Gly Tyr Ser Arg Leu Gly Glu Val Thr Val Leu Pro Leu Leu
        435                 440             445

Gln Arg Gly Gly Asp Gly Lys Pro Glu Ala Arg Gly Gly Gly Asp
450                 455                 460

Asp Asp Asp Glu Lys Asp Gly Leu Arg Glu Phe Leu Arg Asp Gln Asp
465                 470                 475                     480

Val Leu Val Leu Ala Ala Pro Leu Thr Pro Glu Thr Arg Gly Leu Ile
            485                 490                 495

Gly Gly Ala Glu Leu Ala Ala Leu Pro Leu Gly Ala Val Val Leu Asn
```

```
                500             505             510
    Val Ala Arg Gly Pro Leu Leu Asp Glu Arg Ala Leu Ala Glu Arg Leu
                515                 520                 525

Arg Ser Gly His Leu Ala Gly Ala Ala Ile Asp Val Ala Asp Gln Glu
                530                 535                 540

Pro Leu Asp Ala Ala Ser Pro Leu Trp Asp Val Pro Asn Leu Val Ile
    545                 550                 555                 560

Thr Pro His Val Ser Ala Phe His Ser Lys Tyr Asn Gln Asn Met Leu
                    565                 570                 575

Ala Ile Phe Glu His Asn Leu Arg Ala His Leu Cys His Arg Pro Val
                580                 585                 590

Thr Glu Met Arg Asn Val Val Gln Leu Pro Val Pro Ser Glu Pro Ser
                595                 600                 605

Pro Leu Gly Ser Lys Ser Asn Ala Ala Pro Lys Arg Pro Thr Lys Thr
                610                 615                 620

Ala Tyr Ala Val Lys Glu Ser Ser Ser Lys Asn
    625                 630                 635

<210> SEQ ID NO 26
<211> LENGTH: 510
<212> TYPE: PRT
<213> ORGANISM: Paucibacter aquatile

<400> SEQUENCE: 26

Met Pro Tyr Asp His Asn Ala Glu Ala Asp Phe Ala Ala Ser Glu Val
1               5                   10                  15

Ala Arg Met Leu Val Ala Asp Pro Gly Leu Cys Tyr Asp Ala Ala Ser
                20                  25                  30

Leu Pro Ala Ser Ile Ser Ala Ser Ala Ser Tyr Glu Pro Ser Ala Ala
            35                  40                  45

Gly Trp Pro Lys Ala Asp Gly Leu Val Ser Val Leu Glu Gly Gly Thr
        50                  55                  60

Ser Thr Gln Arg Ala Ile Ala Leu Glu Tyr Lys Arg Pro Gln Glu Gly
65                  70                  75                  80

Ile His Gly Leu Leu Thr Ala Ile Gly Gln Ala His Gly Tyr Leu His
                85                  90                  95

Lys Gly Tyr Ser Gly Ala Ala Ile Val Ile Pro Gly Arg Tyr Ser Ser
                100                 105                 110

His Pro Thr Pro Ala Glu Tyr Val Arg Asp Val Leu Asn Ala Ile Ser
            115                 120                 125

Gly Ser Arg Ala Ile Ala Val Phe Ser Tyr Ser Pro Pro Asp Thr Thr
        130                 135                 140

Ser Pro Thr Pro Phe Ala Gly Arg Ile Gln Cys Val Arg Pro Leu Val
145                 150                 155                 160

Phe Asp Ala Gly Arg Val His Leu Arg Pro Ala Asn Gln Gly Pro Lys
                165                 170                 175

Thr Gln Trp Val His Met Arg Glu Gly Ser Thr Thr Arg Asp Ala Phe
                180                 185                 190

Phe Arg Phe Leu Gln Val Ala Lys Arg Leu Ser Ala Asp Pro Thr Ala
            195                 200                 205

Pro Arg Pro Thr Leu Arg Ser Glu Leu Val Ala Ala Ile Gly Arg Leu
        210                 215                 220

Ala Pro Gly Arg Asp Pro Ile Glu Tyr Ile Thr Asn Thr Ala Asp Asn
225                 230                 235                 240
```

-continued

```
Lys Phe Leu Thr Lys Val Trp Gln Phe Phe Trp Leu Glu Trp Leu Ala
            245             250             255

Thr Pro Ala Val Leu Thr Pro Trp Lys Leu Glu Ala Gly Val Tyr Ser
            260             265             270

Ala Pro Gly Ala Arg Thr Arg Ile Leu Arg Glu Asp Gly Thr Asp Phe
            275             280             285

Ser Gln Leu Trp Glu Gly Arg Val Asn Ser Leu Lys Glu Thr Ile Ala
    290             295             300

Gly Met Leu Asn Arg Gly Glu Ile Ser Glu Ala Gln Gly Trp Glu Ala
305             310             315             320

Phe Val Gly Gly Ile Ser Ala Thr Gly Gly Gly Gln Asp Lys Gln Gly
            325             330             335

Val Arg Ala Arg Ala His Ser Tyr Arg Glu Asp Ile Asp Ser Ala Leu
            340             345             350

Ala Gln Leu Arg Trp Ile Glu Asp Asp Gly Leu Pro Thr Asp Gln Gly
            355             360             365

Tyr Arg Phe Met Thr Ile Cys Glu Arg Tyr Gly Gly Ala Asn Ser Arg
            370             375             380

Ala Ala Ile Asp Tyr Met Gly Ala Thr Leu Ile Gln Thr Gly Arg Tyr
385             390             395             400

Ala Ser Phe Leu His Tyr Ile Asn Arg Leu Ser Glu Arg Lys Phe Ala
            405             410             415

Glu Asn Pro Leu Ala Tyr Thr Lys Pro Gly Pro Gly Gly Met Pro Val
            420             425             430

Phe Thr Glu Glu Ser Tyr Trp Glu Tyr Leu Gln Asp Leu Glu Thr Lys
            435             440             445

Leu Thr Asp Glu Leu Arg Val Met Arg Lys Val Ser Gly Arg Ala Arg
450             455             460

Pro Arg Val Arg Thr Thr Phe Gln Val Glu Leu Thr Leu Leu Arg Asn
465             470             475             480

Tyr Gly Phe Val Ser Ser Thr Arg His Arg Leu Gly Val Gly Ile Pro
            485             490             495

Ile Asp Trp Glu Gln Val Val Gln Ala Leu Asn Val Asp Leu
            500             505             510
```

ORDERED ASSEMBLY OF MULTIPLE DNA FRAGMENTS

CROSS REFERENCE

This application is a continuation-in-part of U.S. application Ser. No. 17/286,066 filed Apr. 16, 2021, which is a § 371 application of International Application No. PCT/US19/56670, filed Oct. 17, 2019, which claims the benefit of priority to U.S. Provisional Application No. 62/747,874, filed Oct. 19, 2018; U.S. Provisional Application No. 62/820,435, filed Mar. 19, 2019; and U.S. Provisional Application No. 62/909,641, filed Oct. 2, 2019. This application also claims the benefit of priority to U.S. Provisional Application No. 63/125,530, filed Dec. 15, 2020; U.S. Provisional Application No. 63/213,807, filed Jun. 23, 2021; and U.S. Provisional Application No. 63/213,859, filed Jun. 23, 2021. The contents of these applications are incorporated herein by reference in their entirety.

BACKGROUND

Assembly of large DNA molecules from smaller component DNA molecules is an important feature of synthetic biology. A variety of methods have been developed that include sequence and ligation-independent cloning (SLIC) (Li et al. Nat. Methods Res vol 4, 251-256 (2007)), Golden Gate (Engler et al. PLOS one 3, e3647 (2007), Engler et al. PlosOne e5553 (2009)), circular polymerase extension cloning (CPEG) (Quan et al. PlosOne 4, e 6441(2009)), NEBuilder® (New England Biolabs, Ipswich, MA), seamless ligation cloning extract (SLICE) (Zhang et al. NAR 40, e55 (2012) and ordered gene assembly in *Bacillus subtilis* (OGAB) (Tsuge et al. Scientific Reports, 5, 10655 (2015)). These methods vary with respect to in vitro and in vivo assembly methods, homologous recombination approaches and various uses of exonucleases and ligases. The success of any assembly method is dependent on yield, efficiency and fidelity of assembled fragments, yet there has been very little systematic analysis of the criteria on which these parameters depend. In the method referred to as Golden Gate assembly, fragments of DNA are created using restriction endonucleases that generate single strand overhangs on double stranded DNA. Ligation then occurs between overhangs on different fragments to assemble a single double stranded molecule from the fragments. It would be desirable to identify preferred overhangs for polynucleotide fragment assembly under specified criteria for a desired number of fragments and to collate these with other factors and conditions that permit large numbers of fragments to be faithfully assembled in a desired order and a practical amount in a time efficient manner.

One aspect of Golden Gate assembly methods is its reliance on a Type IIS restriction endonuclease and a ligase (Smolke Nat. Biotechnol. 27: 1099-1102 (2009); Engler et al. PlosOne e5553 (2009); Engler et al. Methods Mol. Biol., 729:167-181 (2011); Marillonnet et al. Methods Mol. Biol. 1321: 269-284 (2015)). The ligase of choice is generally a T4 DNA ligase (New England Biolabs, Ipswich, MA).

Like many or most enzymes, T4 DNA ligase has a bias with respect to ligating various complementary overhangs. Moreover, the use of T4 DNA ligase was described for joining mismatches, gaps and other imperfect structures with varying levels of efficiency (Potapov et al. ACS Synthetic Biology, 7, 2665-2674 (2018); Nilsson et al. Nucleic Acids Res. 10:1425-1437 (1982); Goffin et al. Nucleic Acids Res. 15:8755-8771 (1987); Wu et al. Gene, 76: 245-254 (1989); Harada et al. Nucleic Acids Res., 21, 2287-2291 (1993); Showalter et al. Chem Rev. 106: 340-360 (2006); Engler et al. PlosOne e5553 (2009); Engler et al. Methods Mol. Biol., 729:167-181 (2011); Engler et al. Methods Mol. Biol., 1116, 119-131 (2014)).

There have been some initial attempts to identify, using a computer and instructions, suitable overhangs for a selected number of fragments (see for example, MoClo, Golden Braid, Mobius Assembly, MIDAS). These computer-based overhang selection methods restrict the user to a limited number of 4-base overhangs, which is particularly constraining when sequences may not be chosen arbitrarily (e.g., when assemblies must break within coding sequences). These restrictions extend to relatively small, standardized sets of overhangs. The number of fragments that can be assembled has been limited by the number of allowable overhang pairs, typically limiting the user to 6-8 fragments at a time (GeneArt, ThermoFisher, Waltham, MA). Successive hierarchical assembly rounds of 6-8 fragments are then required to build large DNA constructs. It would be desirable to be able to join many more than 6-8 fragments in a single reaction to more rapidly build large DNA molecules. However, increased numbers of fragments enhance experimental complexity arising from not only the biochemical conditions required for accurate and efficient assembly but also the computer tools that would be desirable for identifying the best set of fragment ends to enable large numbers of fragments to be assembled. For example, increasing the number of fragments in an assembly reaction has the effect that each successive fragment adds two new overhangs into the ligation (i.e., an overhang in the fragment and a complementary overhang in the next fragment in the assembly). Since different overhangs ligate with different fidelities under different conditions, the addition of one more fragment that have an overhang that can promiscuously ligate to one or more of the other overhangs under the ligation conditions used can drastically decrease the overall yield of the ligation. This problem is exacerbated by the fact that in some cases a user may wish to avoid using certain overhangs or may be restricted to overhangs only found in a particular window in a sequence. Thus, for higher order assembly reactions, (e.g., reactions in which at least 8 fragments are ligated together) and assembly reactions that require ligations to occur at or near a particular site, standardized sets of overhangs are of limited use. It would be desirable to have a computer aided resource that enables the user to quickly identify a preferred set of overhangs for any number of overhangs based on biochemical data for any and all combination of overhangs of a selected length. Given certain limitations imposed by the standard enzymes used in the standard Golden Gate assembly method, it would also be desirable to optimize other experimental conditions associated with enzyme function for high fidelity assembly and to correlate these optimizations with the selection of a preferred set of overhangs selected by the computer.

SUMMARY

Methods are provided for forming a target polynucleotide from an ordered set of double stranded polynucleotide fragments, that include (a) determining for the target polynucleotide, an optimized overhang sequence for each polynucleotide fragment for joining into an ordered set to assemble the target polynucleotide. Each overhang sequence corresponds to a plurality of nucleotides wherein the overhang sequences have been optimized individually and as a set according to their experimentally determined ligation fidelity scores; and (b) obtaining double stranded polynucleotide fragments by enzyme cleavage of double stranded DNA having the plurality of nucleotides in the overhang corresponding to the optimized overhang sequence.

Examples of the experimental conditions for ligating overhang pairs for polynucleotide fragments assembly may include one or more of the following features:

the enzyme for cleavage of double stranded DNA is a Type IIS restriction endonuclease capable of cleaving a double stranded DNA outside its recognition or binding site to generate a proximate single strand overhang of a length that is specific to a particular endonuclease or its ortholog (see Example 1); (the terms "recognition" and "binding" are used interchangeably throughout).

the cleavage endonuclease has a recognition sequence of at least 5 bases preferably at least 6 bases, preferably at least 7 bases;

the properties of the selected endonuclease is capable of efficiently performing in a reaction that includes a ligase to assemble as many as 24-100 fragments;

the overhang selected is a DNA of 2, 3, 4 or 5 nucleotides in length;

the set of polynucleotide fragments contains at least 2 fragments, at least 5 fragments, at least 10 fragments, at least 15 fragments, at least 20 fragments or at least 50 fragments, at least 60 fragments or as many as 100 fragments;

the ligase is a DNA ligase such as T4 DNA ligase or variant thereof such as a thermostable variant or high salt tolerant ligase;

the target nucleic acid may include pieces of nucleic acid from different genomes to form a molecule that has no counterpart in nature. Alternatively, virus genomes, bacterial genomes and chromosomes may be assembled using the methods described herein. Individual genes, operons and metabolic pathways may be similarly constructed;

the polynucleotide fragments can be made enzymatically from nucleotides or by chemical synthesis once an optimal set of overhangs have been identified;

the polynucleotide fragments for use in assembly may be amplicons or are clonal inserts. Multiplex amplification of an entire set of polynucleotide fragments in a single reaction vessel makes a streamlined protocol for target polynucleotide assembly in the presence of a ligase and a Type IIS restriction endonuclease;

multiplex amplification of all the fragments in a particular assembly reaction may be performed in the same reaction tube where once the polymerase has been inactivated, the ligase and restriction endonuclease may be added to cause the ordered assembly of fragments;

temperature cycling for endonuclease cleavage and ligation may vary between touch-down, touch-up and drop-down cycling. The cycling conditions may vary from a high temperature of 37° C.-50° C. down to 16° C. However, the range may be broader depending on the ligase and restriction endonuclease used. The salt concentration of the reaction buffer may also vary to include 100 mm salt; and a reaction mixture comprising a DNA ligase, a restriction endonuclease and a plurality of double stranded nucleic acid fragments having single strand overhangs at the 5' or 3' ends suitable for high fidelity ligation in a predetermined order where various overhangs of a selected length (2-base, 3-base, 4-base or 5-base) are described in Table 3, Table 4, Table 5 or Table 6.

In one aspect, a kit is provided that includes a phage derived ligase and a bacterial Type IIS restriction endonuclease combined in a single buffer and a destination vector with instructions for use.

The above experimental conditions assist a user in generating target polynucleotides from fragments. These experimental conditions may be combined with the computer analyses described below that generate optimal sets of overhang sequences and/or identify fragment lengths for synthesis of polynucleotide fragments to accurately and efficiently construct target polynucleotides from target polynucleotide sequences in sequence databases.

Another example provides a method that enables a user to generate a target nucleic acid molecule, where the method includes: (a) receiving into a computer a target nucleic acid sequence corresponding to the target double strand nucleic acid molecule; (b) providing access to a database that includes ligation frequency data for a set of overhang sequences having a defined length; (c) using the database to generate a set of n polynucleotide sequences that when combined, form the target nucleic acid sequence, each polynucleotide sequence having a first end and a second end, such that the first and the second end have different non complementary overhang sequences selected from the set of overhang sequences; wherein: (i) every overhang sequence in a set of overhang sequences is different; (ii) the selection of overhangs is based on ligation fidelity obtained from the database of each member of the set of overhang sequences; (iii) the overhang sequence at a first end of a first polynucleotide is complementary to an overhang sequence at the first end of a second polynucleotide to permit hybridization and ligation for ordered joining of the first and second polynucleotide; (iv) each fragment sequence of the set of n polynucleotide sequences corresponds to a different portion of the target nucleotide sequence; (d) outputting a set of n polynucleotides sequences in a user accessible medium; and (e) enabling the user to construct the target nucleic acid molecule from a plurality of polynucleotide molecule fragments, wherein for each polynucleotide sequence of the set of n polynucleotide sequences; generating an overhang on the polynucleotide fragment corresponding to a selected overhang sequence from the set of overhangs having an overall preferred ligation fidelity score for ordered assembly of the polynucleotides by hybridizing and ligating the overhangs.

Various embodiments include one or more of the following features: the set of n polynucleotide sequences comprises n-1 oligonucleotide sequence pairs suitable for hybridization, each polynucleotide sequence terminating at a first end with a first overhang sequence and respectively terminating at a second end with a second and a third overhang sequence; and a set of overhangs comprise a sequence of at least 2 nucleotides; wherein the sequences for each of the first and second overhangs on each polynucleotide are optimized.

In one example, a method is provided that includes: providing a user interface on a computer system that enables a user of the computer system to: enter into the computer system: a set of unique 5'→3' 2-base, 3-base, 4-base or 5-base overhangs; and experimental conditions for ligation of a set of polynucleotide fragments, each fragment of the set of fragments terminating in a different one of the set of overhangs; and receive output from the computer system, the output comprising an estimated overall ligation fidelity score for the entered set of overhangs under the entered experimental conditions, wherein the computer system automatically generates and outputs the overall ligation fidelity for the entered set of overhangs under the entered experimental conditions by: accessing a database comprising experimentally determined ligation fidelity for 2, 3, 4 or 5-base overhangs; retrieving from the database, a ligation frequency score for the entered overhang set; and deriving the estimated overall ligation frequency score from the retrieved ligation frequency for each overhang in the entered 3 or 4-base overhang set from the database.

Various embodiments include one or more of the following features: the received output from the computer system provides estimated frequencies of ligation events for non-Watson-Crick overhang pairs of the input set of overhangs; the estimated frequencies of ligation events for non-Watson-Crick overhang pairs of the input set of overhangs are represented graphically in a two-dimensional array in which a given array element includes a graphical indication of an estimated frequency of ligation events for an overhang corresponding to an array row of the given element with an overhang corresponding to an array column of the given element; the user interface on the computer system is implemented within a browser and wherein the computer system accesses the database via a wide area network; and the database is hosted in the cloud.

Additionally, the computer system may have: a memory for storing computer-readable instructions; and a processor connected to the memory, wherein the processor, when executing the computer-readable instructions, causes the system to perform a method comprising: providing a user interface on the system that enables a user of the system to: enter into the system: a set of unique 2, 3, 4 or 5-base overhangs; and experimental conditions for ligation of a set of polynucleotide fragments, each fragment of the set of fragments terminating in a different one of the set of overhangs; and receive output from the system, the output comprising an estimated overall ligation fidelity for the entered set of overhangs under the entered experimental conditions, wherein the system automatically generates and outputs the overall ligation fidelity for the entered set of overhangs under the entered experimental conditions by: accessing a database comprising experimentally determined ligation fidelity for 2, 3, 4 or 5-base overhangs; retrieving from the database ligation fidelity for the entered overhang set; and deriving the estimated overall ligation fidelity by averaging the retrieved ligation fidelity retrieved from the database over the entered 3 or 4-base overhang set.

In another aspect, a computer program product is provided with the following features: a non-transitory computer-readable medium with computer program instructions encoded thereon, wherein the computer program instructions, when processed by a computer system, instruct the computer system to perform a method comprising: providing a user interface on the computer system that enables a user of the computer system to: enter into the computer system: a set of unique 5'-3' 3 and/or 4-base overhangs; and experimental conditions for ligation of a set of oligonucleotide fragments, each fragment of the set of fragments terminating in a different one of the set of overhangs; and receive output from the computer system, the output comprising an estimated overall ligation fidelity for the entered set of overhangs under the entered experimental conditions, wherein the computer system automatically generates and outputs the overall ligation fidelity for the entered set of overhangs under the entered experimental conditions by: accessing a database comprising experimentally determined ligation fidelity and hybridization fidelities for 4-base canonical ACGT overhangs; retrieving from the database ligation fidelity and hybridization fidelities for the entered overhang set; and deriving the estimated overall ligation fidelity by averaging the retrieved ligation fidelity and hybridization fidelities retrieved from the database over the entered 4-base overhang set.

In another aspect, a method is provided for forming a target nucleic acid from an ordered set of polynucleotides, that includes: (a) a computer system receiving from a user a sequence for the target nucleic acid; and (b) generating polynucleotide sequences suitable for ordered assembly of the target nucleic acid by hybridization and ligation of 2, 3, 4 or 5-base overhang pairs, wherein an overhang is positioned at a terminus of a first polynucleotide in the set of polynucleotides, and the complement of overhang is positioned at the terminus of a second polynucleotide selected for forming a junction between the two polynucleotides in the set of polynucleotides.

In one embodiment, the junction sequence between the two polynucleotides have been optimized separately and as a set according to ligation parameters of oligonucleotide molecules obtained from a database.

In another embodiment, a computer-generated report to any composition or method described above is provided that contains one or more of the following: primers to be ordered; assembly sequence file with or without annotation; annotated assembly sequence file containing target DNA inserts, overhangs, and/or a vector backbone; a graphic of assembled construct; and/or a downloadable pdf formatted assembly graphic.

In one example, a composition is provided that includes a system hosting a target polynucleotide assembly application with a display, wherein the system is in data communication with a server hosting software for fragment editing, displaying a graphical user interface for collaborative or individual editing of a gene synthesis project, the graphical user interface comprising: a representation of a target nucleic acid molecule built from component parts wherein the sequence of the target nucleic molecule is entered by the user; the system determining the component parts for joining at junction regions wherein the junction regions achieve predetermined hybridization parameters determined for each junction region and for the sum of the junction regions; wherein the system further comprises one or more links selected from the group consisting of links to: sequence databases; protein structure databases; functional features of selected sequences; hybridization efficiency databases; source enzymes for the gene synthesis project; and change notes entered by one or more editors collaborating to edit the gene synthesis project.

In another example, a computer implemented method is provided for selecting a set of overhangs for an assembly reaction to be performed under selected experimental conditions, that includes:

(a) receiving: (i) a desired number of overhangs for an assembly reaction and (ii) a length of the overhangs;
(b) selecting a set of overhangs from an overhang table wherein in one example, the overhang table contains all possible overhangs, and wherein the overhangs in the table are of the length received in (a) and wherein the selected set of overhangs has the desired number of overhangs;
(c) for each individual overhang in the set, calculating a ligation fidelity score, wherein the ligation fidelity score of each individual overhang represents the frequency at which the individual overhang and its complement independently ligate to a perfectly complementary overhang relative to all overhangs in the set and their complements;

(d) calculating an overall fidelity score for the set of overhangs based on the calculated ligation fidelity scores for each of the individual overhangs, as output in step (c);

(e) iterating steps (b)-(d) until a plurality of overall fidelity scores have been calculated, each for a different set of overhangs; and (f) identifying the set of overhangs that has a suitable overall fidelity score.

In examples of the method, other features may be selected for use in the computer implementation.

These features may include one or more of the following:

1) selecting overhangs in (b) with the features that each of the overhangs is unique within the set, is not complementary to another overhang in the set, and is not palindromic;

2) calculating the fidelity score in step (c) further comprises consulting the ligation frequency table comprising individual experimentally-defined measurements of the number of ligation events;

3) calculating the ligation fidelity score in (c) for an individual overhang from the number of ligation events that occur between the individual overhang and its complement relative to the total number of ligation events that occur between i. the individual overhang and all of the overhangs in the set and their complements and ii. the complement of the individual overhang and all of the overhangs in the set and their complements;

4) receiving in step (a): (iii) overhangs that should be excluded, and wherein the overhangs selected in step (b) do not include the excluded overhangs;

5) receiving in step (a): (iii) ligation conditions, for example, one or more of a ligase, a salt concentration, a temperature, temperature range and/or thermocycling conditions for cleavage and ligation; and wherein in step (c) the calculated overall fidelity scores are for ligations done in the specified ligation conditions;

6) multiplying the ligation fidelity scores for each individual overhang calculated in step (c) to calculating the overall fidelity score in (d);

7) receiving: (iii) a nucleotide sequence of an assembly and (iv) a set of intervals in which the nucleotide sequence of (iii) can be cleaved; and between steps (a) and (b) identifying a non-redundant set of sub-sequences in the intervals that are the same length as the overhang length input in (a)(ii) and storing the non-redundant set of sub-sequences as the overhang table of step (b).

Further specifics for (7) may include:

splitting the nucleotide sequence of the assembly at overhangs identified in (f), thereby producing a set of fragments of the assembly, where the ends of the fragments are defined by the identified overhangs;

defining each interval of (iv) by beginning and end coordinates in the nucleotide sequence of the assembly.

8) In step (a) receiving the length of 4 for the overhang length and wherein optionally the overhang table of (b) has 256 overhangs;

9) In step (a) receiving the length of 3 for the overhang length and wherein optionally the overhang table of (b) has 64 overhangs;

10) In step (e) iterating steps (b)-(d) at least 1000 times.

Additional features of the computer implemented method may include:

inputting into an interface: (i) the desired number of overhangs for an assembly reaction, (ii) the length of the overhangs; optionally, (iii) the nucleotide sequence of the assembly (iv) the set of intervals in which the nucleotide sequence of (iii) can be cleaved;

causing the computer implemented method described above to be executed; and receiving a set of overhangs as identified in step (f) and/or if (iii) and (iv) are input, then receiving a set of fragments of the assembly, where the ends of the fragments are defined by the overhangs identified in step (f).

In one example of the above additional features includes: receiving the ligation conditions for ligating the set of overhangs or fragments containing the same, and, optionally, thermocycling conditions for producing the fragments and ligating them together. Another example includes making a set of double stranded nucleic acids that have a set of overhangs that have the highest overall fidelity score, and their complements. Another example includes: ligating the fragments together in a single reaction to produce an assembly, wherein in the reaction the overhangs determine the order of the fragments in the assembly. Another example includes performing ligation by overhang-directed ligation.

Additional features of the computer implemented method may include: receiving in step (a): (iii) a nucleotide sequence of an assembly (iv) a set of intervals in which the nucleotide sequence of (iii) can be cleaved; and between steps (a) and (b) the method comprises: identifying a non-redundant set of sub-sequences in the intervals that are the same length as the overhang length input in (a)(ii) and storing the non-redundant set of sub-sequences as the overhang table of step (b). In one example of the additional features, step (a) further includes receiving experimental conditions for cleavage.

Additional features of the computer implemented method includes a computer-readable medium comprising programming for performing any of the above described features and examples of the method.

BRIEF DESCRIPTION OF THE FIGURES

FIG. 1A-1B shows Golden Gate assembly in which a restriction endonuclease enzyme generates an overhang by cleaving the polynucleotide at a sequence adjacent to the restriction endonuclease recognition (or binding) site resulting in 5' overhangs (NNNN).

FIG. 1A shows a fragment that contains the desired recognition sequence of the chosen restriction endonuclease (here GGTCTC (BsaI-HF®v2, New England Biolabs, Ipswich, MA)) and a desired overhang sequence (NNNN) resulting from enzyme cleavage on either side of a polynucleotide fragment insert. The recognition and overhang sequences may be introduced during synthesis of the desired DNA fragment by, for example, chemical synthesis; in primers used for DNA amplification; or in a vector at a site into which the polynucleotide fragment is inserted.

FIG. 1B shows how ten polynucleotide fragments (A-J) can be joined through overhang pairs formed by restriction endonuclease cleavage in FIG. 1A from 9 junctions. "End junctions" enable joining of the target nucleic acid to each end of a master plasmid. The 5' 4-base overhang on one polynucleotide fragment can hybridize with the complementary overhang on a second polynucleotide fragment. Ligation of the hybridized overhangs forms a junction. Providing each junction sequence is unique, multiple fragments are capable of alignment in a unique ordered manner.

FIG. 2A-2C shows one view of a fragment assembly reaction design. In this view, 12 polynucleotides that have been obtained either by genetic engineering of DNA molecules (for example, genomic DNA) or by chemical synthesis (short fragments typically less than 500 base pair (bp)) or by amplification (varied length fragments typically less than 2 kb) for assembly into a target nucleic acid. In this way, a sequence or set of sequences described in one or more database or other recorded means can be translated into the assembled target nucleic acid in a test tube.

FIG. 2A shows 12 fragments each integrated into individual "donor" plasmids which may be the same or different from each other.

FIG. 2B shows a destination vector and enzymes required for assembly. In this example, the enzymes are T4 DNA ligase and a Type IIS restriction endonuclease (BsaI-HFv2).

FIG. 2C shows how the 12 fragments are then cleaved from the donor plasmids (using BsaI-HFv2), joined in order and integrated by means of a T4 DNA ligase into a master plasmid containing the antibiotic resistance gene. The assembly is seamless, cell free, does not require PCR, and is amenable to standardization and automation.

FIG. 3A-3C shows high efficiency of generation of bacterial clones obtained on antibiotic plates from destination plasmids containing 12 fragments as shown in FIG. 2A-2C. The efficiency is shown to match predictions. The assembly is performed in a single reaction vessel, with choice of junctions driven by the ligation fidelity and bias profiling. Plates shown are representative replicates, with a white filter (top) to show blue colonies expressing β-gal, and a black filter (bottom) to visualize white colonies containing antibiotic resistance but a non-functional lac cassette.

FIG. 3A shows the results of a designed predicted high fidelity 12-fragment set, predicted 99% blue colonies, observed average over 8 replicates, 99.2±0.6%.

FIG. 3B shows results of the designed low fidelity, deletion-prone 12-fragment set; predicted 31% blue colonies, observed average of 8 replicates, 45±5%.

FIG. 3C shows the results of assembly of the designed 24-fragment high fidelity set, predicted 91% blue colonies, observed average over 10 replicates, 84±5%.

FIG. 4A-4B shows how sequences of polynucleotides can be identified from databases and designed to form novel gene constructs in modular assembly. Sequence components from different sources (different species) can be identified and assembled to form a novel target nucleic acid.

FIG. 4A shows sets of promoters, ribosome binding sites, genes and terminators. The user selects single sequences in each category to design a gene expression unit.

FIG. 4B shows a second assembly design where a gene is constructed from multiple components. Each newly assembled gene has a different promoter sequence and also varies in the type of terminator sequence.

FIG. 5A shows ligation yields over time obtained using a polynucleotide with an ANT overhang pair versus a TNA overhang pair showing that ligation yield with ANT was significantly higher than with TNA. This suggests that TNA overhangs should be avoided.

FIG. 5B shows ligation yields over time obtained using a polynucleotide with a 5'GGC/3'TCG overhang pair versus a 5'TCG/3' GGC overhang pair showing that the ligation yield was significantly higher for GGC/TCG than for TCG/GGC. This shows that orientation of the overhangs is a parameter that should be considered in selecting overhangs for ordered fragment assembly.

FIG. 6A shows the mismatch frequency when positions 1 and 3 (N1:N3') in the 3-base overhang were mismatched for a ligation reaction for 1 hour at 25° C.

FIG. 6B shows the mismatch frequency when position 2 (N2:N2') in the 3-base overhang were mismatched for a ligation reaction for 1 hour at 25° C.

FIG. 6C shows the mismatch frequency when positions 1 and 3 (N1:N3') in the 3-base overhang were mismatched for a ligation reaction for 1 hour at 37° C.

FIG. 6D shows the mismatch frequency when position 2 (N2:N2') in the 3-base overhang were mismatched for a ligation reaction for 1 hour at 37° C.

In FIGS. 7B, 7D and 7F, fully Watson-Crick paired ligation results are below the horizontal line in each histogram and ligation products containing one or more mismatches are above the horizontal line.

FIG. 7A shows the frequency heat map of all ligation events (log-scaled). Three-base overhangs are listed alphabetically left to right (AAA, AAC, AAG . . . TTG, TTT) and bottom to top such that the Watson-Crick pairings are shown on the diagonal.

FIG. 7B shows a stacked bar plot showing the frequency of ligation products containing each overhang, corresponding to each column in the heat map in FIG. 7A.

FIG. 7C and FIG. 7D are similar to FIG. 7A-7B except the experimental conditions are 1 hour at 37° C.

FIG. 7E and FIG. 7F shows assay results for the ligation of randomized 4-base overhangs.

FIGS. 11A and 11B are illustrative graphical output displays of the system of FIG. 8-10 showing ligation preferences 1104. The output provides user with an estimated fidelity score meaning the percentage of correctly ligated products 1102. The graphical display can provide as requested by the user, color coded entries for ligation fidelity for overhangs that correspond to good Watson-Crick pairs, poor Watson-Crick pairs, high-count mismatches, modest mismatches and trace mismatches and optionally provides normalized ligation counts. In this figure, a single one-base mismatch is shown in pink. The ligation preferences for all specified overhangs are provided in a tabular format: Overhangs in rows correspond to top strand, Overhangs in columns correspond to bottom strand. Overhangs are written in 5' to 3' direction. For example, ATTC overhang in a row and GAAT overhang in a column corresponds to the Watson-Crick pair 5'-ATTC-3', 3'-TAAG-5'. This is a strongly ligating WC pair as indicated by the dark green color. TACC overhang in a row and GGTT overhang in a column corresponds to a pair 5'-TACC-3', 3'-TTGG-5 with an A/T mismatch. This is a mismatch ligation that is modestly frequent as indicated by the light grey color.

FIG. 12 is an example of a graphical output of a target nucleic acid in a database for which a corresponding double stranded DNA macromolecule is desired to be synthesized. The computer output provides an optimized map of polynucleotide fragments to be synthesized with the location of joins where the position of joins reflects optimization of an overhang set with specified ligation fidelity across the entire database sequence. Seven fragments (A-G) are shown although there could readily be any number of fragments such as A through Z or as many as 75 or 100 fragments for assembly. An output may include the overhangs for each fragment and primers suitable for amplifying synthetic oligonucleotides by PCR. The primers are optionally input via a computer connection directly into an oligonucleotide synthesis platform for synthesizing DNA primers.

Although FIGS. 7E-7J, and FIGS. 8-12 shows examples of 4-base overhangs, the system may output a set of overhangs with 3-bases or more than 4-bases for the desired overall ligation fidelity for joining the defined number of polynucleotide fragments determined by the user or the system based on the target nucleic acid sequence output. The larger the number of fragments, the more likely that the number of bases in an overhang with be 4 or more.

Figure 8:
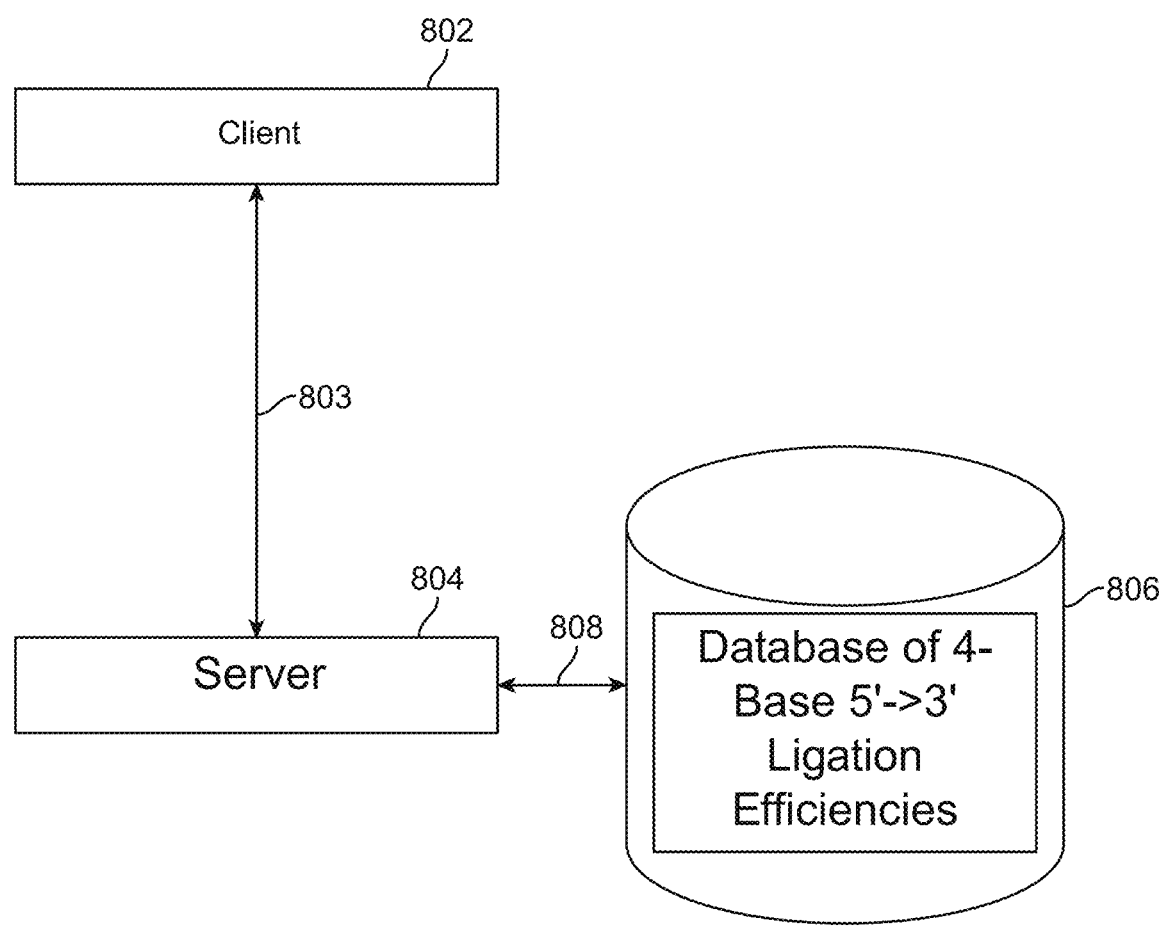
FIG. 8 shows, by means of a high-level block diagram, a system for generating an estimated overall ligation fidelity for a user-specified overhang sequence set; and also, experimental conditions to achieve a desired result The system utilizes client 802 having bidirectional data communication 803 with a server 804 that in turn has access to storage 806 via 808 where 806 includes a database of 4-base 5'-3' ligation fidelity. This can also be a 2-base, 3-base or 5-base database. Bidirectional data communication 803 may be implemented using a local connector such as a local area network (LAN) or a wide area network. Server 804 may be a dedicated resident server or may be implemented in the cloud. Data storage 806 may be co-loaded with server 804. The user enters data into client 802 which may include a browser interface. In addition to running a browser, client 802 may host a graphical user interface for use to enter sets of 5'-3' 4-base canonical form of AGCT or other overhang sets or for selecting experimental conditions for ligation.
Figure 9:
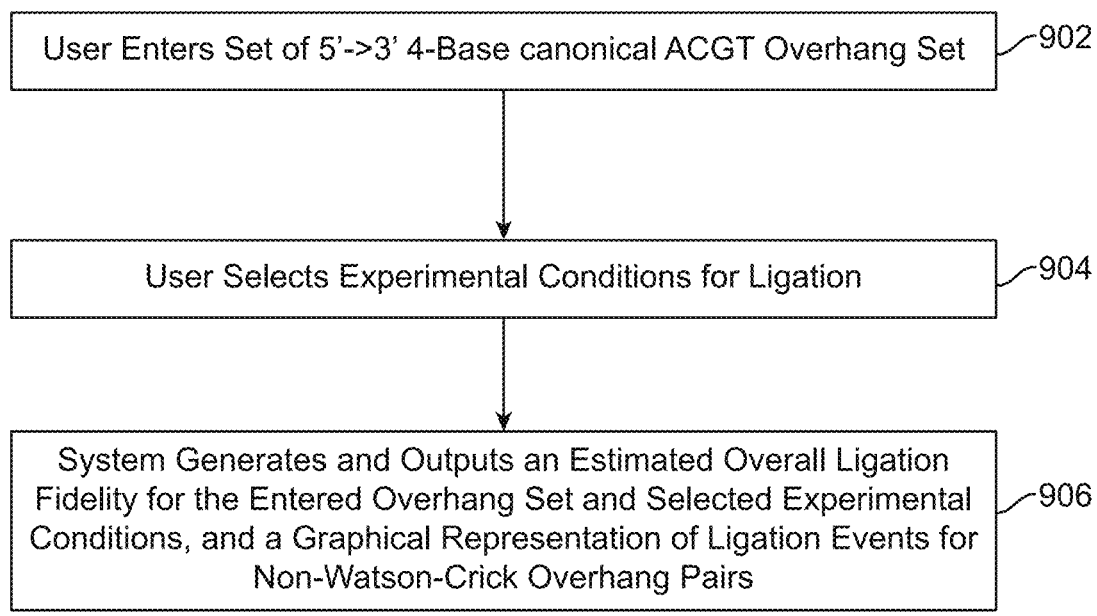
FIG. 9 shows input and output steps in a high-level flow diagram for execution of an assembly reaction using the system outlined in FIG. 8. user enters a set of overhang sequences of any desired length, for example, the set of overhang sequences will be a set of 5'-3' 4-base overhang sequences 902. The set will contain more than one 4-base overhang sequence such that each member of the set differs from all the other members of the set. Each overhang sequence represents a member of a single overhang pair that the user preferably wishes to use in an experiment to join in order a plurality of double stranded nucleic acid fragments. The 4-base overhang may be represented as a Watson-Crick pair of overhangs. As previously shown (FIG. 5B), a single overhang pair in a set may vary with respect to ligation fidelity depending on whether a particular sequence is a 5' sequence or its complement. Each member pair is considered separately from the other member pairs in the set. The user may select experimental conditions for ligation of fragments having overhangs corresponding to the entered sequences in 902. These experimental conditions include, for example, time of incubation with ligase and temperature of incubation 904. By accessing a database of ligation fidelity for individual overhangs or overhang pairs, the system generates an output describing the ligation fidelity for the entered overall overhang sequence set and/or for individual overhang pairs in the set 906. The system may additionally output a graphical matrix representation of ligation fidelity for the selected overhang sequence pairs. If the identified fidelity efficiency of the set of 4-base overhang sequences input by the user is rejected by the user, the user is enabled to assess the ligation of the identical set of 4-base overhangs under different selected experimental conditions or to enter a modified set of 4-base overhang sequences under the same or different experimental conditions to determine how to join the set of double stranded nucleic acid fragments in an ordered assembly.

The overhangs may be input via the client shown in FIG. 8 to generate an output as shown in FIG. 9 where the input set of overhangs may be manually inserted or inserted after computation by the system.

The experimental ligation conditions may be input via the client together with overhangs determined manually or by the system to generate an output as shown in FIG. 9 where the input is manual or inserted after computation by the system that determines the optimal ligation efficiency for a set of overhangs as above.

Figure 11A:
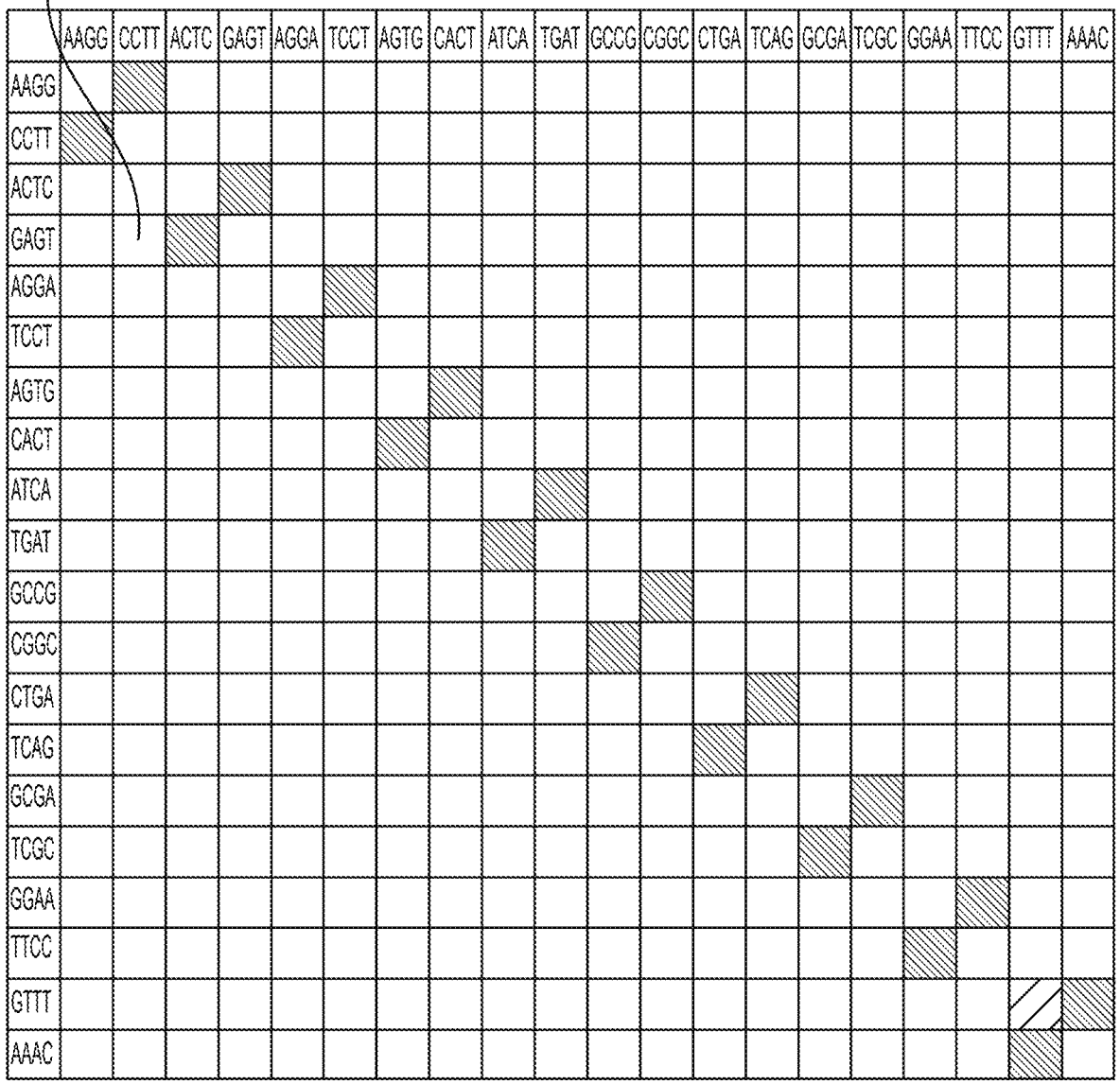

Under certain circumstances, an optimal ligation efficiency may not be desired so that the user may select a desired fidelity % from a pull-down menu. The system will output polynucleotide sequences, overhang sequences, optionally primer sequences, experimental conditions and a graphical representation of ligation preferences for each member of the set of overhangs (as shown in FIG. 11A-11B).

Ligation efficiency may be determined to be greater for individual overhangs with a single base mismatch than for a Watson-Crick overhang pair. The system output will reflect these preferences to meet the user input for a particular overall ligation fidelity.

The user may select from a drop-down menu, a particular ligase whose properties will affect the choice of overhang pairs and the outputs.

Figure 13:
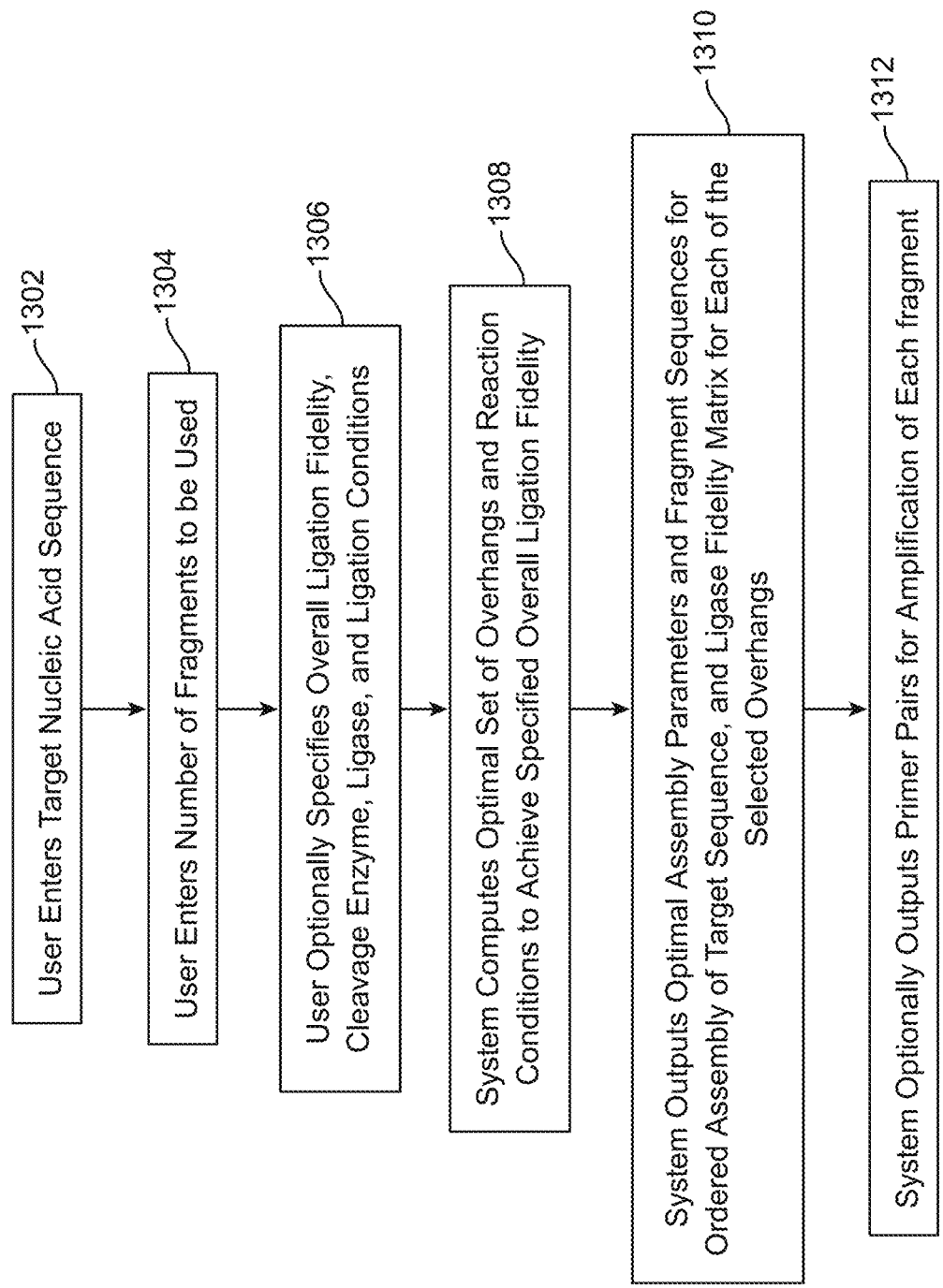

FIG. 13 is a high-level flow diagram showing inputs in addition to system output steps.

Individual examples are provided for user entry of input (1302-1306) generating outputs 1308-1312.

However, the input parameters in 1302-1306 may be substituted or added to by any one or more or two or more of the following:
(a) a target nucleic acid sequence;
(b) a set of polynucleotide fragments;
(c) a partial set of polynucleotide fragments provided by the user and a partial set output from the system;
(d) a set of vectors having specified junction sequences;
(e) a preferred overhang length;
(f) excluded overhangs;
(g) a set of overhangs of specified length;
(h) a partial set of overhangs of specified length provided by the user and a partial set of overhangs output by the system;
(i) a choice of ligase e.g., T4 DNA ligase, T7 DNA ligase, any other ATP dependent DNA ligase or NAD+ dependent ligase such as Taq DNA ligase;
(j) a choice of restriction endonuclease e.g., one or more of Esp3I, SapI, BbsI-HF; BspQI, HgaI, BsaBI, BsaJI, BsaI, BsaI-HFv2, BsiI, BsmAI, BsmBI, BsmFI, BsmI, Bsr DI, BsrI, BtgZI, BtsCI, BtsMutI, Btsv2, BspQI, BpiI, BfuI, BspMI, AarI and isochizomers of the same.
(k) a preferred number of fragments;
(l) a preferred incubation time; e.g., 1 hour, 5 hours, overnight;
(m) a preferred incubation temperature e.g., 37° C. or 45° C.;
(n) preferred reaction conditions in addition to time and temperature;
(o) a preferred overall ligation efficiency;
(p) a minimum acceptable ligation efficiency;
(q) maximum GC content;
(r) maximum AT content;
(s) acceptable bias;
Output may include one or more of the following:
(a) any of the above parameters described above not specified by the user;
(b) warnings if ligation fidelity determined from user input parameters is too low based on manual input of certain parameters where the warning might include internal RE sites, low efficiency junction sites formed from individual overhang pairs; excessive bias of some ligation events over others;
(c) matrix or tabular format for all specified overhang pairs showing strongly ligating Watson Crick pairs and mismatch overhang pairs with color coded frequency of occurrence;
(d) ligase fidelity viewer grid to show predicted fidelity for chosen set;
(e) provide alternative solutions with altered specified experimental parameters;
(f) graphical display of assembly design, annotated if using full sequence;
(g) exportable fragment/primer sequences for synthesizer.

The system then computes any of the above parameters not provided by the user to achieve the requested output using a database of n-base overhangs and 5'-3' ligation efficiencies under various reaction parameters to enable the user to create an ordered assembly of X number of fragments with a defined ligation efficiency.

Figure 10:
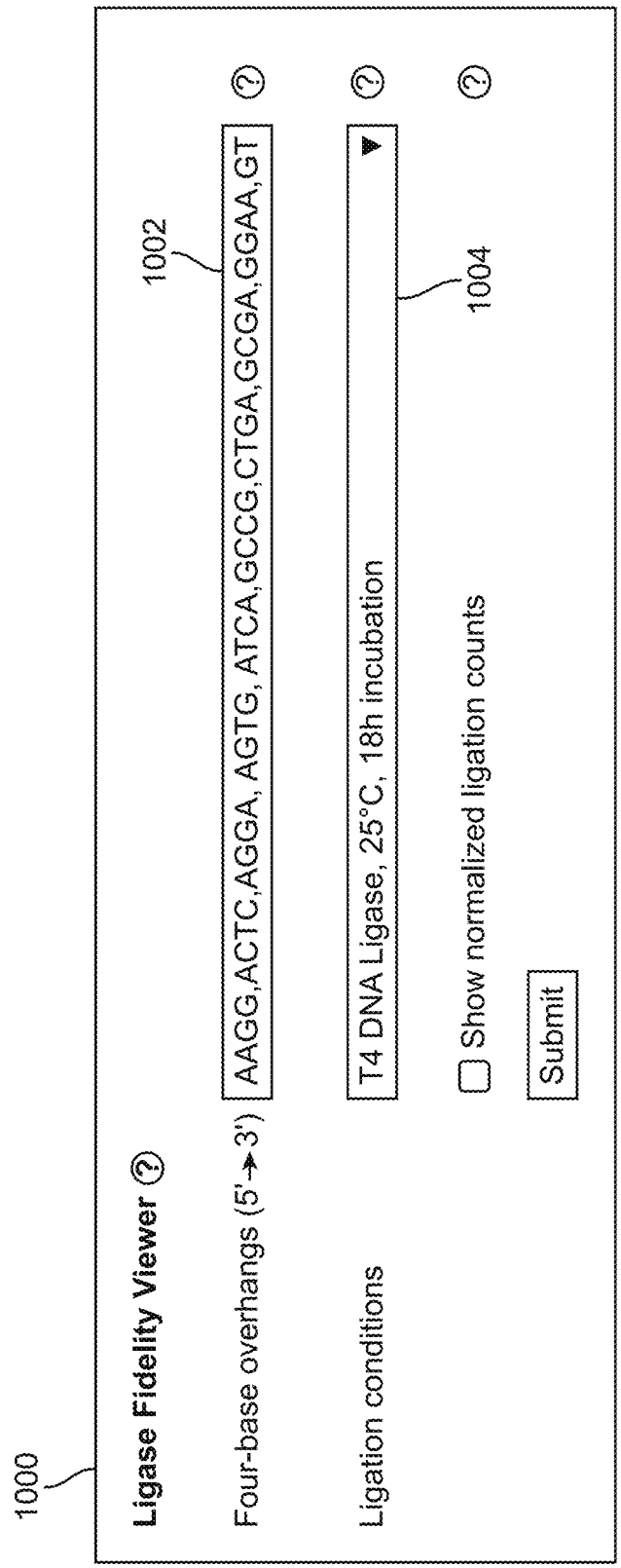
FIG. 10 is a diagrammatic user interface (ViewSet) for inputting a 4-base overhang set and ligase and reaction conditions in the system of FIG. 8. The user inputs a set of 5'-3' 4-base overhang sequences 1002. The user selects ligation conditions from a drop-down menu 1004; here T4 DNA ligase is selected, and ligation conditions are 18-hour incubation at 25° C. Submission of the information results in the events shown in FIG. 8 and FIG. 9.
Figure 14:

FIG. 14 shows an exemplary interface (GetSet) that is a variation of FIG. 10 for entry of alternative or additional parameters by a user. These include as indicated: overhang length, ligation conditions, number of overhangs in the overhang set, list of overhangs that must be included, excluded overhangs and details of experimental conditions.

Figure 15:
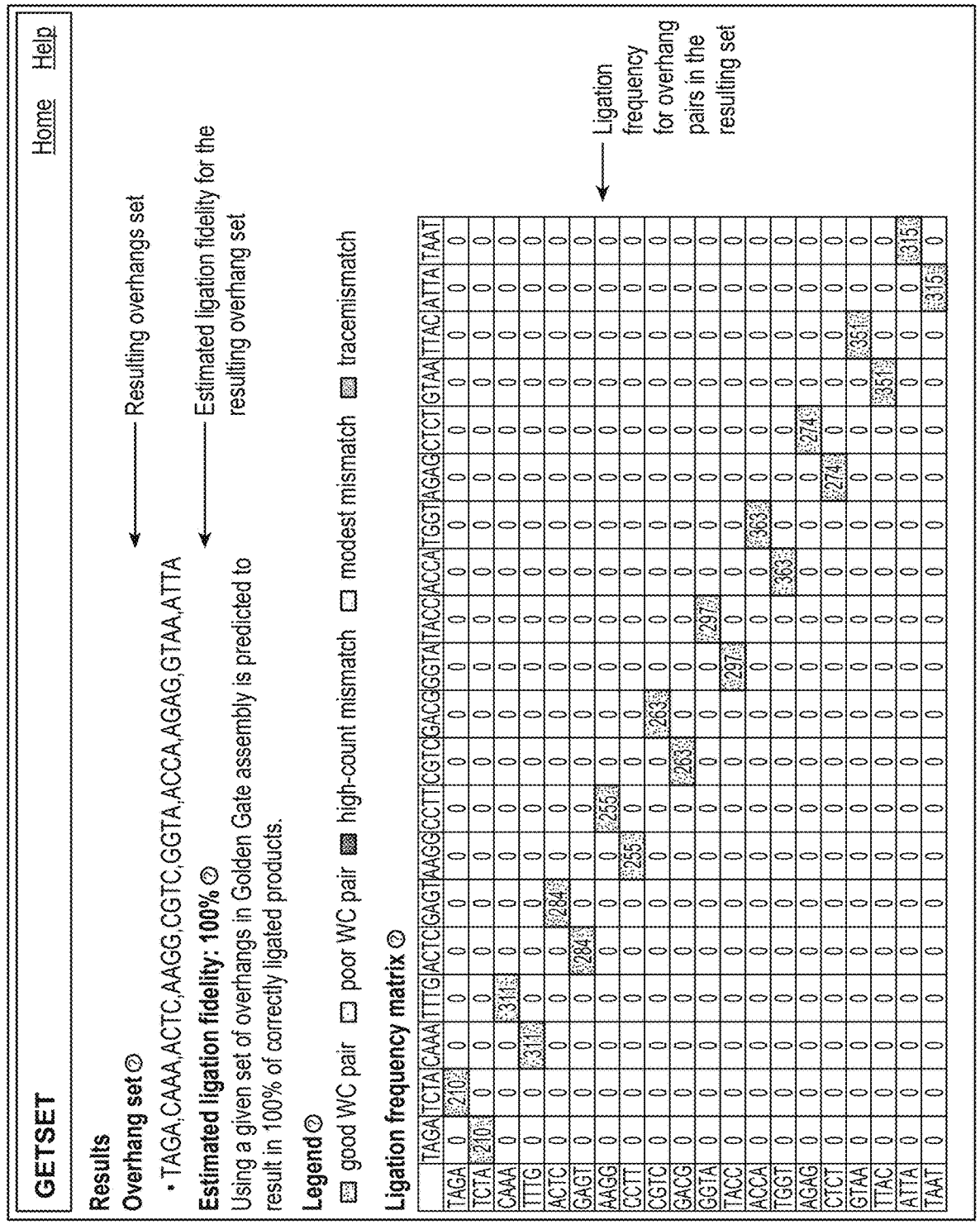

FIG. 15 shows output from the FIG. 14 query. Here 10 overhangs are provided (the overhang set) with an estimated ligation fidelity score of 99.8%. The ligation frequency matrix provides ligation frequency values for each overhang pair. The frequency of mismatch ligations for all mismatches is substantially zero.

Figure 16:
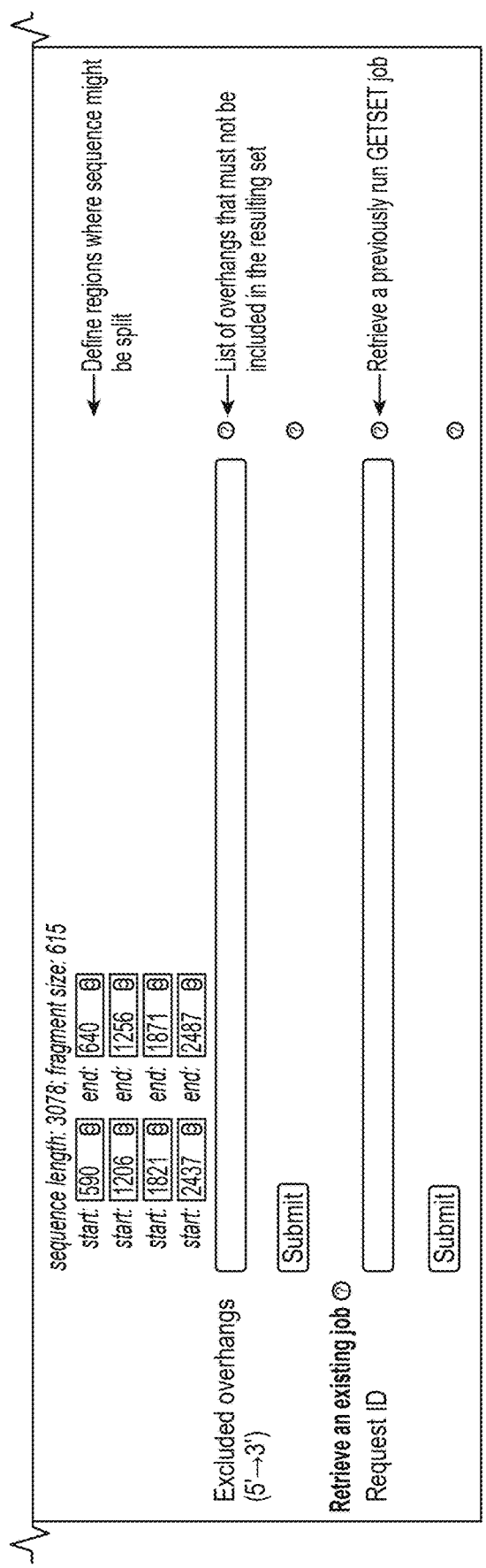

FIG. 16 shows another interface (SplitSET). Here a DNA sequence for example, a gene, is entered from a database or other source (here 3078 nucleotides). The interface permits the user to request overhang length (4-base), fragment size (here 615 nucleotides) experimental conditions (T4 DNA ligase, incubation 18 hours/25° C.), and numbers of fragments to generate. The user can specify excluded overhangs.

Figure 17:
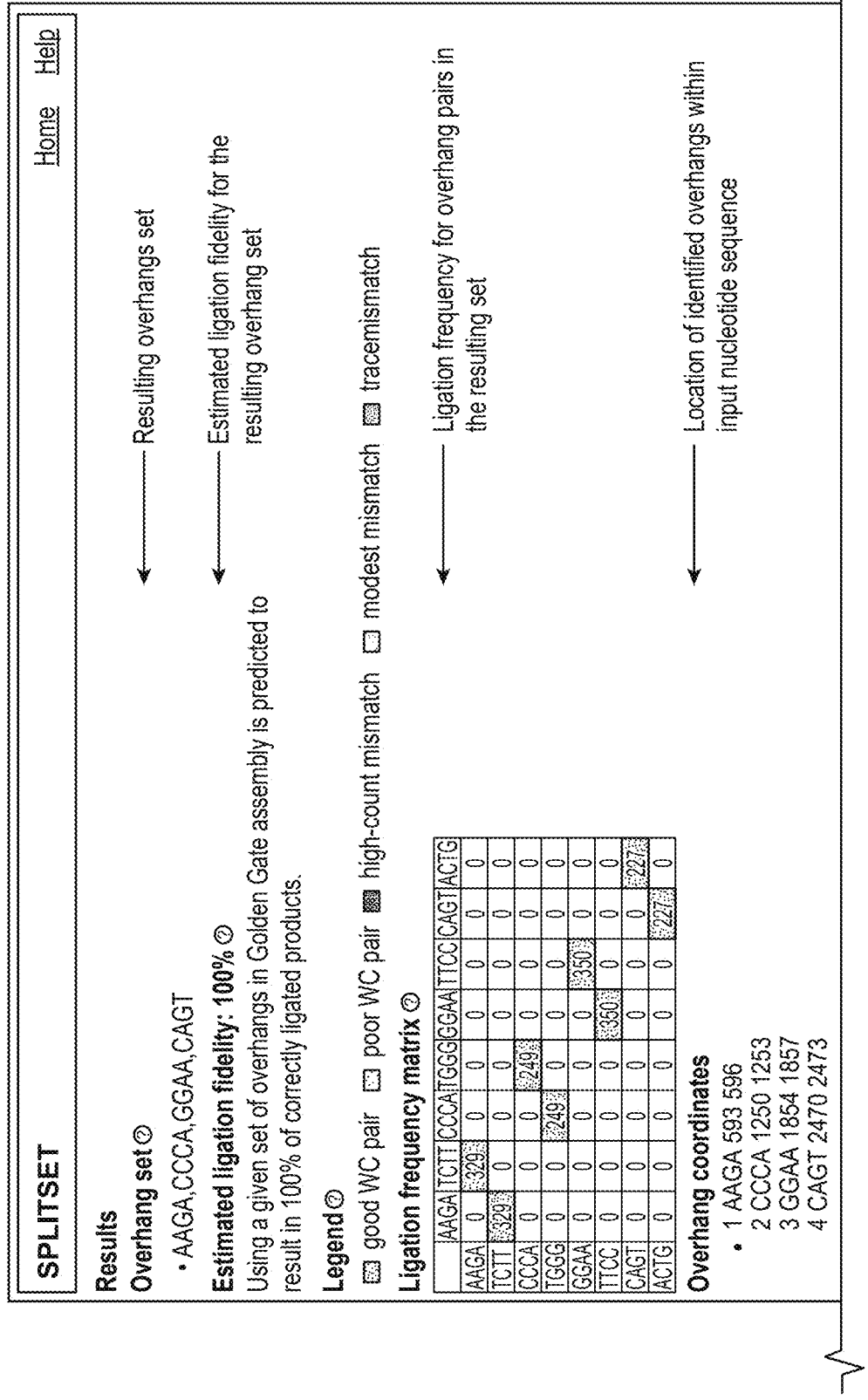

FIG. 17 shows the output from the FIG. 16 query. The output provides a set of fragments with overhangs, an estimated ligation fidelity score with a matrix that shows the frequency of mismatches, the location in the sequence of the overhangs and the fragments for assembly. The fragments may then be ordered from an oligonucleotide synthesis service or by other means.

Figure 18B:
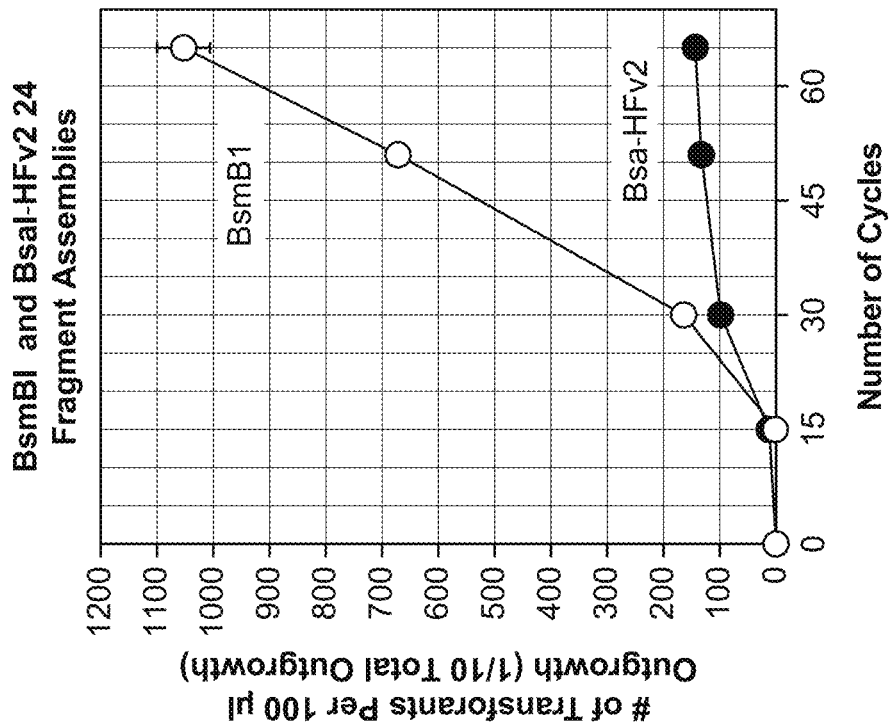
Figure 18A:
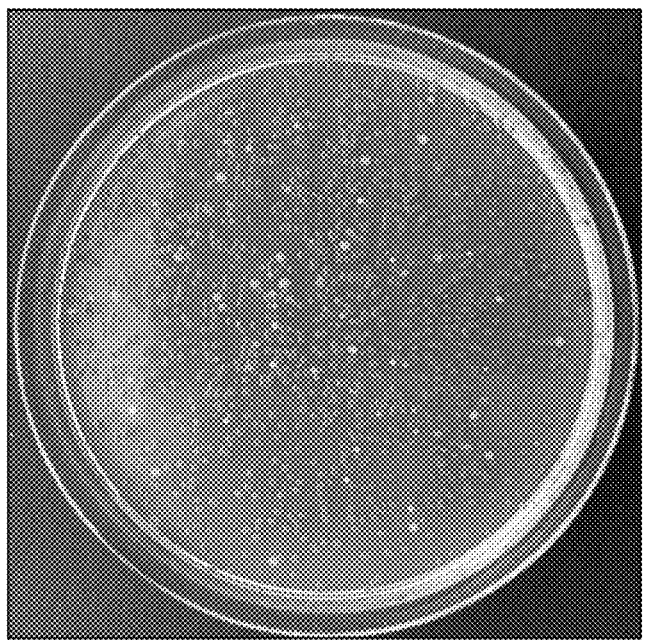

FIGS. 18A and 18B show assembly efficiency of a Lac cassette from 24 fragments in a single pot using the computer systems described herein to select overhangs (see for example Table 7).

FIG. 18A shows blue colonies from a correctly assembled LacZ cassette. The cassette was assembled from 24 fragments using BsmB1 and wild type (wt) T4 DNA ligase. The experimental conditions were drop-down ligation cycling between 42° C. and 16° C. 96% fidelity of assembly was achieved as determined by counting 1100 colonies (per 1/10 outgrowth). This provided a high efficiency of assembly of 137,500 colonies per 25 µl of reaction.

FIG. 18B shows a comparison of BsmBI and Bsa-HFv2 yield for increasing numbers of cycles. The difference observed between the two enzymes increases with the number of cycles suggesting that BsmBI is a more efficient enzyme for assembly than Bsa-HFv2 using wtT4 DNA ligase and a cycling temperature of 42° C./16° C.

Figure 19B:
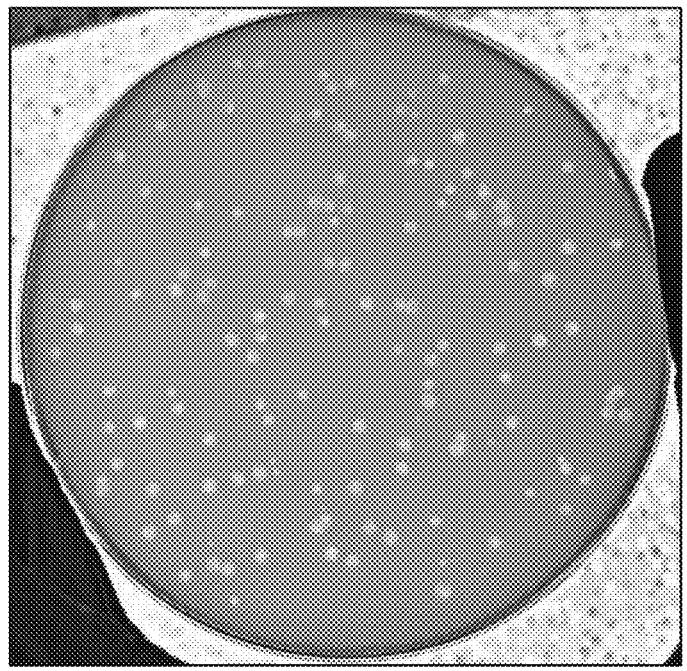
Figure 19A:
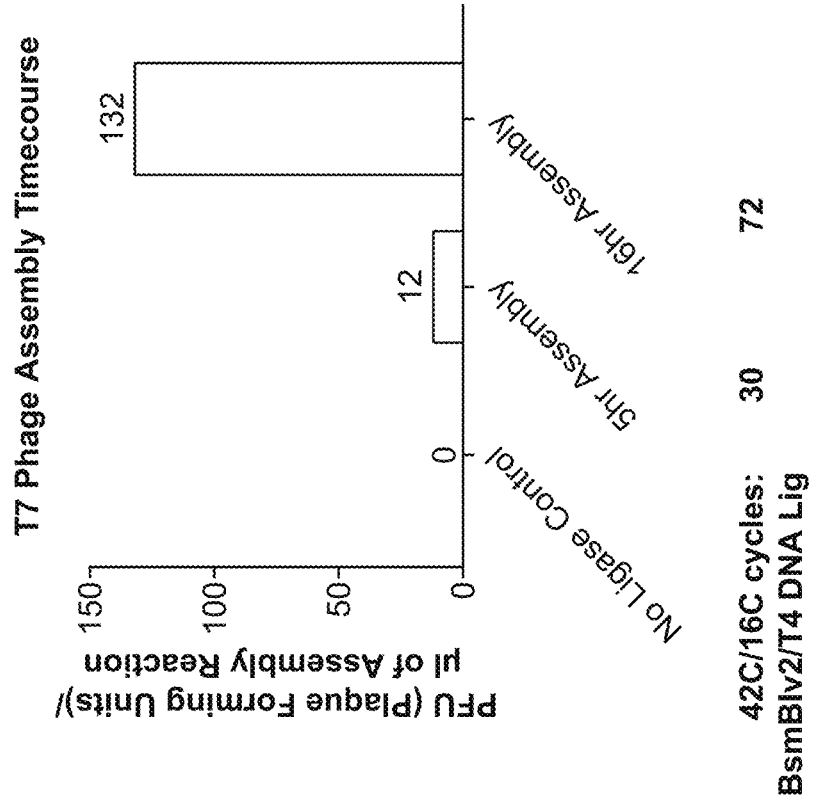

FIGS. 19A and 19B show the assembly efficiency for a T7 phage genome (40 KB) assembly from 52 fragments in a single pot assembly reaction. Wild type T4 DNA ligase and BsmB1 were combined with 52 DNA fragments contained in plasmids in a single pot. The mixture was subjected to 30 or 72 cycles at 42° C./16° C.

FIG. 19A shows the number of colonies observed after a 5-hour incubation and a 16-hour incubation.

FIG. 19B shows the plaques formed when 25 µl of assembly mix was place on a lawn of bacteria on a plate.

Figures 20A, 20B:
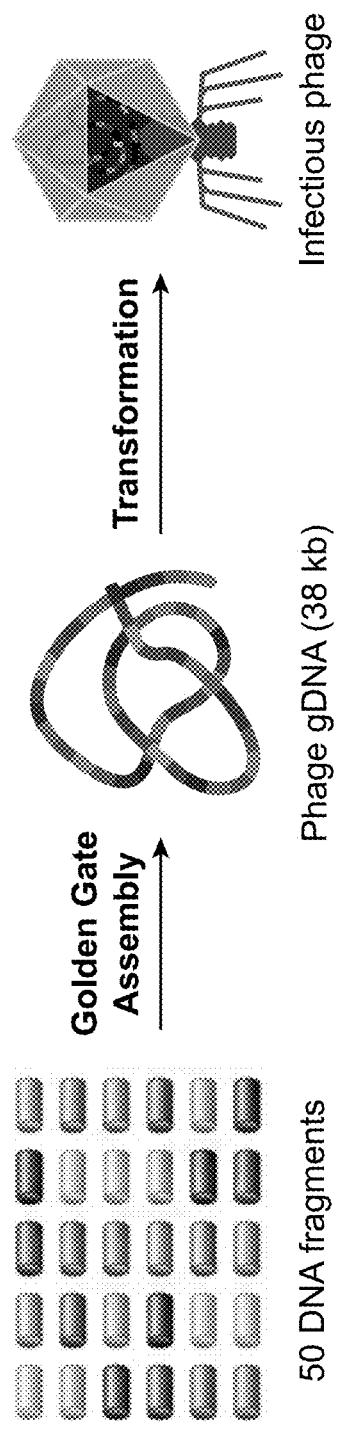

FIGS. 20A and 20B show T7 phage genome assembly and infectious phage reconstitution.

FIG. 20A shows a schematic of the 50 fragment T7 phage reconstitution experiment.

FIG. 20B shows results of the assembly reactions. Four replicate experiments were carried out to quantify the number of plaque forming units upon transformation of the phage gDNA assembly reactions. On average, 23 plaques were observed per µL of the assembly reaction transformed into E. coli cells.

Figure 21B:
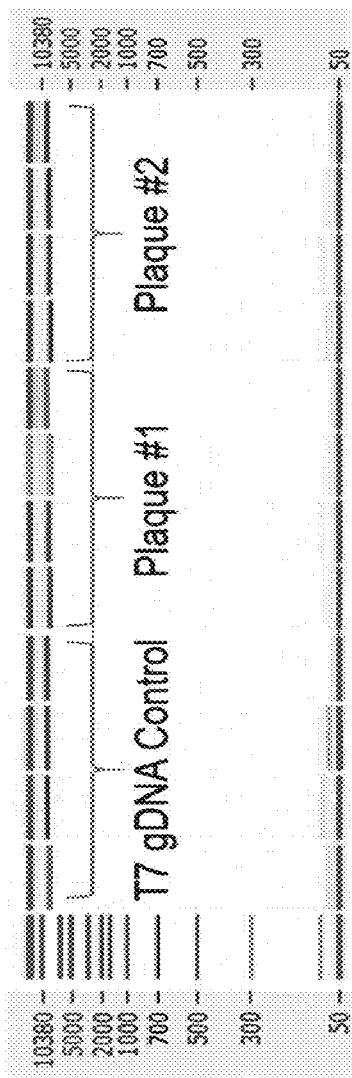
Figure 21A:
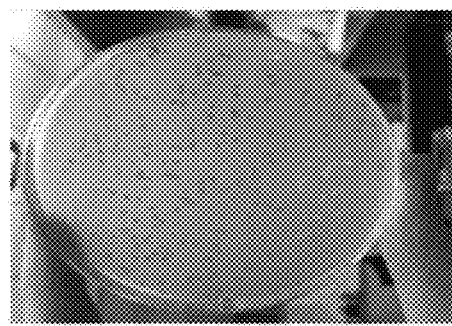

FIGS. 21A and 21B shows that the assembled T7 page genome was active and formed plaques which were then analyzed on a gel.

FIG. 22A-22C shows a one-pot Golden Gate assembly of 52 fragments into a destination vector for lac operon assembly.

FIG. 22A shows a schematic of the 52-fragment lac operon cassette assembly. Assembly inserts were generated by PCR amplification and assembled into a destination vector containing an antibiotic resistance marker.

FIG. 22B shows an example outgrowth plate used for colorimetric scoring by reverse blue-white screening. Correctly assembled 52 insert constructs form blue colonies upon cellular transformation and incorrectly assembled constructs produce white colonies.

FIG. 22C shows results of the assembly reactions. Three replicate experiments were carried out to quantify the number of colony-forming units harboring correct and incorrect assembly products per 100 µL of E. coli outgrowth plated (0.2 µL of the assembly reaction). On average, 49% of the observed transformants harbored correctly assembled products.

Figure 23A:
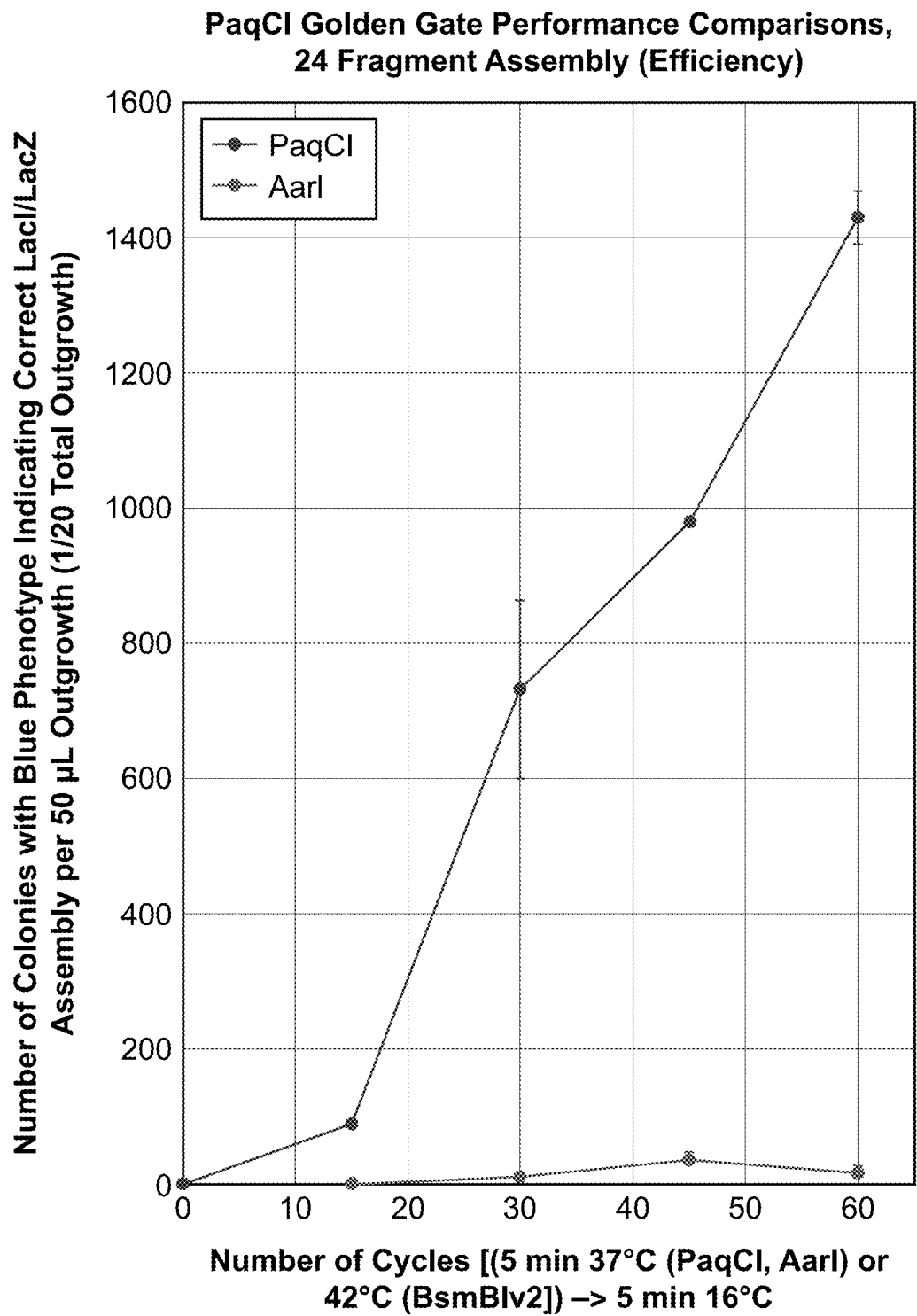
Figure 23B:
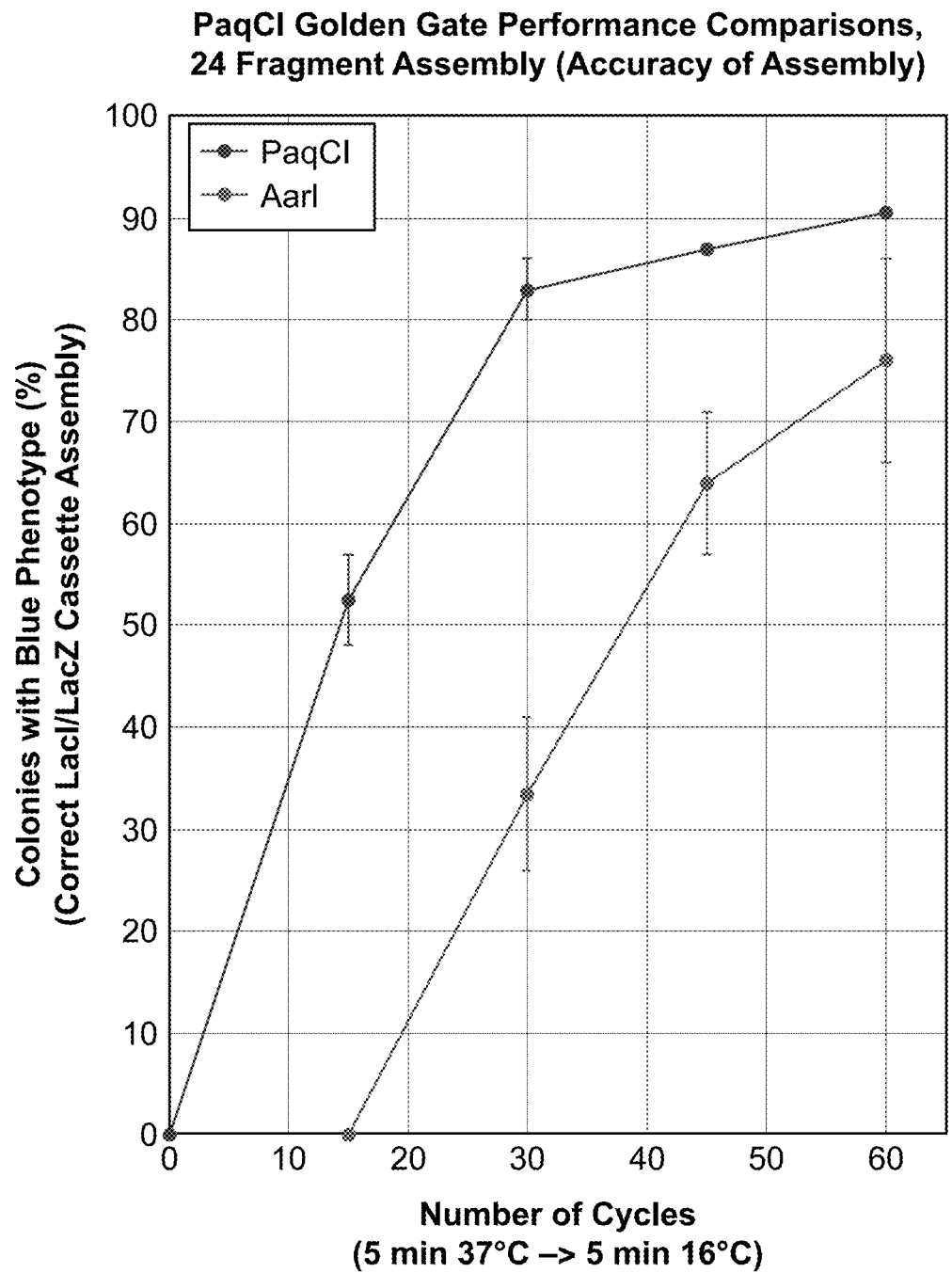

FIG. 23A and FIG. 23B show that the use of the Type IIS restriction endonuclease PaqCI provided greatly enhanced efficiency in the assembly of 24 fragments

DESCRIPTION OF EMBODIMENTS

Described herein, among other things, is a computer-implemented method for selecting a set of overhangs for an assembly reaction.

Unless defined otherwise, all technical and scientific terms used herein in the molecular biology field have the same meaning as commonly understood by one of ordinary skill in the art to which this invention belongs. Singleton, et al., DICTIONARY OF MICROBIOLOGY AND MOLECULAR BIOLOGY, 2nd ED., John Wiley and Sons, New York (1994), and Hale & Markham, THE HARPER COLLINS DICTIONARY OF BIOLOGY, Harper Perennial, N.Y. (1991) provide one of skill with the general meaning of many of the molecular biology-related terms used herein. Certain terms are used herein for which explanations are provided below.

As used herein, the term "target polynucleotide" refers to the end product of a ligation based ordered assembly of fragments that may be DNA, RNA or a mixture thereof.

As used herein, the term "polynucleotide fragments" refer to the building blocks that when assembled, create the target polynucleotide. These building blocks may be derived from sequence databases and may contain promoter sequences, enhancer sequences, coding sequences etc. Polynucleotide fragments may be made by chemical synthesis (IDT, Coralville, IA) or by enzymatic synthesis using for example, a terminal transferase-based synthesis. The fragments made in this way may be assembled in a preliminary step from the products of chemical and/or enzymatic synthesis to form larger polynucleotide fragments suitable for assembly into a gene. Where individual polynucleotide fragments are amplified from a template, e.g., by PCR their length does not exceed the processive capability of the polymerase used in amplification. For example, for Taq polymerase, amplicons rarely exceed 5 kb-10 kb and may have a minimum length of 15 nucleotides in length.

As used herein, the term "oligonucleotide" refers to a multimer of at least 10, e.g., at least 15 or at least 30 nucleotides. In some embodiments, an oligonucleotide may be in the range of 15-500 nucleotides in length, or more. Any oligonucleotide used herein may be composed of G, A, T and C, or bases that are capable of base pairing reliably with a complementary nucleotide.

As used herein, the term "sequence" refers to a series of letters each letter corresponding to a base e.g. A=adenine, T=thymine, U=uracil, G=guanine and C=cytosine. Modified nucleotides (nucleoside (base and deoxyribose) and a phosphate) may optionally be included in an overhang sequence and hence in a ligation efficiency database. A plurality of letters in a specific order describes figuratively the composition of a molecule.

As used herein, the terms "perfect match", "complementary" and Watson and Crick pairs each refer to the pairing by hydrogen bonds of bases on separate strands of a duplex DNA where A is matched to a T or U and G is matched to a C.

As used herein, the term "junction" refers to a position in a target polynucleotide where component polynucleotide fragments have been joined by a ligase. The term "junction" also refers to a position in a sequence of a target polynucleotide in a database where fragmentation is recommended for assembly of a target polynucleotide from an optimized set of fragments. The context of the word "junction" will make clear which of the two meanings is intended. The assembly methods described herein may be used to create scarless junctions in the target polynucleotide meaning that the junction in the target polynucleotide would be indistinguishable from the corresponding position in the original polynucleotide sequence.

As used herein, the term "overhang" refers to a single stranded region at the end of a double stranded fragment polynucleotide for example DNA. The overhang is preferably formed by an enzyme that creates a staggered cleavage of the nucleic acid on both strands of the duplex outside the recognition region. The overhangs are generally 5' overhangs. The overhang can be defined by its length and its sequence. For example, there are 256 different possible 4-base overhangs ($4^4$). Overhangs of 2 bases, 3 bases, 4 bases and 5 bases are exemplified here, generated by restriction endonuclease cleavage. The overhang can contain 2-8 nucleotides although 3 or 4 nucleotide overhangs are generally preferable. The preference derives from the availability of restriction endonucleases (e.g., Type IIS restriction endonucleases) that cleave double stranded DNA outside the recognition site to produce 3 or 4-base overhangs and from the number of possible overhang pairs in a set which is sufficient to optimize ligation of a plurality of polynucleotide fragments to form a target polynucleotide.

Matching the overhang from one polynucleotide fragment with a second complementary overhang on a second polynucleotide fragment results in a junction if a ligase is added to the mixture. The first overhang and the second complementary overhang are referred to as overhang pairs or complementary overhangs. While not wishing to be limited by theory, it is proposed here that combining the ligase with the restriction endonuclease in a single assembly reaction mixture results in a significant reduction in inappropriate hybridization and ligation events. These inappropriate events occur when a cleavage product that consists of an overhang and the restriction endonuclease recognition sequence reconnects with the assembly fragment from which it has been cleaved or reconnects with another cleavage product. In both scenarios, the sequences are cleaved again by restriction endonucleases in the reaction mix to liberate the polynucleotide overhangs for proper ligation to the compatible polynucleotide fragment partner.

As used herein, the term "inputs" refers to the information the user enters into the computer. These may include: specified reaction conditions, a target polynucleotide sequence that can be divided into polynucleotide fragments, excluded overhangs, included overhangs, and the number of desired fragments or overhangs. Input parameters are received by the computer.

As used herein, the term "outputs" refer to instructions from the computer that enable the user to make the desired target polynucleotide. These may include: overhang sets with preferred ligation fidelity scores for a specified number of junctions, and/or full polynucleotide fragment sequences based on input of the target polynucleotide. Where polynucleotide fragment sequences are entered by user, then the computer output may include pairs of overhangs that avoid internal sites, palindromes and repeat overhangs and provide a high overall fidelity score for the specified reaction conditions including cycling conditions, incubation time and temperature and recommended enzymes for optimizing ligation fidelity. Computer outputs may further provide graphical display of fragment assembly design and fragment sequences or link to the same. A computer output may also provide a matrix of ligation frequencies for all combinations of the selected overhangs in order to graphically illustrate the predicted fidelity for a chosen set of overhangs and their complements or link to the same.

By default, the tool can provide ligation data in a graphical output, indicating the general efficiency of each connection. For example, in FIG. 11A-11B, the checkbox can be toggled to display normalized ligation counts. In multiplex ligation assay, the relative ligation frequency was experimentally determined for all 256 4-base overhangs in a single experiment. Total ligation events for each experiment were normalized to 100,000; in this case, a typical frequency for any single Watson-Crick pair was 300-400 observations per 100,000 ligation events. Further details are provided in Potapov, et al. Nucleic Acid Research, 46, e79 (2018); Potapov, et al. Cold Spring Harbor Laboratory, bioRxiv, doi: https://doi.org/10.1101/322297 (2018); and Potapov et al. ACS Synthetic Biology 711, 2665-2675 (2018).

As used herein, the term "experimental conditions" refer to choices of a ligase, endonuclease and other enzymes as desired for the workflow and their unit ratio. For example, the ligase to restriction endonuclease unit ratio may be within the range of 1:10-1:1000 regardless of the type of DNA ligase or Type IIS restriction endonuclease selected. Experimental conditions may include salt concentrations, temperature and time used to complete ligation of overhangs and may further include cycling conditions for ligation reactions. Experimental conditions may be selected to reduce the assembly time for large numbers of fragments, improve the fidelity score of the selected set of overhangs, improve the activity of the cleavage endonucleases while retaining ligase activity and performance and/or reduce background of incorrect assemblies. Experimental conditions may also affect removal of mismatches in the target polynucleotide. Watson/Crick perfect matches may be preferred although in some cases a single base mismatch in the overhang may provide a higher fidelity score for ordered assembly than a perfect match of bases that do not readily hybridize as deduced from the ligation frequency tables. Alternative splicing may also occur during assembly resulting in a mismatch at a junction. Mismatches can be removed using EndoMS or T7 Endo I, or other repair enzyme that identifies mismatches, to cleave the DNA at the mismatch.

As used herein "ligation frequency" refers to the number of times an overhang will ligate to another overhang out of a total number of ligations (e.g., 100,000 ligations).

As used herein, the term "ligation fidelity" refers to a numerical assessment of discrimination against the ligation of substrates containing mismatched base pairs bias (preferential ligation of particular sequences over others). This has been determined in various ways such as: biochemically by sequencing ligation events for a specific overhang pair (sequence analysis) to detect perfect or imperfect matches; and by counting blue colonies denoting successful ligations of target polynucleotides as a function of the total number of colonies on a plate. The ligation fidelity is then calculated from the number of correct assemblies/total number of assemblies.

As used herein, the term "ligation fidelity by overhang" or "ligation fidelity score for an individual overhang" refers to the frequency at which an individual overhang and its complement independently ligate to a perfectly complementary overhang relative to all overhangs in a set and their complements. A fidelity score can be calculated by consulting a ligation frequency table, which comprising individual experimentally-defined measurements of the number of ligation events for each overhang to all overhangs of the same length (including itself). A ligation fidelity score for an individual overhang is calculated as the number of ligation events that occur between the individual overhang and its complement relative to the total number of ligation events that occur between i. the individual overhang and all of the overhangs in the set and their complements and ii. the complement of the individual overhang and all of the overhangs in the set and their complements.

As used herein, the terms "ligation fidelity of an entire set" and "overall fidelity score" refer to the expected ratio of correctly ligated assemblies to incorrectly ligated assemblies based on the individual ligation fidelity scores for each member of a given set of overhangs. An overall fidelity score for a set of overhangs can be calculated by multiplying the individual ligation fidelity scores for the overhangs in the set together.

As used herein, the term "overall assembly fidelity" refers to the actual number of correctly assembled target nucleic acids compared to the predicted number of correctly assembled target nucleic acids. For example, the assembly efficiency of 10 oligonucleotides with overhangs can be determined by the number of times all 10 junctions are ordered correctly in the population of target polynucleotides. Assembly fidelity may be greater than 20%, 30%, 40%, 50%, 60%, 60%, 70%, 80%, or 90%.

The term "ligation efficiency" refers to the number of correct assemblies as a function of time. As used herein, the term "assembly efficiency" refers to the rate at which full length ligation products (complete target nucleic acids as determined by size or colony formation or sequencing) accumulate in a particular assembly reaction after a particular time period. An arbitrary unit of time may be selected which will provide an overall average/unit time for ordered assembly of a target polynucleotide. However, the ligation efficiency may not be linear over a selected incubation period.

The term "ligation yield" refers to the number of correct assemblies.

The term "ligation accuracy" refers to the number of correct end joining of fragments over number of total assemblies. This may be determined by sequencing.

A method described herein is for selecting a set of overhangs suitable for assembling a selected number of polynucleotide fragments into a target polynucleotide. For example, this can be achieved by means of a computer system that can test and arrange in suitable order, useful overhangs that not be achievable by a mental act. The identification of suitable overhangs may involve one or more steps. A first step may be initiated by receiving numbers that have been entered by a user into a computer interface. These numbers may include: (i) a desired number of overhangs for an assembly reaction and (ii) a length of the overhangs. In some embodiments, the number of overhangs may be in the region of 5-200, e.g., 10-100, e.g., 10-50, although the number of overhangs can be outside of these ranges in some circumstances. The length of the overhangs may be 2, 3, 4 or 5 nucleotides, where the length of the overhangs is limited only by the choice of restriction endonuclease or other means for generating the overhang and the frequency and fidelity of possible ligation reactions. The choice regarding the preferred length of overhang may be subject to the number of possible overhangs for any combination of nucleotides in the overhang where this number should exceed the number of fragments to be joined. After the desired number of overhangs for an assembly reaction and the length of the overhangs have been received, the computer provides a set of overhangs from an overhang table, of the selected length (e.g., 2, 3, 4 or 5-bases). For example, if a user were to input, into the computer, 20 overhangs each 4-bases long, then the computer would output a set of 20 unique overhangs that did not include duplicates, complements, palindromes (e.g., GATC) or excluded sequences. GATC is an example of a palindromic sequence since its reverse complement is GATC. Palindromes should be avoided because any one fragment with palindromic ends could anneal to another identical molecule resulting in the disruption of ordered assembly. The interface may permit receiving a list of one or more overhangs that should be excluded or included. Overhangs that are excluded may be selected because of poor fidelity or frequency of ligation profiles or because the overhangs have been used elsewhere in a reaction. Included overhangs may be selected on the basis of experimental findings of their high fidelity and/or frequency values. The interface may additionally permit selection or input of experimental conditions under which the assembly reaction is expected to occur. The experimental conditions will change the choice of ligation frequency tables and individual overhang ligation fidelity determinations accessed by the computer.

As would be apparent, the overhang ligation frequency table may be stored in computer memory and can include all possible overhangs of the desired length or a subset of the same. For example, for a 4-base overhang the overhang table may contain 256 4-base sequences for a 3-base overhang the overhang table may contain 64 3-base sequences. The overhangs may be selected in any particular order. For example, in some embodiments the overhangs may be selected randomly whereas in other embodiments the overhangs may be selected in a defined order.

Next, after a set of overhangs of the desired length and number have been selected, then the computer calculates a ligation fidelity score for each individual overhang and its complement in the set. For example, if there are 20 overhangs in the set, then there should be 20 ligation fidelity scores, where the ligation fidelity score of each individual overhang represents the frequency at which the individual overhang and its complement independently ligate to a perfectly complementary overhang relative to all overhangs in the set and their complements. For example, if a particular overhang and its complement ligate together 90% of the time relative to all overhangs in the set and their complements, then that overhang may have a calculated ligation fidelity score of 0.9. This step may be done by consulting a ligation frequency table comprising individual experimentally-defined measurements of the number of ligation events. A ligation frequency table for a 4-base overhang should have an experimental value for each of all possible combinations of overhangs, i.e., 256×256/2 datapoints, each value indicating the frequency of ligation of two overhangs under defined experimental conditions. Details for how this data can be obtained is described below as well as in, e.g., Potapov et al (2018).

The ligation fidelity score for an individual overhang can be calculated as the number of ligation events that occur between the individual overhang and its complement relative to the total number of ligation events that occur between i. the individual overhang and all of the overhangs in the set and their complements and ii. the complement of the individual overhang and all of the overhangs in the set and their complements.

The overall fidelity score for the set of overhangs can then be generated based on the calculated ligation fidelity score for each of the individual overhangs, as output above. In some embodiments, the individual ligation fidelity score may be multiplied together to obtain the overall fidelity score. For example, if there are 20 overhangs that each have a fidelity of 0.950, then the overall fidelity score for that set of overhangs may be 0.36 (i.e., $0.95^{20}$). In some embodiments, this calculation may, in addition, weight overhangs by how efficient an overhang is at ligating to its complement. For example, in some cases, two overhangs may have equal fidelities, but one ligates to its complement more efficiently than the other under the conditions used. In this case, the overhang that ligates with a higher efficiency may have a higher weight than the other. As such, in some embodiments, the overall fidelity score may be calculated using i. the calculated ligation fidelity score for each of the individual overhangs and ii. the yield that each of the individual overhangs ligates to a perfectly complementary overhang.

After an overall fidelity score for the selected set of overhangs has been calculated, the process may be repeated for another set of overhangs to calculate a plurality of overall fidelity scores, each for a different set of overhangs. In this step the sets of overhangs selected in the iterated steps are different from one another (and different from the first set of overhangs). Again, in the iterated steps the selection may be random or in a defined order. In some embodiments, these steps may be iterated using a Monte Carlo simulation. In this method, at least 100, at least 1,000 or at least 10,000 overall fidelity scores may be generated, each for a different set of overhangs. This part of the method repeated until an overall fidelity score has been assigned to all possible combinations of overhangs or until one or more overhangs have been identified that overall fidelity score that is above a threshold.

After the overall fidelity scores have been calculated, then the method may comprise identifying the set of overhangs that has a suitable overall fidelity score. In some embodiments, the identified set of overhangs may have an overall fidelity score that is in the top 50%, top 20%, top 10% or top 5% of overall fidelity scores. In some embodiments, the identified set of overhangs may have the highest overall fidelity score or a score that is in the top 10 or top 5 highest fidelity scores. The selected set of overhangs may be output from the computer onto, e.g., a display.

Where ligation conditions (in addition to the desired number of overhangs for an assembly reaction and the length of the overhangs) are received in the interface, the overall fidelity scores are calculated for the overhangs in ligations that were performed in the specified ligation conditions. Hence a ligation frequency table that corresponds to the specified conditions may be selected from multiple ligation frequency tables, each for a different ligation condition. After the ligation frequency table is selected, then the ligation fidelity scores can be calculated using data in that table. Accordingly, the ligation conditions may comprise one or more of a ligase, a salt concentration, a temperature, temperature range and/or thermocycling conditions (which may be used for cleavage and ligation). These options could be implemented using a drop-down menu, where the options laid out in the drop-down menu correspond to different ligation frequency tables. Examples of experimental conditions that were found to affect ligation efficiency, fidelity and yield are provided in Table 8 and are discussed in more detail below. The parameters experimentally tested for yield, fidelity and efficiency of ordered assembly included the following in various combinations:

(a) Temperature conditions for ligation including static temperatures and cycling between high and low temperatures using drop-down or touch-down cycling. These terms are explained in Example 2;
(b) Number of fragments for ordered assembly;
(c) Length of overhang;
(d) Time of incubation of the restriction endonuclease/ligation reaction;
(e) Types of restriction endonuclease and ligase;
(f) Salt concentrations of the buffer;
(g) Additional proteins for repairing mismatches.

In variations of the method, a first step may include receiving a nucleotide sequence of an intended assembly and a set of intervals (e.g., at least 5, at least 10, at least 20 or at least 30, up to 50 or more intervals) in which the nucleotide sequence can be cleaved (in addition to the desired number of overhangs for an assembly reaction and the length of the overhangs). The input sequence may be, for example, any sequence that is at least 500 bases in length, although sequences as short as 25 nucleotides could be selected providing a Type IIS restriction endonuclease recognition (binding) sequence is present at the beginning and end of that interval. For example, the method may include receiving a sequence and multiple sets of beginning and end coordinates, where each set of beginning and end coordinates defines an interval in which the sequence can be cleaved. In these circumstances, only overhangs that are in the intervals may be selected from the overhang table such that, together, each interval is represented by a selected overhang. A non-redundant set of sub-sequences are then identified in the intervals that are the same length as the received overhang length. These sub-sequences may be stored as the overhang table itself or only sequences from the non-redundant set of sub-sequences will be selected from an overhang table. The intervals may be input into the computer by a user, e.g., by inputting the intervals into an interface, as illustrated in FIG. 17. Alternatively, a user may input a sequence and specify how many fragments are desired. In these embodiments, an algorithm may determine approximate positions at which the input sequence may be split to produce the desired number of fragments, and then identify intervals (which may be, e.g., 10-50 or 10-100 nucleotides in length) that contain the approximate positions. The intervals may be processed as described above. In these embodiments, the method may further comprise splitting the nucleotide sequence of the assembly at the identified overhangs, thereby producing a set of fragments of the assembly, where the ends of the fragments are defined by the identified overhangs.

In any of the examples provided herein, the method may comprise a user inputting into an interface, one or more of the following: (i) the desired number of overhangs for an assembly reaction, (ii) the length of the overhangs; optionally, (iii) the nucleotide sequence of the assembly (iv) the set of intervals in which the nucleotide sequence of (iii) can be cleaved, causing the method to be executed and then receiving as output, an identified set of overhangs and/or receiving a set of fragments for the assembly, where the ends of the fragments are defined by the identified set of overhangs, depending on which information is input into the interface. This method may further include receiving instructions regarding the ligation conditions for ligating the set of overhangs or fragments containing the same, and, optionally, thermocycling conditions for producing the fragments and ligating them together. In these embodiments, the method may comprise making a set of double stranded nucleic acids that have a set of overhangs that has an overall ligation score that is at or above a threshold, and their complements, and then ligating the fragments together in a single reaction to produce an assembly, wherein in the reaction the overhangs determine the order of the fragments in the assembly. The ligating may be done by overhang-directed ligation, which will be explained in greater detail above and/or below. As would be apparent the method may further comprise receiving selected experimental conditions for ligation.

FIG. 14 illustrates a user interface that can be used to input the parameters that are received by the present method. In this example, a user can specify any one or more of the overhang lengths, the size of the set (i.e., the number of overhangs that should be in the set), ligation conditions and, optionally, overhangs that should be required or excluded in the set.

FIG. 15 illustrates an example of the output of the present method. In this example, the method may output the set of overhangs, the calculated overall ligation fidelity for the set, and a fidelity matrix that shows the efficiency of ligation for each overhang in the set and their complements to all overhangs in the set and their complements.

FIG. 16 illustrates another user interface that can be used to input the parameters that are received by the present method. In this example, a user can input a sequence, ligations conditions and define regions where the sequence can be split and, optionally, overhangs that should be required or excluded in the set.

FIG. 17 illustrates an example of the output of this example. In this example, the method may output the set of overhangs, the calculated overall ligation fidelity for the set, and a fidelity matrix that shows the efficiency of ligation for each overhang in the set and their complements to all overhangs in the set and their complements, as well as the sequences of the fragments that have the selected overhangs at the ends.

Embodiments are provided herein for enabling a user of a computer to review by means of a graphical representation, the ligation fidelity profile expected from a predetermined set of fragment overhangs under selected experimental conditions. Each of these features can be modified by adjusting any of the parameters described herein to provide a revised graphical representation and to determine whether the change improved the ligation fidelity profile for the selected number of overhang sequences using the graphical representation of the deviation from perfect score obtained for the set of overhang sequences.

Other embodiments are provided herein for enabling a user of a computer to rapidly and efficiently obtain from the computer an optimized set of overhang sequences suited for assembling multiple nucleic acid fragments into a target polynucleotide. The optimization relies on a database of ligation fidelity values for all possible overhang sequences for a complete set of all possible sequence combinations of overhangs having a single length. The complete set of overhangs may include overhangs of different sizes. The nucleic acids include DNA, RNA or DNA/RNA hybrids or chimera. While DNA may be specifically mentioned in the description, examples and claims for convenience, embodiments herein are not limited to DNA but may be applied to any type of nucleic acid as described above.

The overhang length of choice may be determined by the availability of endonucleases that generate the desired overhang length. Another factor is the frequency of recognition sequences in the originator DNA and the adjacent sequences. For example, recognition sequences that occur within a polynucleotide fragment should be avoided. The length of the recognition sequence determines to some extent at least, the likelihood of it appearing at internal sites within the originator DNA. For example, a 7-base recognition sequence is predicted to occur less frequently than a 6-base recognition sequence. An 8-base recognition sequence is predicted to occur even less frequently than a seven base recognition sequence. Consequently, the use of 6-base, 7-base and 8-base recognition sequences for Type IIS restriction endonucleases that generate overhangs after cleavage of 3, 4 or 5-base overhangs are preferred. Examples of 7-base recognition sequences for IIS restriction endonucleases include AartI and its isoschizomers including PaqCI. These endonucleases cleave DNA outside their recognition sequence to produce a 4-base overhang.

An increasing number of different Type IIS restriction endonucleases are being described. Many of the current endonucleases may be found in the commercial literature (including www.neb.com) provided by New England Biolabs (NEB), including recognition sequences and length of overhang generated by cleavage. New endonucleases are listed in a regularly updated database (see REBASE on www.neb.com from New England Biolabs). For example, this includes AcuI, AlwI, BaeI, BbsI, BbnI, BccI, BcgI, BciVI, BcoDI, BspMI, BfuAI, BmrI, BpmI, BpuEI, BsaI, BsaXI, BseRI, BsgI, BsmAI, BsmBI, BsmFI, BspCNI, BspMI, BspQI, BsrDI, BsrI, BtgZI, BtsCI, BtsIMutI, CspCI, EarI, EciI, Esp3I, FauI, FokI, HgaI, HpHI, HpyAv, MboII, MlyI, MmeI, MnlI, NmeAIII, PleI, SapI, and SfaNI. These endonucleases are all available from New England Biolabs. The recognition sequences and overhangs are described by NEB along with reaction buffers, reaction temperatures and storage conditions. Isoschizomer information is also provided.

PaqCI, described herein as having at least 90% sequence identity to SEQ ID NO:26 is a novel Type IS restriction endonuclease and as FIG. 23A-23B shows, it is a preferred Type IIS restriction endonucleases for performing assembly of large numbers of fragments (at least 20 fragments). Unlike AarI, it does not appear to have star activity that is detectable by gel electrophoresis and cuts DNA to completion. PaqCI appears to perform better in the presence of a synthetic oligonucleotide. Also described herein is an activator oligonucleotide that was found to improve the activity of PaqCI. This oligonucleotide is a synthetic self-complementary oligonucleotide that comprises a double-stranded region and a loop, wherein the double-stranded region contains a binding (recognition) sequence for PaqCI and wherein the oligonucleotide comprises unligatable 3' and 5' ends and cannot be cleaved by PaqCI.

Recognition sequences can be readily introduced at the termini of fragments by primer dependent amplification or by chemical nucleic acid synthesis. The sequences adjacent to the restriction endonuclease recognition sequence form the overhangs. Preferably, these should be suitable for joining an ordered set of fragments that comprise a target nucleic acid.

Factors for determining an appropriate length of overhangs include: how many fragments are desired to be joined where the longer the overhang, the larger the set of possible combinations. This enables more fragments, each with a unique overhang complementary to its adjacent fragment overhang, to be joined to form a target polynucleotide. Other factors include the efficiency of melting/annealing where shorter overhangs melt and anneal faster and longer overhangs require higher melting temperatures. Ligation efficiency is another factor where longer overhangs may ligate more efficiently than shorter overhangs. Ligation efficiency also depends on the characteristics of the nucleotides singly or together in the overhang where some sequences are more efficiently hybridized and/or ligated to form a junction than others, have reduced bias and do not favor or induce mismatches.

In one embodiment, the output from the system instructs the user which restriction endonucleases should be used to cleave the nucleic acid to generate overhangs having sequences that have been optimized for ligation fidelity or selected for a chosen ligation fidelity. However other cleavage enzyme systems can be used such as uracil-specific excision reagent (USER®, New England Biolabs, Ipswich, MA), argonautes, clustered regularly interspaced short palindromic repeats (CRISPR) or other cleavage enzymes can be used to generate overhangs.

The experimental conditions may be offered by menu from the computer interface to the user and then selected by the user or selected by the computer that has computed all the various parameters for the assembly and provides the best conditions for efficient joining all the fragments in a set correctly. The use of a Type IIS restriction enzyme enables the precise selection of a site where the DNA will be broken and enables exclusion of the restriction enzyme recognition sequence from the final construct (thus enabling seamless one-tube assembly reactions) or certain types of nucleic acid assembly, for example for gene coding regions, scarless junctions which do not alter the DNA sequence are important. In other applications, for example, cistron formation, additional or altered nucleotides that may remain from an assembly reaction may not interfere with the gene expression of the target nucleic acid. In one embodiment; the endonucleases suitable for use in generating overhangs and scarless junctions include: 2-base overhang generators (e.g.

BtsI and isoschizomers thereof, AcuI and isoschizomers thereof), 3-base overhang generators (e.g., SapI and isoschizomers thereof (7-base recognition) and BspQI and isoschizomers thereof (7-base recognition)), 4-base overhang generators (e.g., BsaI-HFv2 and isoschizomers thereof (6-base recognition), BbsI and isoschizomers thereof (6-base recognition), BsmBI and isoschizomers thereof (6-base recognition), AarI and isoschizomers thereof) and 5-base overhang generators (e.g., HgaI and isoschizomers thereof with a 5-base recognition site). Other restriction endonucleases as described in the New England Biolabs 2017/2018 catalog and isoschizomers thereof may be used for those assembly reactions that are not required to be scarless.

In some embodiments, overhangs are created using alternate enzymes such as nicking agents for example, USER (also see for example U.S. Pat. No. 7,435,572), or EndoMS suitable for creating overhangs in DNA fragments; and argonautes and Cas cleavage enzymes suitable for overhangs in DNA and RNA, where these enzymes utilize guide DNAs or RNAs.

Embodiments describe how to obtain an optimized data set by profiling end-joining hybridization and ligation fidelity and bias to predict highly accurate sets of connections for ligation-based DNA assembly methods. Unlike the prior teachings that preferred at least a two base pair difference between overhangs, to avoid overhangs with 3 identical base pairs in a row, and to ensure all overhangs have similar GC content in a given assembly (Nilsson et al. Nucleic Acids Res., 10, 1425-1437 (1982); Goffin et al. Nucleic Acids Res., 15, 8755-8771 (1987); and Wu et al. Gene, 76, 245-254 (1989)), the optimized data sets exemplified herein have no such rule based limitations. This presents a significant improvement over the prior art rules that restrict the user to a limited number of 4-base overhangs, which is particularly constraining when sequences may not be chosen arbitrarily (e.g., when assemblies must break within coding sequences).

The optimized data set avoids the use of any overhangs more than once within an assembly, and palindromic overhangs to prevent self-ligation of fragments and depends on quantification of sequence-dependent ligation fidelity and identification of mismatch-prone pairings to limit mismatches. In one embodiment, ligation fidelity profiles were generated that accurately predicted junction fidelity in 10-fragment Golden Gate assembly reactions. The ligation fidelity profiles were verified by determining the efficiency of assembly of a lac cassette from up to 24-fragments in a single reaction. Application of the ligation fidelity profile permitted an informed choice of junctions and enabled a highly flexible assembly design using more than 20 fragments in a single reaction.

Two-base overhangs generate a 16×16 matrix data table, 3-base overhangs generate 64×64 matrix data table, 4-base overhangs generate 256×256 matrix data table, 5-base overhangs generate a 1024×1024 matrix data table, 6-base overhangs generate a 4096×4096 matrix data table. The upper limit of overhang length using a Type IIS restriction endonuclease may be 5, 6, 7 or 8-bases in length. For a nicking agent such as USER, the number of bases in an overhang may be as much as the user desires based on the positioning of a uracil. The optimized sets of Watson crick pair overhangs include overhang pairs that can ligate with their exact complementary partner efficiently, are not palindromes, and are unique within the set. Other overhang pairs are acceptable as long as preferably no individual overhang forms a ligation product with an overhang partner containing one or more mismatches but preferably no more than one mismatch. The highest fidelity set of overhangs with good ligation fidelity can be provided by the computer for any chosen number of junctions (such as 10 junctions, 12 junctions, 15 junctions, 20 junctions etc.). The greater the number of junctions the lower the mean maximal ligation fidelity for the set of overhang pairs.

In one embodiment, the database contains the results of experimentally determined ligation and stores ligation fidelity and/or ligation efficiency parameters for all combinations of an overhang sequence of a single defined length or all combinations for each overhang length of multiple defined lengths. In all cases, the ligation parameters are specified for each pair of same length overhangs in a matrix of all possible options. These ligation parameters may include ligation efficiencies in specified buffer and temperature and time incubation conditions (for hybridization/ligation) as well as number of temperature cycles to complete ligation for a particular ligase.

Embodiments of the methods permits the user to receive a computational output that provides optimized sets of overhangs based on a measure of the net effect of cutting, melting, annealing, and ligation for a particular combination of cleaving enzyme and one or more ligases under a given set of cycling conditions where some or all of these features are provided by the user. The output can then provide a relative ligation efficiency and/or ligation fidelity value for every overhang pairing.

The computational output may additionally provide for the user an optimized protocol for performing an assembly to obtain a desired overall ligation fidelity detailing at least one of temperature, time for hybridization, cycling conditions for ligation, and buffer.

The computational output may include a graphical output of features that include one or more of the following: (1) the entire assembled sequence with the junction sites highlighted, (2) a map of input fragments with individual cut sites indicated on the fragment where the set of cut sites have been determined computationally to yield the optimal set of overhangs for fragment assembly to form the desired product; (3) a matrix of ligation fidelity of the selected overhangs under the user specified conditions or the computer optimized experimental conditions; and (4) a set of primer sequencers that contain selected Type IIS restriction endonuclease recognition sequences and overhang sequences plus any additional target fragment sequences for directing automated oligonucleotide synthesis. The set of primer sequences can be forwarded electronically to a receiving location for instructing a DNA synthesis instrument to make such primers.

In one embodiment, the results for a user's chosen set of overhangs can be optimized by the user providing the preferred set of conditions to achieve efficient and accurate hybridization. Short linkers of arbitrary sequences are preferred for large numbers of fragments (e.g., ≥20). Multiple data sets can be accessed that provide overhang optima under different conditions. Such assays enable the user to select a set of enzymes and reaction conditions that would give the highest possible fidelity and efficiency for a selected set of overhangs.

In another embodiment, partial overhang pair reaction parameters and data sets could be selected by the user and partial overhang reaction parameters and optionally data sets could be selected by the computer to provide the optimal ligation efficiency and fidelity possible to create the desired number of ligated fragments. For example, 15 junction pairs might be required in total to join 16 fragments of double stranded nucleic acid fragments where 6 overhang pairs had been selected by the user and the remainder of overhangs are provided in a computer-generated output optionally with preferred experimental conditions including choice of ligase. The user could then be enabled to receive an additional optimized 9 overhang pairs with optional choice of reaction components such as restriction enzyme, ligase and optional choice of other reaction conditions including cycling time and temperature that would provide the highest ligation fidelity and efficiency possible for the 15-member final set.

In another embodiment, the user inputs into the computer, a gene, gene pathway, plasmid or chromosome sequence for dividing into fragments suitable for efficient assemble with high fidelity using an optimized set of overhangs. The user may specify the target nucleic acid and the desired number of fragments. The webtool or graphical interface provides the sequence for the desired number of fragments at the optimal junctions that satisfy the hybridization parameters of the associated overhangs that when ligated, form scarless junctions thus enabling to the user to make the target polynucleotide in the desired manner. If the user additional specifies the minimum acceptable fidelity, the sequence specification for the desired number of fragments may be altered and indeed the number of fragments provided to the user might change to provide the maximum number of sequences possible with junctions that provide the specified minimum acceptable fidelity.

In another embodiment, the user may provide the target sequence and additionally may specify some junctions to be included in the design of constituent fragments with predetermined overhangs, and some subset of reaction conditions (or all reaction conditions). The computer provides to the user, a list of overhangs for efficient ligation to supply the best additional junctions and/or reaction conditions.

The assembly proceeds at either a single temperature suitable for all types of enzyme activities used in a reaction (e.g., cleavage enzymes and ligation enzymes) or any number of cycling conditions varying between an optimal cutting/melting temperature and an optimal annealing/ligation temperature. Thus, overhangs are generated and sealed in one pot, and multiple fragments can be joined together in one experiment.

As used herein, the term "ligase" refers to an enzyme that is capable of joining two polynucleotides covalently. Many different ligases have been described in the art and are widely known (see Ellenberger et al. Annual Review in Biochemistry, 77, 313-338 (2008); Bauer et al. PLOS ONE, 10, 12:e0145046 (2017)). Ligases for use in assembly reactions may include ATP ligases and NAD+ligases such as T4 DNA ligase, T7 DNA ligase, Taq DNA ligase, viral ligases such as *chlorella* virus DNA ligase (e.g., PBVC-1 ligase), bacterial ligases such as bacterial LigA (e.g., *E. coli* DNA ligase) and LigD; archeal ligases such as *Thermus thermophilus* (Tth) Ligase and eukaryotic ligases such as Mammalian Lig1 and Lig3. T4 DNA ligase and mutants thereof has been used in the present examples, but the methods described herein are applicable to any ligase known in the art suitable for repairing a break in the DNA backbone by joining a 5' phosphate on one strand to a 3' OH on a second strand in cis.

As used herein, the term "restriction endonuclease" refers to an enzyme that is used for bacterial host defense by recognizing a specific sequence on an incoming viral DNA and cleaving the DNA either at the recognition sequence or at a distinct sequence site. One group of restriction endonucleases are identified as Type IIS. This group recognizes asymmetric DNA sequences and cleaves the DNA at a site outside the cleavage site that is at a defined distance from the recognition site usually between 1 and 20 nucleotides. Restriction endonucleases share little amino acid homology. However, those endonucleases that recognize the same DNA sequences are referred to as isoschizomers. Isochizomers may cleave DNA at the same or different positions. A subset of isoschizomers are neoschizomers, recognize the same site as another endoncuclease but cleave at a different site. The term "restriction endonucleases and isoschizomers thereof" is intended to encompass those restriction endonucleases which have the same recognition sequences. For example, PaqC1 is a novel Type IIS restriction endonuclease with a sequence that is at least 90% identical to SEQ ID NO:26 below. Every restriction endonuclease is encoded by a DNA sequence that has little homology with an isoschizomer to itself. The differences in sequences have been long acknowledged and is firmly established in REBASE, the definitive restriction endonuclease database provided by New England Biolabs. Any restriction endonuclease with 90% or greater sequence homology refers only to minor mutations introduced into the selected restriction endonuclease sequence. AarI is a functionally similar Type IIS restriction endonuclease with a 7-base recognition sequence (CACCTGC) that cleaves double strand DNA to create a 4-base overhang. The full DNA sequence encoding AarI is unknown but fragments of sequence indicate that there is little sequence identity with PaqCI Unlike AarI, PaqCI does not have detectable star activity and appears to be a more active cleavage enzyme. This naturally occurring restriction endonuclease appears to be enhanced by the use of a synthetic oligonucleotide that acts as an activator for this restriction endonuclease. The self-complementary oligonucleotide that comprises a double-stranded region and a loop is preferably less than 100 nucleotides in length and contains the recognition sequence for PaqCI and extends no more than 0-4 bases downstream from the recognition sequence plus one unnatural extension of a blocking moiety on each strand. The synthetic oligonucleotide also preferably contains a ligation inhibiting modified base at the 5' end such as an inverted dideoxy thymine (invddT) and a ligation block at the 3' end such as a 3' dideoxy-C, 3' C3 Spacer (C3-OH), a C6 spacer or 3' Amino Linker (C6-NH2). While not wishing to be limited by theory, it is proposed that the PaqCI binds this synthetic oligonucleotide and diffuses through 3D space to complex with the PaqCI this is bound to the substrate DNA resulting in cutting competent complexes that allow cutting of the substrate target.

PaqCI sequence (SEQ ID NO: 26)

510 aa

MPYDHNAEADFAASEVARMLVADPGLCYDAASLPASISASASYEPSAAGW

PKADGLVSVLEGGTSTQRAIALEYKRPQEGIHGLLTAIGQAHGYLHKGYS

GAAIVIPGRYSSHPTPAEYVRDVLNAISGSRAIAVFSYSPPDTTSPTPFA

GRIQCVRPLVFDAGRVHLRPANQGPKTQWVHMREGSTTRDAFFRFLQVAK

RLSADPTAPRPTLRSELVAAIGRLAPGRDPIEYITNTADNKFLTKVWQFF

WLEWLATPAVLTPWKLEAGVYSAPGARTRILREDGTDFSQLWEGRVNSLK

ETIAGMLNRGEISEAQGWEAFVGGISATGGGQDKQGVRARAHSYREDIDS

ALAQLRWIEDDGLPTDQGYRFMTICERYGGANSRAAIDYMGATLIQTGRY

ASFLHYINRLSERKFAENPLAYTKPGPGGMPVFTEESYWEYLQDLETKLT

-continued

DELRVMRKVSGRARPRVRTTFQVELTLLRNYGFVSSTRHRLGVGIPIDWE

QVVQALNVDL

Present embodiments describe how to determine which mismatches to expect in end-joining and to use this information to identify appropriate overhangs for ordered assembly of polynucleotide fragments using T4 DNA ligase. Ligation frequency using T4 DNA ligases have been comprehensively determined by sequencing for 2-base overhangs, 3-base overhangs, 4-base overhangs and 5-base overhangs under a standard set of experimental conditions (see Tables 3-6).

These ligation frequency tables (Tables 3-6) revealed ligation biases for T4 DNA ligases for different length overhangs under specified conditions. Sequence type and context was found to affect fidelity of ligation of overhangs at a junction, in addition to the annealing strength and/or number of hydrogen bonds of the overhang to its complement.

In general, ligases are tolerant of mismatches at the side of the junction providing the 5'-phosphate. T4 DNA ligase could ligate all mismatched base pairings at the 5' side, but preferred C:T, G:T, A:C and T:T mismatches at the 3'-hydroxyl side to the exclusion of others. The high-fidelity Tth DNA ligase was less tolerant of mismatches on the 5'-side of the ligation junction than T4 DNA ligase, readily ligating T:T, T:G, A:C and C:A mismatches, with lesser amounts of G:T, C:C, A:A and G:A ligation. Asymmetrical preferences were found to be common in ligation mismatch tolerance; for example, T4 DNA ligase prefers T:C to C:T at the 3'-OH side of the junction, and Tth DNA ligase prefers T:G to G:T at the 5'-side of the ligation junction. In one embodiment, the relative frequency of all ligation products after T4 DNA ligation were identified with or without mismatches, the position-dependent frequency of each mismatch, and the surprising observation that 5'-TNA overhangs ligate extremely inefficiently compared to all other Watson-Crick pairings.

GC rich overhangs were found to display a higher frequency of mismatch ligation, especially when two of 3-bases in the overhang formed G:C Watson-Crick pairs. Among overhangs with single base mismatches, the two correct base pairings were both G:Cs in 50% of cases, G:Cs and A:Ts in 42% of cases, and both A:Ts in 8% of cases at 25° C. (with similar ratios at 37° C.). Not only the GC content but also the location of G:Cs had an effect on the likelihood of mismatch ligation. For example, overhangs with single-base edge mismatches containing middle A:T pairs and edge G:C base pairs (XAG/YTC, where X:Y indicates mismatch) outnumbered the reverse (XGA/YCT) by a factor of 2.5 (32% versus 13%, respectively), despite having similar predicted AG of annealing (Potapov et al. Nucleic Acid Research, 46, e79 (2018); and Potapov et al. Cold Spring Harbor Laboratory, bioRxiv, doi: https://doi.org/10.1101/322297 (2018)).

Figure 6A:
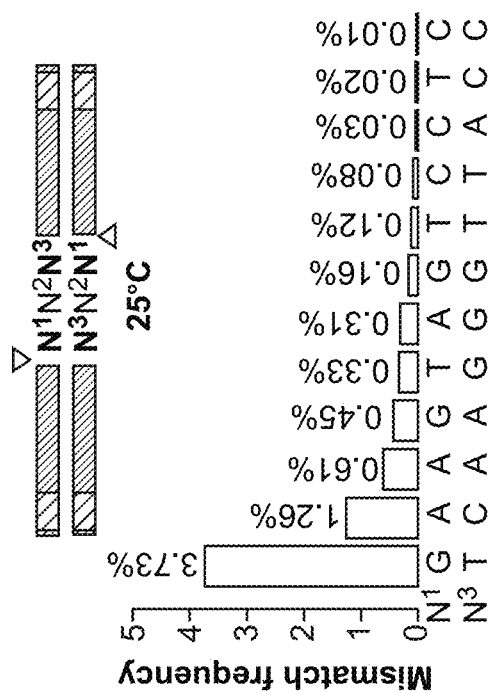
FIG. 6A-6D show that overhangs with different sequences have varying frequency of specific base pair mismatches by position that contributes to a measure of ligase fidelity. The incidence of each possible mismatched base pair observed for ligation of 3 and 4-base overhangs was recorded. The results shown are for Single-Molecule Real-Time (SMRT) sequencing (Pacific Biosciences, Menlo Park, CA) of ligation reactions with 100 nM of the multiplexed 3-base overhang polynucleotide. The reactions were performed at various temperatures and for various times as specified for 1.75 μM T4 DNA ligase in standard ligation buffer. Mismatch frequency varies between almost 4% to 0.01% or less.
Figure 6C:
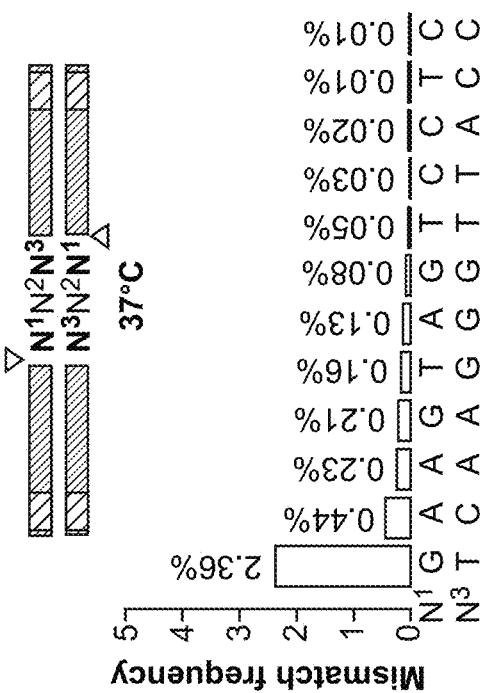
Figure 6B:
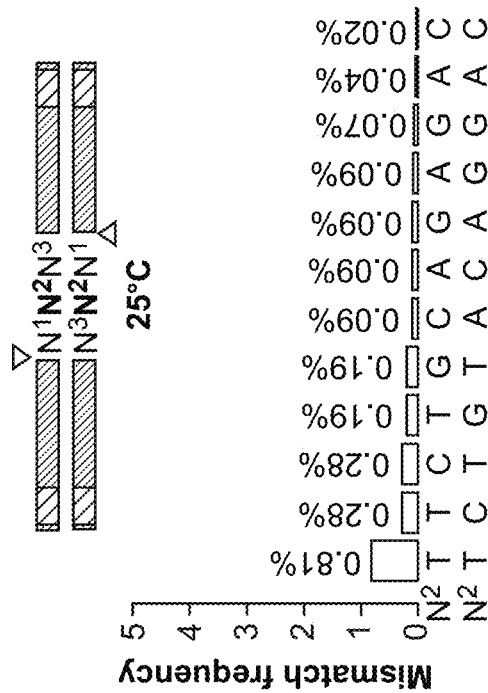
Figure 6D:
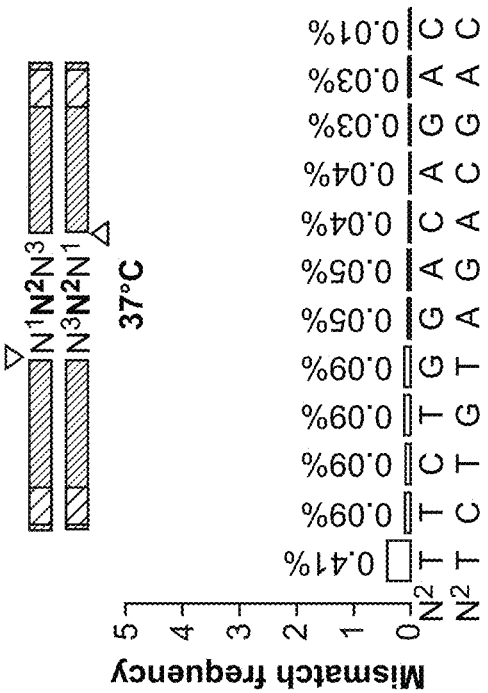
Figure 6E:
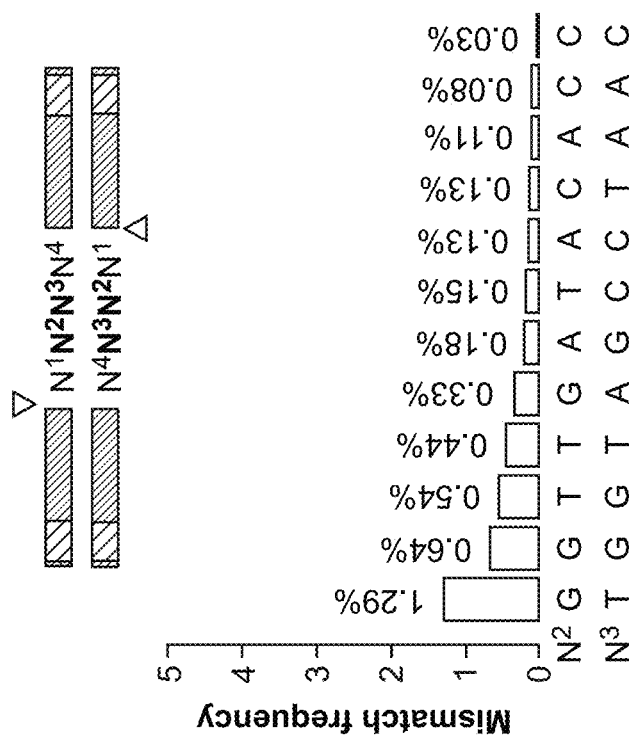
FIG. 6E shows the mismatch frequency when position 2 and 3 (N2:N3') in the 4-base overhang were mismatched for a ligation reaction for 18 hours at 25° C.
Figure 6F:
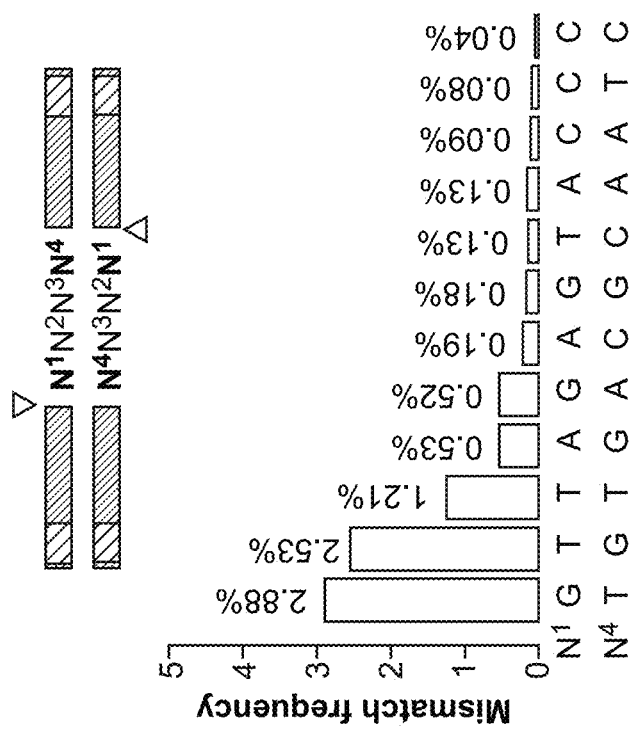
FIG. 6F shows the mismatch frequency when position 1 and 4 (N1:N4') in the 4-base overhang were mismatched for a ligation reaction for 18 hours at 25° C.

The results provided herein from sequencing studies (see for example, Example 1) show that mismatches for 3-base overhangs were observed for A:G, A:C, A:A, T:T, and G:T. G:T mismatches were much more (~10-fold) prone to ligation than T:G, and A:C mismatches which in turn were much more prone to ligation than C:A (~40-fold). Mismatches in the middle position were very poorly tolerated (2.3% of all ligation events), with overall incidence much lower than at the edge positions and only T:T mismatches present in relative high frequency (36% of all mismatches at this position; FIG. 6C).

In addition to the effect of base composition of the overhangs on ligation frequency and fidelity, the base composition of the overhang may also have an effect on efficiency of ligation which is measured by yield over time. It was noted that the ligation rate of TNA overhangs was relatively very slow compared to all other Watson-Crick pairings, including ANT and other high AT overhangs. Incubation time required for ligation may become increasingly important when more fragments above 25 fragments are to be assembled into a target polynucleotide. Selection of overhangs by sequence as determined by a computer after receiving various inputs at an interface are shown here to be effective in rapidly profiling the ligation fidelity of T4 DNA ligase for a plurality of overhangs in a single experiment.

Other factors in addition to the sequence and type of overhang that can increase fidelity (reducing mismatches and/or bias) at ligation junctions during assembly of polynucleotide fragments include one or more of the following: combining ligase with restriction endonuclease in a single reaction; increasing ligation temperature; increasing salt concentration such as ionic strength, divalent cation concentration buffer pH; temperature cycling and varying the conditions thereof; and adding a repair enzyme to correct mismatches that may occur.

5'deadenylase may be used to enhance ligation. One example of a deadenylase is aprataxin. Although the use of the term "aprataxin" is generally the name given to the human derived deadenylase, it is here used interchangeably with "deadenylase" from the family of the histidine triad (HIT) superfamily. This is a conserved family where for example yeast deadenylase is referred to below as aprataxin-like.

Deadenylase-Aprataxin, Genbank ID: Q7Z2E3, from
Homo sapiens
(SEQ ID NO: 18)
MSNVNLSVSDFWRVMMRVCWLVRQDSRHQRIRLPHLEAVVIGRGPETKIT

DKKCSRQQVQLKAECNKGYVKVKQVGVNPTSIDSVVIGKDQEVKLQPGQV

LHMVNELYPYIVEFEEEAKNPGLETHRKRKRSGNSDSIERDAAQEAEAGT

GLEPGSNSGQCSVPLKKGKDAPIKKESLGHWSQGLKISMQDPKMQVYKDE

QVVVIKDKYPKARYHWLVLPWTSISSLKAVAREHLELLKHMHTVGEKVIV

DFAGSSKLRFRLGYHAIPSMSHVHLHVISQDFDSPCLKNKKHWNSFNTEY

FLESQAVIEMVQEAGRVTVRDGMPELLKLPLRCHECQQLLPSIPQLKEHL

RKHWTQ

Deadenylase: Genbank ID: Q08702, from
Saccharomyces cerevisiae
(SEQ ID NO: 19)
MSWRYALKNYVTSPETVNDDTVTYFDDKVSIIRDSFPKSECHLLILPRTM

QLSRSHPTKVIDAKFKNEFESYVNSAIDHIFRHFQEKFRIKKSDDDKDPC

WDDILKDKNKFVRNFVQVGIHSVPSMANLHIHVISKDFHSVRLKNKKHYN

SFNTGFFISWDDLPLNGKNLGTDKEIETTYLKEHDLLCCYCQRNFSNKFS

LLKKHLELEFNSHFELK

Deadenylase: Genbank ID: O74859, from *Schizosaccharomyces pombe*
(SEQ ID NO: 20)
MSVHKTNDAFKVLMNSAKEPIVEDIPKKYRKQSFRDNLKVYIESPESYKN

VIYYDDDVVLVRDMFPKSKMHLLLMTRDPHLTHVHPLEIMMKHRSLVEKL

VSYVQGDLSGLIFDEARNCLSQQLTNEALCNYIKVGFHAGPSMNNLHLHI

MTLDHVSPSLKNSAHYISFTSPFFVKIDTPTSNLPTRGTLTSLFQEDLKC

WRCGETFGRHFTKLKAHLQEEYDDWLDKSVSM

Deadenylase: Genbank ID: XP_003666069, from *Thermothelomyces thermophilus*
(SEQ ID NO: 21)
MAERAEDADDIPQPESAPPTTDQQQQQQHDSPPPKAPAKRNAFEELMAPK

PKAPISQAPQFLAHKASQVIRGVWRGALIEYIEHPERFPDKVLRVTADTV

LIKDAFPKATVHLLLLPRSPAHYLVHPHDAFADPAFLAMMRGEAAVAAEL

AAAELARRLGSFSASNRARDEAMSRGVGPDQLPPGRDYSRDIRVGTHAHP

SMAHLHVHVISRDMRSEKLKHRKHYNSFNTPFFVPLEDHPLAQDDVRRQT

GYQNGNLAKDLVCWRCGKGFGNRFAELKRHLEDEFEKWRAE

Deadenylase: Genbank ID: XP_003652653, from *Thermothielavioides terrestris*
(SEQ ID NO: 22)
MAETAEDLEDLTRTESVASSADSPESTPKQDEAQTPTARANTTKPSKPET

KRNAFTELMAPKPRAPISQAPQSLASKASQVIRGVWRGALIEYIEHPERF

PNQVLRVTAHTVLIKDAFPKSTIHLLLLPRSPAHYLLHPHTAFADASFLT

TIRAEAAEAARLAAAELARQLGSFSASNRARDEAVGRGVPPDRLPPGRDY

AREIRVGTHAHPSMAHLHVHIISRDMRSERVKHRKHYNSFNTPFFVPLAD

YPLAEDDVRRETGYQNANLRRELVCWRCGRTFGNRFAELKRHLEEEFVEW

RAE

Deadenylase: Genbank ID: SPQ25427, from *Thermothielavioides terrestris*
(SEQ ID NO: 23)
MRVYVHVGGPLHAGLDEVPVCVDLITEAFLGAPVNTLEASEEVEGVTKEG

TRTYRLIDIQHILASKLAAFCARGDLDSHDFLDLMWLLIKSPYSVKLREG

SVNVPLDQRQAFLAAASTESPHIPSPQSLASKASQVIRGVWRGALIEYIE

HPERFPNQVLRVTAHTVLIKDAFPKSTIHLLLLPRSPAHYLLHPHTAFAD

ASFLTTIRAEAAEAARLAAAELARQLGSFSASNRARDEAVGRGVPPDRLP

PGRDYAREIRVGTHAHPSMAHLHVHIISRDMRSERVKHRKHYNSFNTPFF

VPLADYPLAEDDVRRETGYQNANLRRELVCWRCGRAFGNRFAELKRHLEE

EFVEWRAE

Deadenylase: Genbank ID: XP_006694125 from *Chaetomium thermophilum* var. *thermophilum* DSM 1495
((SEQ ID NO: 24)
MPEAEIPEEMDEFVQPESAPPTVDSPEVPVDHDATKTVSSVLETFTSTKK

DAFAELMSHKQPSKKLMKPPRSLAEKAGKVIGGVWRGALGPFIEHPEKYP

DQVLRVTEHTVLIKDRYPKATIHLLLLPRSKEHNLLHPHTAMADPAFLKI

MRAEAETAAQLAAAELQRLLGRFSEKNRSRNEAIDACVPFDELPPGRDYR

KDIRVGTHAHPSMAHVHVHIISRDMRSESLKRVKHYNSFNTPFFIPLEDY

PLGEEDERWSTSYQNNNLTGDMVCWRCKKNFGHKFAELKRHLEEEFEAWK

RE

Deadenylase:, Genbank ID: XP_003662779, from *Thermothelomyces thermophilus* ATCC 42464
(SEQ ID NO: 25)
MVRPYDPTLTETAVRVDPRDSREYAGNQEASPLYDICHHPEKYTNVRYFD

REMVVLDDANAKSPDHVILMPRDTSIKEMACLKTKHLPLLYRFRDQAHRE

IERMMRVDPGRIPMFRVGFHTIPSLFPLHCHVHDCSLSTDKMFHARHWKV

NFSNMFVALDRVIEEIERTGRIEVDADAYRHDWRTRPIRCPVCPGRQPQW

EADITELAAHWRRHVDEWKSGRAPLPPNVTPARLWEPSYPVILTTRRRSG

FLGLLGDELDHLKAEFPGLEIHSYYTDEWPRIPKYVLDKTTVYLSAAELP

PPGYSLPRLEWVHLGSSGLDLLAAHPYNTHHHRGLRVTSSTGSGSEAVAE

WVLMNTMFLTRRMGAALRNQAGREWAPRALTGFRTISQLSVGIVGFGSIG

RHVAERFLALGARKVTAVNTTGPPLSSSSSSSPCGYSRLGEVTVLPLLQR

GGDGKPEARGGGGDDDDEKDGLREFLRDQDVLVLAAPLTPETRGLIGGAE

LAALPLGAVVLNVARGPLLDERALAERLRSGHLAGAAIDVADQEPLDAAS

PLWDVPNLVITPHVSAFHSKYNQNMLAIFEHNLRAHLCHRPVTEMRNVVQ

LPVPSEPSPLGSKSNAAPKRPTKTAYAVKESSSKN

Polyethylene glycol (PEG) (Millipore Sigma, Burlington, MA) may also be used to enhance ligation. The examples show that PEG having a molecular weight in the range of 600-6000 enhances DNA assemble. For example, PEG MW may be selected from 500, 600, 800, 1000, 1500, 2000, 2500, 3000, 3500, 4000, 4500, 5000, 5500, 6000, 6500, 7000, 7500, 8000, 8500, 9000 and 10,000. Example 7 shows results with PEG 600, PEG 3350 and PEG 6000 at 6.8% w/v.

The user can input any of or all these factors into an interface to enable the computer to provide an effective set of overhangs for assembling target polynucleotides either from polynucleotide fragments defined by the user or from a complete polynucleotide sequence in put by the user. The effective set may vary from one computation to the next, but should exceed a defined threshold for fidelity, efficiency and/or yield of the target assembled polynucleotide (as described above, the ligation fidelity of a set of overhangs is the product of multiplying together the ligation fidelity of a single overhang). The calculated threshold for fidelity may be greater than 85%, 90%, 95%, 96%, 97%, 98% or 99%. It is desirable that the calculated fidelity of joining for a set of overhangs should exceed 95%. The actual fidelity can be established by selecting randomly 2-3 bacterial colonies on a culture plate and analyzing the inserts. The assembly fidelity percentage determined biochemically should preferably provide an approximately 95% probability (typically less than 15% variation) that the clone will have a correct assembly (with no mistakes).

The results shown in Tables 3-6 were obtained from biochemistry and sequencing analysis using methods described in the examples. It is envisaged that tables may be similarly constructed for rNMPs or a mixture rNMPs and dNMPs or modified nucleotides in a single overhang or for the overhang and its complement. In these circumstances a ligase other than T4 DNA ligase may be selected according to the known properties of ligation of generally available ligases. In other embodiments, a matrix with 3' overhang on one axis and 3' and 4' overhang on the second axis may be used where the gap may be filled by the ligase or other gap filling enzyme using an dNTP, an rNTP and/or a labeled nucleotide such as a modified nucleotide such as a methylated nucleotide, a fluorescent nucleotide or a biotinylated nucleotide or other affinity binding domain. One or more of the overhangs pairs may be selected to have one fragment with a 3-nucleotide overhang and the other fragment to have a 4-nucleotide overhang. Where the gap is adjacent to the 3' end of the double stranded DNA on the overhang, T4 DNA ligase can gap fill with the desired modified nucleotide. In this way the assembled molecule may be labeled at one or multiple sites suitable for visualization and/or immobilization for purposes of enrichment and the like.

Embodiments of the present methods enable the user to mix and match large or small numbers of fragments with overhangs with a range of sizes and types for scarless and/or sequence-modified junctions.

Embodiments of the method are suitable for identifying fidelity profiles and mismatch preferences for a variety of ligases that differ in regard to these features from T4 DNA ligase. In this way, ligation pairs that are low fidelity with T4 DNA ligase may be high fidelity for other ligases expanding the repertoire of optimized sets of overhangs.

Embodiments of the method and the data tables provided herein relating to fidelity and bias of cohesive end-joining provides the means to execute high-fidelity ligation such as required in applications that include the ligase chain reaction, generation of libraries for NGS sequencing including choice of adapters and related ligation-dependent methods for detecting specific DNA sequences.

TABLE 1

| Junction | High-fidelity Set | Deletion-prone Set | Failure-prone Set | Low-fidelity Set |
|---|---|---|---|---|
| 1 | AAGG | - - - - | - - - - | GCCC |
| 1' | TTCC | . . . . | . . . . | CGGG |
| 2 | ACTC | - - - - | - - - - | GCCA |
| 2' | TGAG | . . . . | . . . . | CGGT |
| 3 | AGGA | - - - - | - - - - | ACCC |
| 3' | TCCT | . . . . | . . . . | TGGG |
| 4 | AGTC | - - - - | - - - - | AGCC |
| 4' | TCAG | . . . . | . . . . | TCGG |
| 5 | ATCA | - - - - | - - - - | AGCC |
| 5' | TAGT | . . . . | . . . . | TTCC |
| 6 | GCCG | - - - - | - - - - | CGCC |
| 6' | CGGC | . . . . | . . . . | GCGG |
| 7 | CTGA | GCTG | TAAA | AGCG |
| 7' | GACT | CGAC | ATTT | TCGC |
| 8 | GCGA | - - - - | - - - - | CGGC |
| 8' | CGCT | . . . . | . . . . | GCCG |
| 9 | GGAA | - - - - | - - - - | AGGC |
| 9' | TCCTT | . . . . | . . . . | TCCG |

[1]A notation of . . . . indicates the junction pair used is identical to the HF set.

Implementation of Nucleic Acid Assembly Using a Computer Program and a General-Purpose Computer System The various components of the various systems described herein may be implemented as a computer program using general-purpose computer systems. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or non-writeable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

System such as those described herein may be implemented in software, hardware, firmware, or a combination of the three. The various elements of the systems, either individually or in combination may be implemented as one or more computer program products in which computer program instructions are stored on a computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory storage system or transmitted between computer systems by means of various communication media such as carrier signals.

All publications, patents, and patent applications mentioned in this specification are herein incorporated by reference to the same extent as if each individual publication, patent or patent application was specifically and individually indicated to be incorporated by reference.

EMBODIMENTS

The following embodiments describe aspects of the methods described herein. These aspects include computer implemented methods and uses thereof.

Embodiment 1. A synthetic self-complementary oligonucleotide that comprises a double-stranded region and a loop, wherein the double-stranded region contains a binding sequence for PaqCI and wherein the oligonucleotide comprises unligatable 3' and 5' ends and cannot be cleaved by PaqCI.

In other words, the oligonucleotide forms a hairpin, where the stem of the hairpin is double-stranded and the loop is single-stranded. The double-stranded region may be 10-50 base pairs in length, e.g., 10-30 base pairs in length e.g., 15-30 bases. The oligonucleotide is capable of being bound by PaqCI via the binding sequence, but not cleaved. The oligonucleotide cannot be cleaved by PaqCI, meaning that the double stranded part of the oligonucleotide is not long enough to be cleaved by PaqCI. Specifically, the double-stranded region of the oligonucleotide may terminate 1-4 base pairs away from the binding site so that that there are no correctly-positioned phosphodiester bonds in a double-stranded region for the enzyme to cleave. Alternatively, the oligonucleotide may contain an uncleavable linkage at that would usually be cleaved. The 5' and 3' ends of the oligonucleotide may be flush or recessed by 1, 2, 3, 4, 5, 6, or more nucleotides, where either the 3' end or the 5' end can be recessed. The loop of the oligonucleotide is not critical and may be 4-20 nucleotides in some cases. Unligatable 3' and 5' ends are ends that cannot be ligated to another substrate by T4 DNA ligase in a ligation buffer. An unligatable 3' end does not contain a 3' hydroxyl. An unligatable 5' end does not contain a 5' phosphate. The unligatable ends prevent the oligonucleotide from participating in downstream ligation reactions. A 3' end that contains a 3' phosphate and a 5' end that contains a C3 spacer are examples of unligatable ends.

Embodiment 2. The oligonucleotide of embodiment 1, wherein the double-stranded region is 10-50 or 10-30 base pairs in length.

Embodiment 3. The oligonucleotide of any of embodiments 1-2, wherein the oligonucleotide is less than 110 nucleotides or less than 100 nucleotides in length.

Embodiment 4. The oligonucleotide of any of embodiments 1-3, wherein the 3' end of the oligonucleotide does not contain a 3' hydroxyl.

Embodiment 5. The oligonucleotide of any of embodiments 1-4, wherein the 5' end of the oligonucleotide is not a 5' phosphate.

Embodiment 6. The oligonucleotide of any of embodiments 1-5, wherein the binding sequence is CACCTGC.

Embodiment 7. A reaction mixture comprising:
(a) a synthetic self-complementary oligonucleotide of any of embodiments 1-6; and
(b) PaqCI or a variant thereof having an amino acid sequence that has at least 90% amino acid sequence identity with SEQ ID NO:26.

In these embodiments, the amino acid sequence of the variant of PaqCI may be at least 92%, at least 95%, at least 98%, or at least 99% identical to SEQ ID NO:26, and it should have the same basic functional characteristics of PaqCI, i.e., it should be able to the binding site of PaqCI (CACCTGC) and make a double-stranded break a few bases away from the binding site to produce a four base overhang.

Embodiment 8. The reaction mixture of embodiment 7, further comprising a double-stranded DNA substrate for PaqCI, wherein the substrate contains a binding sequence for PaqCI and can be cleaved by PaqCI to produce a 4 base overhang.

Embodiment 9. The reaction mixture according to embodiment 8, wherein the binding sequence in the DNA substrate is CACCTGC.

Embodiment 10. The reaction mixture of any of embodiments 7-9, further comprising a phage derived ligase.

Embodiment 11. The reaction mixture according to any of embodiments 7-10, further comprising a plurality of DNA substrates having a binding site for PaqCI, wherein cleavage of the DNA substrates by PaqCI or a variant thereof produces a plurality of fragments that have compatible overhangs that can be ligated into a single molecule.

Embodiment 12. The reaction mixture of embodiment 11, further comprising a ligase.

Embodiment 13. The reaction mixture of embodiment 11 or 12, wherein the reaction mixture comprises at least 20 DNA substrates containing the binding site for PaqCI.

Embodiment 14. The reaction mixture of any of embodiments 12 and 13, wherein the ratio of the PaqCI or variant to ligase is 2.5-20 units of PaqCI or variant to 200-800 units of ligase.

It is within the scope of these embodiments to utilize a mixture of PaqCI and one or more variants of PaqCI in the same reaction mixture. This scope is intended when PaqCI or PaqCI or a variant thereof is described in any of the present embodiments above or below.

Embodiment 15. A method comprising:
(a) combining:
  i. a synthetic self-complementary oligonucleotide of any of embodiments 1-6;
  ii. PaqCI or a variant thereof having an amino acid sequence that has at least 90% amino acid sequence identity with SEQ ID NO:26;
  iii. a plurality of DNA substrates for PaqCI, wherein cleavage of the DNA substrates by PaqCI or a variant thereof produces a plurality of fragments that have compatible overhangs that can be ligated into a single molecule; and
  iv. a ligase, to produce a reaction mix; and
(b) incubating the reaction mix to produce a reaction product that comprises a DNA molecule that comprises sequence from the plurality of fragments.

Embodiment 16. The method of embodiment 15, further comprising transforming cells with the reaction product.

Embodiment 17. The method of embodiment 15 or 16, wherein the reaction mix further comprises a vector backbone.

Embodiment 18. The method of any of embodiments 15-17, wherein the reaction mix further comprises a DNA repair enzyme, a deadenylase, a crowding agent and/or the incubating is done by thermocycling.

Embodiment 19. The method of embodiment 18, wherein the reaction mix comprises polyethylene glycol (PEG) having a molecular weight in the range of 600-8000.

Embodiment 20. The method of embodiment 18, wherein the deadenylase is a yeast deadenylase.

Embodiment 21. The method of embodiment 18, wherein the DNA repair enzyme is EndoMS.

Embodiment 22. The method according to embodiment 20, wherein the plurality of DNA substrates is at least 20 plurality of DNA substrates.

Embodiment 23. The method according to embodiment 22, wherein the plurality of DNA substrates is at least 50 DNA substrates.

Embodiment 24. A kit for use in synthesizing a DNA from component sequences that are either contained in oligonucleotide fragments, cDNA or in genomic DNA, wherein the kit comprises: a type IIS restriction endonuclease having at least 90% (e.g., at least 95%, 98% or 99%) sequence identity to SEQ ID NO:26, a ligase, and optionally an additive selected from the group consisting of a deadenylase and a crowding agent.

Embodiment 25. The kit according to embodiment 24, wherein the Type IIS restriction endonuclease and the ligase are combined in a single container.

Embodiment 26. The kit according to embodiment 24, wherein the Type IIS restriction endonuclease and the ligase are in separate containers.

Embodiment 27. The kit according to any of embodiments 24-26, further comprises synthetic self-complementary oligonucleotide that comprises a double-stranded region and a loop, wherein the double-stranded region contains a binding sequence for PaqCI and wherein the oligonucleotide cannot be cleaved by PaqCI and comprises unligatable 3' and 5' ends.

Embodiment 28. The kit according to any of embodiments 24-27 wherein the kit contains a deadenylase that has at least 90% (e.g., at least 95%, 98% or 99%) sequence identity to any of SEQ ID NO:18-25.

Embodiment 29. The kit according to any of embodiments 24-28, wherein the crowding agent is polyethylene glycol (PEG).

Embodiment 30. The kit according to embodiment 29, wherein the PEG has a molecular weight in the range of 600-8000.

Embodiment 31. The kit according to any of embodiments 24-30, wherein the kit further comprises a mismatch specific endonuclease.

Embodiment 32. The kit according to any of embodiments 24-31 wherein the mismatch endonuclease is EndoMS.

Embodiment 33. The kit according to any of embodiments 24-32, further comprising in the same or separate container, one or more destination vectors.

Embodiment 34. The kit according to any of embodiments 24-33, wherein the kit further comprises competent prokaryotic or eukaryotic cells for receiving the destination vector.

All publications, patents, and patent applications mentioned in this specification are herein incorporated by reference to the same extent as if each individual publication, patent or patent application was specifically and individually indicated to be incorporated by reference including: U.S. application Ser. No. 17/286,066 filed Apr. 16, 2021; U.S. Provisional Application No. 63/125,530, filed Dec. 15, 2020; U.S. Provisional Application No. 63/213,807, filed Jun. 23, 2021; and U.S. Provisional Application No. 63/213,859, filed Jun. 23, 2021.

EXAMPLES

All enzymes and buffers were obtained from New England Biolabs, Ipswich, MA unless otherwise noted.

Example 1: Sequencing of Junction Regions Formed by Ligation of Overhangs

A single-molecule, next-generation sequencing assay was used to probe the fidelity of DNA ligase end-joining, from a mixed population of single stranded DNA overhangs. The assay utilized SMRT sequencing. Hairpin substrates incorporated the SMRTbell® (Pacific Biosciences, Menlo Park, CA) adapter and a short 2-base, 3-base, 4-base or 5-base 5'-overhang. The results of the analysis are shown in Tables 3-6. The method for obtaining the results are provided below for 3-base overhangs but the same approach was used to determine the 2-base, 4-base and 5-base overhangs. In place of SapI which is a Type IIS restriction endonuclease that creates 3-base overhangs, restriction endonucleases that produced 2-base, 4-base and 5-base overhangs were used and recognition sites to permit cleavage by the restriction endonucleases were utilized in the section on preparation of substrates for multiplexed ligation fidelity and bias profiling assay. Examples of restriction endonucleases:

2-base cutters (e.g., BtsI and isoschizomers thereof)

```
        ↓
5'.. G C A G T G N N ..3'
3'.. C G T C A C N N ..5'
                  ↑
```

3-base cutters (e.g., SapI and isoschizomers thereof including BspQI),

```
          ↓
5'.. G C T C T T C N N N N ..3'
3'.. C G A G A A G N N N N ..5'
                      ↑
```

4-base cutter (e.g., BsaI-HFv2, and isoschizomers thereof

```
          ↓
5'.. G G T C T C N N N N N ..3'
3'.. C C A G A G N N N N N ..5'
                      ↑
```

BbsI, and isoschizomers thereof

```
         ↓
5'.. G A A G A C N N N N N N ..3'
3'.. C T T C T G N N N N N N ..5'
                      ↑
```

BsmbI, and isoschizomers thereof including Esp3I

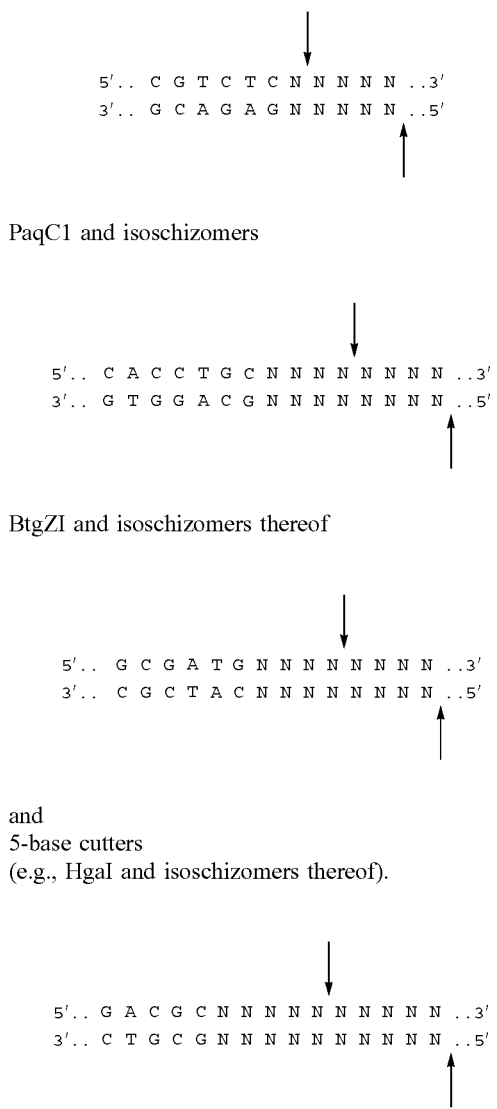

PaqC1 and isoschizomers

BtgZI and isoschizomers thereof and
5-base cutters
(e.g., HgaI and isoschizomers thereof).

For 3-base overhangs, the overhang region was randomized such that it contained all possible 3-base overhangs in approximately equal proportion. Ligation of these randomized pools created libraries with SMRTbell adapters on both ends and an insert region generated from the ligation of two overhangs. SMRT sequencing of the ligated libraries allowed direct read out of both overhangs from single ligation products. Systematic profiling of ligation events for all possible overhangs in a single experiment was achieved. The frequency of each product was assumed to be proportional to the efficiency of that particular end-joining reaction. This method was used to characterize the ligation of 3-base and 4-base overhangs by T4 DNA ligase under typical reaction conditions, allowing the comprehensive evaluation of the fidelity and bias of the reaction. The results are shown in Table 3.

Preparation of Substrates for Multiplexed Ligation Fidelity and Bias Profiling Assay Initial PAGE-purified substrate precursor oligonucleotide was obtained from IDT (Coralville, IA). The sequence (Table 2) contained a 5'-terminal region, a randomized 3-base region, a SapI binding site, a constant region, an internal 6-base randomized region as a control for synthesis bias, and a region corresponding to the SMRTbell sequencing adapter for SMRT sequencing. The oligonucleotide was designed with a short (7-base) complementary region such that they formed a primer-template junction hairpin structure. The precursor oligonucleotide was combined with Klenow Fragment (3'→5' exo-), yeast inorganic pyrophosphatase and dNTPs and an extension reaction performed.

The extended DNA was cut using SapI to generate a 3-base overhang. Final concentration and extent of cutting was determined by Agilent Bioanalyzer® DNA 1000 (Agilent, Santa Clara, CA) and confirmed to be >95% cut.

In a typical reaction, substrate was combined with wt T4 DNA ligase and the ligation yield was determined by Agilent Bioanalyzer DNA 1000. The ligated library was treated with exonuclease III and exonuclease VII in Standard Taq Polymerase buffer for a 60 minute incubation at 37° C.

Pacific Biosciences SMRT Sequencing

Ligated overhang substrates libraries were prepared for sequencing according to the Pacific Biosciences Binding Calculator Version 2.3.1.1 and the DNA/Polymerase Binding Kit P6 v2 using the standard protocol, no-DNA control complex. Libraries were sequenced on a Pacific Biosciences RSII, Inserts corresponding to the same strand were grouped together, and a consensus sequence of each strand was built with the Arrow algorithm using the ccs program from SMRT Link software.

Each consensus sequence represented the product of ligating multiple Golden Gate fragments into a single assembly such that the resulting consensus reads were comprised of long fragments separated by short regions corresponding to ligation junctions. The ten known 300 nucleotide fragments, their coordinates and mapping direction in each consensus read from assembly libraries were determined using BLAST software. This information was then used to tabulate the frequency of pairwise ligation events and overall composition of assemblies. A number of filtering steps were applied to ensure integrity of the derived data. Any 300-nucleotide fragment was required to map entirely from the first to the last nucleotide in the consensus read. Additionally, only two types of ligation junctions were expected to be seen in consensus reads: junctions of length 3 or 4 (for different length overhangs) corresponding to overhang ligation during assembly reaction and corresponding junction lengths of 6 or 8 nucleotides resulting from blunt ligation during SMRT library preparation workflow. Respective barcodes in the opposite strands were required to be complementary.

One nucleotide variation in length or mismatch was permitted for each junction type to account for possible errors in the sequencing reads. If any of above conditions were not met, the resulting consensus read was excluded from the analysis. When a blunt ligation junction was detected in the consensus read, the entire read was split apart at such junctions.

At least five sub-reads per strand were required to build a consensus reads from which fewer than five sub-reads per strand were found were discarded. Resulting consensus sequences were aligned to the respective insert reference sequences using BLASR aligner, and sequence fragments corresponding to overhangs and barcodes were extracted for each strand. Frequencies of all observed overhang pairs in ligation products were tabulated and used to derive results. For each multiplexed ligation profile library, the internal barcodes were characterized to assess the degree of sequence bias introduced by the oligonucleotide synthesis.

For each read, the barcode sequence was extracted, and the fraction of each base at each position determined. The reported values are for the barcode strand produced by the oligonucleotide synthesis; the complementary strand, inserted during the polymerase extension step, had the complementary ratios. The error was reported as the standard deviation of all six positions from all sequencing runs using a given substrate.

Results

Figure 7A:
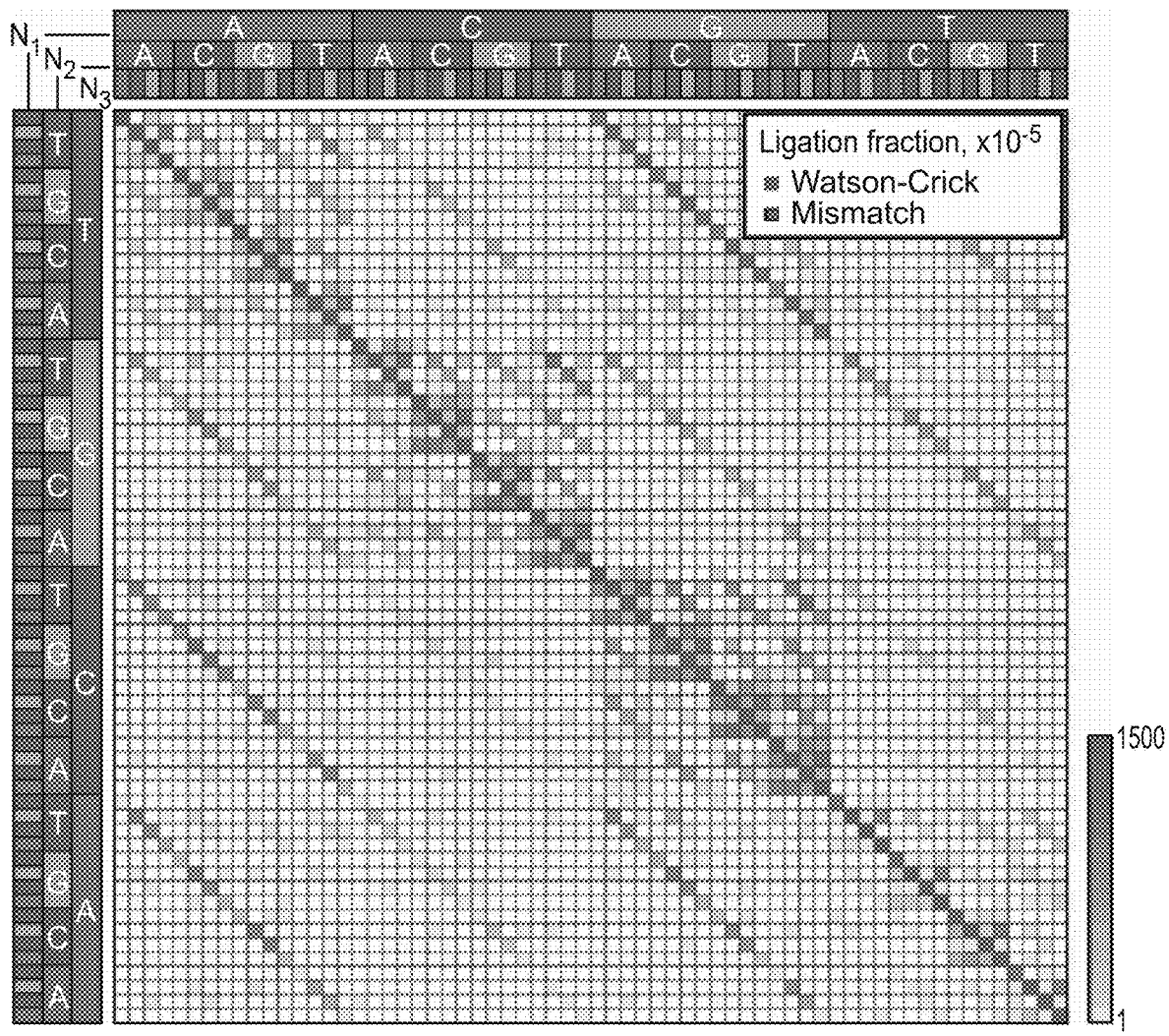
FIG. 7A-7F provides comprehensive data on ligation efficiency for different randomized 3-base overhangs by T4 DNA ligase and for 4-base overhangs under different reaction times and temperatures. SMRT sequencing results are presented for ligation of 100 nM of the multiplexed 3-base and 4-base overhang substrate for the specified incubation time and temperature, using 1.75 μM T4 DNA ligase in standard ligation buffer. Observations have been normalized to 100,000 ligation events.
Figure 7B:
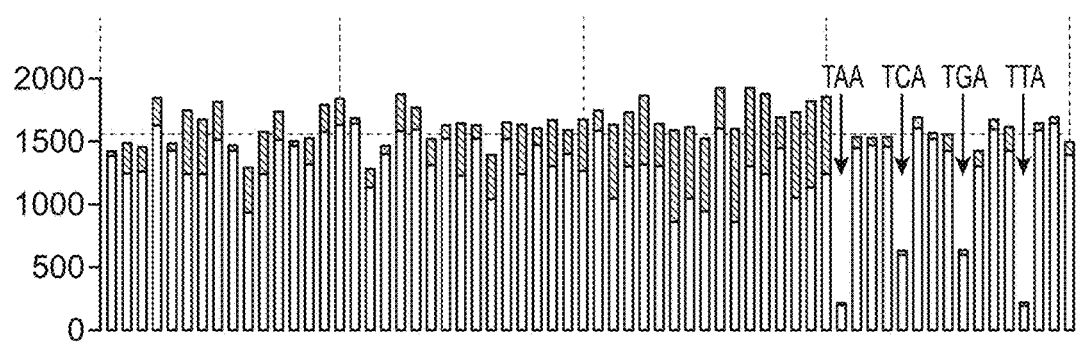

The multiplexed ligation profile results for 3-base overhangs formed after an incubation time of 1 hour at 25° C. were assembled and reported in a tabular format in Table 3. The results for TNA overhangs under these conditions show greatly reduced ligation fidelity. While the majority of correctly base-paired ligation partners were observed in very similar overall frequency (FIG. 7B, below the horizontal line). At incubation temperatures of 25° C. and 37° C. it was established that the 4 TNA overhangs had notably reduced ligation fidelity compared to the average. The corresponding ANT overhangs, despite being expected to be present in the exact same proportion of the initial substrate pool, did not show a reduced incidence compared to the other overhangs in the set at these temperatures for the specified incubation time.

Figure 7C:
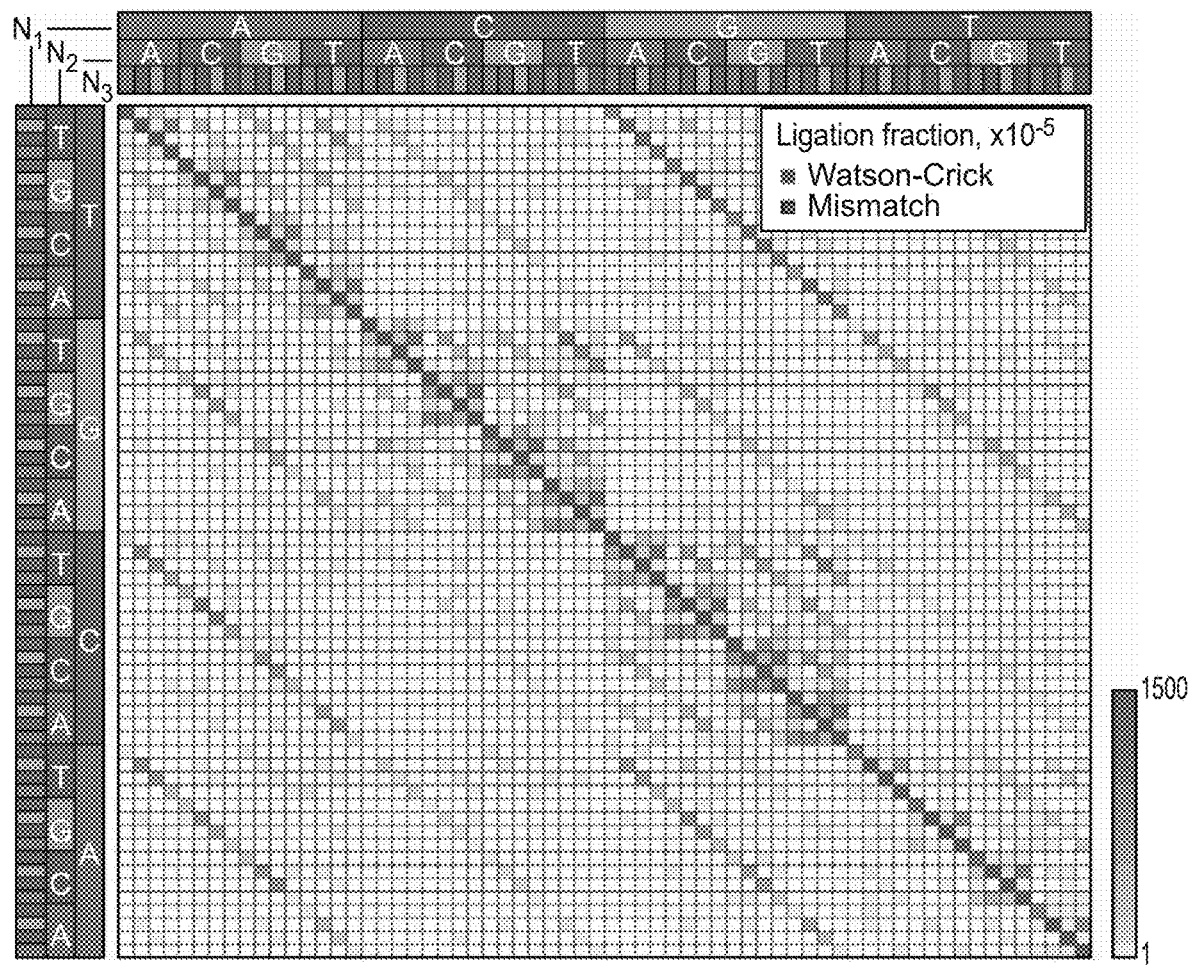
Figure 7D:
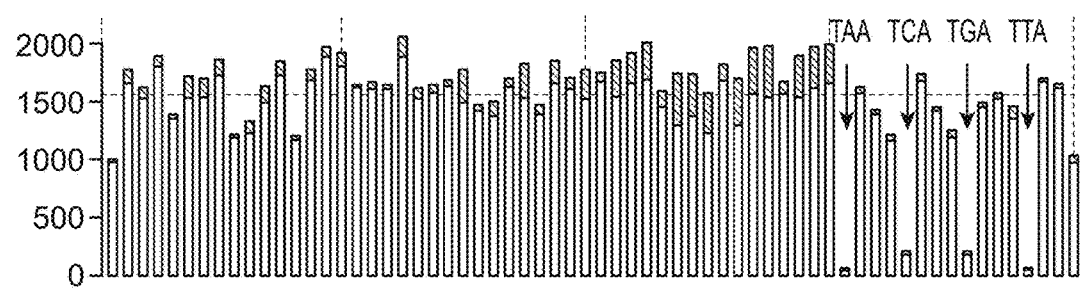
Figure 7E:
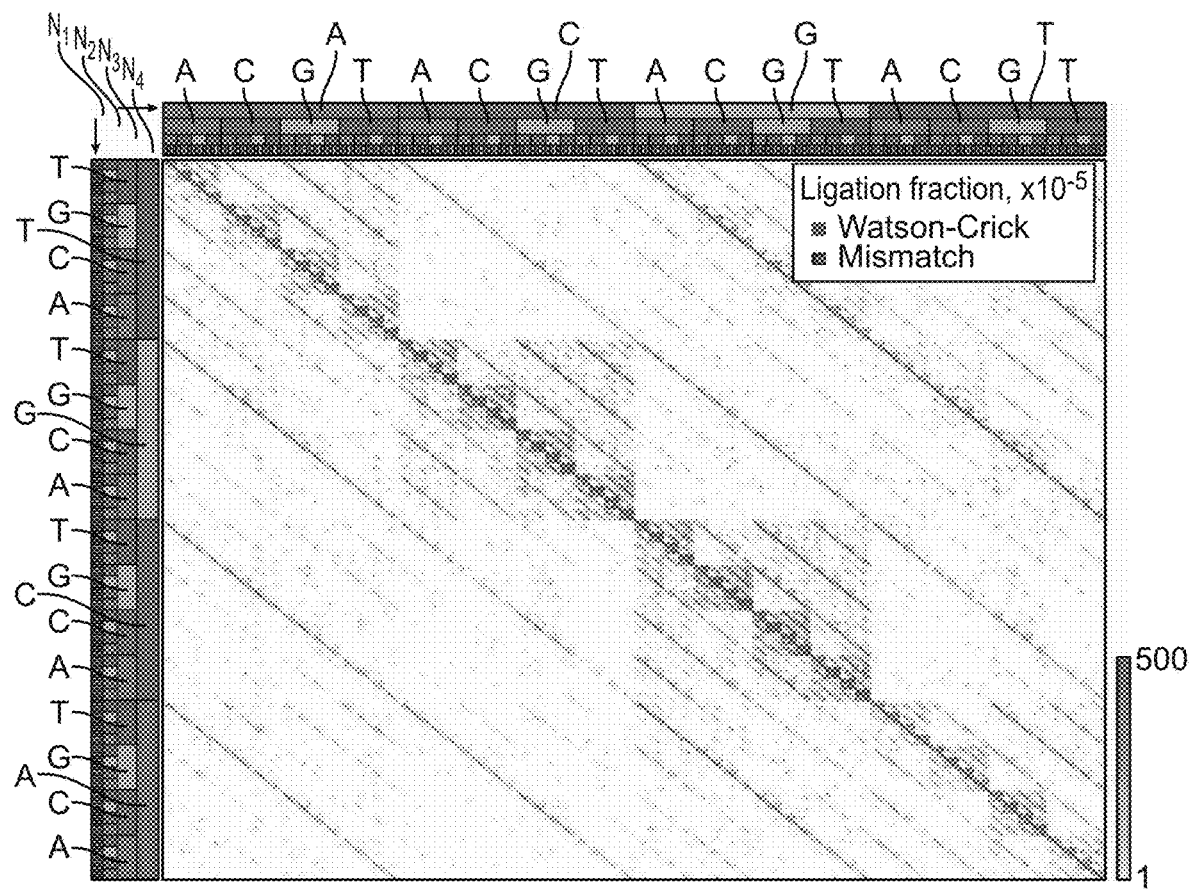
Figure 7F:
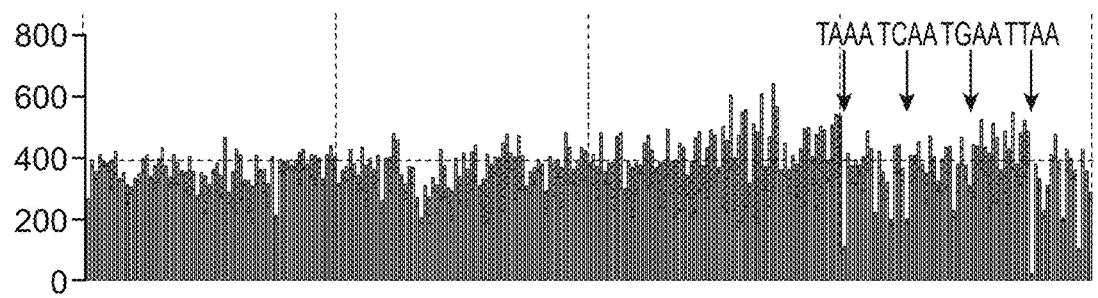
Figures 7G, 7I:
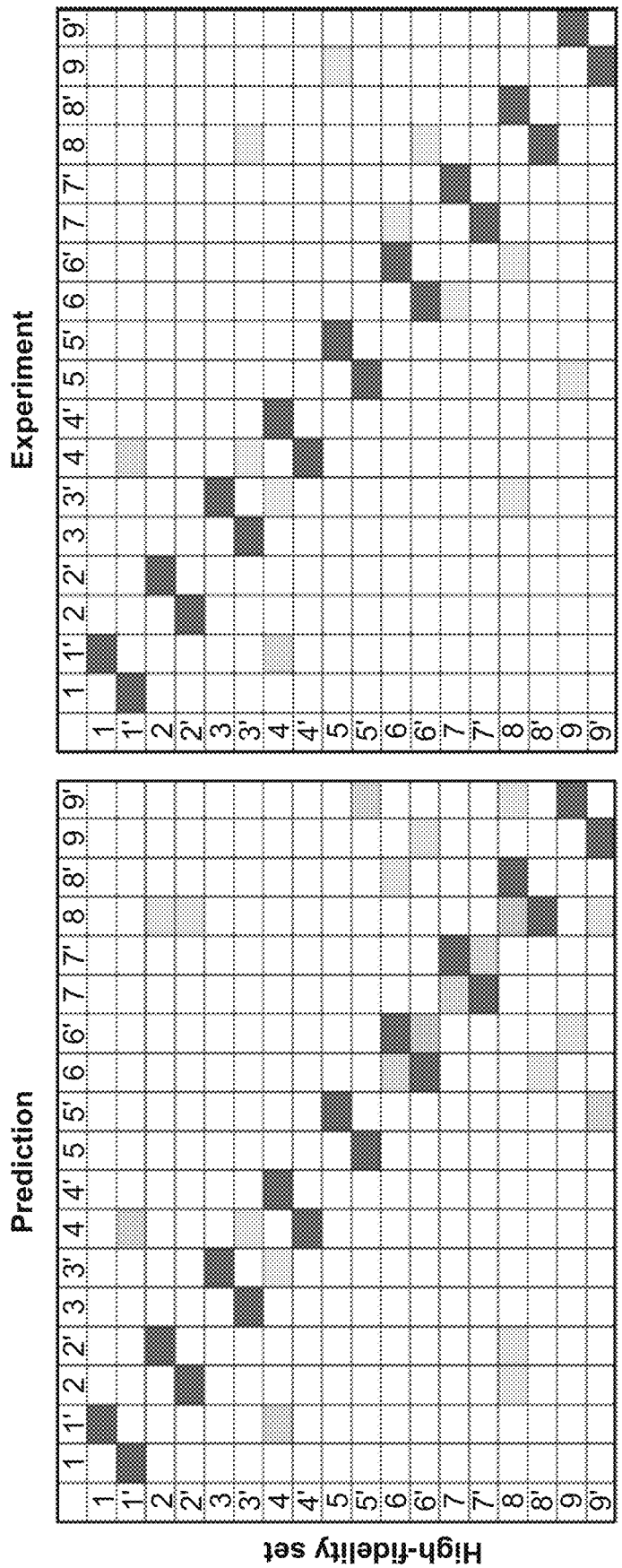
FIG. 7G-7J shows that overhang sequences may be clustered into groups identified as High-fidelity (HF), Low-fidelity (LF), and also Deletion prone (DP) and Failure Prone (FP) (described in Table 1). This data can be used to determine a set of overhangs for a set of fragments to achieve a desired purpose, e.g., optimally efficient joining for efficient assembly or inaccurate joining or evolution studies. The predicted and actual results of joining 10 fragments are provided following identification of a HF set (G) and (I) or LF set (H) and (J) of overhangs under specified conditions of temperature and time. Junction overhangs can be found in Table 1. The intensity of the color corresponds to the number of instances of that junction observed in a SMRT sequencing experiment, normalized to 100,000 total junctions. Predicted frequencies of junctions are based on the fidelity library data generated for the 4-base overhang substrate ligated with T4 DNA ligase at 25° C. for 18 hours. The experimental observations shown are for assembly of the 10-fragment HF and LF sets at 37° C. for 5 minutes and 16° C. for 5 minutes, 30 cycles. The sequences chosen for the junction differ amongst the HF, LF, DP and FP sets, as indicated in Table 1.
Figures 7H, 7J:
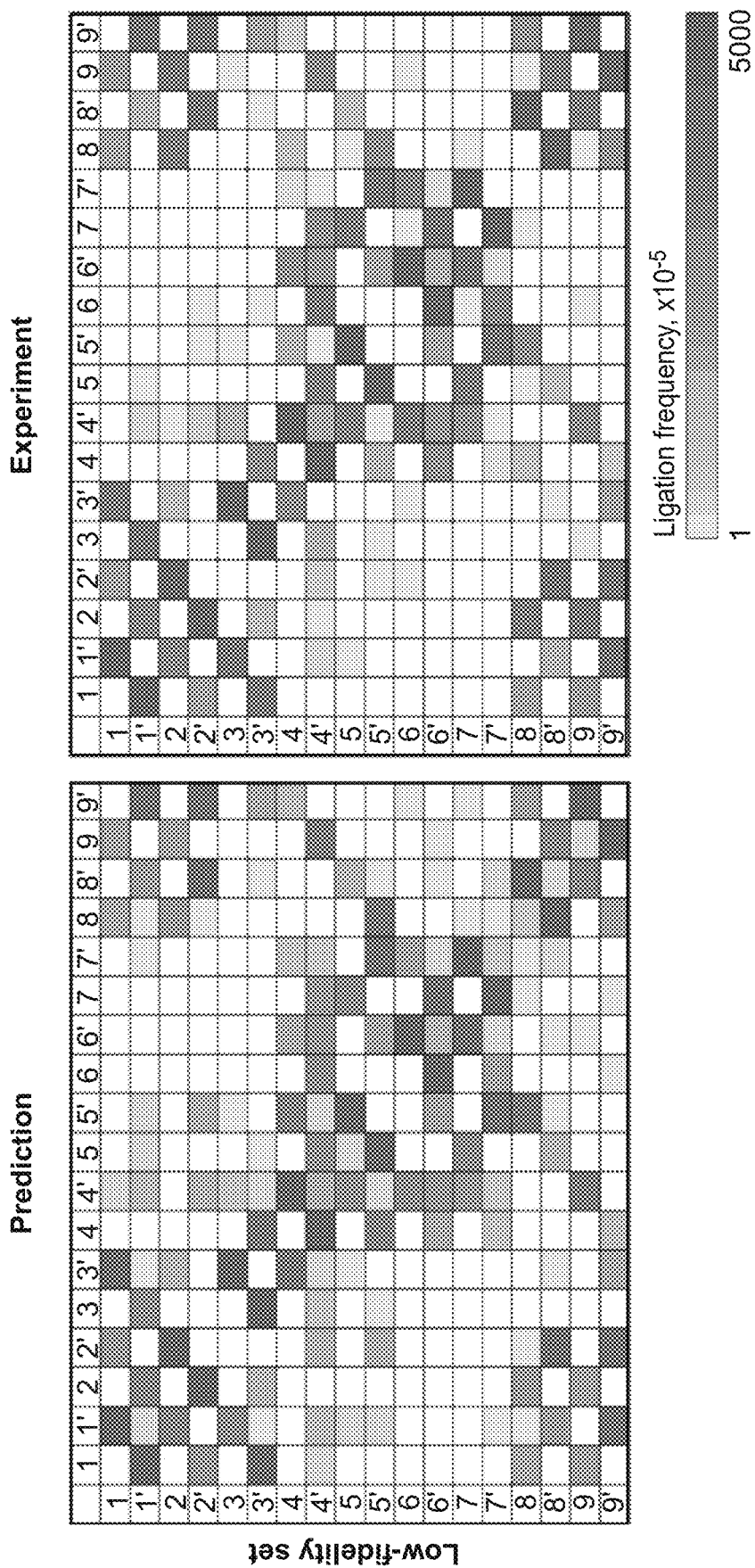

From this data, it was concluded that ligation fidelity of overhangs varies significantly with their sequence. The range of observed ligation fidelity as a function of overhang identity was broad, from overhangs with very few observed mismatch ligation events (e.g., AAA, ATA, CAA) to those where a very large fraction of observations (>40%) found a ligation partner with one or more base pair mismatches (e.g., GCC and GGC). Overall, there was a weak trend towards lower fidelity with higher G/C content. More specifically, for 3-base overhangs, 5'-GNN sequences were highly represented in the lowest-fidelity overhangs, with 5'-TNN over-represented in the highest fidelity group. Increasing temperature (37° C., FIGS. 7C and 7D) resulted in an overall suppression of mismatch ligation, with no significant change to the overall patterns: the Kendall rank correlation coefficient equaled 0.87 when compared with individual ligation fractions observed at 25° C. and 37° C. (only ligations with more than 10 counts per ligation event were considered).

Additionally, there was minimal effect on the identity of the mismatches observed. Mismatch rates at 37° C. were 2-fold lower than at 25° C. as measured by the fraction of mismatch ligations; mean mismatch ligation fraction per overhang was $2.53 \times 10^{-3}$ and $1.29 \times 10^{-3}$, respectively.

For most overhangs, even those of the lowest fidelity, the bulk of the mismatch ligation events were derived from pairing with only a few (typically 2-3) other overhangs (Table 3). For example, GGC was one of the lowest fidelity overhangs, with only 54% of observations showing it paired with its Watson-Crick partner, GCC. However, its mispairing events are dominated by GCT (43% of mismatch ligation events) and ACC (38% of mismatch ligation events). For CGT, 76% of ligations were with its Watson-Crick partner, with nearly all of the observed mismatch ligations coming from pairing with the overhang GCG (90% of mismatch ligation events). Importantly, the overwhelming majority (98%) of mismatch overhangs at 1 hour at 25° C. had a single-base mismatch; 2 and 3-base mismatches were 1.8% and <0.1%, respectively.

Very similar results were observed for 1 hour at 37° C. (1, 2 and 3-base mismatches were 97.6%, 2.2% and <0.2%, respectively). Thus, individual overhangs that exhibit low fidelity were not promiscuous; rather they tend to pair with only a few specific mismatched sequences.

Ligation Preference for Mismatches Varies by Position and Strand Sense and is Context-Sensitive Analysis of the observed mismatch ligation events further allowed identification of the types of mismatches tolerated by the ligase, and the effect of position and structural context on ligation preferences. FIG. 6A-6F shows the observed frequency of ligated mispairs at the 'edge' position versus the middle' position for 3-base overhangs at 25° C. and 37° C. As with the overall fidelity, increasing temperature had little effect on the specific mismatch pairings observed or their relative frequency to each other, simply reducing overall mismatch frequency relative to Watson-Crick paired products.

Figure 5A:
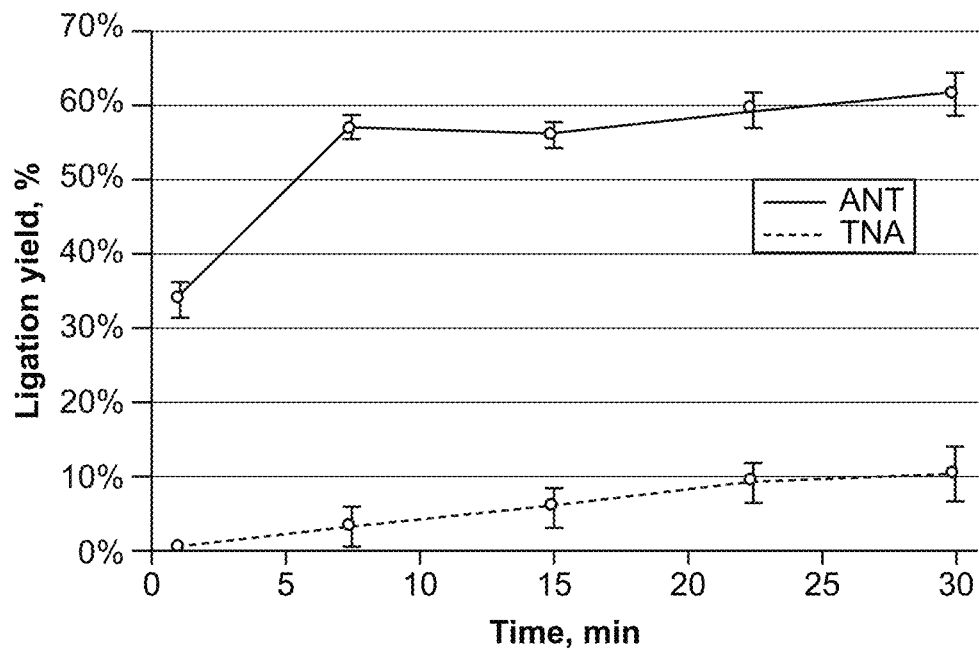
FIG. 5A-5B shows that ligation yields vary according to the composition of overhangs for defined substrates. Ligation yield is measured against ligation time courses for defined substrates having 3-base overhangs. These values contribute to an assessment of ligation efficiency. The 3'-end of the phosphorylated strand was FAM labeled. Ligation reactions were composed of 1×T4 DNA ligase reaction buffer, 350 nM T4 DNA ligase and 100 nM FAM-labeled DNA substrate and 100 nM polynucleotides with a range of overhangs where ligation was measured by scarless joining of two polynucleotides with complementary overhangs (overhang pairs). Reactions were performed at 25° C., with incubation time points from 0 to 30 minutes. Reported values are the average of a minimum of 3 replicates with the error bars showing the standard deviation.
Figure 5B:
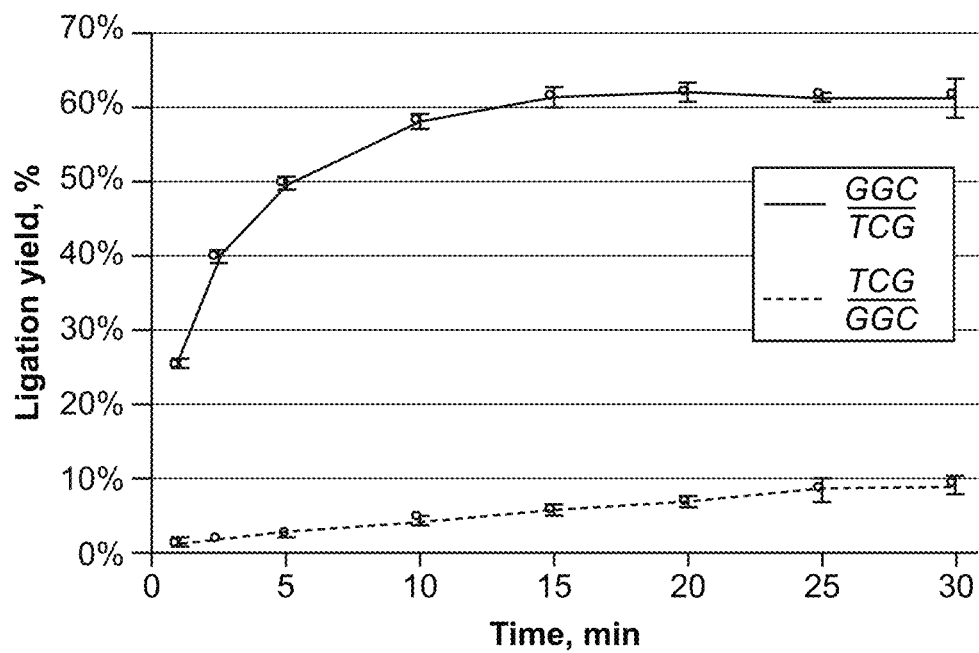

At the edge position of 3-base overhangs (N1:N3', FIGS. 6A and 6C), mismatch ligation was dominated by G:T mispairs, which make up 52% of all observed N1:N3_mismatches (mismatches at this position total 7.1% of all ligation events, with G:T mismatches at this position comprising 3.7% of all ligation events). Interestingly, this preference was only for 5'-G mispairs, GNN/TNN; the reciprocal TNN/GNN mismatch was not especially prevalent (3.7% and 0.3% of all observed ligations, respectively). The ligation of a GNN/TNN mispair was independently assayed and compared to the ligation of the reciprocal TNN/GNN mispair to confirm this observation. Indeed, the 5'-G mismatch ligated ~80-fold faster than the 5'-T mismatch (FIG. 5A-5B). The preference for edge G:T mismatches accounted for the over-representation of GNN overhangs displaying low overall fidelity; a G:T simply ligated much faster than any other mispairing in this position. After G:T, several purine:purine (A:A, A:G, and G:A) and the other purine:pyrimidine (A:C, C:A, T:G) mismatches were observed, with pyrimidine: pyrimidine mismatches disfavored. Adenine displayed the same 5' mismatch preference; the ANN/CNN mispairing was ~40-fold more prevalent than the reciprocal CNN/ANN mispairing (1.3% and 0.03% of ligation events, respectively).

At the middle position of 3-base overhangs (N2:N2, FIGS. 6B and 6D), a lower overall frequency of mismatches was observed, ~3-fold less common compared to the total frequency for mismatches at the edge position (7.1% and 2.3% for edge and middle mismatches, respectively). At the middle position, T:T mismatches were modestly favored, ~2-3 times more prevalent than any other single mismatch, with C:T, T:C, G:T and T:G all present at similar frequencies (FIG. 5B) A:C, C:A, C:C and purine:purine mismatches.

The fidelity of 4-base overhang ligation shared much in common with 3-base overhangs. As in the case of 3-base overhangs, G:T mismatches were highly favored, along with lesser amounts of T:T, purine:purine, and A:C mismatches. However, here, very similar profiles were seen at the edge and middle positions, in contrast to 3-base overhangs in which mismatches were dramatically dis-favored at the middle position, and only T:T mismatches were observed. Four-base overhangs also lack the dramatic asymmetry in preference for 5'-purines; while G:T is favored modestly over T:G (T in the template vs G in the template), it falls far short of the 10-fold preference observed for 3-base overhangs. Thus, the data is suggestive of a stronger influence of annealing on the mismatch preferences as compared to 3-base overhangs. However, the influence of ligase preference was still clear, with higher mismatch frequencies at the edge position and sequence dependence of mismatch prevalence. For example, cases of an edge mismatch with two GC and one AT base pair where both GCs are in the middle (N2:N3' and N3:N2') positions outnumber by a factor of two those where only one of the middle pairs is a GC. The fidelity of 2-base overhangs is very high while there is more variability in fidelity for the longer 5-base overhangs.

Further details for the analysis of 3-base and 4-base overhangs can be found in Potapov, et al. Nucleic Acid Research, 46, e79 (2018) and Potapov, et al. Cold Spring Harbor Laboratory, bioRxiv, doi: https://doi.org/10.1101/322297 (2018), incorporated by reference.

TABLE 2

Precursor and substrate sequences

| Substrate | Sequence[a] |
|---|---|
| Ligation library precursor | TCAGGTNNNCGAAGAGCTGCGATCCAGTGCGCCGTGCATT GATCAACGCAANNNNNN<u>ATCTCTCTCTTTTCCTCCTCCTC CGTTGTTGTTGTTGAGAGAG</u> (SEQ ID NO: 1) |

TABLE 2-continued

Precursor and substrate sequences

| Substrate | Sequence[a] |
|---|---|
| Ligation library substrate | pNNNCGAAGAGCTGCGATCCAGTGCGCCGTGCATTGATCA ACGCAANNNNNNATCTCTCTCTTTTCCTCCTCCTCCGTTG TTGTTGAGAGAGATNNNNNNTTGCGTTGATCAATGCA CGGCGCACTGGATCGCAGCTCTTCG (SEQ ID NO: 2) |
| Expected insert[b] | NNNNNNTTGCGTTGATCAATGCACGGCGCACTGGATCGCA GCTCTTCGNNNCGAAGAGCTGCGATCCAGTGCGCCGTGCA TTGATCAACGCAANNNNNN (SEQ ID NO: 3) |

[a]The SapI (Type IIS restriction enzyme) binding site is indicated in bold. SMRT adapter region is underlined.
[b]The expected insert length in 99 nt. The location of 3-base overhang is in position 49 . . . 51, 31-randomized region is in position 1 . . . 6, and 51-randomized region is position 94 . . . 99.

TABLE 3

Ligation fidelity for 3-base overhangs (18 hours at 25° C.).

| Overhang | Correct, ×10⁻⁵ Value | S.D. | Mismatch, ×10⁻⁵ Value | S.D. | Fidelity, %[a] Value | S.D. | Mismatch overhangs[b] |
|---|---|---|---|---|---|---|---|
| AAA | 1403.8 | 14.2 | 11.1 | 4.1 | 99.2 | 0.3 | TTC (43%); ATT (12%); TGT (10%) |
| TAA | 209.0 | 10.8 | 2.9 | 1.9 | 98.6 | 0.9 | GTA (36%); TTT (27%); TTG (18%) |
| ATA | 1472.5 | 11.9 | 24.9 | 3.1 | 98.3 | 0.2 | AAT (44%); GAT (26%); TTT (13%) |
| CAA | 1658.4 | 0.2 | 30.0 | 8.0 | 98.2 | 0.5 | GTG (54%); ATG (34%); TGG (2%) |
| TTC | 1608.3 | 29.6 | 34.2 | 2.5 | 97.9 | 0.2 | GAG (42%); GAT (17%); AAA (14%) |
| TTG | 1658.4 | 0.2 | 36.3 | 7.4 | 97.9 | 0.4 | CAG (46%); CAT (22%); CTA (9%) |
| AGA | 1440.7 | 7.9 | 32.4 | 18.9 | 97.8 | 1.3 | GCT (24%); ACT (23%); TCA (16%) |
| TAG | 1491.6 | 12.2 | 35.3 | 0.3 | 97.7 | 0.0 | CTG (55%); CTT (35%); CTC (5%) |
| TTA | 209.0 | 10.8 | 5.0 | 2.0 | 97.6 | 1.0 | GAA (21%); AAA (21%); TAG (11%) |
| TCA | 617.9 | 1.1 | 16.2 | 4.2 | 97.4 | 0.6 | AGA (31%); GGA (28%); TGG (11%) |
| TCG | 1531.7 | 10.1 | 41.9 | 9.0 | 97.3 | 0.6 | CGG (68%); CGT (9%); AGA (6%) |
| TGA | 617.9 | 1.1 | 21.5 | 1.2 | 96.6 | 0.2 | GCA (43%); ACA (31%); TCT (10%) |
| ACA | 1437.3 | 19.3 | 50.4 | 15.3 | 96.6 | 1.0 | TGC (54%); TGG (16%); TGA (13%) |
| CAG | 1415.5 | 35.6 | 51.2 | 0.8 | 96.5 | 0.1 | TTG (33%); ATG (19%); GTG (19%) |
| TGG | 1609.6 | 39.8 | 66.0 | 18.0 | 96.1 | 1.1 | CCG (41%); CCT (20%); ACA (12%) |
| TAT | 1472.5 | 11.9 | 63.9 | 3.6 | 95.8 | 0.2 | GTA (71%); ATG (17%); ATT (7%) |
| TCC | 1619.4 | 43.6 | 71.6 | 18.6 | 95.8 | 1.2 | GGG (68%); GGT (14%); AGA (5%) |
| TAC | 1453.7 | 30.9 | 87.0 | 3.7 | 94.4 | 0.3 | GTG (69%); GTT (26%); GTC (3%) |
| CGA | 1531.7 | 10.1 | 98.1 | 1.3 | 94.0 | 0.1 | ACG (51%); GCG (41%); CCG (2%) |
| CCG | 1531.1 | 69.8 | 101.0 | 24.2 | 93.8 | 1.6 | AGG (39%); TGG (27%); CTG (14%) |
| TTT | 1403.8 | 14.2 | 94.7 | 8.5 | 93.7 | 0.5 | GAA (82%); AAG (4%); AGA (4%) |
| CGG | 1531.1 | 69.8 | 120.9 | 29.1 | 92.7 | 1.9 | ACG (41%); TCG (24%); GCG (11%) |
| CTA | 1491.6 | 12.2 | 120.4 | 23.9 | 92.5 | 1.4 | AAG (56%); GAG (32%); TTG (3%) |
| TGC | 1316.9 | 18.0 | 107.4 | 20.8 | 92.5 | 1.3 | GCG (47%); ACA (25%); GCT (20%) |
| TCT | 1440.7 | 7.9 | 119.6 | 7.8 | 92.3 | 0.4 | GGA (81%); AGG (13%); TGA (2%) |
| GAA | 1608.3 | 29.6 | 139.5 | 15.5 | 92.0 | 0.9 | TTT (56%); GTC (27%); ATC (12%) |
| CCA | 1609.6 | 39.8 | 162.3 | 8.0 | 90.8 | 0.6 | AGG (73%); GGG (23%); CGG (2%) |
| CAC | 1147.7 | 67.3 | 133.6 | 8.9 | 89.6 | 1.1 | ATG (54%); GCG (17%); GTT (13%) |
| ATG | 1593.4 | 13.4 | 198.9 | 20.5 | 88.9 | 1.1 | CAC (36%); CTT (33%); TAT (5%) |
| CTG | 1415.5 | 35.6 | 177.7 | 12.4 | 88.8 | 0.9 | CTG (50%); AAG (12%); TAG (11%) |
| TGT | 1437.3 | 19.3 | 181.6 | 6.7 | 88.8 | 0.2 | GCA (83%); ACG (11%); ACT (3%) |
| ATT | 1638.5 | 19.7 | 207.1 | 11.2 | 88.8 | 0.4 | GAT (84%); AGT (4%); ATT (3%) |
| AAT | 1638.5 | 19.7 | 211.6 | 21.3 | 88.6 | 0.9 | GTT (74%); ATC (16%); ATA (5%) |
| AAG | 1279.7 | 15.5 | 175.8 | 12.3 | 87.9 | 0.9 | CTC (40%); CTA (38%); CTG (13%) |
| ATC | 1336.5 | 8.9 | 188.5 | 19.1 | 87.6 | 1.2 | GAC (33%); AAT (17%); GGT (14%) |
| AGT | 1526.9 | 0.5 | 217.2 | 27.7 | 87.5 | 1.4 | GCT (83%); ATT (4%); ACC (3%) |
| CCC | 1322.4 | 107.4 | 197.6 | 68.8 | 87.0 | 4.8 | AGG (61%); GTG (20%); GAG (6%) |
| GTA | 1453.7 | 30.9 | 248.5 | 7.0 | 85.4 | 0.6 | AAC (39%); GAC (31%); TAT (18%) |
| CAT | 1593.4 | 13.4 | 281.4 | 38.2 | 85.0 | 1.9 | GTG (87%); ACG (3%); TTG (3%) |
| AAC | 1259.1 | 35.1 | 234.7 | 18.4 | 84.3 | 0.7 | GTC (42%); GTA (41%); GTG (12%) |
| GGA | 1619.4 | 43.6 | 305.0 | 27.6 | 84.2 | 1.6 | GCC (33%); TCT (32%); ACC (31%) |
| ACT | 1526.9 | 0.5 | 289.8 | 20.6 | 84.0 | 1.0 | GGT (64%); AGC (24%); AGG (5%) |
| GCA | 1316.9 | 18.0 | 330.4 | 2.2 | 79.9 | 0.3 | TGT (45%); AGC (33%); GGC (15%) |
| CTC | 1313.9 | 25.9 | 358.8 | 10.9 | 78.6 | 0.8 | GTG (57%); AAG (19%); GCG (12%) |
| AGG | 1236.8 | 51.8 | 342.9 | 52.8 | 78.3 | 3.3 | CCC (35%); CCA (35%); CCG (11%) |
| CGT | 1250.0 | 0.8 | 386.9 | 35.2 | 76.4 | 1.7 | GCG (90%); GAG (2%); AGG (2%) |
| CTT | 1279.7 | 15.5 | 405.7 | 18.1 | 75.9 | 0.6 | GAG (71%); ATG (16%); AGG (4%) |
| GAG | 1313.9 | 25.9 | 425.9 | 4.2 | 75.5 | 0.5 | CTT (67%); CTA (9%); CTG (4%) |
| CGC | 1055.4 | 20.0 | 342.1 | 33.9 | 75.5 | 2.2 | ACG (82%); GTG (5%); GCT (4%) |
| CCT | 1236.8 | 51.8 | 408.9 | 48.8 | 75.2 | 3.0 | GGG (90%); TGG (3%); ATG (2%) |
| ACG | 1250.0 | 0.8 | 432.2 | 44.7 | 74.3 | 2.0 | CGC (65%); CGA (12%); CGG (12%) |
| AGC | 950.7 | 21.1 | 337.8 | 13.5 | 73.8 | 1.2 | GCA (32%); GCC (31%); ACT (20%) |

TABLE 3-continued

Ligation fidelity for 3-base overhangs (18 hours at 25° C.).

| Overhang | Correct, ×10⁻⁵ Value | S.D. | Mismatch, ×10⁻⁵ Value | S.D. | Fidelity, %[a] Value | S.D. | Mismatch overhangs[b] |
|---|---|---|---|---|---|---|---|
| ACC | 1258.3 | 110.3 | 498.5 | 58.2 | 71.6 | 4.1 | GGC (57%); GGA (19%); GGG (14%) |
| GAT | 1336.5 | 8.9 | 533.5 | 16.6 | 71.5 | 0.8 | GTC (59%); ATT (33%); ATG (1%) |
| GGG | 1322.4 | 107.4 | 608.8 | 90.4 | 68.5 | 4.9 | CCT (61%); ACC (11%); TCC (8%) |
| GTT | 1259.1 | 35.1 | 603.3 | 20.1 | 67.6 | 1.3 | GAC (55%); AAT (26%); ACC (4%) |
| GGT | 1258.3 | 110.3 | 623.4 | 97.8 | 66.9 | 5.4 | GCC (60%); ACT (30%); ATC (4%) |
| GCG | 1055.4 | 20.0 | 564.8 | 33.5 | 65.1 | 1.8 | CGT (61%); TGC (9%); CTC (7%) |
| GAC | 1061.5 | 2.1 | 570.1 | 36.7 | 65.1 | 1.4 | GTT (58%); GTA (13%); ATC (11%) |
| GTG | 1147.7 | 67.3 | 679.6 | 48.1 | 62.8 | 3.0 | CAT (36%); CTC (30%); TAC (9%) |
| GCT | 950.7 | 21.1 | 572.5 | 46.7 | 62.4 | 2.5 | GGC (56%); AGT (32%); TGC (4%) |
| GTC | 1061.5 | 2.1 | 673.5 | 26.0 | 61.2 | 0.9 | GAT (47%); AAC (15%); GTC (12%) |
| GCC | 864.7 | 68.8 | 730.8 | 98.5 | 54.2 | 5.4 | GGT (51%); AGC (14%); GGA (14%) |
| GGC | 864.7 | 68.8 | 748.9 | 48.2 | 53.6 | 3.6 | GCT (43%); ACC (38%); GCA (7%) |

Standard deviations were derived from two experimental replicates, while the values themselves were derived from the combined data.

[a]Fidelity is calculated as the fraction of correct ligations divided by the total fraction of ligations for a given overhang.

[b]Top 3 mismatch overhangs are given for each overhang. All overhangs are written in the 5'-to-3' direction. The numbers in parenthesis give the percentage for the given mismatch ligation relative to the total number of mismatch ligations for the overhang.

TABLE 4

Ligation fidelity for 4-base overhangs (18 hours at 25° C.)

| Overhang | Correct, ×10⁻⁵ | Mismatch, ×10⁻⁵ | Fidelity, %[1] | Mismatch Overhangs[2] |
|---|---|---|---|---|
| AAAA | 264.3 | 1.6 | 99.4 | TTTG (35%); CTTT (13%); TTAT (13%) |
| AAGA | 329.4 | 3.0 | 99.1 | GCTT (14%); TTTT (12%); TCTG (12%) |
| GAAA | 378.3 | 5.0 | 98.7 | TTTT (25%); TTCC (10%); ATTC (8%) |
| ACAA | 333.4 | 4.8 | 98.6 | TTGG (45%); TTGC (13%); ATGT (7%) |
| CAAA | 310.8 | 4.7 | 98.5 | GTTG (30%); ATTG (18%); CTTG (9%) |
| ATAA | 209.3 | 3.2 | 98.5 | TAAT (17%); TTGT (15%); TTTT (13%) |
| AATA | 324.5 | 5.5 | 98.3 | GATT (22%); TGTT (18%); AATT (10%) |
| AGAA | 354.4 | 6.2 | 98.3 | TTGT (42%); TTCG (12%); TGCT (8%) |
| AACA | 380.9 | 7.1 | 98.2 | GGTT (19%); TGTG (16%); TGTC (14%) |
| ACGA | 349.1 | 7.3 | 98.0 | GCGT (17%); TCGG (16%); TTGT (14%) |
| GTAA | 350.6 | 8.1 | 97.7 | TTAT (20%); TGAC (9%); TTGC (9%) |
| CCAA | 335.4 | 7.8 | 97.7 | GTGG (23%); TGGG (12%); ATGG (12%) |
| ACCA | 363.5 | 9.3 | 97.5 | TGGG (28%); GGGT (23%); TGGC (13%) |
| CGAA | 403.0 | 10.4 | 97.5 | GTCG (25%); ATCG (15%); TTTG (13%) |
| CTAA | 296.9 | 8.8 | 97.1 | GTAG (24%); TCAG (10%); TAAG (9%) |
| ATGA | 367.8 | 11.4 | 97.0 | GCAT (24%); TTAT (20%); TCGT (13%) |
| GCAA | 355.4 | 11.2 | 96.9 | TTGT (37%); TGGC (11%); TAGC (9%) |
| AGGA | 315.3 | 10.4 | 96.8 | GCCT (32%); TTCT (14%); ACCT (8%) |
| TCAA | 194.2 | 6.7 | 96.7 | TTGG (68%); TTGT (8%); TGGA (5%) |
| GAGA | 287.9 | 9.9 | 96.7 | GCTC (24%); TCTT (18%); TTTC (11%) |
| ATCA | 360.0 | 13.3 | 96.4 | GGAT (43%); AGAT (10%); CGAT (9%) |
| ACTA | 266.6 | 10.0 | 96.4 | TGGT (39%); GAGT (26%); TTGT (8%) |
| CAGA | 381.8 | 14.4 | 96.4 | GCTG (53%); ACTG (13%); TTTG (6%) |
| TTTA | 100.1 | 4.1 | 96.1 | TAAG (49%); TAAT (10%); TTTA (7%) |
| TAGA | 210.1 | 8.8 | 96.0 | TCTG (37%); TCTT (37%); GCTA (6%) |
| TTCA | 294.2 | 12.4 | 96.0 | TGAG (60%); TGAT (12%); TGGA (8%) |
| TTGA | 194.2 | 8.8 | 95.7 | TCAG (38%); TCAT (16%); GCAA (6%) |
| TGAA | 294.2 | 13.4 | 95.6 | TTCG (44%); TTCT (25%); GTCA (7%) |
| ATTA | 314.9 | 14.4 | 95.6 | GAAT (38%); TGAT (25%); AAAT (9%) |
| AGTA | 343.6 | 15.7 | 95.6 | GACT (41%); TGCT (18%); CACT (8%) |
| ATAT | 369.5 | 17.9 | 95.4 | GTAT (24%); TTAT (18%); AAAT (14%) |
| TATA | 187.8 | 9.3 | 95.3 | TATG (40%); TATT (34%); TGTA (5%) |
| GGAA | 350.4 | 18.3 | 95.0 | TTGC (25%); TTCT (17%); TTTC (16%) |
| AAAC | 369.8 | 20.1 | 94.8 | GTTG (31%); GTTA (17%); GTTC (15%) |
| TAAA | 100.1 | 5.5 | 94.8 | TTTT (39%); TTTG (35%); ATTA (5%) |
| GATA | 355.2 | 20.6 | 94.5 | GATC (28%); TGTC (23%); TATT (12%) |
| AACC | 358.7 | 23.0 | 94.0 | GGTG (18%); GGTC (15%); GGGT (14%) |
| TTAT | 209.3 | 13.8 | 93.8 | ATAT (23%); ATAG (19%); ATGA (16%) |
| TTTT | 264.3 | 18.1 | 93.6 | AAAG (37%); AAAT (22%); TAAA (12%) |
| AATT | 380.4 | 26.5 | 93.5 | GATT (39%); TATT (38%); ATTT (4%) |
| AAAG | 329.5 | 23.3 | 93.4 | TTTT (29%); CTTA (16%); CTTG (15%) |
| CCCA | 249.4 | 18.2 | 93.2 | GGGG (51%); CGGG (14%); AGGG (11%) |
| TTGT | 333.4 | 25.1 | 93.0 | ACAG (37%); GCAA (16%); ACAT (11%) |
| AATC | 320.8 | 24.4 | 92.9 | GGTT (52%); GATC (7%); GTTT (6%) |
| AAGC | 326.7 | 25.2 | 92.9 | GGTT (24%); GCTG (19%); GCTA (11%) |
| TTAA | 18.5 | 1.5 | 92.7 | TTGA (14%); GTAA (14%); TTAG (14%) |
| TTAC | 350.6 | 27.9 | 92.6 | GTAG (33%); GTGA (28%); GTAT (15%) |
| CAAC | 332.0 | 26.4 | 92.6 | GGTG (35%); GTTT (11%); GATG (10%) |
| TCTA | 210.1 | 17.2 | 92.4 | TAGG (80%); TAGT (4%); TGGA (3%) |
| ATAG | 357.8 | 29.9 | 92.3 | CTTT (30%); CTGT (27%); TTAT (9%) |

TABLE 4-continued

Ligation fidelity for 4-base overhangs (18 hours at 25° C.)

| Overhang | Correct, ×10⁻⁵ | Mismatch, ×10⁻⁵ | Fidelity, %[1] | Mismatch Overhangs[2] |
|---|---|---|---|---|
| ATCC | 360.4 | 30.9 | 92.1 | GGGT (44%); GGTT (8%); GGAC (7%) |
| TACA | 344.9 | 29.9 | 92.0 | TGTG (48%); TGTT (38%); TGTC (3%) |
| TTCT | 354.4 | 31.3 | 91.9 | AGAG (48%); AGAT (15%); TGAA (11%) |
| TGTA | 344.9 | 30.7 | 91.8 | TACG (49%); TACT (21%); GACA (10%) |
| TGGA | 331.6 | 29.6 | 91.8 | TCCG (49%); TCCT (25%); GCCA (4%) |
| CCCC | 189.1 | 17.1 | 91.7 | GGTG (26%); TGGG (20%); AGGG (12%) |
| TCGA | 296.0 | 28.4 | 91.2 | TCGG (85%); TCGT (4%); GCGG (1%) |
| AAGT | 277.4 | 26.8 | 91.2 | GCTT (76%); TCTT (5%); AGTT (4%) |
| ATAC | 359.7 | 34.8 | 91.2 | GGAT (34%); GTGT (26%); GTTT (10%) |
| CTAT | 357.8 | 34.7 | 91.2 | GTAG (26%); TTAG (16%); ATTG (14%) |
| CACA | 344.0 | 34.6 | 90.9 | GGTG (61%); TGGG (9%); TGCG (7%) |
| TTAG | 296.9 | 32.1 | 90.2 | CTAG (31%); CTGA (23%); CTAT (17%) |
| CATA | 357.2 | 39.2 | 90.1 | GATG (41%); TGTG (24%); AATG (9%) |
| GACA | 318.4 | 36.5 | 89.7 | TGTT (26%); GGTC (26%); TGGC (14%) |
| ACCC | 302.0 | 34.7 | 89.7 | GGGG (50%); GGGC (19%); GGGA (6%) |
| AATG | 355.0 | 40.9 | 89.7 | TATT (47%); CATG (12%); CATA (9%) |
| ATGT | 353.9 | 41.3 | 89.5 | GCAT (30%); AGAT (28%); TCAT (14%) |
| ATTT | 358.0 | 42.7 | 89.3 | TAAT (44%); GAAT (29%); AGAT (10%) |
| TATT | 324.5 | 40.0 | 89.0 | AATG (49%); AATT (25%); TATA (8%) |
| CCGA | 297.4 | 36.7 | 89.0 | GCGG (41%); TTGG (28%); ACGG (11%) |
| AGCA | 254.5 | 31.8 | 88.9 | TGGT (34%); GGCT (22%); TGCG (8%) |
| TTTC | 378.3 | 47.5 | 88.9 | GAAG (56%); GAAT (22%); GGAA (6%) |
| CAGT | 226.9 | 30.4 | 88.2 | GCTG (65%); TCTG (11%); AGTG (11%) |
| ACTT | 277.4 | 37.2 | 88.2 | TAGT (41%); GAGT (26%); AGGT (10%) |
| CAAG | 326.0 | 43.9 | 88.1 | TTTG (58%); GTTG (8%); CTTT (6%) |
| CGGA | 354.7 | 49.1 | 87.9 | GCCG (51%); TTCG (20%); ACCG (6%) |
| GTAT | 359.7 | 50.2 | 87.7 | GTAC (33%); ATGC (14%); AGAC (9%) |
| TCTT | 329.4 | 46.2 | 87.7 | AAGG (77%); TAGA (7%); GAGA (4%) |
| CTTA | 319.4 | 45.2 | 87.6 | GAAG (34%); TGAG (24%); TTAG (10%) |
| TCCA | 331.6 | 47.2 | 87.5 | TGGG (85%); TGGT (7%); GGGA (2%) |
| TTTG | 310.8 | 45.4 | 87.3 | CAAG (56%); CAAT (14%); CATA (6%) |
| CTCA | 329.4 | 48.2 | 87.2 | GGAG (47%); TGTG (14%); CGAG (11%) |
| CCTA | 261.5 | 38.4 | 87.2 | GAGG (29%); TGGG (28%); ATGG (9%) |
| AAAT | 358.0 | 53.8 | 86.9 | GTTT (73%); TTTT (7%); ATTG (6%) |
| ATTC | 356.1 | 54.1 | 86.8 | GGAT (59%); GAGT (8%); TAAT (7%) |
| CGTA | 359.3 | 55.5 | 86.6 | GACG (39%); TGCG (22%); AACG (15%) |
| CACC | 297.0 | 46.0 | 86.6 | GGGG (31%); GGCG (20%); GGTT (8%) |
| CTGA | 337.7 | 52.4 | 86.6 | GCAG (50%); TTAG (14%); TCTG (9%) |
| CCAG | 319.9 | 50.3 | 86.4 | TTGG (52%); ATGG (11%); CGGG (7%) |
| CAAT | 367.9 | 58.1 | 86.4 | GTTG (76%); TTTG (11%); ATCG (2%) |
| ATCT | 367.4 | 58.2 | 86.3 | TGAT (58%); GGAT (28%); AGGT (3%) |
| AGTT | 348.3 | 55.5 | 86.3 | TACT (47%); GACT (30%); AGCT (7%) |
| ACGT | 303.1 | 50.2 | 85.8 | GCGT (58%); AGGT (8%); ACGG (8%) |
| TTCC | 350.4 | 58.1 | 85.8 | GGAG (57%); GGAT (20%); GGGA (10%) |
| CTAG | 316.0 | 53.1 | 85.6 | CTTG (29%); CTGG (25%); TTAG (19%) |
| TAAG | 319.4 | 54.0 | 85.5 | CTTT (41%); CTTG (41%); CTTC (6%) |
| CAGC | 308.8 | 53.4 | 85.2 | GGTG (37%); GTTG (16%); ACTG (10%) |
| GCTA | 318.1 | 55.9 | 85.0 | GAGC (30%); TAGT (25%); TGGC (20%) |
| CCAC | 267.0 | 47.7 | 84.9 | GGGG (59%); GCGG (13%); GAGG (10%) |
| TTCG | 403.0 | 72.4 | 84.8 | CGAG (56%); CGGA (13%); CGAT (12%) |
| CCAT | 312.2 | 56.4 | 84.7 | GTGG (68%); TTGG (13%); AGGG (8%) |
| TTGG | 335.4 | 61.6 | 84.5 | CCAG (43%); CCGA (17%); CCAT (12%) |
| ATTG | 367.9 | 70.5 | 83.9 | TAAT (41%); CGAT (20%); CATT (13%) |
| ACGC | 293.0 | 57.8 | 83.5 | GCGG (29%); GGGT (20%); GCGC (16%) |
| ACCT | 319.2 | 63.5 | 83.4 | TGGT (44%); GGGT (32%); AGGG (10%) |
| TTGC | 355.4 | 70.9 | 83.4 | GCAG (56%); GCAT (13%); GCGA (12%) |
| AGTC | 300.5 | 60.2 | 83.3 | GGCT (52%); GATT (12%); GAGT (6%) |
| TAGT | 266.6 | 53.7 | 83.2 | ACTG (35%); ACTT (28%); GCTA (26%) |
| TCAG | 337.7 | 68.2 | 83.2 | CTGG (69%); CTGT (17%); TTGA (5%) |
| GTTA | 323.6 | 66.2 | 83.0 | GAAC (32%); TAAT (29%); TGAC (15%) |
| AACT | 348.3 | 72.3 | 82.8 | GGTT (54%); TGTT (31%); AGTC (3%) |
| ATGC | 339.1 | 71.4 | 82.6 | GCGT (33%); GGAT (28%); GTAT (10%) |
| AAGG | 255.1 | 55.0 | 82.3 | TCTT (64%); CCTG (9%); CGTT (5%) |
| CGCA | 254.3 | 55.7 | 82.0 | GGCG (42%); CGCG (14%); AGCG (12%) |
| TCTG | 381.8 | 83.7 | 82.0 | CAGG (75%); CTGA (6%); CAGT (4%) |
| GCGA | 281.7 | 61.8 | 82.0 | TCGT (58%); TTGC (14%); GCGC (9%) |
| ACAT | 353.9 | 77.8 | 82.0 | GTGT (70%); ATGG (14%); ATGC (5%) |
| TCAT | 367.8 | 82.8 | 81.6 | ATGG (46%); GTGA (41%); ATGT (7%) |
| ACAG | 322.4 | 73.8 | 81.4 | CTGG (60%); CTGC (13%); TTGT (13%) |
| GGGA | 254.2 | 58.5 | 81.3 | TCCT (30%); GCCC (29%); TTCC (10%) |
| ACAC | 303.8 | 70.0 | 81.3 | GTGG (59%); GTGC (16%); GGGT (9%) |
| TATC | 355.2 | 82.7 | 81.1 | GATG (56%); GATT (29%); GGTA (5%) |
| CTAC | 285.7 | 67.4 | 80.9 | GGAG (37%); GTTG (23%); GTGG (18%) |
| TATG | 357.2 | 84.8 | 80.8 | CATG (52%); CATT (29%); CATC (6%) |
| TGCA | 347.9 | 83.5 | 80.6 | TGCG (66%); TGCT (21%); GGCA (5%) |
| TAAT | 314.9 | 75.9 | 80.6 | ATTG (38%); GTTA (26%); ATTT (25%) |

TABLE 4-continued

Ligation fidelity for 4-base overhangs (18 hours at 25° C.)

| Overhang | Correct, ×10⁻⁵ | Mismatch, ×10⁻⁵ | Fidelity, % [1] | Mismatch Overhangs [2] |
|---|---|---|---|---|
| ACTC | 283.8 | 68.6 | 80.5 | GGGT (59%); GAGG (17%); GAGC (7%) |
| AGAG | 274.0 | 67.4 | 80.3 | TTCT (22%); CTGT (21%); CTCG (20%) |
| GGTA | 296.5 | 73.0 | 80.3 | TACT (31%); GACC (29%); TGCC (13%) |
| TACT | 343.6 | 86.7 | 79.8 | AGTT (30%); GGTA (26%); AGTG (25%) |
| TCGT | 349.1 | 88.6 | 79.8 | ACGG (46%); GCGA (41%); ACGT (4%) |
| GTGA | 320.8 | 82.2 | 79.6 | TCAT (41%); GCAC (33%); TTAC (10%) |
| GTAG | 285.7 | 75.5 | 79.1 | CTGC (30%); CTTC (22%); TTAC (12%) |
| AGTG | 246.9 | 65.7 | 79.0 | TACT (32%); CATT (13%); CACG (13%) |
| TCAC | 320.8 | 86.1 | 78.8 | GTGG (71%); GTGT (20%); GGGA (2%) |
| AGAT | 367.4 | 98.7 | 78.8 | GTCT (61%); ATGT (12%); ATCG (8%) |
| AGGT | 319.2 | 86.8 | 78.6 | GCCT (57%); AGCT (15%); TCCT (7%) |
| TCCT | 315.3 | 86.2 | 78.5 | AGGG (59%); GGGA (20%); TGGA (9%) |
| TAAC | 323.6 | 89.2 | 78.4 | GTTG (47%); GTTT (40%); GTTC (9%) |
| TGTT | 380.9 | 107.2 | 78.0 | AACG (50%); AACT (21%); TACA (11%) |
| CATT | 355.0 | 100.8 | 77.9 | GATG (48%); TATG (24%); ATTG (9%) |
| ATCG | 324.1 | 92.2 | 77.9 | TGAT (56%); CGGT (9%); CGAG (9%) |
| CTTT | 329.5 | 94.9 | 77.6 | GAAG (37%); TAAG (24%); AGAG (11%) |
| GTAC | 345.4 | 102.5 | 77.1 | GTGC (27%); GGAC (27%); GTAT (16%) |
| CTCC | 224.0 | 66.8 | 77.0 | GGTG (49%); GGGG (21%); GGCG (14%) |
| ATGG | 312.2 | 94.0 | 76.9 | TCAT (41%); ACAT (12%); CCGT (10%) |
| AGAC | 291.9 | 89.7 | 76.5 | GTGT (30%); GTCG (21%); GTTT (20%) |
| AACG | 296.7 | 93.3 | 76.1 | TGTT (57%); CGTG (10%); CGTA (9%) |
| GATT | 320.8 | 102.9 | 75.7 | GATC (47%); TATC (23%); AATT (10%) |
| TCTC | 287.9 | 92.3 | 75.7 | GAGG (78%); GAGT (9%); GGGA (6%) |
| ACCG | 313.0 | 100.7 | 75.7 | CGGG (40%); TGGT (39%); GGGC (9%) |
| TCCG | 354.7 | 116.7 | 75.3 | CGGG (66%); CGGT (16%); TGGA (12%) |
| CCTT | 255.1 | 84.2 | 75.2 | GAGG (38%); TAGG (31%); AGGG (13%) |
| CTTG | 326.0 | 107.8 | 75.2 | CGAG (32%); TAAG (20%); CTAG (14%) |
| CTCG | 302.2 | 99.9 | 75.2 | TGAG (42%); CGGG (14%); AGAG (13%) |
| TGAG | 329.4 | 109.2 | 75.1 | CTCG (39%); CTCT (33%); CTTA (10%) |
| GAAC | 308.7 | 102.7 | 75.0 | GTTT (50%); GTTA (21%); GTAC (7%) |
| CATG | 359.9 | 119.9 | 75.0 | TATG (37%); CGTG (29%); CTTG (12%) |
| TAGC | 318.1 | 106.5 | 74.9 | GCTT (43%); GCTG (42%); GCTC (7%) |
| TAGG | 261.5 | 87.9 | 74.8 | CCTG (39%); CCTT (30%); TCTA (16%) |
| CTGT | 322.4 | 110.3 | 74.5 | GCAG (46%); ACTG (13%); AGAG (13%) |
| GAGT | 283.8 | 97.4 | 74.5 | GCTC (64%); ACTT (10%); TCTC (9%) |
| GAAT | 356.1 | 122.2 | 74.4 | GTTC (66%); ATTT (10%); TTTC (8%) |
| CCGT | 277.7 | 95.4 | 74.4 | GCGG (54%); TCGG (16%); AGGT (12%) |
| TACC | 296.5 | 103.4 | 74.1 | GGTG (48%); GGTT (40%); GGTC (6%) |
| CATC | 297.4 | 104.8 | 73.9 | GGTG (63%); GTTG (16%); TATG (5%) |
| CGAT | 324.1 | 115.0 | 73.8 | GTCG (62%); ATTG (12%); TTCG (8%) |
| TACG | 359.3 | 127.6 | 73.8 | CGTG (43%); CGTT (29%); TGTA (12%) |
| TCCC | 254.2 | 90.5 | 73.8 | GGGG (73%); GGGT (20%); GTGA (1%) |
| CCCG | 225.5 | 81.8 | 73.4 | TGGG (72%); AGGG (12%); GGGG (5%) |
| CGTT | 296.7 | 109.9 | 73.0 | GACG (37%); TACG (34%); AGCG (12%) |
| GCCA | 283.5 | 105.5 | 72.9 | TGGT (78%); GGGC (11%); GGGC (3%) |
| GAAG | 270.0 | 101.4 | 72.7 | CTTT (35%); TTTC (26%); CTTA (15%) |
| CGAG | 302.2 | 114.8 | 72.5 | TTCG (35%); CTTG (30%); ATCG (7%) |
| CCGC | 224.1 | 87.0 | 72.0 | GTGG (42%); ACGG (21%); GGGG (20%) |
| GTCA | 272.9 | 106.9 | 71.8 | TGAT (53%); GGAC (27%); GACA (4%) |
| GATC | 321.7 | 126.1 | 71.8 | GATT (39%); GGTC (36%); GATA (5%) |
| CTCT | 274.0 | 109.2 | 71.5 | GGAG (47%); TGAG (33%); AGTG (5%) |
| AGGC | 233.5 | 93.5 | 71.4 | GGCT (25%); GCTT (16%); GCGT (13%) |
| TCGC | 281.7 | 116.0 | 70.8 | GCGG (79%); GCGT (12%); GGGA (1%) |
| CTTC | 270.0 | 113.9 | 70.3 | GGAG (51%); GTAG (15%); GATG (10%) |
| CCCT | 189.6 | 80.4 | 70.2 | TGGG (48%); GGGG (43%); CGGG (2%) |
| CCTG | 278.5 | 120.8 | 69.7 | CGGG (37%); TAGG (29%); CTGG (15%) |
| GAGC | 270.2 | 117.7 | 69.7 | GCTT (43%); GCTA (14%); GGTC (13%) |
| CACG | 299.6 | 131.7 | 69.5 | TGTG (59%); CGGG (9%); AGTG (6%) |
| CCTC | 202.3 | 90.0 | 69.2 | GGGG (59%); GTGG (18%); GCGG (7%) |
| ACGG | 277.7 | 123.5 | 69.2 | TCGT (33%); CCGG (30%); CCGC (15%) |
| TGAT | 360.0 | 160.4 | 69.2 | GTCA (35%); ATCG (32%); ATCT (21%) |
| GTTT | 369.8 | 165.9 | 69.0 | GAAC (31%); AAAT (24%); TAAC (21%) |
| TCGG | 297.4 | 133.8 | 69.0 | CCGG (61%); TCGA (18%); CCGT (12%) |
| GCTT | 326.7 | 147.0 | 69.0 | GAGC (34%); TAGC (31%); AAGT (14%) |
| GCAT | 339.1 | 153.2 | 68.9 | GTGC (73%); ATGT (8%); TTGC (6%) |
| CAGG | 278.5 | 127.0 | 68.7 | TCTG (49%); ACTG (34%); CCTG (4%) |
| AGCC | 240.7 | 110.9 | 68.5 | GGGT (34%); GGTT (18%); GGCG (11%) |
| CGAC | 244.9 | 116.4 | 67.8 | GTTG (45%); GGCG (25%); GACG (5%) |
| ACTG | 226.9 | 112.8 | 66.8 | CAGG (38%); CGGT (20%); TAGT (17%) |
| AGCT | 273.2 | 136.5 | 66.7 | AGCT (42%); TGCT (27%); AGGT (9%) |
| CTGG | 319.9 | 160.0 | 66.7 | TCAG (30%); ACAG (27%); CCGG (12%) |
| TGTC | 318.4 | 160.2 | 66.5 | GACG (47%); GACT (32%); GGCA (11%) |
| TGGT | 363.5 | 184.8 | 66.3 | GCCA (44%); ACCG (21%); ACCT (15%) |
| TGTG | 344.0 | 176.1 | 66.1 | CACG (44%); CACT (26%); TACA (8%) |
| CGGT | 313.0 | 163.6 | 65.7 | GCCG (44%); AGCG (19%); ACTG (14%) |

TABLE 4-continued

Ligation fidelity for 4-base overhangs (18 hours at 25° C.)

| Overhang | Correct, ×10⁻⁵ | Mismatch, ×10⁻⁵ | Fidelity, %[1] | Mismatch Overhangs[2] |
|---|---|---|---|---|
| CTGC | 241.1 | 126.1 | 65.7 | GCTG (26%); GCGG (20%); GGAG (18%) |
| CACT | 246.9 | 129.3 | 65.6 | GGTG (49%); TGTG (36%); AGCG (5%) |
| CGTC | 262.8 | 139.1 | 65.4 | GGCG (42%); GATG (19%); GAGG (11%) |
| GGTT | 358.7 | 205.8 | 63.5 | GACC (33%); TACC (20%); AACT (19%) |
| CGTG | 299.6 | 172.3 | 63.5 | TACG (32%); CATG (20%); CGCG (19%) |
| GCAG | 241.1 | 141.9 | 63.0 | CTGT (36%); TTGC (28%); CTGA (18%) |
| GATG | 297.4 | 175.1 | 62.9 | CATT (27%); TATC (26%); CGTC (15%) |
| CCGG | 268.6 | 158.5 | 62.9 | TCGG (51%); ACGG (24%); CTGG (12%) |
| GACT | 300.5 | 178.2 | 62.8 | GGTC (43%); TGTC (29%); AGTT (9%) |
| GCTG | 308.8 | 183.6 | 62.7 | CGGC (27%); TAGC (24%); CTGC (18%) |
| GCTC | 270.2 | 163.6 | 62.3 | GGGC (39%); GAGT (38%); GTGC (6%) |
| GTGT | 303.8 | 185.9 | 62.0 | GCAC (31%); ACAT (29%); AGAC (14%) |
| AGGG | 189.6 | 116.7 | 61.9 | TCCT (44%); CCGT (10%); CCTT (9%) |
| TGAC | 272.9 | 168.8 | 61.8 | GTCG (45%); GTCT (35%); GTTA (6%) |
| GCAC | 236.0 | 148.4 | 61.4 | GTGT (39%); GGGC (20%); GTGA (18%) |
| GTTG | 332.0 | 210.0 | 61.3 | CGAC (25%); CAAT (21%); TAAC (20%) |
| GACC | 233.7 | 149.0 | 61.1 | GGTT (46%); GGGC (15%); GGTA (14%) |
| GTTC | 308.7 | 199.1 | 60.8 | GAAT (41%); GGAC (35%); GTAC (5%) |
| GCGT | 293.0 | 190.2 | 60.6 | GCGC (49%); ACGT (15%); ATGC (13%) |
| GGAT | 360.4 | 244.3 | 59.6 | GTCC (52%); ATTC (13%); ATGC (8%) |
| CGCT | 223.3 | 154.5 | 59.1 | GGCG (42%); TGCG (38%); AGTG (5%) |
| GTCT | 291.9 | 205.8 | 58.7 | AGAT (29%); TGAC (29%); GGAC (26%) |
| TGGG | 249.4 | 178.0 | 58.4 | CCCG (33%); TCCA (23%); CCCT (22%) |
| TGGC | 283.5 | 203.0 | 58.3 | GCCG (41%); GCCT (31%); GGCA (11%) |
| GGCA | 229.0 | 168.5 | 57.6 | TGCT (37%); GGCC (16%); TGGC (13%) |
| CGCC | 189.1 | 140.9 | 57.3 | GGTG (34%); GGGG (19%); GTCG (8%) |
| CGGC | 225.2 | 173.9 | 56.4 | GCTG (29%); GTCG (21%); GGCG (21%) |
| GACG | 262.8 | 204.4 | 56.3 | TGTC (37%); CGTT (20%); CGGC (11%) |
| TGCC | 229.0 | 185.3 | 55.3 | GGCG (48%); GGCT (36%); GGTA (5%) |
| GTCC | 236.7 | 193.4 | 55.0 | GGAT (66%); GGGC (13%); GGCC (6%) |
| GAGG | 202.3 | 167.4 | 54.7 | TCTC (43%); CCTT (19%); CGTC (9%) |
| TGCT | 254.5 | 214.7 | 54.2 | AGCG (36%); GGCA (29%); AGCT (17%) |
| GCCC | 209.7 | 179.3 | 53.9 | GGGT (76%); GGGA (9%); GTGC (2%) |
| GCCT | 233.5 | 200.1 | 53.9 | GGGC (33%); TGGC (32%); AGGT (25%) |
| GCGC | 208.5 | 180.7 | 53.6 | GCGT (51%); GTGC (14%); GGGC (12%) |
| GTGG | 267.0 | 233.7 | 53.3 | TCAC (26%); ACAC (18%); CCAT (16%) |
| AGCG | 223.3 | 205.6 | 52.1 | TGCT (37%); CGCG (15%); CGGT (15%) |
| CGGG | 225.5 | 220.9 | 50.5 | TCCG (35%); CCTG (20%); ACCG (18%) |
| GCCG | 225.2 | 220.9 | 50.5 | TGGC (37%); CGGT (33%); CGGA (11%) |
| GGTC | 233.7 | 232.6 | 50.1 | GACT (33%); GGCC (24%); GATC (20%) |
| GGGT | 302.0 | 303.7 | 49.9 | GCCC (45%); ACTC (13%); AGCC (12%) |
| TGCG | 254.3 | 258.0 | 49.6 | CGCG (40%); CGCT (23%); TGCA (21%) |
| GTGC | 236.0 | 239.5 | 49.6 | GCAT (47%); GGAC (15%); GTAC (12%) |
| GTCG | 244.9 | 251.2 | 49.4 | TGAC (30%); CGAT (28%); CGGC (14%) |
| GGAG | 224.0 | 234.9 | 48.8 | CTTC (25%); CTCT (22%); TTCC (14%) |
| GCGG | 224.1 | 238.8 | 48.4 | TCGC (38%); CCGT (21%); TGGC (10%) |
| GGAC | 236.7 | 262.7 | 47.4 | GTTC (26%); GTCT (20%); GTGC (13%) |
| GGTG | 297.0 | 341.7 | 46.5 | CATC (19%); CACT (19%); TACC (14%) |
| CGCG | 188.6 | 221.9 | 45.9 | TGCG (46%); CGTG (15%); AGCG (14%) |
| GGCT | 240.7 | 318.5 | 43.0 | GGCC (30%); TGCC (21%); AGCT (18%) |
| GGGC | 209.7 | 299.0 | 41.2 | GCCT (22%); GCTC (21%); GGCC (14%) |
| GGGG | 189.1 | 294.4 | 39.1 | TCCC (22%); CCTC (18%); CCCT (12%) |
| GGCC | 174.6 | 297.6 | 37.0 | GGCT (33%); GGTC (19%); GGGC (14%) |
| GGCG | 189.1 | 358.8 | 34.5 | TGCC (25%); CGCT (18%); CGTC (16%) |

[1] Fidelity is calculated as the fraction of correct ligations divided by the total fraction of ligations for a given overhang.
[2] Top 3 mismatch overhangs are given for each overhang. All overhangs are written in the 5'-to-3' direction. The numbers in parenthesis give the percentage for the given mismatch ligation relative to the total number of mismatch ligations for the overhang.

TABLE 5

Ligation fidelity for 2-base overhangs (16 hours at 25° C.). Although the number of combinations presented by two base overhangs is small with a maximum of 6 fragments in one pot, advantages include almost total freedom of where to break target sequence and virtually ensures the assembly products are error free. The Type IIS BtsI, with a preferred reaction temperature of 50° C. is an example of a restriction endonuclease that can generate a 2-base overhang.

| Overhang | Correct, ×10⁻⁵ | Mismatch, ×10⁻⁵ | Fidelity, %[1] | Mismatch Overhangs[2] |
|---|---|---|---|---|
| AA | 6375 | 6 | 99.9 | TC (50%); TG (50%) |
| AC | 6400 | 10 | 99.9 | GA (33%); TT (33%); AT (33%) |

TABLE 5-continued

Ligation fidelity for 2-base overhangs (16 hours at 25° C.). Although the number of combinations presented by two base overhangs is small with a maximum of 6 fragments in one pot, advantages include almost total freedom of where to break target sequence and virtually ensures the assembly products are error free. The Type IIS BtsI, with a preferred reaction temperature of 50° C. is an example of a restriction endonuclease that can generate a 2-base overhang.

| Overhang | Correct, ×10⁻⁵ | Mismatch, ×10⁻⁵ | Fidelity, %[1] | Mismatch Overhangs[2] |
|---|---|---|---|---|
| AG | 6579 | 22 | 99.7 | GT (86%); AT (14%) |
| AT | 6406 | 10 | 99.9 | AC (33%); AG (33%); CT (33%) |
| CA | 5100 | 13 | 99.8 | CA (50%); TT (25%); GG (25%) |
| CC | 6100 | 3 | 99.9 | CG (100%) |
| CG | 6068 | 19 | 99.7 | CT (33%); GG (33%); CC (17%) |
| CT | 6579 | 13 | 99.8 | CG (50%); GG (25%); AT (25%) |
| GA | 6745 | 13 | 99.8 | GA (50%); AC (25%); GC (25%) |
| GC | 6630 | 19 | 99.7 | GG (50%); GA (17%); CG (17%) |
| GG | 6100 | 26 | 99.6 | GC (38%); CG (25%); TC (12%) |
| GT | 6400 | 22 | 99.7 | AG (86%); GC (14%) |
| TA | 6100 | 0 | 100.0 | |
| TC | 6745 | 13 | 99.8 | TC (50%); AA (25%); GG (25%) |
| TG | 5100 | 3 | 99.9 | AA (100%) |
| TT | 6375 | 6 | 99.9 | AC (50%); CA (50%) |

[1]Fidelity is calculated as the fraction of correct ligations divided by the total fraction of ligations for a given overhang.
[2]Top 3 mismatch overhangs are given for each overhang. All overhangs are written in the 5'-to-3' direction. The numbers in parenthesis give the percentage for the given mismatch ligation relative to the total number of mismatch ligations for the overhang.

TABLE 6

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| AAAAA | 24 | 38 | 38.5 | ATTTT (38%); CTTTT (25%); TTTTC (12%) |
| AAAAC | 9 | 99 | 8.7 | GTATT (19%); GTTTC (14%); GTTTA (10%) |
| AAAAG | 38 | 113 | 25.0 | CTATT (17%); CTTTC (17%); CATTT (12%) |
| AAAAT | 33 | 80 | 29.2 | ATTTA (24%); AATTT (24%); ATTTC (18%) |
| AAACA | 9 | 43 | 18.2 | AGTTT (33%); TGTTG (11%); TGTTC (11%) |
| AAACC | 9 | 99 | 8.7 | GGTCT (19%); GGTTA (14%); TGTTT (10%) |
| AAACG | 0 | 156 | 0.0 | CGCTT (15%); CGTTA (12%); CGTAT (12%); CGATT (9%) |
| AAACT | 14 | 113 | 11.1 | AGTTC (21%); AGTTA (17%); AGGTT (12%) |
| AAAGA | 24 | 71 | 25.0 | TCTTC (27%); ACTTT (20%); TCATT (20%) |
| AAAGC | 0 | 109 | 0.0 | GTTTT (13%); GCTTA (13%); ACTTC (9%); ACTTT (9%) |
| AAAGG | 43 | 118 | 26.5 | ACTTT (12%); CCTTA (12%); TCTTT (12%) |
| AAAGT | 14 | 109 | 11.5 | GCTTT (17%); ACATT (17%); ACTTA (13%) |
| AAATA | 57 | 38 | 60.0 | TATTC (25%); AATTT (25%); TATTA (12%) |
| AAATC | 14 | 85 | 14.3 | GATTA (28%); ACTTT (17%); GATTG (11%) |
| AAATG | 24 | 85 | 21.7 | CATTA (17%); CATAT (17%); CATTC (11%) |
| AAATT | 28 | 99 | 22.2 | AATCT (14%); TATTT (14%); AATTC (10%) |
| AACAA | 5 | 0 | 100.0 | |
| AACAC | 9 | 52 | 15.4 | GTGCG (9%); GTGCT (9%); GGGTT (9%) |
| AACAG | 19 | 142 | 11.8 | CAGTT (17%); CTGCT (13%); CTATT (10%) |
| AACAT | 19 | 61 | 23.5 | ATGTG (15%); ATGTA (15%); ATCTT (8%) |
| AACCA | 14 | 66 | 17.6 | TGGTC (14%); GGGTT (14%); TTGTT (14%) |
| AACCC | 5 | 85 | 5.3 | CGGTT (17%); GGGTA (17%); GGTTT (17%); GGGGC (11%) |
| AACCG | 0 | 165 | 0.0 | CAGTT (11%); CGGCT (9%); CGGTC (9%); CGGTG (9%) |
| AACCT | 14 | 66 | 17.6 | AGGTA (29%); AAGTT (14%); AGGAT (14%) |
| AACGA | 38 | 109 | 25.8 | ACGTT (26%); TCGTC (17%); TTGTT (9%) |
| AACGC | 9 | 85 | 10.0 | GCGAT (17%); ACGTT (17%); GCGCT (11%) |
| AACGG | 0 | 175 | 0.0 | CCGCT (14%); CCGTA (11%); CCGAT (11%); CCGTG (8%) |
| AACGT | 28 | 123 | 18.8 | ACGAT (23%); ACGTA (15%); CCGTT (15%) |
| AACTA | 24 | 76 | 23.8 | AAGTT (25%); TAGGT (12%); CAGTT (12%) |
| AACTC | 9 | 80 | 10.5 | GAGTG (18%); TAGTT (12%); GAGGT (12%) |
| AACTG | 14 | 118 | 10.7 | CAGTA (16%); CAATT (16%); CAGTG (12%) |
| AACTT | 33 | 52 | 38.9 | AAGCT (27%); AAGAT (27%); AAGTA (18%) |
| AAGAA | 43 | 76 | 36.0 | ATCTT (19%); TTCAT (12%); TTCTA (12%) |
| AAGAC | 9 | 90 | 9.5 | ATCTT (16%); GCCTT (11%); GTCCT (11%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| AAGAG | 33 | 90 | 26.9 | CTTTT (21%); CTCTA (11%); CTCAT (11%) |
| AAGAT | 9 | 80 | 10.5 | AACTT (18%); ATCTA (12%); ATCGT (12%) |
| AAGCA | 24 | 85 | 21.7 | AGCTT (17%); TGCTG (17%); TGCGT (11%) |
| AAGCC | 9 | 113 | 7.7 | GTCTT (12%); GGCCT (12%); GGCTG (12%); GGCGC (8%) |
| AAGCG | 5 | 94 | 4.8 | CGCTC (20%); CTCTT (15%); CGCTA (10%); CGCTG (10%) |
| AAGCT | 5 | 99 | 4.5 | AGCTG (24%); AACTT (14%); AGCTA (10%); AGCCT (10%) |
| AAGGA | 43 | 123 | 25.7 | TCCTC (19%); ACCTT (15%); TCTTT (12%) |
| AAGGC | 14 | 156 | 8.3 | GCCAT (18%); GCCTA (12%); ACCTT (9%) |
| AAGGG | 24 | 94 | 20.0 | CCCTA (20%); CCTTT (15%); CCATT (15%) |
| AAGGT | 33 | 66 | 33.3 | ACTTT (14%); ACCAT (14%); ACCTG (7%) |
| AAGTA | 28 | 104 | 21.4 | TACTC (23%); CACTT (14%); TTCTT (14%) |
| AAGTC | 5 | 113 | 4.0 | GACTA (12%); GCCTT (12%); CACTT (12%); GACGG (8%) |
| AAGTG | 14 | 66 | 17.6 | CAATT (21%); CATTT (14%); CACAG (7%) |
| AAGTT | 33 | 85 | 28.0 | AACTA (22%); CACTT (17%); AACTG (11%) |
| AATAA | 43 | 57 | 42.9 | CTATT (25%); GTATT (17%); TTATG (8%) |
| AATAC | 14 | 43 | 25.0 | GAATT (33%); CTATT (11%); GTAAT (11%) |
| AATAG | 19 | 113 | 14.3 | CTATC (17%); CTAAT (12%); CTAGT (12%) |
| AATAT | 33 | 61 | 35.0 | ATAAT (23%); AAATT (15%); ATGTT (15%) |
| AATCA | 14 | 61 | 18.8 | AGATT (31%); TGAAT (23%); TGATC (15%) |
| AATCC | 19 | 109 | 14.8 | GGAAT (22%); GGATA (22%); GGATC (9%) |
| AATCG | 5 | 156 | 2.9 | CGATC (15%); CGATA (12%); CGAAT (12%); CAATT (9%) |
| AATCT | 9 | 80 | 10.5 | TGATT (24%); AAATT (18%); AGAAT (18%) |
| AATGA | 33 | 128 | 20.6 | CCATT (15%); TCAAT (15%); TCATA (11%) |
| AATGC | 5 | 71 | 6.3 | GCATC (20%); GCAAT (13%); GCATA (13%); GCATG (13%) |
| AATGG | 14 | 90 | 13.6 | CCATC (16%); CCAAT (16%); CAATT (11%) |
| AATGT | 9 | 94 | 9.1 | ACGTT (20%); AGATT (10%); CCATT (10%) |
| AATTA | 47 | 61 | 43.5 | CAATT (31%); AAATT (15%); TAATC (8%) |
| AATTC | 28 | 90 | 24.0 | GAATC (21%); GAAAT (11%); AAATT (11%) |
| AATTG | 14 | 90 | 13.6 | CAATG (21%); CAAAT (16%); TAATT (11%) |
| AATTT | 28 | 99 | 22.2 | AAAAT (19%); AAATC (14%); AATTT (10%) |
| ACAAA | 19 | 43 | 30.8 | TTTGA (44%); TCTGT (11%); ATTGT (11%) |
| ACAAC | 0 | 57 | 0.0 | ATTGT (17%); GCTGT (17%); GTTGC (17%); GTTGA (17%) |
| ACAAG | 19 | 109 | 14.8 | CTAGT (13%); CTCGT (13%); CTTGC (13%) |
| ACAAT | 14 | 38 | 27.3 | ATTGA (38%); TTTGT (12%); ATTCT (12%) |
| ACACA | 14 | 76 | 15.8 | TGTGA (31%); TGTGG (25%); AGTGT (12%) |
| ACACC | 5 | 99 | 4.5 | GGTGG (14%); GGTGC (14%); GTTGT (10%); GATGT (10%) |
| ACACG | 24 | 165 | 12.5 | CTTGT (11%); TGTGG (9%); CGAGT (9%) |
| ACACT | 5 | 99 | 4.5 | AGCGT (14%); AGTGA (14%); AGTTT (10%); AGGGT (10%) |
| ACAGA | 19 | 132 | 12.5 | TCTGC (32%); TCTGA (14%); TCTGG (7%) |
| ACAGC | 14 | 90 | 13.6 | GCTGC (21%); GCTAT (16%); ACTGT (11%) |
| ACAGG | 5 | 137 | 3.3 | CCTAT (14%); CCTGC (14%); TCTGT (10%); CCAGT (7%) |
| ACAGT | 14 | 113 | 11.1 | ACTGG (21%); ACTGC (12%); GCTGT (8%) |
| ACATA | 24 | 66 | 26.3 | CATGT (14%); TGTGT (14%); TATGA (14%) |
| ACATC | 5 | 85 | 5.3 | GATGA (22%); GATAT (11%); GAGGT (11%); TATGT (11%) |
| ACATG | 14 | 161 | 8.1 | CATGG (18%); CATGA (15%); CAAGT (12%); CATGC (12%) |
| ACATT | 9 | 80 | 10.5 | AAAGT (24%); AATGA (18%); ACTGT (12%) |
| ACCAA | 14 | 38 | 27.3 | TTGGA (38%); TAGGT (25%); TTGGC (12%) |
| ACCAC | 5 | 52 | 8.3 | GTGGC (18%); GTGGA (18%); GTGAT (18%); GTGGG (9%) |
| ACCAG | 14 | 113 | 11.1 | CTGCT (12%); CTAGT (12%); CTGGC (12%); CTGAT (12%) |
| ACCAT | 9 | 99 | 8.7 | ATGGC (14%); ATGTT (14%); AAGGT (10%) |
| ACCCA | 14 | 43 | 25.0 | AGGGT (22%); TGGAT (11%); GGGGC (11%) |
| ACCCC | 0 | 104 | 0.0 | GGGGA (18%); GGAGT (14%); GGGTT (9%); CGGGT (9%) |
| ACCCG | 9 | 142 | 6.3 | CGGGC (20%); CGGGA (13%); CAGGT (10%); CGGTG (10%) |
| ACCCT | 9 | 94 | 9.1 | AGGGA (25%); AGGGC (15%); TGGGT (15%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| ACCGA | 14 | 123 | 10.3 | TCGGC (12%); GCGGC (12%); TAGGT (12%) |
| ACCGC | 14 | 85 | 14.3 | GCGAT (22%); TCGGT (11%); GCAGT (11%) |
| ACCGG | 19 | 161 | 10.5 | CCGGA (21%); CCGAT (18%); CCGGC (9%) |
| ACCGT | 5 | 52 | 8.3 | ACGAT (18%); ACAGT (18%); ACGGA (18%); CCGGT (9%) |
| ACCTA | 5 | 43 | 10.0 | TAGGC (22%); AAGGT (11%); TAGTT (11%); TCGGT (11%) |
| ACCTC | 14 | 61 | 18.8 | GAGGA (38%); AAGGT (8%); ATGGT (8%) |
| ACCTG | 28 | 99 | 22.2 | CAGGA (24%); CAGGG (14%); CCGGT (10%) |
| ACCTT | 33 | 66 | 33.3 | AAGGA (29%); AAGGC (21%); GAGGT (14%) |
| ACGAA | 19 | 113 | 14.3 | TTCGA (29%); TTCGC (21%); TTCAT (12%) |
| ACGAC | 9 | 118 | 7.4 | GACGT (12%); GCCGG (8%); GTCGG (8%) |
| ACGAG | 9 | 118 | 7.4 | CTCGG (16%); CTCGC (12%); CACGT (12%); TTCGT (12%) |
| ACGAT | 14 | 142 | 9.1 | AACGT (20%); ATCGA (17%); ATCGC (10%) |
| ACGCA | 5 | 61 | 7.1 | TGCGG (15%); TGCGA (15%); AGTGT (8%); TGCTT (8%) |
| ACGCC | 0 | 113 | 0.0 | GACGT (8%); GGCGG (8%); GGCCG (4%); AGCGT (4%) |
| ACGCG | 5 | 104 | 4.3 | AGCGT (14%); TGCGG (9%); CGCAT (9%); CGCCT (9%) |
| ACGCT | 5 | 99 | 4.5 | AGAGT (10%); AGCAC (10%); AGCGA (10%); AGCCT (10%) |
| ACGGA | 0 | 156 | 0.0 | TCCGC (27%); TCCGA (12%); TCTGT (9%); ACCGT (6%) |
| ACGGC | 14 | 137 | 9.4 | GCCGA (21%); GCCGC (10%); GCCGG (7%) |
| ACGGG | 5 | 90 | 5.0 | CCCGG (11%); CCCAT (11%); CCCAG (11%); TCCGT (11%) |
| ACGGT | 5 | 104 | 4.3 | GCCGT (9%); GCCGG (9%); ACCAT (9%); ACGGT (9%) |
| ACGTA | 14 | 76 | 15.8 | AACGT (25%); TACGA (12%); TATGT (12%) |
| ACGTC | 0 | 104 | 0.0 | GACGA (9%); GCCGT (9%); GACAT (9%); TACGT (9%) |
| ACGTG | 5 | 94 | 4.8 | CACGA (15%); GACGT (15%); CACAT (10%); CAGGT (10%) |
| ACGTT | 28 | 118 | 19.4 | AACGA (24%); AATGT (16%); AACGC (12%) |
| ACTAA | 19 | 80 | 19.0 | TCAGT (18%); GTAGT (18%); TTAGC (12%) |
| ACTAC | 0 | 57 | 0.0 | GTAGA (25%); GAAGT (17%); ATAGT (17%); GTAGC (8%) |
| ACTAG | 28 | 113 | 20.0 | CTAGA (25%); CTAAT (12%); CAAGT (8%) |
| ACTAT | 9 | 80 | 10.5 | ATAGA (24%); ATGGG (12%); ATGGT (6%) |
| ACTCA | 19 | 52 | 26.7 | AGAGT (27%); TGAAT (18%); CTAGT (9%) |
| ACTCC | 9 | 104 | 8.3 | GAAGT (14%); AGAGT (9%); GTTGT (5%) |
| ACTCG | 24 | 113 | 17.2 | CGAGA (29%); CGAGC (21%); CGATT (12%) |
| ACTCT | 9 | 66 | 12.5 | AGAGC (29%); AGTGT (14%); CGAGT (14%) |
| ACTGA | 33 | 71 | 31.8 | CCAGT (13%); ACAGT (13%); TCAGA (13%) |
| ACTGC | 5 | 85 | 5.3 | GCAGA (22%); ACAGT (17%); GCGGT (17%); GCAGG (11%) |
| ACTGG | 5 | 132 | 3.4 | ACAGT (18%); CAAGT (14%); CTAGT (11%); CCAGA (11%) |
| ACTGT | 14 | 76 | 15.8 | ACAGC (12%); AGAGT (12%); AAAGT (12%) |
| ACTTA | 38 | 104 | 26.7 | TAAGA (18%); TAAGG (18%); GAAGT (14%) |
| ACTTC | 5 | 99 | 4.5 | GAAGA (24%); GAAGC (19%); AAAGC (10%); GAAAT (5%) |
| ACTTG | 19 | 94 | 16.7 | CAAGA (15%); CAAGG (15%); CAATT (15%) |
| ACTTT | 14 | 71 | 16.7 | AAAGA (20%); AAAGG (20%); AAGGT (13%) |
| AGAAA | 19 | 85 | 18.2 | CTTCT (17%); TTACT (17%); TTTCC (11%) |
| AGAAC | 14 | 94 | 13.0 | ATTCT (20%); GTTCA (10%); GTACT (10%) |
| AGAAG | 24 | 142 | 14.3 | CTTCC (23%); CTACT (13%); CTGCT (10%) |
| AGAAT | 9 | 123 | 7.1 | AATCT (12%); ATTCC (12%); CTTCT (12%); GTTCT (12%) |
| AGACA | 28 | 90 | 24.0 | TGTCA (26%); AGTCT (11%); TGGCT (11%) |
| AGACC | 14 | 99 | 12.5 | GGGCT (10%); GGTCG (10%); AGTCT (10%) |
| AGACG | 14 | 137 | 9.4 | CGTCA (14%); CGCCT (10%); CGACT (10%) |
| AGACT | 9 | 85 | 10.0 | AGACT (22%); TGTCT (11%); AGTCG (11%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| AGAGA | 5 | 113 | 4.0 | TCTCC (17%); TGTCT (8%); TCCCT (8%); GCTCT (8%) |
| AGAGC | 0 | 109 | 0.0 | ACTCT (17%); GCTCA (13%); GCTTT (13%); GCTCC (13%) |
| AGAGG | 14 | 142 | 9.1 | CCTCA (17%); CCTTT (13%); CCTCG (10%) |
| AGAGT | 9 | 76 | 11.1 | ACTCA (19%); ACGCT (12%); ACTGT (12%) |
| AGATA | 24 | 118 | 16.7 | CATCT (20%); TATCA (16%); TATCC (16%) |
| AGATC | 19 | 156 | 10.8 | GATCC (18%); GATCG (12%); GATAT (9%) |
| AGATG | 5 | 80 | 5.6 | CAACT (29%); CATCC (12%); CTTCT (12%); CATAT (12%) |
| AGATT | 9 | 71 | 11.8 | AATCA (27%); ATTCT (13%); AATGT (13%) |
| AGCAA | 9 | 90 | 9.5 | TTGCA (21%); CTGCT (16%); TCGCT (16%); ATGCT (16%) |
| AGCAC | 0 | 85 | 0.0 | GAGCT (22%); GTGCA (17%); AGGCT (11%); ACGCT (11%) |
| AGCAG | 0 | 109 | 0.0 | CTGCA (17%); CCGCT (13%); CTGAT (13%); CGGCT (9%) |
| AGCAT | 0 | 71 | 0.0 | GTGCT (20%); AAGCT (13%); ATGTT (13%); ATGGG (7%) |
| AGCCA | 5 | 99 | 4.5 | TGGCA (19%); CGGCT (14%); TGGAT (10%); AGGCT (10%) |
| AGCCC | 9 | 85 | 10.0 | CGGCT (22%); GGGCA (17%); GTGCT (11%); GGGCG (11%) |
| AGCCG | 9 | 113 | 7.7 | CGACT (17%); AGGCT (12%); CGGCA (12%); CTGCT (8%) |
| AGCCT | 9 | 123 | 7.1 | AGCCT (23%); AGGCA (15%); ACGCT (8%); AAGCT (8%) |
| AGCGA | 9 | 132 | 6.7 | TCGCC (14%); TCGCA (11%); CCGCT (7%); ACGCT (7%) |
| AGCGC | 14 | 71 | 16.7 | GCACT (13%); GCGCG (13%); ACGCT (13%) |
| AGCGG | 0 | 76 | 0.0 | CCGCC (19%); CAGCT (19%); CCGCG (12%); CTGCT (6%) |
| AGCGT | 5 | 76 | 5.9 | ACGCG (19%); ACACT (19%); ACGTT (12%); GCGCG (6%) |
| AGCTA | 5 | 113 | 4.0 | CAGCT (25%); TAGCA (21%); TAGCG (12%); TAGTT (8%) |
| AGCTC | 0 | 61 | 0.0 | GAGCC (31%); GAGCA (23%); CAGCT (15%); GTGCT (8%) |
| AGCTG | 5 | 104 | 4.3 | AAGCT (23%); CAGTT (14%); CAACT (9%); CAGGA (5%) |
| AGCTT | 5 | 61 | 7.1 | AAGCA (23%); CAGCT (15%); AAGGT (8%); AGGCT (8%) |
| AGGAA | 5 | 94 | 4.8 | TACCT (15%); ATCCT (15%); TTCCA (10%); GACCT (10%) |
| AGGAC | 5 | 128 | 3.6 | GTCTT (11%); GCCCT (11%); GACCT (7%); GTCCC (7%) |
| AGGAG | 0 | 113 | 0.0 | CTCAT (17%); CTCTT (12%); CGCCT (8%); CCCCT (8%) |
| AGGAT | 5 | 66 | 6.7 | ACCCT (14%); ATTCT (14%); AGCCT (14%); AACCT (14%) |
| AGGCA | 14 | 113 | 11.1 | AGCCT (17%); TGCCC (8%); TGCCA (8%) |
| AGGCC | 19 | 113 | 14.3 | GGACT (12%); GGCTT (12%); GGCAT (8%) |
| AGGCG | 14 | 123 | 10.3 | CGCCA (12%); CACCT (12%); TGCCG (8%) |
| AGGCT | 9 | 99 | 8.7 | AGCCG (14%); GGCCG (10%); AGCAC (10%); AGCCA (10%) |
| AGGGA | 14 | 123 | 10.3 | ACCCT (19%); TCCCC (12%); CCCCT (12%) |
| AGGGC | 14 | 94 | 13.0 | ACCCT (15%); GACCT (10%); GCCGT (10%) |
| AGGGG | 9 | 76 | 11.1 | CCCCC (25%); CCCCA (19%); CCTCT (12%) |
| AGGGT | 9 | 94 | 9.1 | ACCCA (10%); CCCCT (10%); GCCCT (10%) |
| AGGTA | 19 | 80 | 19.0 | AACCT (24%); CACCT (18%); GACCT (12%) |
| AGGTC | 9 | 132 | 6.7 | GACAT (14%); GAACT (11%); GACCA (11%) |
| AGGTG | 19 | 80 | 19.0 | CACCC (35%); CACCA (18%); TGCCT (12%) |
| AGGTT | 14 | 66 | 17.6 | AACGT (21%); AAACT (21%); AACCG (21%) |
| AGTAA | 0 | 99 | 0.0 | TTACG (19%); CTACT (14%); TTACC (14%); ATACT (10%) |
| AGTAC | 9 | 57 | 14.3 | GAACT (25%); GCACT (17%); GTAGG (8%) |
| AGTAG | 14 | 94 | 13.0 | CTACA (20%); CCACT (15%); ATACT (15%) |
| AGTAT | 14 | 57 | 20.0 | ATACA (25%); ATACC (17%); ATACG (17%) |
| AGTCA | 24 | 99 | 19.2 | TGACC (19%); TGATT (14%); TGACA (10%) |
| AGTCC | 9 | 99 | 8.7 | GGACA (29%); CGACT (19%); AGACT (10%) |
| AGTCG | 19 | 71 | 21.1 | CGACA (27%); CGATT (13%); AGACT (13%) |
| AGTCT | 9 | 71 | 11.8 | AGACA (13%); AGACC (13%); GGACT (13%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| AGTGA | 9 | 94 | 9.1 | CCACT (20%); TCGCT (15%); ACACT (15%); GCACT (10%) |
| AGTGC | 19 | 76 | 20.0 | GCACG (19%); GCACA (12%); GAACT (12%) |
| AGTGG | 5 | 61 | 7.1 | CCGCT (23%); CCACG (15%); TAACT (8%); CAACT (8%) |
| AGTGT | 5 | 71 | 6.3 | ACACA (13%); GCACT (13%); ACTCT (13%); ACACC (7%) |
| AGTTA | 28 | 66 | 30.0 | AAACT (29%); TAACG (21%); TAACC (14%) |
| AGTTC | 5 | 99 | 4.5 | GAACA (24%); AAACT (24%); GATCT (10%); GGACT (10%) |
| AGTTG | 9 | 71 | 11.8 | CAACA (20%); CCACT (20%); CAACG (13%) |
| AGTTT | 14 | 71 | 16.7 | AAACG (20%); AAACA (20%); TAACT (13%) |
| ATAAA | 24 | 52 | 31.3 | TTTAG (18%); TTTGT (9%); TTCAT (9%) |
| ATAAC | 14 | 90 | 13.6 | GTTAA (21%); GTTAG (16%); GTAAT (16%) |
| ATAAG | 19 | 104 | 15.4 | CTCAT (14%); CTTAA (9%); CTTTT (9%) |
| ATAAT | 14 | 76 | 15.8 | ATTAA (31%); AATAT (19%); ATTAC (12%) |
| ATACA | 14 | 76 | 15.8 | AGTAT (19%); TGCAT (12%); CGTAT (12%) |
| ATACC | 5 | 71 | 6.3 | GGAAT (27%); AGTAT (13%); GGTAA (13%); TGTAT (7%) |
| ATACG | 38 | 104 | 26.7 | AGTAT (9%); TGTAT (9%); CGGAT (9%) |
| ATACT | 14 | 90 | 13.6 | AGAAT (16%); AGTAG (16%); TGTAT (11%) |
| ATAGA | 9 | 80 | 10.5 | ACTAT (24%); TATAT (18%); TCAAT (12%) |
| ATAGC | 14 | 90 | 13.6 | GCTAA (37%); GCCAT (16%); GCAAT (11%) |
| ATAGG | 14 | 94 | 13.0 | CCAAT (20%); CCTAC (15%); CCTAG (10%) |
| ATAGT | 9 | 57 | 14.3 | ACTAC (17%); ACAAT (8%); GCTGT (8%) |
| ATATA | 52 | 19 | 73.3 | TATAA (25%); TGAAT (25%); GAAAT (25%) |
| ATATC | 14 | 61 | 18.8 | GATAA (31%); GATAG (23%); GCTAT (15%) |
| ATATG | 28 | 66 | 30.0 | CATAA (21%); CACAT (14%); AATAT (14%) |
| ATATT | 33 | 38 | 46.7 | CATAT (38%); AATAA (12%); AATCT (12%) |
| ATCAA | 14 | 57 | 20.0 | ATGAT (25%); TTGAC (25%); TGGAT (8%) |
| ATCAC | 5 | 33 | 12.5 | GTGGT (29%); GCGAT (14%); GTGCT (14%) |
| ATCAG | 14 | 94 | 13.0 | CGGAT (15%); CTGAG (10%); CTGAC (10%) |
| ATCAT | 0 | 52 | 0.0 | ATGAC (27%); ACGAT (18%); ATGAA (9%); GTGAT (9%) |
| ATCCA | 14 | 61 | 18.8 | TAGAT (23%); GGGAT (23%); TGGTT (15%) |
| ATCCC | 5 | 61 | 7.1 | GGGAA (23%); GGAAT (15%); GGGAC (15%); GGGTT (8%) |
| ATCCG | 9 | 142 | 6.3 | CGGAC (17%); CGGAA (13%); CGAAT (13%); TGGAT (7%) |
| ATCCT | 5 | 71 | 6.3 | TGGAT (20%); AGGAA (20%); CGGAT (13%); GGGAA (7%) |
| ATCGA | 9 | 156 | 5.7 | TCGAC (18%); TCGAA (15%); ACGAT (15%); CCGAT (12%) |
| ATCGC | 5 | 66 | 6.7 | ACGAT (21%); CCGAT (14%); GCAAT (14%); GGGAT (14%) |
| ATCGG | 9 | 71 | 11.8 | CCGAA (13%); CCGAG (13%); ATGAT (7%) |
| ATCGT | 14 | 61 | 18.8 | GCGAT (15%); AAGAT (15%); ACGAC (8%) |
| ATCTA | 19 | 52 | 26.7 | CAGAT (45%); TAGAG (18%); AAGAT (18%) |
| ATCTC | 5 | 52 | 8.3 | GAGAC (27%); GACAT (18%); GAAAT (9%) |
| ATCTG | 9 | 76 | 11.1 | CAGAG (25%); CAGAA (12%); CCGAT (12%) |
| ATCTT | 9 | 57 | 14.3 | AAGAC (25%); AAGAA (25%); ATGAT (8%) |
| ATGAA | 43 | 38 | 52.9 | GTCAT (25%); ATCAT (12%); TTCAG (12%) |
| ATGAC | 9 | 104 | 8.3 | GTCAA (18%); GTCAC (18%); ATCAT (14%) |
| ATGAG | 9 | 76 | 11.1 | CTCAA (19%); CTCTC (12%); CTCCT (12%) |
| ATGAT | 0 | 80 | 0.0 | ATCAA (18%); ATGAT (12%); ACCAT (12%); ATCTT (6%) |
| ATGCA | 9 | 76 | 11.1 | CGCAT (19%); TACAT (19%); TGCAA (19%); TGCAG (12%) |
| ATGCC | 0 | 61 | 0.0 | GGCAA (15%); GGCGT (8%); GGAAT (8%); GTACT (8%) |
| ATGCG | 9 | 90 | 9.5 | GGCAT (11%); CGCAA (11%); CGAAT (11%) |
| ATGCT | 0 | 47 | 0.0 | AGCAA (30%); AGCAG (20%); AACAT (10%); CGCAT (10%) |
| ATGGA | 9 | 94 | 9.1 | TACAT (15%); GCCAT (15%); TCAAT (15%); CCCAT (10%) |
| ATGGC | 9 | 94 | 9.1 | GCTAT (15%); ACCAT (15%); GCCAA (10%) |
| ATGGG | 0 | 71 | 0.0 | CCCAA (20%); ACTAT (13%); CTCAT (7%); TTCAT (7%) |
| ATGGT | 9 | 76 | 11.1 | CCCAT (6%); ACTGT (6%); TGCAG (6%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| ATGTA | 5 | 76 | 5.9 | TACAG (12%); CACAT (12%); GACAT (12%); AACAT (12%) |
| ATGTC | 9 | 76 | 11.1 | GACAA (19%); GATAT (12%); CACAT (12%) |
| ATGTG | 5 | 99 | 4.5 | CACAC (14%); CACAA (14%); CTCAT (10%); AACAT (10%) |
| ATGTT | 19 | 80 | 19.0 | ACCAT (18%); AGCAT (12%); AATAT (12%) |
| ATTAA | 38 | 57 | 40.0 | ATAAT (42%); TCAAT (17%); TAAAT (17%) |
| ATTAC | 19 | 38 | 33.3 | ATAAT (25%); GTAAC (12%); GGAAT (12%) |
| ATTAG | 38 | 33 | 53.3 | CCAAT (29%); ATAAT (14%); CAAAT (14%) |
| ATTAT | 14 | 61 | 18.8 | ATAAC (15%); ATTAT (15%); ATATT (8%) |
| ATTCA | 38 | 71 | 34.8 | TGAAA (13%); TAAAT (13%); TGAAG (13%) |
| ATTCC | 19 | 90 | 17.4 | GGAAC (16%); GGAAA (16%); AGAAT (16%) |
| ATTCG | 14 | 85 | 14.3 | CGAAA (17%); CGATT (11%); TGAAT (11%) |
| ATTCT | 9 | 104 | 8.3 | GGAAT (18%); AGAAC (18%); TGAAT (9%); AGATT (9%) |
| ATTGA | 28 | 66 | 30.0 | ACAAT (21%); TCAGT (21%); TCAAC (7%) |
| ATTGC | 19 | 57 | 25.0 | GCAAC (25%); GCAAG (17%); GCAAA (17%) |
| ATTGG | 0 | 85 | 0.0 | CCGAT (11%); CCTAT (11%); CCAAC (11%); CAAAT (11%) |
| ATTGT | 14 | 61 | 18.8 | ACAAC (15%); GGAAT (15%); ACAAA (8%) |
| ATTTA | 24 | 52 | 31.3 | AAAAT (36%); TAAGT (18%); TAAAA (18%) |
| ATTTC | 0 | 80 | 0.0 | AAAAT (18%); GAAAC (12%); TAAAT (12%); CAAAT (12%) |
| ATTTG | 9 | 66 | 12.5 | CAAGT (14%); CCAAT (14%); CTAAT (7%) |
| ATTTT | 33 | 61 | 35.0 | AAAAA (23%); AAAAG (15%); AAGGT (8%) |
| CAAAA | 19 | 47 | 28.6 | CTTTG (20%); ATTTG (10%); TTTGA (10%) |
| CAAAC | 9 | 66 | 12.5 | GTATG (21%); GTTTT (14%); GATTG (14%); GTTCG (14%) |
| CAAAG | 9 | 161 | 5.6 | CTTCG (18%); CTTTA (12%); CATTG (12%); CTATG (9%) |
| CAAAT | 9 | 71 | 11.8 | AATTG (20%); ACTTG (13%); ATTGG (13%) |
| CAACA | 19 | 47 | 28.6 | AGTTG (30%); CGTTG (20%); TGTAG (10%) |
| CAACC | 14 | 85 | 14.3 | GGATG (17%); GGTTA (11%); GGTCG (11%) |
| CAACG | 14 | 113 | 11.1 | CATTG (12%); CGATG (12%); CGTCG (8%) |
| CAACT | 9 | 99 | 8.7 | AGATG (24%); GGTTG (10%); CGTTG (10%) |
| CAAGA | 33 | 151 | 17.9 | TCTAG (16%); CCTTG (12%); TCTTA (12%) |
| CAAGC | 14 | 113 | 11.1 | GCTTA (25%); ACTTG (12%); GCCTG (8%) |
| CAAGG | 24 | 189 | 11.1 | CCTAG (15%); CCTCG (12%); CCATG (12%) |
| CAAGT | 19 | 113 | 14.3 | ACATG (17%); ACTGG (17%); ACTTA (12%) |
| CAATA | 14 | 52 | 21.4 | CATTG (27%); TCTTG (18%); TAGTG (9%) |
| CAATC | 5 | 66 | 6.7 | GCTTG (21%); GAATG (21%); GATCG (14%); GACTG (7%) |
| CAATG | 33 | 80 | 29.2 | AATTG (24%); CAGTG (18%); CACTG (12%) |
| CAATT | 14 | 151 | 8.6 | AACTG (12%); AATTA (12%); ACTTG (9%); AAGTG (9%) |
| CACAA | 5 | 52 | 8.3 | ATGTG (27%); TTGTA (18%); GTGTG (9%) |
| CACAC | 5 | 90 | 5.0 | GTGGG (16%); ATGTG (16%); CACAC (11%); GAGTG (11%) |
| CACAG | 19 | 109 | 14.8 | CCGTG (13%); CTGGG (9%); CGGTG (9%) |
| CACAT | 5 | 76 | 5.9 | ATGTC (12%); ACGTG (12%); CTGTG (12%); ATGTA (12%) |
| CACCA | 14 | 76 | 15.8 | TGGCG (25%); TAGTG (19%); AGGTG (19%); TGGTA (19%) |
| CACCC | 9 | 118 | 7.4 | AGGTG (24%); GAGTG (12%); CGGTG (12%); GGCTG (12%) |
| CACCG | 5 | 118 | 3.8 | CGGTA (20%); CGGCG (16%); CGATG (12%); CGGTC (8%) |
| CACCT | 19 | 99 | 16.0 | AGGTA (14%); AGGCG (14%); AGGTC (10%) |
| CACGA | 9 | 118 | 7.4 | TCGCG (16%); TCGAG (16%); TAGTG (12%); CCGTG (12%) |
| CACGC | 9 | 76 | 11.1 | GCGCG (19%); GCGTA (12%); GTGTG (12%); GCAGG (12%) |
| CACGG | 14 | 109 | 11.5 | CCGAG (17%); CCGCG (13%); CCATG (13%) |
| CACGT | 5 | 43 | 10.0 | ACGAG (33%); ACGCG (22%); ACATG (11%) |
| CACTA | 28 | 66 | 30.0 | CAGTG (21%); TAGTT (7%); TAGCG (7%) |
| CACTC | 14 | 61 | 18.8 | GAATG (23%); GAGTA (15%); GAGGA (8%) |
| CACTG | 5 | 113 | 4.0 | CAGTA (17%); CAGAG (17%); CCGTG (12%); CAGTT (12%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| CACTT | 14 | 66 | 17.6 | AAGTC (21%); AAGTA (21%); AAGTT (21%) |
| CAGAA | 14 | 118 | 10.7 | TTCAG (24%); TCCTG (12%); CTCTG (12%) |
| CAGAC | 9 | 85 | 10.0 | GTCTA (22%); GTCTC (17%); GTCAG (11%) |
| CAGAG | 24 | 184 | 11.4 | CTCTA (13%); CACTG (10%); ATCTG (10%) |
| CAGAT | 9 | 76 | 11.1 | ATCTA (31%); TTCTG (19%); AACTG (12%); ATCCG (12%) |
| CAGCA | 28 | 80 | 26.1 | TGCAG (18%); CGCTG (18%); TGCCG (12%) |
| CAGCC | 14 | 109 | 11.5 | GTCTG (13%); TGCTG (9%); GGCTC (9%) |
| CAGCG | 14 | 85 | 14.3 | CGCTC (17%); CGCGG (11%); CACTG (11%) |
| CAGCT | 5 | 142 | 3.2 | AGCTA (20%); AACTG (10%); AGCGG (10%); GACTG (10%) |
| CAGGA | 52 | 156 | 25.0 | ACCTG (15%); GCCTG (12%); TCCTT (9%) |
| CAGGC | 0 | 94 | 0.0 | GCCCG (15%); ACCTG (10%); GCTTG (10%); GCCTT (10%) |
| CAGGG | 9 | 161 | 5.6 | CCCTC (18%); CCCAG (9%); ACCTG (9%); CCCCG (9%) |
| CAGGT | 28 | 90 | 24.0 | ACCCG (16%); ACCGG (11%); ACCAG (11%) |
| CAGTA | 14 | 113 | 11.1 | CACTG (17%); AACTG (17%); TACTA (12%) |
| CAGTC | 5 | 128 | 3.6 | GACTC (22%); CACTG (11%); GAGTG (11%); GACAG (11%) |
| CAGTG | 5 | 118 | 3.8 | AACTG (12%); CACTA (12%); CACGG (12%); CAATG (12%) |
| CAGTT | 14 | 132 | 9.7 | AACAG (18%); AACCG (14%); CACTG (11%) |
| CATAA | 33 | 47 | 41.2 | ATATG (30%); ACATG (10%); TTAGG (10%) |
| CATAC | 9 | 71 | 11.8 | GAATG (13%); GGATG (13%); GCATG (13%) |
| CATAG | 14 | 99 | 12.5 | CTACG (19%); CGATG (14%); CTATC (14%) |
| CATAT | 28 | 109 | 20.7 | ACATG (13%); ATATT (13%); AAATG (13%) |
| CATCA | 5 | 57 | 7.7 | CGATG (25%); TGATA (17%); TCATG (17%); TTATG (8%) |
| CATCC | 5 | 85 | 5.3 | GGAAG (22%); GAATG (17%); GGATC (17%); AGATG (11%) |
| CATCG | 5 | 94 | 4.8 | CGATC (20%); CGATA (20%); CGAAG (15%); CGATT (15%) |
| CATCT | 5 | 80 | 5.6 | AGATA (29%); AGATC (12%); AAATG (12%); AGAGG (6%) |
| CATGA | 14 | 118 | 10.7 | ACATG (20%); TCACG (20%); CCATG (12%) |
| CATGC | 5 | 118 | 3.8 | ACATG (16%); GCAAG (12%); GCACG (12%); GCATA (12%) |
| CATGG | 14 | 109 | 11.5 | ACATG (26%); CCATA (17%); CCAAG (9%) |
| CATGT | 14 | 71 | 16.7 | ACATA (13%); ACAAG (13%); GCATG (13%) |
| CATTA | 9 | 90 | 9.5 | TAAAG (21%); GAATG (16%); AAATG (16%); CATTA (11%) |
| CATTC | 9 | 113 | 7.7 | GAAAG (21%); GAATC (21%); GAATA (21%) |
| CATTG | 33 | 94 | 25.9 | CAAAG (20%); CAACG (15%); CAATA (15%) |
| CATTT | 24 | 85 | 21.7 | AAAAG (17%); AAACG (11%); AAAGG (11%) |
| CCAAA | 5 | 57 | 7.7 | TTAGG (17%); CTTGG (17%); TATGG (17%); TGTGG (8%) |
| CCAAC | 9 | 43 | 18.2 | ATTGG (22%); GCTGG (22%); GTTGT (11%) |
| CCAAG | 19 | 151 | 11.1 | CTTGA (16%); CGTGG (9%); CTGGG (9%) |
| CCAAT | 0 | 99 | 0.0 | ATAGG (19%); AATGG (14%); ATTAG (10%); ATTTG (10%) |
| CCACA | 14 | 66 | 17.6 | CGTGG (21%); TGGGG (21%); TGCGG (14%) |
| CCACC | 9 | 61 | 13.3 | GGTGC (15%); TGTGG (8%); AGTGG (8%) |
| CCACG | 0 | 118 | 0.0 | CGAGG (24%); CTTGG (16%); AGTGG (8%); CGTGA (8%) |
| CCACT | 5 | 90 | 5.0 | AGTGA (21%); AGTTG (16%); AGTAG (16%); AATGG (11%) |
| CCAGA | 38 | 123 | 23.5 | GCTGG (12%); ACTGG (12%); TCTGC (12%) |
| CCAGC | 14 | 109 | 11.5 | GCTAG (17%); ACTGG (13%); GCCGG (13%) |
| CCAGG | 19 | 137 | 12.1 | CCTAG (14%); CCGGG (14%); CCAGG (14%) |
| CCAGT | 5 | 38 | 11.1 | ACAGG (25%); ACTGA (25%); GTTGG (12%); ATTGG (12%) |
| CCATA | 14 | 57 | 20.0 | CATGG (33%); AATGG (17%); TGTGG (8%) |
| CCATC | 9 | 123 | 7.1 | GTTGG (12%); TATGG (12%); AATGG (12%); GAAGG (12%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %¹ | Mismatch Overhangs² |
|---|---|---|---|---|
| CCATG | 14 | 99 | 12.5 | CAAGG (24%); CATGA (14%); CACGG (14%) |
| CCATT | 14 | 137 | 9.4 | AATGA (14%); AAGGG (10%); AATAG (10%) |
| CCCAA | 9 | 123 | 7.1 | TCGGG (15%); CTGGG (15%); ATGGG (12%); GTGGG (12%) |
| CCCAC | 9 | 38 | 20.0 | GTTGG (12%); GCGGG (12%); GTGTG (12%) |
| CCCAG | 5 | 113 | 4.0 | CAGGG (12%); CCGGG (12%); CGGGG (12%); CTGAG (8%) |
| CCCAT | 0 | 52 | 0.0 | ACGGG (18%); ATGGA (18%); GTGGG (9%); AGGGG (9%) |
| CCCCA | 19 | 99 | 16.0 | CGGGG (33%); AGGGG (14%); TCGGG (14%) |
| CCCCC | 0 | 99 | 0.0 | AGGGG (19%); CGGGG (14%); GGGGA (14%); GGGGC (10%) |
| CCCCG | 0 | 80 | 0.0 | CGGAG (24%); CAGGG (18%); CGAGG (18%); CGGGC (12%) |
| CCCCT | 9 | 85 | 10.0 | AGGGA (17%); AGGGT (11%); AGGAG (11%) |
| CCCGA | 14 | 57 | 20.0 | GCGGG (17%); CAGGG (17%); CCGGG (17%) |
| CCCGC | 5 | 66 | 6.7 | GGGGG (14%); GCAGG (14%); GTGGG (7%); GCGGA (7%) |
| CCCGG | 14 | 85 | 14.3 | CCCGG (11%); CCGGC (11%); GCGGG (11%) |
| CCCGT | 5 | 38 | 11.1 | AGGGG (12%); ACAGG (12%); AGGGA (12%) |
| CCCTA | 0 | 66 | 0.0 | AAGGG (29%); TCGGG (14%); ATGGG (7%); ACGGG (7%) |
| CCCTC | 19 | 123 | 13.3 | CAGGG (23%); GAAGG (19%); GAGGC (15%) |
| CCCTG | 9 | 24 | 28.6 | AAGGG (40%); TAGGG (20%); CAAGG (20%) |
| CCCTT | 24 | 24 | 50.0 | TAGGG (40%); CAGGG (40%); GAGGG (20%) |
| CCGAA | 5 | 123 | 3.7 | TTCGA (19%); TTCAG (12%); TTAGG (12%); CTCGG (12%) |
| CCGAC | 14 | 99 | 12.5 | GCCGG (14%); GACGG (10%); GTAGG (10%) |
| CCGAG | 0 | 109 | 0.0 | CTCCG (17%); CACGG (17%); CTCAG (13%); ATCGG (9%) |
| CCGAT | 9 | 146 | 6.1 | ACCGG (19%); ATCGA (13%); AACGG (13%) |
| CCGCA | 9 | 76 | 11.1 | TGCAG (25%); TGTGG (12%); TGCGA (12%) |
| CCGCC | 9 | 128 | 6.9 | AGCGG (11%); GGCGA (11%); GACGG (11%); GGCAG (11%) |
| CCGCG | 9 | 161 | 5.6 | CGCCG (15%); CGCGA (12%); CGTGG (9%); CACGG (9%) |
| CCGCT | 0 | 128 | 0.0 | AACGG (19%); AGTGG (11%); AGCAG (11%); AGAGG (7%) |
| CCGGA | 19 | 156 | 10.8 | ACCGG (21%); TCTGG (9%); TACGG (9%) |
| CCGGC | 14 | 161 | 8.1 | GCCGA (12%); ACCGG (9%); GCAGG (9%) |
| CCGGG | 14 | 109 | 11.5 | CCAGG (17%); CCCAG (13%); CCCGA (9%) |
| CCGGT | 19 | 61 | 23.5 | ACCTG (15%); CCCGG (8%); ACCGT (8%) |
| CCGTA | 9 | 80 | 10.5 | AACGG (24%); TAAGG (12%); CACGG (12%) |
| CCGTC | 33 | 113 | 22.6 | GACAG (17%); GACGT (12%); GACGA (12%) |
| CCGTG | 14 | 90 | 13.6 | CACAG (16%); CACTG (16%); CACGA (16%) |
| CCGTT | 0 | 61 | 0.0 | AACGT (31%); ACCGG (15%); AAAGG (15%); GACCG (8%) |
| CCTAA | 5 | 66 | 6.7 | TAAGG (29%); TTAGA (21%); TCAGG (14%); TGAGG (14%) |
| CCTAC | 0 | 61 | 0.0 | ATAGG (23%); CTAGG (15%); GTAGT (15%); TGAGG (8%) |
| CCTAG | 28 | 146 | 16.2 | CAAGG (19%); CCAGG (13%); CTACG (10%) |
| CCTAT | 14 | 71 | 16.7 | ACAGG (27%); ATTGG (13%); TTAGG (13%) |
| CCTCA | 24 | 128 | 15.6 | AGAGG (19%); TGAAG (11%); TGATG (11%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| CCTCC | 9 | 128 | 6.9 | GGATG (15%); GCAGG (11%); AGAGG (7%); GGAGA (7%) |
| CCTCG | 5 | 161 | 2.9 | CAAGG (15%); CGACG (12%); AGAGG (9%); CGAGA (9%) |
| CCTCT | 14 | 52 | 21.4 | AGGGG (18%); AGAGA (18%); AAAGG (18%) |
| CCTGA | 5 | 61 | 7.1 | GCAGG (15%); TCATG (15%); TCTGG (8%) |
| CCTGC | 5 | 94 | 4.8 | ACAGG (20%); GCAAG (10%); TCAGG (10%); GCGAG (10%) |
| CCTGG | 19 | 47 | 28.6 | CCTGG (20%); CAAGG (20%); CCAGA (20%) |
| CCTGT | 5 | 24 | 16.7 | AGAGG (40%); AAAGG (20%); TCAGG (20%) |
| CCTTA | 28 | 57 | 33.3 | TCAGG (25%); AAAGG (25%); TGAGG (8%) |
| CCTTC | 9 | 61 | 13.3 | CAAGG (31%); GATGG (15%); AAAGG (15%) |
| CCTTG | 24 | 94 | 20.0 | CAAGA (20%); CCAGG (10%); GAAGG (10%) |
| CCTTT | 43 | 76 | 36.0 | AGAGG (25%); AAGGG (19%); ACAGG (12%) |
| CGAAA | 28 | 99 | 22.2 | TTTTG (14%); ATTCG (14%); TTACG (14%) |
| CGAAC | 0 | 76 | 0.0 | GCTCG (19%); GTACG (19%); GTTCA (12%); GATCG (12%) |
| CGAAG | 0 | 104 | 0.0 | CTTCA (18%); CTACG (14%); CTCCG (14%); CCTCG (14%) |
| CGAAT | 14 | 128 | 10.0 | ATCCG (15%); AATCG (15%); CTTCG (11%) |
| CGACA | 9 | 109 | 8.0 | TGTCA (26%); CGTCG (17%); AGTCG (17%); TGCCG (9%) |
| CGACC | 5 | 113 | 4.0 | GTTCG (21%); CGTCG (12%); GGACG (12%); GGCCG (8%) |
| CGACG | 5 | 161 | 2.9 | CGACG (35%); CCTCG (12%); CGTCA (6%); CGAGG (6%) |
| CGACT | 19 | 109 | 14.8 | AGCCG (17%); AGTCC (17%); AGACG (13%) |
| CGAGA | 9 | 161 | 5.6 | ACTCG (21%); TCTAG (12%); TCGCG (9%); TCACG (9%) |
| CGAGC | 9 | 128 | 6.9 | GCTCA (19%); ACTCG (19%); GCACG (15%); GCTTG (7%) |
| CGAGG | 5 | 123 | 3.7 | CCACG (23%); CCTCA (12%); CCCCG (12%); CCTCC (8%) |
| CGAGT | 24 | 71 | 25.0 | ACACG (20%); ACTCT (13%); AATCG (13%) |
| CGATA | 28 | 109 | 20.7 | AATCG (17%); CATCG (17%); TTTCG (17%) |
| CGATC | 0 | 175 | 0.0 | AATCG (14%); GATCC (11%); GAACG (11%); CATCG (11%) |
| CGATG | 5 | 118 | 3.8 | CAACG (12%); CATAG (12%); CATCA (12%); CACCG (12%) |
| CGATT | 5 | 113 | 4.0 | AAACG (12%); ACTCG (12%); AATAG (12%); CATCG (12%) |
| CGCAA | 5 | 109 | 4.2 | CTGCG (17%); TCGCG (13%); TTGCA (13%); ATGCG (9%) |
| CGCAC | 0 | 43 | 0.0 | GCGCG (22%); CTGCG (22%); GGGTG (11%); GTACG (11%) |
| CGCAG | 0 | 47 | 0.0 | CTACG (20%); CTGCA (20%); CTGCT (10%); GTGCG (10%) |
| CGCAT | 9 | 61 | 13.3 | ATGCA (23%); ACGCG (15%); ATACG (15%) |
| CGCCA | 5 | 118 | 3.8 | CGGCG (28%); AGGCG (12%); TAGCG (8%); TGGCT (8%) |
| CGCCC | 5 | 90 | 5.0 | GGCCG (16%); GAGCG (11%); CGGCG (11%); GGGCA (11%) |
| CGCCG | 0 | 90 | 0.0 | CCGCG (26%); CGGCA (16%); CGGCC (11%); CAGCG (11%) |
| CGCCT | 14 | 85 | 14.3 | AGACG (17%); ACGCG (11%); AGGCA (11%) |
| CGCGA | 14 | 94 | 13.0 | TAGCG (20%); CCGCG (20%); GAGCG (10%) |
| CGCGC | 5 | 90 | 5.0 | TCGCG (11%); GCGCC (11%); GCCCG (11%); GCGCT (11%) |
| CGCGG | 9 | 52 | 15.4 | CAGCG (18%); CCACG (9%); TCGCG (9%) |
| CGCGT | 5 | 28 | 14.3 | ACGAG (17%); ACACG (17%); ATGCG (17%); ACGGG (17%) |
| CGCTA | 14 | 52 | 21.4 | TAGCA (18%); TTGCG (18%); AAGCG (18%) |
| CGCTC | 9 | 90 | 9.5 | AAGCG (21%); CAGCG (16%); GAGCA (16%); GAGAG (16%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| CGCTG | 14 | 76 | 15.8 | CAGCA (19%); CAACG (12%); AAGCG (12%) |
| CGCTT | 5 | 61 | 7.1 | AAACG (38%); AATCG (15%); GAGCG (8%); TCGCG (8%) |
| CGGAA | 14 | 137 | 9.4 | TCCCG (21%); ATCCG (14%); TTCCA (10%); TTCTG (10%) |
| CGGAC | 5 | 109 | 4.2 | ATCCG (22%); GGACG (13%); GACCG (9%); TTCCG (9%) |
| CGGAG | 19 | 80 | 19.0 | CCCCG (24%); TTCCG (12%); CTACG (12%) |
| CGGAT | 9 | 90 | 9.5 | ATCAG (16%); AACCG (16%); ATACG (11%); ATCCA (11%) |
| CGGCA | 19 | 137 | 12.1 | TGCGG (10%); GGCCG (10%); TACCG (10%) |
| CGGCC | 24 | 156 | 13.2 | GGCCA (27%); GTGCG (6%); AGCCG (6%) |
| CGGCG | 0 | 128 | 0.0 | CGCCA (26%); CACCG (15%); CGTTG (7%); CGCCC (7%) |
| CGGCT | 9 | 113 | 7.7 | AGCCC (17%); GGCCG (12%); AGCCA (12%); AACCG (12%) |
| CGGGA | 5 | 109 | 4.2 | TACCG (17%); ACCCG (17%); TCCGG (13%); TGCCG (9%) |
| CGGGC | 9 | 165 | 5.4 | ACCCG (17%); GACCG (11%); GCCGG (9%); GCGCG (6%) |
| CGGGG | 0 | 137 | 0.0 | CCCCA (24%); CCCAG (10%); CCCCC (10%); ACCCG (7%) |
| CGGGT | 9 | 128 | 6.9 | TCCCG (11%); GCCCG (11%); GGCCG (7%); ACCCC (7%) |
| CGGTA | 14 | 123 | 10.3 | CACCG (19%); GACCG (12%); TCCCG (12%) |
| CGGTC | 14 | 128 | 10.0 | GACCA (15%); TACCG (11%); GACCC (11%) |
| CGGTG | 5 | 90 | 5.0 | CACCC (16%); ACCCG (16%); AACCG (16%); CACAG (11%) |
| CGGTT | 0 | 94 | 0.0 | AACAG (15%); AACCC (15%); AAACG (10%); ACCCG (10%) |
| CGTAA | 19 | 71 | 21.1 | TAACG (20%); TCACG (13%); TTATG (7%) |
| CGTAC | 5 | 61 | 7.1 | GCACG (23%); GTCCG (23%); GAACG (15%); ATACG (15%) |
| CGTAG | 9 | 33 | 22.2 | CTCAG (14%); CGGCG (14%); CTACT (14%) |
| CGTAT | 38 | 80 | 32.0 | AAACG (24%); ATACA (12%); ACACG (12%) |
| CGTCA | 0 | 109 | 0.0 | AGACG (17%); TGACA (13%); TAACG (13%); TCACG (9%) |
| CGTCC | 9 | 90 | 9.5 | GGACC (21%); TGACG (16%); GGCCG (11%); GGACA (11%) |
| CGTCG | 5 | 104 | 4.3 | CTACG (18%); CGACA (18%); CGACC (14%); CGAAG (9%) |
| CGTCT | 14 | 66 | 17.6 | AGAAG (21%); ACACG (14%); AGAGG (7%) |
| CGTGA | 19 | 61 | 23.5 | ACACG (23%); CCACG (15%); TCAGG (15%) |
| CGTGC | 9 | 94 | 9.1 | GGACG (15%); ACACG (15%); GAACG (10%) |
| CGTGG | 0 | 94 | 0.0 | CCACA (15%); CCAAG (15%); CCGCG (15%); GCACG (10%) |
| CGTGT | 24 | 47 | 33.3 | CCACG (20%); ACATG (10%); ACACA (10%) |
| CGTTA | 5 | 76 | 5.9 | AAACG (25%); TCACG (12%); CAACG (12%); AGACG (6%) |
| CGTTC | 9 | 85 | 10.0 | TAACG (17%); GACCG (11%); GAGCG (11%); CAACG (11%) |
| CGTTG | 14 | 61 | 18.8 | CAACA (15%); CAACT (15%); CGGCG (15%) |
| CGTTT | 0 | 71 | 0.0 | AAAAG (13%); CAACG (13%); GAACG (13%); TAACG (13%) |
| CTAAA | 28 | 52 | 35.3 | TTCAG (18%); TTTAA (18%); TTTCG (18%) |
| CTAAC | 5 | 71 | 6.3 | GATAG (20%); GTAAG (13%); GCAAG (7%); ATTAG (7%) |
| CTAAG | 9 | 61 | 13.3 | CTAAG (15%); CTCAG (15%); CATAG (15%) |
| CTAAT | 38 | 47 | 44.4 | ACTAG (30%); AATAG (30%); ATTTG (10%) |
| CTACA | 19 | 76 | 20.0 | AGTAG (25%); TGCAG (12%); TGTTG (12%) |
| CTACC | 9 | 80 | 10.5 | GGTCG (18%); GGAAG (12%); GGTAA (12%) |
| CTACG | 9 | 137 | 6.5 | CATAG (14%); CGTCG (14%); CCTAG (10%); CGAAG (10%) |
| CTACT | 14 | 94 | 13.0 | AGAAG (20%); TGTAG (20%); AGTAA (15%) |
| CTAGA | 24 | 104 | 18.5 | ACTAG (27%); TCTAA (14%); TCTGG (9%) |
| CTAGC | 5 | 76 | 5.9 | GCGAG (19%); GCAAG (12%); ACTAG (12%); GCCAG (12%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| CTAGG | 28 | 90 | 24.0 | CCAAG (16%); CCTCG (11%); CCTAC (11%) |
| CTAGT | 28 | 118 | 19.4 | GCTAG (12%); ACTGG (12%); AATAG (12%) |
| CTATA | 28 | 33 | 46.2 | TATTG (43%); CATAG (14%); TAGAG (14%) |
| CTATC | 14 | 118 | 10.7 | GAAAG (20%); AATAG (16%); GATAA (16%) |
| CTATG | 14 | 76 | 15.8 | CAAAG (19%); CATCG (12%); CTTAG (12%) |
| CTATT | 19 | 90 | 17.4 | AAAAG (21%); AACAG (16%); AATAA (16%) |
| CTCAA | 24 | 85 | 21.7 | CTGAG (17%); ATGAG (17%); TTGAC (11%) |
| CTCAC | 5 | 90 | 5.0 | GCGAG (26%); GAGAG (11%); GTAAG (11%); GTGGG (5%) |
| CTCAG | 5 | 94 | 4.8 | CCGAG (15%); CGGAG (10%); CTAAG (10%); CAGAG (10%) |
| CTCAT | 9 | 94 | 9.1 | AGGAG (20%); ATAAG (15%); TTGAG (15%); AAGAG (10%) |
| CTCCA | 5 | 80 | 5.6 | TGTAG (12%); TGAAG (12%); AGGAG (12%); GGGAG (12%) |
| CTCCC | 14 | 47 | 23.1 | GGGAT (20%); TGGAG (20%); GGGCG (20%) |
| CTCCG | 19 | 80 | 19.0 | CCGAG (24%); CGAAG (18%); CAGAG (18%) |
| CTCCT | 0 | 76 | 0.0 | CGGAG (12%); ACGAG (12%); ATGAG (12%); AGGAA (12%) |
| CTCGA | 24 | 80 | 22.7 | TCAAG (18%); TCCAG (12%); CCGAG (12%) |
| CTCGC | 5 | 99 | 4.5 | GCAAG (14%); GCGAA (14%); ACGAG (14%); GCCAG (14%) |
| CTCGG | 0 | 128 | 0.0 | CAGAG (15%); ACGAG (15%); CCGAA (11%); CCTAG (7%) |
| CTCGT | 9 | 66 | 12.5 | ACAAG (21%); AAGAG (14%); GCGCG (7%) |
| CTCTA | 9 | 71 | 11.8 | CAGAG (33%); AAGAG (13%); TTGAG (13%) |
| CTCTC | 9 | 94 | 9.1 | CAGAG (15%); GAAAG (10%); GATAG (10%); AAGAG (10%) |
| CTCTG | 24 | 80 | 22.7 | CAGAA (18%); TAGAG (12%); CTGAG (6%) |
| CTCTT | 33 | 99 | 25.0 | TAGAG (19%); AAGCG (14%); AGGAG (14%) |
| CTGAA | 33 | 71 | 31.8 | TCCAG (27%); TTCTG (20%); TTTAG (13%) |
| CTGAC | 5 | 99 | 4.5 | GACAG (24%); GTCAA (14%); ATCAG (10%); GTTGG (10%) |
| CTGAG | 5 | 90 | 5.0 | CTCAA (16%); CTGAG (11%); ATCAG (11%); TTCAG (11%) |
| CTGAT | 14 | 90 | 13.6 | TTCAG (16%); AGCAG (16%); ACCAG (16%) |
| CTGCA | 9 | 113 | 7.7 | AGCAG (17%); TACAG (17%); TTCAG (8%); GGCAG (8%) |
| CTGCC | 0 | 104 | 0.0 | GGCCG (18%); GGCAA (18%); GGCAC (14%); TGCAG (9%) |
| CTGCG | 0 | 99 | 0.0 | CGCAA (19%); CACAG (10%); CGCAC (10%); CGCTG (10%) |
| CTGCT | 0 | 123 | 0.0 | AACAG (15%); AGCAA (12%); AGAAG (12%); ACCAG (12%) |
| CTGGA | 33 | 99 | 25.0 | TCCTG (10%); TCCGG (10%); TACAG (10%) |
| CTGGC | 5 | 113 | 4.0 | GACAG (21%); GCTAG (12%); ACCAG (12%); GGCAG (8%) |
| CTGGG | 5 | 104 | 4.3 | CCCAA (18%); CCAAG (14%); CACAG (9%); CCCGG (9%) |
| CTGGT | 14 | 71 | 16.7 | ATCAG (13%); ACCTG (13%); ACTAG (13%) |
| CTGTA | 14 | 52 | 21.4 | CACAG (18%); AACAG (18%); TCCAG (18%) |
| CTGTC | 19 | 90 | 17.4 | GACGG (11%); GACTG (11%); GGCAG (11%) |
| CTGTG | 19 | 71 | 21.1 | AACAG (13%); CACAT (13%); CCTAG (7%) |
| CTGTT | 19 | 104 | 15.4 | AACCG (14%); GACAG (14%); AACTG (9%) |
| CTTAA | 24 | 66 | 26.3 | ATAAG (14%); TCAAG (14%); TTAAT (7%) |
| CTTAC | 9 | 71 | 11.8 | GAAAG (33%); GTTAG (13%); ATAAG (13%) |
| CTTAG | 9 | 66 | 12.5 | CAAAG (21%); CTATG (14%); ATAAG (14%) |
| CTTAT | 19 | 66 | 22.2 | AAAAG (21%); CTAAG (14%); ATGAG (14%) |
| CTTCA | 28 | 80 | 26.1 | CGAAG (24%); AGAAG (18%); TGAAA (12%) |
| CTTCC | 9 | 113 | 7.7 | AGAAG (29%); GGAAA (25%); GAAAG (12%); GGAAC (8%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %¹ | Mismatch Overhangs² |
|---|---|---|---|---|
| CTTCG | 0 | 118 | 0.0 | CAAAG (24%); AGAAG (12%); CGAAT (12%); CCAAG (8%) |
| CTTCT | 24 | 80 | 22.7 | AGAAA (18%); AGAAT (18%); AGACG (12%) |
| CTTGA | 9 | 99 | 8.7 | CCAAG (24%); TCGAG (14%); ACAAG (14%); TCAGG (10%) |
| CTTGC | 19 | 71 | 21.1 | ACAAG (20%); GCTAG (13%); GCAAT (13%) |
| CTTGG | 19 | 80 | 19.0 | CCACG (24%); CCCAG (12%); ACAAG (12%) |
| CTTGT | 19 | 76 | 20.0 | ACACG (25%); CCAAG (19%); ACATG (12%) |
| CTTTA | 33 | 66 | 33.3 | CAAAG (29%); GAAAG (29%); AAAAG (14%) |
| CTTTC | 19 | 99 | 16.0 | AAAAG (19%); GAACG (14%); GAAAA (10%) |
| CTTTG | 9 | 94 | 9.1 | CCAAG (15%); CACAG (10%); CAAAA (10%); CAGAG (10%) |
| CTTTT | 38 | 80 | 32.0 | AAGAG (24%); ATAAG (12%); AAAAA (12%) |
| GAAAA | 28 | 71 | 28.6 | TCTTC (20%); TTTTA (13%); TATTC (13%) |
| GAAAC | 19 | 170 | 10.0 | GTTAC (14%); GTCTC (11%); GTGTC (11%) |
| GAAAG | 19 | 142 | 11.8 | CATTC (17%); CTTAC (17%); CTATC (17%) |
| GAAAT | 0 | 61 | 0.0 | AATTC (15%); GTTTC (15%); GTTTT (8%); ACTTC (8%) |
| GAACA | 28 | 137 | 17.1 | AGTTC (17%); TGCTC (17%); TGATC (10%) |
| GAACC | 9 | 94 | 9.1 | TGTTC (10%); GGATC (10%); GGTCC (10%) |
| GAACG | 9 | 128 | 6.9 | CGATC (15%); CTTTC (11%); CGTGC (7%) |
| GAACT | 5 | 123 | 3.7 | AGGTC (12%); AGATC (12%); AGTAC (12%); GGTTA (8%) |
| GAAGA | 19 | 109 | 14.8 | ACTTC (22%); TCATC (13%); TCTTT (13%) |
| GAAGC | 9 | 142 | 6.3 | GCTAC (17%); GCTCC (13%); ACTTC (13%); GCCTC (10%) |
| GAAGG | 9 | 99 | 8.7 | CCCTC (24%); CCATC (14%); CCTCC (10%); CCTTG (10%) |
| GAAGT | 5 | 90 | 5.0 | ACTTA (16%); ACTCC (16%); ACGTC (11%); TCTTC (11%) |
| GAATA | 28 | 94 | 23.1 | CATTC (25%); TAATC (15%); TTTTC (10%) |
| GAATC | 14 | 161 | 8.1 | CATTC (15%); GTTTC (15%); GGTTC (12%); AATTC (12%) |
| GAATG | 9 | 104 | 8.3 | CATCC (14%); CAATC (14%); CATTA (14%); CACTC (14%) |
| GAATT | 28 | 61 | 31.6 | AATAC (23%); ATTTC (15%); AAGTC (15%) |
| GACAA | 24 | 118 | 16.7 | TAGTC (28%); TCGTC (12%); ATGTC (12%) |
| GACAC | 14 | 94 | 13.0 | GTGAC (15%); ATGTC (10%); GTATC (10%) |
| GACAG | 19 | 170 | 10.0 | CTGGC (14%); CTGAC (14%); CCGTC (11%) |
| GACAT | 9 | 94 | 9.1 | AGGTC (20%); CTGTC (10%); ACGTC (10%) |
| GACCA | 9 | 128 | 6.9 | CGGTC (15%); AGGTC (11%); TGGAC (11%); GGGTC (11%) |
| GACCC | 5 | 61 | 7.1 | CGGTC (23%); GAGTC (23%); AGGTC (15%); GGGGC (8%) |
| GACCG | 14 | 132 | 9.7 | CGGGC (14%); CGATC (11%); CGGTA (11%) |
| GACCT | 9 | 109 | 8.0 | TGGTC (9%); AGATC (9%); AGGGC (9%) |
| GACGA | 14 | 123 | 10.3 | TCGAC (15%); TCATC (12%); CCGTC (12%) |
| GACGC | 0 | 24 | 0.0 | GTGTC (20%); AGGTC (20%); CCGTC (20%); AAGTC (20%) |
| GACGG | 33 | 113 | 22.6 | CCGCC (12%); CCGCT (8%); ACGGC (8%) |
| GACGT | 0 | 94 | 0.0 | ACGAC (15%); ACGTG (15%); CCGTC (15%); ACGCC (10%) |
| GACTA | 28 | 76 | 27.3 | TTGTC (19%); AAGTC (19%); TGGTC (12%) |
| GACTC | 14 | 128 | 10.0 | CAGTC (22%); GAGCC (19%); GAGAC (11%) |
| GACTG | 5 | 113 | 4.0 | CAGCT (12%); CAGTA (8%); CTGTT (8%); CCGTC (8%) |
| GACTT | 5 | 76 | 5.9 | AAGAC (12%); AAGTA (12%); GAGTC (12%); TTGTC (6%) |
| GAGAA | 9 | 170 | 5.3 | TTCAC (14%); TTCGC (11%); TTCTT (11%); TACTC (8%) |
| GAGAC | 14 | 109 | 11.5 | GGCTC (13%); ATCTC (13%); GTCTT (13%) |
| GAGAG | 9 | 104 | 8.3 | CGCTC (14%); CCCTC (9%); CTGTC (9%) |
| GAGAT | 5 | 33 | 12.5 | ATCTT (14%); ATCGG (14%); AGCTC (14%) |
| GAGCA | 5 | 80 | 5.6 | CGCTC (18%); AGCTC (18%); TGCCC (12%); TACTC (12%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| GAGCC | 0 | 137 | 0.0 | GACTC (17%); AGCTC (14%); GGCTA (10%); GTCTC (7%) |
| GAGCG | 9 | 90 | 9.5 | CGTTC (11%); CGGTC (11%); CGCGA (11%) |
| GAGCT | 0 | 80 | 0.0 | AGCAC (24%); AGATC (18%); AGTTC (12%); AGCTA (6%) |
| GAGGA | 5 | 113 | 4.0 | ACCTC (21%); TCCAC (17%); TCTTC (8%); TTCTC (8%) |
| GAGGC | 5 | 113 | 4.0 | CCCTC (17%); GCCTA (12%); GTCTC (12%); GCATC (8%) |
| GAGGG | 19 | 57 | 25.0 | CCCGA (17%); CCCAA (8%); CCTCC (8%) |
| GAGGT | 14 | 66 | 17.6 | AACTC (14%); ACATC (14%); ACCTT (14%) |
| GAGTA | 14 | 71 | 16.7 | TCCTC (20%); TACAC (20%); CACTC (13%) |
| GAGTC | 14 | 57 | 20.0 | GACCC (25%); GCCTC (25%); GACTT (17%) |
| GAGTG | 14 | 113 | 11.1 | AACTC (12%); CACCC (12%); CAGTC (12%) |
| GAGTT | 9 | 43 | 18.2 | AACTA (22%); GACTC (22%); ATCTC (11%) |
| GATAA | 38 | 109 | 25.8 | CTATC (17%); ATATC (17%); TAATC (9%) |
| GATAC | 14 | 109 | 11.5 | GCATC (13%); GAATC (13%); GTATA (9%) |
| GATAG | 14 | 85 | 14.3 | CTAAC (17%); ATATC (17%); CTCTC (11%) |
| GATAT | 14 | 57 | 20.0 | AGATC (25%); ACATC (17%); ATGTC (17%) |
| GATCA | 14 | 123 | 10.3 | CGATC (12%); TGATA (12%); AGATC (12%) |
| GATCC | 24 | 123 | 16.1 | AGATC (23%); CGATC (15%); GGCTC (8%) |
| GATCG | 0 | 99 | 0.0 | AGATC (19%); CGACC (10%); CGAAC (10%); CGAGC (10%) |
| GATCT | 19 | 76 | 20.0 | AGTTC (12%); AGAAC (12%); AGGTC (6%) |
| GATGA | 14 | 90 | 13.6 | ACATC (21%); TCATA (11%); TCATT (11%) |
| GATGC | 5 | 85 | 5.3 | GCATA (22%); GCAAC (17%); CCATC (11%); GAATC (11%) |
| GATGG | 9 | 80 | 10.5 | CGATC (18%); CCTTC (12%); CCATT (12%) |
| GATGT | 5 | 71 | 6.3 | ACATA (13%); CCATC (13%); ACACC (13%); ACAAC (7%) |
| GATTA | 14 | 71 | 16.7 | AAATC (33%); TAAGC (27%); TAACC (13%) |
| GATTC | 14 | 57 | 20.0 | GAAGC (25%); TAATC (8%); GAAAC (8%) |
| GATTG | 5 | 52 | 8.3 | AAATC (18%); CAAAC (18%); TAATC (9%); CAATT (9%) |
| GATTT | 14 | 80 | 15.0 | AAAAC (12%); AAACC (12%); GAATC (12%) |
| GCAAA | 14 | 52 | 21.4 | ATTGC (18%); TTTGA (18%); TTCGC (18%) |
| GCAAC | 0 | 109 | 0.0 | GTAGC (17%); ATTGC (13%); GATGC (13%); GTCGC (9%) |
| GCAAG | 19 | 85 | 18.2 | CATGC (17%); CTCGC (17%); ATTGC (11%) |
| GCAAT | 19 | 85 | 18.2 | ATAGC (11%); CTTGC (11%); ATCGC (11%) |
| GCACA | 9 | 94 | 9.1 | TGAGC (10%); TGTAC (10%); TGTGA (10%); TATGC (10%) |
| GCACC | 5 | 90 | 5.0 | GGCGC (11%); GGAGC (11%); GGTGA (11%); TGTGC (11%) |
| GCACG | 9 | 146 | 6.1 | CGAGC (13%); AGTGC (10%); CATGC (10%); CGTAC (10%) |
| GCACT | 19 | 76 | 20.0 | AGTGT (12%); AGTGA (12%); AGTAC (12%) |
| GCAGA | 33 | 128 | 20.6 | ACTGC (15%); TCTGG (15%); TCGGC (7%) |
| GCAGC | 0 | 104 | 0.0 | GCTAC (9%); GCTGA (9%); GCTTC (9%); ACTGC (5%) |
| GCAGG | 5 | 146 | 3.1 | CCTCC (10%); CCGGC (10%); ACTGC (6%); CCCGC (6%) |
| GCAGT | 5 | 71 | 6.3 | ACCGC (13%); ACTGT (13%); ACTTC (7%) |
| GCATA | 28 | 94 | 23.1 | GATGC (20%); TATGA (20%); CATGC (15%) |
| GCATC | 5 | 99 | 4.5 | GATAC (14%); AATGC (14%); GATCC (10%); TATGC (10%) |
| GCATG | 5 | 80 | 5.6 | CATGT (12%); CATAC (12%); CCTGC (12%); AATGC (12%) |
| GCATT | 5 | 71 | 6.3 | AATGA (20%); CATGC (13%); TATGC (13%); ACTGC (7%) |
| GCCAA | 5 | 109 | 4.2 | TCGGC (22%); TTGGA (13%); TTGAC (13%); TGGGC (9%) |
| GCCAC | 5 | 94 | 4.8 | GTAGC (15%); ATGGC (10%); GAGGC (10%); GGGGC (10%) |
| GCCAG | 5 | 146 | 3.1 | CTCGC (10%); ATGGC (6%); CTGGG (6%); CTAGC (6%) |
| GCCAT | 9 | 128 | 6.9 | AAGGC (22%); ATAGC (11%); ATGGA (11%); TTGGC (11%) |
| GCCCA | 14 | 76 | 15.8 | TCGGC (12%); TGGTC (12%); TAGGC (12%) |
| GCCCC | 5 | 90 | 5.0 | GGGAC (26%); GGGAA (11%); GCGGC (11%); GAGGC (11%) |
| GCCCG | 9 | 142 | 6.3 | CGGGT (10%); CAGGC (10%); CGGAC (7%) |
| GCCCT | 14 | 109 | 11.5 | AGGAC (13%); AGGTC (9%); AGGGA (9%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| GCCGA | 14 | 137 | 9.4 | ACGGC (21%); CCGGC (14%); TCGTC (10%) |
| GCCGC | 9 | 118 | 7.4 | TCGGC (12%); GCGAC (12%); ACGGC (12%); GCTGC (12%) |
| GCCGG | 14 | 142 | 9.1 | CGGGC (10%); CCAGC (10%); CCGAC (10%) |
| GCCGT | 14 | 76 | 15.8 | ACGGA (12%); ACGTC (12%); AGGGC (12%) |
| GCCTA | 5 | 104 | 4.3 | AAGGC (18%); TCGGC (14%); GAGGC (14%); TAGGT (14%) |
| GCCTC | 5 | 104 | 4.3 | GAAGC (14%); GAGTC (14%); GTGGA (9%); AAGGC (9%) |
| GCCTG | 0 | 90 | 0.0 | CAGGA (21%); CCGGC (11%); CAGGG (11%); CAAGC (11%) |
| GCCTT | 14 | 80 | 15.0 | AAGTC (18%); AAGAC (12%); AAAGC (12%) |
| GCGAA | 5 | 66 | 6.7 | CTCGC (21%); TTCGA (21%); TCCGC (14%); GTTGC (7%) |
| GCGAC | 5 | 66 | 6.7 | GCCGC (21%); GTCGA (7%); GTTGT (7%); GTTGC (7%) |
| GCGAG | 5 | 94 | 4.8 | CTCAC (25%); CTAGC (15%); CCTGC (10%); CTCAT (5%) |
| GCGAT | 5 | 90 | 5.0 | ACCGC (21%); AACGC (16%); ATCGA (16%); ATCGT (11%) |
| GCGCA | 5 | 76 | 5.9 | TGCGG (12%); GGCGC (12%); AGCGT (6%); CGGGC (6%) |
| GCGCC | 5 | 151 | 3.0 | GGCGG (16%); GGAGC (9%); GGCGA (9%); GGCGT (9%) |
| GCGCG | 5 | 123 | 3.7 | CACGC (12%); CGGGC (8%); CGCAC (8%); CGCTC (8%) |
| GCGCT | 14 | 90 | 13.6 | AACGC (11%); CGCGC (11%); AGCGA (11%) |
| GCGGA | 14 | 85 | 14.3 | TCCAC (17%); TCCCC (6%); CCCGC (6%) |
| GCGGC | 9 | 123 | 7.1 | ACCGA (12%); GGCGC (8%); GCCGG (8%); GCCCC (8%) |
| GCGGG | 5 | 109 | 4.2 | TCCGC (13%); CCCGG (9%); CCCGA (9%); CCGGC (9%) |
| GCGGT | 14 | 94 | 13.0 | ACTGC (15%); ACCCC (10%); TCCGC (10%) |
| GCGTA | 9 | 33 | 22.2 | CACGC (29%); TACGA (14%); TACTC (14%) |
| GCGTC | 0 | 43 | 0.0 | GACGA (22%); GACGG (11%); GGCTC (11%); GCCGT (11%) |
| GCGTG | 9 | 57 | 14.3 | CATGA (17%); CGGGC (8%); CACAC (8%) |
| GCGTT | 9 | 66 | 12.5 | AAGGC (14%); AACTC (7%); TAGGC (7%) |
| GCTAA | 9 | 85 | 10.0 | ATAGC (39%); TTAGT (11%); TCAGC (11%) |
| GCTAC | 5 | 99 | 4.5 | GAAGC (24%); GTAGA (10%); GCAGC (10%); GTCGC (10%) |
| GCTAG | 5 | 123 | 3.7 | CCAGC (15%); CTAGT (12%); CTGGC (12%); TTAGC (8%) |
| GCTAT | 14 | 118 | 10.7 | ACAGC (12%); ATGGC (12%); TTAGC (8%) |
| GCTCA | 14 | 94 | 13.0 | CGAGC (25%); TCAGC (15%); AGAGC (15%) |
| GCTCC | 5 | 90 | 5.0 | GAAGC (21%); GGAAC (16%); AGAGC (16%); GGACC (11%) |
| GCTCG | 9 | 90 | 9.5 | CGATC (16%); CGAAC (16%); CCAGC (11%) |
| GCTCT | 0 | 33 | 0.0 | AGAGA (29%); GGAGC (14%); TGAGC (14%); AGCGA (14%) |
| GCTGA | 0 | 61 | 0.0 | GCAGC (15%); TGAGC (15%); TCAGA (15%); TCTGC (8%) |
| GCTGC | 0 | 85 | 0.0 | ACAGC (22%); GCCGC (17%); GCGGC (11%); GCTGC (11%) |
| GCTGG | 14 | 85 | 14.3 | CCAGA (17%); CCAAC (11%); CAAGC (11%) |
| GCTGT | 14 | 80 | 15.0 | ACAAC (12%); ACAGT (12%); AGAGC (12%) |
| GCTTA | 43 | 113 | 27.3 | CAAGC (25%); TAAGA (12%); AAAGC (12%) |
| GCTTC | 9 | 47 | 16.7 | GCAGC (20%); TAAGC (20%); CAAGC (20%) |
| GCTTG | 14 | 94 | 13.0 | CAATC (15%); CAAGA (10%); AAAGC (10%) |
| GCTTT | 0 | 94 | 0.0 | TAAGC (20%); AAAGT (20%); AGAGC (15%); CAAGC (10%) |
| GGAAA | 43 | 132 | 24.3 | CTTCC (21%); TTTCT (14%); ATTCC (11%) |
| GGAAC | 14 | 104 | 12.0 | GTTCA (18%); GTCCC (14%); ATTCC (14%); GCTCC (14%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10$^{-5}$ | Mismatch, ×10$^{-5}$ | Fidelity, %[1] | Mismatch Overhangs[2] |
|---|---|---|---|---|
| GGAAG | 9 | 94 | 9.1 | CATCC (20%); TTTCC (10%); CTTTC (10%); CTACC (10%) |
| GGAAT | 19 | 128 | 12.9 | AATCC (19%); ATTCT (15%); ATACC (15%) |
| GGACA | 38 | 146 | 20.5 | AGTCC (19%); TGACC (13%); TGTTC (10%) |
| GGACC | 5 | 137 | 3.3 | CGTCC (14%); TGTCC (14%); GCTCC (7%); GGGCC (7%) |
| GGACG | 9 | 123 | 7.1 | CGACC (12%); CGGAC (12%); CGTGC (12%); CGGCC (8%) |
| GGACT | 9 | 113 | 7.7 | AGGCC (12%); AGTCT (8%); AGTTC (8%); TGTCC (8%) |
| GGAGA | 9 | 85 | 10.0 | TTTCC (17%); TCACC (17%); CCTCC (11%) |
| GGAGC | 5 | 128 | 3.6 | GCGCC (11%); GCTCA (7%); GCTAC (7%); GCACC (7%) |
| GGAGG | 9 | 90 | 9.5 | CCGAC (11%); CCCCA (5%); CATAC (5%) |
| GGAGT | 9 | 85 | 10.0 | ACCCC (17%); CCTCC (11%); GATCC (11%) |
| GGATA | 14 | 90 | 13.6 | AATCC (26%); TATCA (11%); TAGCC (11%) |
| GGATC | 24 | 80 | 22.7 | CATCC (18%); GCTCC (12%); GAACC (12%) |
| GGATG | 5 | 85 | 5.3 | CCTCC (22%); CAACC (17%); CATAC (11%); AATCC (11%) |
| GGATT | 19 | 80 | 19.0 | AATTC (12%); GATCC (12%); ATTCC (12%) |
| GGCAA | 5 | 151 | 3.0 | TCGCC (19%); CTGCC (12%); TTACC (12%); TTGCA (9%) |
| GGCAC | 5 | 71 | 6.3 | CTGCC (20%); GTCCC (7%); GTGCT (7%); GGCCC (7%) |
| GGCAG | 0 | 118 | 0.0 | CCGCC (12%); CTGCA (8%); CTGGC (8%); CTGTC (8%) |
| GGCAT | 0 | 85 | 0.0 | ATGCG (11%); TTGCC (11%); AGGCC (11%); GTGCC (11%) |
| GGCCA | 5 | 137 | 3.3 | CGGCC (31%); TGGAC (7%); TGTCC (7%); GGGCC (7%) |
| GGCCC | 5 | 118 | 3.8 | GGCCC (16%); GGACC (8%); GGGCT (8%); CGGCC (8%) |
| GGCCG | 24 | 179 | 11.6 | CTGCC (11%); CGGCA (8%); CGGCT (8%) |
| GGCCT | 19 | 99 | 16.0 | AAGCC (14%); AGGCA (10%); AGGAC (10%) |
| GGCGA | 14 | 123 | 10.3 | GCGCC (12%); CCGCC (12%); TCACC (8%) |
| GGCGC | 5 | 113 | 4.0 | GCACC (8%); GCGGC (8%); AAGCC (8%); GCGCA (8%) |
| GGCGG | 9 | 104 | 8.3 | GCGCC (23%); ACGCC (9%); CCGCG (9%); CAGCC (9%) |
| GGCGT | 0 | 85 | 0.0 | GCGCC (17%); ACGTA (6%); TAGCC (6%); AGGCC (6%) |
| GGCTA | 14 | 85 | 14.3 | GAGCC (17%); TAGGC (11%); TTGCC (11%) |
| GGCTC | 0 | 104 | 0.0 | GCGCC (14%); GAGAC (14%); GTGCT (9%); GATCC (9%) |
| GGCTG | 14 | 76 | 15.8 | CACCC (19%); AAGCC (19%); CGGCC (6%) |
| GGCTT | 9 | 71 | 11.8 | AGGCC (20%); AAGCT (13%); AAGAC (7%) |
| GGGAA | 24 | 85 | 21.7 | ATCCC (17%); TCCCC (11%); GTCCC (11%) |
| GGGAC | 5 | 109 | 4.2 | GCCCC (22%); GTCCA (9%); ATCCC (9%); GTGCC (9%) |
| GGGAG | 14 | 61 | 18.8 | CTCCA (15%); CGCCC (15%); CTACA (8%) |
| GGGAT | 5 | 66 | 6.7 | ATCCA (21%); ACCCC (14%); ATCGC (14%); CTCCC (14%) |
| GGGCA | 14 | 146 | 8.8 | TACCC (10%); AGCCC (10%); TCCCC (6%) |
| GGGCC | 5 | 118 | 3.8 | GGACC (8%); GGGCC (8%); GGCCA (8%); AGCCC (8%) |
| GGGCG | 5 | 66 | 6.7 | TGCCC (14%); AGCCC (14%); CTCCC (14%); CGACC (7%) |
| GGGCT | 9 | 104 | 8.3 | AGACC (9%); GGCCA (9%); AGCAC (9%); GGCCC (9%) |
| GGGGA | 9 | 61 | 13.3 | ACCCC (31%); CCCCC (23%); GTCCC (8%) |
| GGGGC | 5 | 109 | 4.2 | TCCCC (9%); GCCAC (9%); AACCC (9%); CCCCC (9%) |
| GGGGG | 0 | 43 | 0.0 | CCCGC (22%); CCTTC (11%); TCCCC (11%); CCTCC (11%) |
| GGGGT | 0 | 38 | 0.0 | ACCCT (12%); GCCCT (12%); ACTCC (12%); GGCCC (12%) |
| GGGTA | 5 | 66 | 6.7 | TGCCC (21%); AACCC (21%); TCCCC (7%); TAGCC (7%) |
| GGGTC | 5 | 99 | 4.5 | GACCA (14%); CACCC (10%); TACCC (10%); AACCC (10%) |
| GGGTG | 9 | 104 | 8.3 | CACCT (9%); CACAC (9%); CCCCC (9%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %¹ | Mismatch Overhangs² |
|---|---|---|---|---|
| GGGTT | 5 | 61 | 7.1 | ACCCC (15%); AACCA (15%); GACCT (8%); AGCCT (8%) |
| GGTAA | 19 | 90 | 17.4 | TCACC (16%); ATACC (11%); CTACC (11%) |
| GGTAC | 14 | 52 | 21.4 | GAGCC (18%); GAACC (18%); CGACC (9%) |
| GGTAG | 9 | 38 | 20.0 | CTGCT (12%); CTAGA (12%); CTGCA (12%) |
| GGTAT | 5 | 61 | 7.1 | TTACC (23%); ATACT (15%); ATAAC (8%) |
| GGTCA | 5 | 118 | 3.8 | TGACA (12%); TAACC (12%); AGACC (8%); TGACG (8%) |
| GGTCC | 5 | 109 | 4.2 | CGACC (9%); GGAAC (9%); AGACC (9%); GGCCC (9%) |
| GGTCG | 5 | 80 | 5.6 | CTACC (18%); AGACC (12%); TGGCC (12%); CAACC (12%) |
| GGTCT | 14 | 80 | 15.0 | AAACC (24%); AGACA (12%); GGACC (6%) |
| GGTGA | 9 | 38 | 20.0 | GCACC (25%); TCTCC (25%); TCACA (12%) |
| GGTGC | 5 | 66 | 6.7 | ACACC (21%); CCACC (14%); GCAGC (7%); GGACC (7%) |
| GGTGG | 9 | 90 | 9.5 | ACACC (16%); CCACT (11%); CCACA (5%) |
| GGTGT | 5 | 43 | 10.0 | ACCCC (11%); ACGCA (11%); ACGCT (11%) |
| GGTTA | 24 | 80 | 22.7 | AAACC (18%); TAAAC (12%); GAACT (12%) |
| GGTTC | 9 | 71 | 11.8 | GAATC (27%); GAAAC (20%); GAACA (13%) |
| GGTTG | 14 | 61 | 18.8 | CAACT (15%); CGGCC (8%); CTAAC (8%) |
| GGTTT | 9 | 90 | 9.5 | AACCC (16%); ATTCC (11%); ATACC (5%) |
| GTAAA | 38 | 76 | 33.3 | TTTAT (19%); TTTTC (12%); GTTAC (12%) |
| GTAAC | 0 | 80 | 0.0 | GTGAC (18%); GTAAC (12%); GTTAA (12%); GTTTC (12%) |
| GTAAG | 9 | 90 | 9.5 | CTAAC (11%); CTTTC (11%); CTGAC (11%); CTCAC (11%) |
| GTAAT | 19 | 57 | 25.0 | ATAAC (25%); ATGAC (17%); TTTAC (17%) |
| GTACA | 14 | 33 | 30.0 | TGCAC (29%); AGTAC (14%); CGTAC (14%) |
| GTACC | 14 | 80 | 15.0 | GATAC (6%); GTAAC (6%); GGAAC (6%) |
| GTACG | 5 | 71 | 6.3 | CGAAC (20%); CGTTC (7%); CGACC (7%) |
| GTACT | 9 | 52 | 15.4 | AGAAC (18%); GATAC (9%); AGTAT (9%) |
| GTAGA | 14 | 76 | 15.8 | ACTAC (19%); GCTAC (12%); TCCAC (12%) |
| GTAGC | 5 | 71 | 6.3 | GCAAC (27%); GCCAC (20%); GCTAA (7%); GCTAG (7%) |
| GTAGG | 0 | 71 | 0.0 | CCTAG (13%); CCGAC (13%); CCTCC (7%); ACTAT (7%) |
| GTAGT | 0 | 76 | 0.0 | ACTAA (19%); CCTAC (12%); AATAC (6%); ACTGC (6%) |
| GTATA | 24 | 66 | 26.3 | TGTAC (21%); GATAC (14%); TATAT (14%) |
| GTATC | 14 | 57 | 20.0 | GATAA (17%); GACAC (17%); GATAT (8%) |
| GTATG | 9 | 24 | 28.6 | CAAAC (60%); CATAT (40%) |
| GTATT | 14 | 76 | 15.8 | AAAAC (25%); GAAAC (19%); AATAA (12%) |
| GTCAA | 14 | 142 | 9.1 | ATGAC (13%); TCGAC (13%); CTGAC (10%); TGGAC (10%) |
| GTCAC | 0 | 71 | 0.0 | ATGAC (27%); GTAAC (13%); GGGAC (13%); GTCAC (13%) |
| GTCAG | 5 | 80 | 5.6 | CAGAC (12%); CGGGC (6%); ATGAC (6%); TTGAC (6%) |
| GTCAT | 9 | 43 | 18.2 | ATGAA (22%); ATAAC (22%); TTGGC (11%) |
| GTCCA | 9 | 94 | 9.1 | TGAAC (15%); TAGAC (10%); AGGAC (10%) |
| GTCCC | 5 | 85 | 5.3 | GGAAC (17%); GGGAA (11%); AGGAC (11%); GAGAC (11%) |
| GTCCG | 5 | 66 | 6.7 | CGTAC (21%); CGGGC (14%); CGGCC (14%); CGGAA (14%) |
| GTCCT | 5 | 71 | 6.3 | AAGAC (13%); AGGTC (13%); AGAAC (13%); AGGGG (7%) |
| GTCGA | 14 | 38 | 27.3 | TGGAC (12%); ACGAC (12%); GCGAC (12%) |
| GTCGC | 5 | 66 | 6.7 | GCTAC (14%); GCAAC (14%); ACGAT (14%); GAGAC (14%) |
| GTCGG | 14 | 71 | 16.7 | ACGAC (13%); ACGAT (13%); CCGAT (7%) |
| GTCGT | 9 | 43 | 18.2 | AAGAC (11%); ACAGC (11%); GCTAC (11%) |
| GTCTA | 5 | 85 | 5.3 | CAGAC (22%); TAGAT (17%); TCGAC (11%); AAGAC (6%) |
| GTCTC | 14 | 99 | 12.5 | GAAAC (19%); GAGGC (14%); CAGAC (14%) |
| GTCTG | 9 | 76 | 11.1 | CAGCC (19%); TAGAA (12%); TAGAC (12%); CAGGC (12%) |
| GTCTT | 9 | 80 | 10.5 | AAGCC (18%); AGGAC (18%); GAGAC (18%); AAAAC (12%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10$^{-5}$ | Mismatch, ×10$^{-5}$ | Fidelity, %[1] | Mismatch Overhangs[2] |
|---|---|---|---|---|
| GTGAA | 24 | 52 | 31.3 | TCCAC (18%); TGCAC (9%); TTCCC (9%) |
| GTGAC | 0 | 76 | 0.0 | GTAAC (19%); GACAC (19%); GGCTC (6%); ATAAC (6%) |
| GTGAG | 5 | 52 | 8.3 | CCCAA (9%); CACAC (9%); CTAAC (9%); CTACC (9%) |
| GTGAT | 5 | 52 | 8.3 | ACCAC (18%); ATCAG (9%); ATCAT (9%) |
| GTGCA | 5 | 90 | 5.0 | AGCAC (16%); TGCAA (11%); TACAC (11%); TTCAC (5%) |
| GTGCC | 5 | 76 | 5.9 | GGCAT (12%); GACAC (12%); GGGAC (12%); GTGCC (12%) |
| GTGCG | 0 | 66 | 0.0 | CGGCC (14%); CCCTC (7%); CGCCA (7%); TGTAC (7%) |
| GTGCT | 0 | 80 | 0.0 | AGCAT (18%); GGCTC (12%); AGCCC (12%); CGCGC (6%) |
| GTGGA | 5 | 76 | 5.9 | TACAC (19%); TCAAC (12%); ACCAC (12%); GCCTC (12%) |
| GTGGC | 5 | 109 | 4.2 | TCCAC (9%); GCAAC (9%); ACCAC (9%); GCTAT (9%) |
| GTGGG | 9 | 66 | 12.5 | CCCAA (21%); CACAC (21%); CTCAT (7%) |
| GTGGT | 5 | 66 | 6.7 | ACCCC (14%); ATCAC (14%); CACAC (7%) |
| GTGTA | 5 | 28 | 14.3 | GATAC (17%); TACCC (17%); TAGAC (17%); TACAA (17%) |
| GTGTC | 14 | 80 | 15.0 | GAAAC (24%); GACAA (12%); TACAC (12%) |
| GTGTG | 5 | 57 | 7.7 | CACGC (17%); CATAC (8%); CCCGC (8%) |
| GTGTT | 9 | 43 | 18.2 | GATAC (22%); AACTC (11%); AACAG (11%) |
| GTTAA | 9 | 94 | 9.1 | ATAAC (20%); GTAAC (10%); TTAAT (10%); TAAAC (10%) |
| GTTAC | 0 | 94 | 0.0 | GAAAC (25%); GGAAC (10%); ATAAC (10%); GTAAA (10%) |
| GTTAG | 5 | 52 | 8.3 | ATAAC (27%); CTTAC (18%); GTAAC (9%) |
| GTTAT | 14 | 43 | 25.0 | AGAAC (22%); ATACC (11%); ACAAC (11%) |
| GTTCA | 14 | 80 | 15.0 | GGAAC (24%); TGGAC (18%); TGAAT (12%) |
| GTTCC | 14 | 76 | 15.8 | GGAAA (19%); GAAAC (12%); GGAAT (6%) |
| GTTCG | 0 | 99 | 0.0 | CGACC (24%); AGAAC (10%); CGAAT (10%); CAAAC (10%) |
| GTTCT | 14 | 52 | 21.4 | AGAAT (27%); AAAAC (18%); AGAAA (9%) |
| GTTGA | 0 | 66 | 0.0 | ACAAC (14%); TCAGC (14%); GCAGC (7%); AAAAC (7%) |
| GTTGC | 0 | 43 | 0.0 | ACAAC (22%); GCAGC (11%); GCAAG (11%); GCAAT (11%) |
| GTTGG | 9 | 80 | 10.5 | CCATC (18%); CTGAC (12%); CCGGC (6%) |
| GTTGT | 0 | 47 | 0.0 | ACACC (20%); GCGAC (10%); ACTCC (10%); ACCAC (10%) |
| GTTTA | 14 | 66 | 17.6 | GAAAC (21%); AAAAC (14%); TTAAC (14%) |
| GTTTC | 19 | 85 | 18.2 | GAATC (28%); AAAAC (17%); GTAAC (11%) |
| GTTTG | 9 | 57 | 14.3 | CAACC (17%); ACAAC (8%); AAAAC (8%) |
| GTTTT | 9 | 52 | 15.4 | AAAGC (27%); GAAAC (18%); CAAAC (18%) |
| TAAAA | 52 | 38 | 57.9 | ATTTA (25%); TTTTT (25%); TTATA (25%) |
| TAAAC | 14 | 38 | 27.3 | GTTAA (25%); GGTTA (25%); GTATA (25%) |
| TAAAG | 33 | 85 | 28.0 | CATTA (22%); CTCTA (11%); CTTCA (11%) |
| TAAAT | 24 | 57 | 29.4 | ATTAA (17%); ATTTC (17%); ATTCA (17%) |
| TAACA | 28 | 57 | 33.3 | TGTGA (17%); GGTTA (8%); TGTTC (8%) |
| TAACC | 24 | 76 | 23.8 | GGTCA (19%); GATTA (12%); AGTTA (12%) |
| TAACG | 5 | 109 | 4.2 | CGTTC (13%); CGATA (13%); AGTTA (13%); CGTAA (13%) |
| TAACT | 28 | 28 | 50.0 | AGTTT (33%); AGTGG (17%); GGCTA (17%) |
| TAAGA | 47 | 52 | 47.6 | ACTTA (36%); GCTTA (27%); TCTTG (18%) |
| TAAGC | 43 | 99 | 30.0 | GATTA (19%); GCTTT (19%); ACTTA (10%) |
| TAAGG | 28 | 76 | 27.3 | ACTTA (25%); CCTAA (25%); CCGTA (12%) |
| TAAGT | 38 | 52 | 42.1 | GCTTA (27%); ATTTA (18%); ACTGA (18%) |
| TAATA | 71 | 24 | 75.0 | CATTA (20%); TATTC (20%); AATTA (20%) |
| TAATC | 14 | 52 | 21.4 | GAATA (27%); GATAA (18%); GAGTA (9%) |
| TAATG | 9 | 57 | 14.3 | CAGTA (17%); GATTA (8%); CGTTA (8%) |
| TAATT | 47 | 33 | 58.8 | AATTG (29%); GATTA (14%); AACTA (14%) |
| TACAA | 19 | 14 | 57.1 | GTGTA (33%); TGGTA (33%); CTGTA (33%) |
| TACAC | 5 | 71 | 6.3 | GAGTA (20%); GTGGA (20%); GTGCA (13%); GTGTC (13%) |
| TACAG | 14 | 76 | 15.8 | CTGCA (25%); ATGTA (12%); CTGGA (12%) |
| TACAT | 5 | 57 | 7.7 | ATGCA (25%); ATGGA (25%); AAGTA (17%); GCGTA (8%) |
| TACCA | 9 | 19 | 33.3 | CGGTA (50%); TGATA (25%); TGGAA (25%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| TACCC | 5 | 52 | 8.3 | GGGCA (27%); GGGTC (18%); GGGAA (9%); GGTTA (9%) |
| TACCG | 14 | 85 | 14.3 | CGGGA (22%); CGGTC (17%); CGGCA (17%) |
| TACCT | 19 | 66 | 22.2 | AGGGA (21%); AGGAA (21%); TGGTA (14%) |
| TACGA | 5 | 90 | 5.0 | TCGGA (26%); TCGCA (16%); ACGTA (11%); TCGAA (11%) |
| TACGC | 9 | 47 | 16.7 | ACGTA (20%); GCGCG (10%); GGGTA (10%) |
| TACGG | 9 | 57 | 14.3 | CCGGA (25%); CAGTA (17%); TCGTA (17%) |
| TACGT | 14 | 66 | 17.6 | AAGTA (14%); ACGGA (14%); ACGTC (14%) |
| TACTA | 19 | 28 | 40.0 | CAGTA (50%); TAGTT (33%); GAGTA (17%) |
| TACTC | 14 | 80 | 15.0 | AAGTA (29%); GAGAA (18%); CAGTA (12%) |
| TACTG | 14 | 38 | 27.3 | CAGAA (25%); CATTA (25%); CGGTA (12%) |
| TACTT | 28 | 24 | 54.5 | AAGGA (40%); GAGGA (20%); AAGTG (20%) |
| TAGAA | 57 | 28 | 66.7 | GTCTG (33%); TTCCA (33%); TTGTA (17%) |
| TAGAC | 5 | 90 | 5.0 | GCCTA (16%); GTCAA (16%); GACTA (11%); GTCCA (11%) |
| TAGAG | 9 | 85 | 10.0 | CTCTT (22%); CTCTC (11%); ATCTA (11%) |
| TAGAT | 19 | 52 | 26.7 | ATCCA (27%); GTCTA (27%); AACTA (9%) |
| TAGCA | 19 | 76 | 20.0 | AGCTA (31%); TGCCA (19%); TGATA (19%) |
| TAGCC | 14 | 66 | 17.6 | GACTA (14%); GGATA (14%); GGCCG (7%) |
| TAGCG | 14 | 76 | 15.8 | CGCGA (25%); AGCTA (19%); CGCCA (12%) |
| TAGCT | 5 | 33 | 12.5 | AGGTA (29%); AGCAA (14%); AGCTG (14%) |
| TAGGA | 43 | 47 | 47.4 | TCCTG (30%); TCGTA (20%); TCTTA (10%) |
| TAGGC | 5 | 61 | 7.1 | GGCTA (15%); GCCCA (15%); ACCTA (15%) |
| TAGGG | 0 | 33 | 0.0 | CCCTT (29%); CCATA (14%); CACTA (14%); CGCTA (14%) |
| TAGGT | 5 | 80 | 5.6 | GCCTA (18%); ACCGA (18%); ACCAA (12%); AACTA (12%) |
| TAGTA | 19 | 24 | 44.4 | TACGA (40%); TACTT (20%); CACTA (20%) |
| TAGTC | 28 | 71 | 28.6 | GACAA (47%); GACCA (13%); GGCTA (7%) |
| TAGTG | 28 | 57 | 33.3 | CACGA (25%); CACCA (25%); CTCTA (8%) |
| TAGTT | 24 | 52 | 31.3 | TACTA (18%); AACTC (18%); AGCTA (18%) |
| TATAA | 43 | 14 | 75.0 | TTTTA (33%); TTAGA (33%); ATATA (33%) |
| TATAC | 24 | 24 | 50.0 | GTGTA (20%); GTAAA (20%); GTACA (20%) |
| TATAG | 28 | 9 | 75.0 | CTAGA (50%); CTATC (50%) |
| TATAT | 52 | 52 | 50.0 | ATAGA (27%); GTATA (18%); ATTTA (9%) |
| TATCA | 38 | 85 | 30.8 | AGATA (22%); CGATA (17%); TGACA (11%) |
| TATCC | 14 | 57 | 20.0 | AGATA (33%); GAATA (17%); GGAGA (8%) |
| TATCG | 28 | 61 | 31.6 | CGATC (15%); CGATT (15%); CGATG (15%) |
| TATCT | 24 | 52 | 31.3 | TGATA (18%); AGGTA (18%); AGACA (9%) |
| TATGA | 24 | 76 | 23.8 | GCATA (25%); TCGTA (19%); ACATA (12%) |
| TATGC | 28 | 66 | 30.0 | GCATC (14%); GCATT (14%); GCACA (14%) |
| TATGG | 14 | 90 | 13.6 | CCATC (16%); CCATT (11%); CCATG (11%) |
| TATGT | 24 | 52 | 31.3 | ACGTA (18%); ACATC (18%); ACATG (9%) |
| TATTA | 71 | 24 | 75.0 | TAACA (20%); AAATA (20%); GAATA (20%) |
| TATTC | 28 | 43 | 40.0 | GAAAA (22%); GAACA (22%); AAATA (22%) |
| TATTG | 14 | 38 | 27.3 | CTATA (38%); CAAGA (12%); CAAAA (12%) |
| TATTT | 57 | 47 | 54.5 | AAATT (30%); AAATG (20%); AAAGA (10%) |
| TCAAA | 52 | 24 | 68.8 | TTAGA (40%); TTTTA (20%); TTGGA (20%) |
| TCAAC | 0 | 33 | 0.0 | GTGGA (29%); GTAGA (14%); GTTAA (14%); TTTGA (14%) |
| TCAAG | 9 | 71 | 11.8 | CTCGA (20%); CTTCA (13%); CTTAA (13%) |
| TCAAT | 28 | 85 | 25.0 | AATGA (22%); ATGGA (17%); ATTAA (11%) |
| TCACA | 9 | 52 | 15.4 | AGTGA (18%); TGAGA (18%); TGTGG (9%) |
| TCACC | 9 | 61 | 13.3 | GGAGA (23%); GGTAA (23%); GGCGA (15%) |
| TCACG | 19 | 94 | 16.7 | CATGA (25%); CGAGA (15%); CGTTA (10%) |
| TCACT | 9 | 66 | 12.5 | TGTGA (21%); AGAGA (14%); AGTGT (7%) |
| TCAGA | 28 | 47 | 37.5 | TCAGA (40%); GCTGA (20%); ACTGA (20%) |
| TCAGC | 0 | 90 | 0.0 | GCTCA (16%); GCTTA (16%); GCTAA (11%); GCCGA (11%) |
| TCAGG | 5 | 137 | 3.3 | CCTTA (10%); CCAGA (7%); CGTGA (7%); CATGA (7%) |
| TCAGT | 33 | 76 | 30.4 | ACTAA (19%); ATTGA (19%); AATGA (12%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| TCATA | 24 | 43 | 35.7 | AATGA (33%); GATGA (22%); CATGA (11%) |
| TCATC | 14 | 57 | 20.0 | GACGA (25%); GAAGA (25%); GAGGA (8%) |
| TCATG | 14 | 76 | 15.8 | CAAGA (19%); CATGC (12%); CAGGA (12%) |
| TCATT | 33 | 76 | 30.4 | AAAGA (19%); AATGT (12%); AACGA (12%) |
| TCCAA | 33 | 38 | 46.7 | TCGGA (38%); ATGGA (25%); CTGGA (25%) |
| TCCAC | 5 | 66 | 6.7 | GAGGA (29%); GCGGA (21%); GTAGA (14%); GTGGC (14%) |
| TCCAG | 33 | 113 | 22.6 | CTGAA (17%); CAGGA (8%); CTGTA (8%) |
| TCCAT | 9 | 61 | 13.3 | AGGGA (15%); ACGGA (15%); GTGGA (15%); AAGGA (15%) |
| TCCCA | 24 | 38 | 38.5 | TGGGC (25%); AGGGA (25%); TGAGA (12%) |
| TCCCC | 9 | 76 | 11.1 | AGGGA (19%); GGGAA (12%); GGGGC (12%) |
| TCCCG | 5 | 104 | 4.3 | CGGAA (27%); CGAGA (14%); CGGGT (14%); CGGTA (14%) |
| TCCCT | 14 | 28 | 33.3 | AGAGA (33%); AGGGC (17%); AGGGT (17%) |
| TCCGA | 9 | 66 | 12.5 | ACGGA (29%); TCGGC (14%); TCGGG (14%) |
| TCCGC | 14 | 123 | 10.3 | ACGGA (35%); TCGGA (15%); GCGGG (12%) |
| TCCGG | 19 | 99 | 16.0 | CAGGA (14%); CGGGA (14%); CCGCA (10%) |
| TCCGT | 0 | 38 | 0.0 | ACGGG (25%); CCGGA (25%); GCGGT (25%); ACGAA (12%) |
| TCCTA | 43 | 28 | 60.0 | CAGGA (33%); TCGGA (17%); GAGGA (17%) |
| TCCTC | 5 | 80 | 5.6 | AAGGA (29%); GAGTA (18%); CAGGA (18%); GAGAA (18%) |
| TCCTG | 52 | 90 | 36.7 | CAGAA (16%); TAGGA (16%); CGGGA (11%) |
| TCCTT | 43 | 66 | 39.1 | CAGGA (21%); AAGGC (14%); AAGGT (7%) |
| TCGAA | 57 | 61 | 48.0 | ATCGA (38%); TACGA (15%); TTTGA (15%) |
| TCGAC | 14 | 113 | 11.1 | ATCGA (25%); GACGA (17%); GTCAA (17%) |
| TCGAG | 24 | 94 | 20.0 | CACGA (20%); CTTGA (15%); CGCGA (10%) |
| TCGAT | 9 | 52 | 15.4 | ACCGA (27%); AGCGA (18%); ATCAG (9%) |
| TCGCA | 9 | 80 | 10.5 | TACGA (18%); TGCAA (18%); AGCGA (18%) |
| TCGCC | 14 | 109 | 11.5 | GGCAA (26%); AGCGA (17%); GACGA (13%) |
| TCGCG | 14 | 128 | 10.0 | CACGA (15%); CGCAA (11%); CGAGA (11%) |
| TCGCT | 9 | 71 | 11.8 | AGCAA (20%); AGTGA (20%); GGCGA (13%) |
| TCGGA | 9 | 137 | 6.5 | TACGA (17%); TCCGC (14%); ACCGA (10%); TCCAA (10%) |
| TCGGC | 14 | 123 | 10.3 | GCCAA (19%); GCCTA (12%); ACCGA (12%) |
| TCGGG | 14 | 109 | 11.5 | CCCAA (17%); CCCCA (13%); CACGA (9%) |
| TCGGT | 14 | 61 | 18.8 | ACCGC (15%); ACCGG (15%); TACGA (8%) |
| TCGTA | 5 | 71 | 6.3 | TATGA (20%); TACGG (13%); TACGT (13%); TAGGA (13%) |
| TCGTC | 14 | 80 | 15.0 | AACGA (24%); GACAA (18%); GCCGA (18%) |
| TCGTG | 9 | 61 | 13.3 | CAGGA (15%); CTCGG (15%); CAACA (8%) |
| TCGTT | 38 | 76 | 33.3 | AACGG (19%); AATGA (12%); AACGC (12%) |
| TCTAA | 85 | 28 | 75.0 | CTAGA (50%); TTAGC (17%); TTAGT (17%) |
| TCTAC | 14 | 52 | 21.4 | GCAGA (18%); CAAGA (9%); GGAGA (9%) |
| TCTAG | 24 | 99 | 19.2 | CAAGA (24%); CGAGA (19%); GTAGA (10%) |
| TCTAT | 9 | 38 | 20.0 | AGAGA (25%); ACAGA (25%); GTAGA (12%) |
| TCTCA | 19 | 47 | 28.6 | AGAGA (20%); TGACA (20%); CGAGA (10%) |
| TCTCC | 9 | 61 | 13.3 | AGAGA (31%); GGTGA (15%); GAAGA (15%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| TCTCG | 9 | 19 | 33.3 | CGAGC (25%); TGAGA (25%); AGAGA (25%) |
| TCTCT | 5 | 24 | 16.7 | CGAGA (40%); AGAGG (20%); AGAGT (20%) |
| TCTGA | 28 | 76 | 27.3 | ACAGA (25%); TCGGA (19%); TCAGG (12%) |
| TCTGC | 33 | 104 | 24.1 | ACAGA (41%); CCAGA (14%); GCAGG (9%) |
| TCTGG | 38 | 104 | 26.7 | GCAGA (18%); CCGGA (14%); CTAGA (9%) |
| TCTGT | 19 | 80 | 19.0 | ACAGG (18%); ACGGA (18%); CCAGA (12%) |
| TCTTA | 47 | 43 | 52.6 | CAAGA (44%); GAAGA (11%); TGAGA (11%) |
| TCTTC | 19 | 90 | 17.4 | AAAGA (21%); GAAAA (16%); CAAGA (11%) |
| TCTTG | 33 | 52 | 38.9 | TAAGA (18%); CCAGA (18%); CAATA (18%) |
| TCTTT | 24 | 61 | 27.8 | GAAGA (23%); AAAGG (23%); AAGGA (23%) |
| TGAAA | 38 | 66 | 36.4 | TTACA (36%); CTTCA (14%); ATTCA (14%) |
| TGAAC | 14 | 61 | 18.8 | GTCCA (23%); GATCA (15%); GTTTA (8%) |
| TGAAG | 28 | 76 | 27.3 | CCTCA (19%); CTCCA (12%); ATTCA (12%) |
| TGAAT | 38 | 80 | 32.0 | AATCA (18%); GTTCA (12%); ATTCT (12%) |
| TGACA | 28 | 104 | 21.4 | TGTTA (14%); GGTCA (14%); CGTCA (14%) |
| TGACC | 5 | 90 | 5.0 | GGACA (21%); AGTCA (21%); GGTAA (11%); GATCA (11%) |
| TGACG | 0 | 90 | 0.0 | CGTCC (16%); GGTCA (11%); AGCCA (5%); CGCCA (5%) |
| TGACT | 24 | 61 | 27.8 | AGCCA (15%); AGGCT (15%); AGGCA (15%) |
| TGAGA | 19 | 47 | 28.6 | TCACA (20%); TCTTA (10%); TATCA (10%) |
| TGAGC | 14 | 71 | 16.7 | GATCA (13%); GCACA (13%); GCTGA (13%) |
| TGAGG | 24 | 38 | 38.5 | CCTAA (25%); CCTCC (12%); CCTTA (12%) |
| TGAGT | 19 | 43 | 30.8 | ACACA (11%); ACTTA (11%); ACTCG (11%) |
| TGATA | 38 | 85 | 30.8 | TAGCA (17%); GATCA (17%); TGTCA (11%) |
| TGATC | 14 | 52 | 21.4 | GAACA (27%); AATCA (18%); GATTA (9%) |
| TGATG | 5 | 80 | 5.6 | CCTCA (18%); CATCC (12%); TGTCA (12%); AAGCA (12%) |
| TGATT | 14 | 71 | 16.7 | AATCT (27%); AGTCA (20%); TATCA (7%) |
| TGCAA | 38 | 76 | 33.3 | TCGCA (19%); ATGCA (19%); GTGCA (12%) |
| TGCAC | 5 | 43 | 10.0 | GTACA (22%); GGGCA (22%); GTTCA (11%); CTGCA (11%) |
| TGCAG | 9 | 94 | 9.1 | CCGCA (20%); CAGCA (15%); CTACA (10%) |
| TGCAT | 9 | 52 | 15.4 | TTGCA (18%); ATACA (18%); ATGAA (9%) |
| TGCCA | 19 | 113 | 14.3 | TAGCA (12%); TGGCT (12%); TTGCA (8%) |
| TGCCC | 14 | 99 | 12.5 | GGGTA (14%); GGACA (14%); GAGCA (10%) |
| TGCCG | 19 | 104 | 15.4 | TGGCA (9%); CAGCA (9%); CGGGA (9%) |
| TGCCT | 14 | 61 | 18.8 | TGGCA (23%); AGGTG (15%); AGGCC (15%) |
| TGCGA | 9 | 43 | 18.2 | TCGCG (22%); CCGCA (22%); ACGCA (22%) |
| TGCGC | 5 | 76 | 5.9 | GCGCC (19%); GCTCA (12%); GCGCG (6%); TCACA (6%) |
| TGCGG | 9 | 99 | 8.7 | CGGCA (14%); CCCCA (10%); CCACA (10%) |
| TGCGT | 5 | 38 | 11.1 | AAGCA (25%); ACGGA (25%); ACACA (12%); TCGCA (12%) |
| TGCTA | 19 | 47 | 28.6 | CAGCA (20%); TGGCA (20%); AAGCA (20%) |
| TGCTC | 5 | 76 | 5.9 | GAACA (31%); GAGAA (12%); TAGCA (6%); TCGCA (6%) |
| TGCTG | 28 | 80 | 26.1 | AAGCA (18%); CGGCA (12%); CAGCC (12%) |
| TGCTT | 24 | 43 | 35.7 | AAGTA (22%); GTGCA (11%); ACGCA (11%) |
| TGGAA | 19 | 52 | 26.7 | TTCCC (18%); TGCCA (18%); GTTCA (9%) |
| TGGAC | 9 | 94 | 9.1 | GTTCA (15%); GTCAA (15%); GACCA (15%) |
| TGGAG | 5 | 52 | 8.3 | GTCCA (18%); CTCCC (18%); CTACA (9%); CGCCA (9%) |
| TGGAT | 14 | 57 | 20.0 | ATCCT (25%); AGCCA (17%); ATCCG (17%) |
| TGGCA | 19 | 113 | 14.3 | AGCCA (17%); TGCCT (12%); TGCCG (8%) |
| TGGCC | 5 | 80 | 5.6 | GGCCG (12%); GGTCG (12%); AGCCA (12%); GGACA (12%) |
| TGGCG | 5 | 85 | 5.3 | CACCA (22%); CGGCA (11%); CGCCC (11%); TGCCG (6%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10⁻⁵ | Mismatch, ×10⁻⁵ | Fidelity, %[1] | Mismatch Overhangs[2] |
|---|---|---|---|---|
| TGGCT | 5 | 61 | 7.1 | TGCCA (23%); AGACA (15%); CGCCA (15%); AGCGA (15%) |
| TGGGA | 24 | 57 | 29.4 | TCCCC (8%); GCTCA (8%); CCCCA (8%) |
| TGGGC | 14 | 80 | 15.0 | GCCAA (12%); GCACA (12%); GCCCG (12%) |
| TGGGG | 19 | 57 | 25.0 | CCACA (25%); CCCCC (17%); CCCGA (8%) |
| TGGGT | 14 | 57 | 20.0 | ACCCT (25%); ACACA (17%); ACCCC (8%) |
| TGGTA | 9 | 80 | 10.5 | TACCG (18%); CACCA (18%); TACCT (12%) |
| TGGTC | 9 | 76 | 11.1 | GAACA (12%); GACTA (12%); GACCT (12%); GCCCA (12%) |
| TGGTG | 14 | 57 | 20.0 | CGCCA (17%); CACCT (17%); CCGCA (8%) |
| TGGTT | 14 | 43 | 25.0 | ATCCA (22%); AAACG (11%); ACCCA (11%) |
| TGTAA | 43 | 47 | 47.4 | TTTCA (30%); CTACA (20%); ATACA (20%) |
| TGTAC | 14 | 71 | 16.7 | GTATA (20%); GCACA (13%); GTGCG (7%) |
| TGTAG | 19 | 71 | 21.1 | CTACT (27%); CTCCA (13%); CAACA (7%) |
| TGTAT | 14 | 47 | 23.1 | ATACT (20%); ATACG (20%); ATACC (10%) |
| TGTCA | 28 | 132 | 17.6 | CGACA (21%); AGACA (18%); GGACA (11%) |
| TGTCC | 38 | 80 | 32.0 | GGACC (24%); GGACT (12%); GCACA (12%) |
| TGTCG | 9 | 47 | 16.7 | CGACC (10%); CAACA (10%); AGACA (10%) |
| TGTCT | 28 | 71 | 28.6 | AGACG (13%); AGAGA (13%); GGACA (13%) |
| TGTGA | 9 | 94 | 9.1 | ACACA (25%); TCACT (15%); GCACA (10%) |
| TGTGC | 9 | 57 | 14.3 | GCACC (17%); GCAGA (17%); GCTCA (8%) |
| TGTGG | 14 | 76 | 15.8 | ACACA (25%); ACACG (19%); CCGCA (12%) |
| TGTGT | 14 | 28 | 33.3 | ACATA (33%); GCACA (17%); ACACG (17%) |
| TGTTA | 28 | 47 | 37.5 | GAACA (30%); TGACA (30%); GGACA (10%) |
| TGTTC | 28 | 61 | 31.6 | GGACA (23%); GAACC (15%); AAACA (8%) |
| TGTTG | 19 | 38 | 33.3 | CTACA (25%); CAAGA (12%); CGGCA (12%) |
| TGTTT | 9 | 57 | 14.3 | AGACA (17%); AAACC (17%); AAACG (8%) |
| TTAAA | 52 | 14 | 78.6 | TTCAA (33%); TTTAG (33%); TTGAA (33%) |
| TTAAC | 9 | 43 | 18.2 | GTTTA (22%); TTTAA (22%); GCTAA (11%) |
| TTAAG | 24 | 38 | 38.5 | ATTAA (12%); CTCAA (12%); CTTTA (12%) |
| TTAAT | 38 | 28 | 57.1 | GTTAA (33%); ATTAG (17%); TTTAA (17%) |
| TTACA | 43 | 66 | 39.1 | TGAAA (36%); TGCAA (14%); TGTCA (14%) |
| TTACC | 19 | 85 | 18.2 | GGCAA (22%); GGTAT (17%); AGTAA (17%) |
| TTACG | 19 | 90 | 17.4 | AGTAA (21%); CGAAA (16%); CGCAA (11%) |
| TTACT | 0 | 47 | 0.0 | AGAAA (30%); AGGAA (20%); GTTAA (10%); AGTAC (10%) |
| TTAGA | 85 | 80 | 51.4 | TTTAA (18%); CCTAA (18%); GCTAA (12%) |
| TTAGC | 9 | 76 | 11.1 | ACTAA (12%); GCTAG (12%); GCCAA (12%) |
| TTAGG | 5 | 71 | 6.3 | CCGAA (20%); CCTAT (13%); CCAAA (13%); CCTCA (13%) |
| TTAGT | 19 | 47 | 28.6 | ACGAA (30%); GCTAA (20%); TCTAA (10%) |
| TTATA | 43 | 28 | 60.0 | TAAAA (33%); TAGAA (17%); TATCA (17%) |
| TTATC | 38 | 57 | 40.0 | GAGAA (17%); GCTAA (8%); GAAAA (8%) |
| TTATG | 33 | 47 | 41.2 | CATAG (20%); CATGT (10%); CATAC (10%) |
| TTATT | 43 | 24 | 64.3 | AATTA (20%); AAGAA (20%); AATAT (20%) |
| TTCAA | 80 | 24 | 77.3 | TTGGA (40%); TTAAA (20%); ATGAA (20%) |
| TTCAC | 24 | 43 | 35.7 | GAGAA (56%); GGGAA (11%); GTCAA (11%) |
| TTCAG | 33 | 104 | 24.1 | CAGAA (27%); CCGAA (14%); CTGAT (14%) |
| TTCAT | 43 | 43 | 50.0 | ACGAA (33%); AAGAA (22%); ATGGG (11%) |
| TTCCA | 19 | 43 | 30.8 | CGGAA (33%); TAGAA (22%); AGGAA (22%) |
| TTCCC | 24 | 47 | 33.3 | TGGAA (20%); GGAGA (10%); GCGAA (10%) |
| TTCCG | 14 | 76 | 15.8 | CCGAA (12%); CGGAG (12%); CGGAC (12%) |
| TTCCT | 5 | 19 | 20.0 | CGGAA (25%); AAGAA (25%); AGGTA (25%) |
| TTCGA | 57 | 113 | 33.3 | ACGAA (29%); CCGAA (21%); GCGAA (12%) |
| TTCGC | 5 | 80 | 5.6 | ACGAA (29%); GAGAA (24%); CCGAA (12%); GCAAA (12%) |
| TTCGG | 5 | 61 | 7.1 | CAGAA (15%); CCGGA (15%); CCCAA (8%) |
| TTCGT | 19 | 38 | 33.3 | ACGAG (38%); CCGAA (25%); ACGTA (25%) |

TABLE 6-continued

Ligation fidelity for 5-base overhangs (16 hours at 25° C.). This can achieve potentially joining of 512 Fragment in one pot. HgaI Type IIS enzyme is an example of a restriction endonuclease that generates a 5-base overhang.

| Overhang | Correct, ×10$^{-5}$ | Mismatch, ×10$^{-5}$ | Fidelity, %[1] | Mismatch Overhangs[2] |
|---|---|---|---|---|
| TTCTA | 57 | 28 | 66.7 | AAGAA (33%); GAGAA (33%); CAGAA (17%) |
| TTCTC | 9 | 47 | 16.7 | CAGAA (20%); GAGGA (20%); GGGAA (10%) |
| TTCTG | 14 | 71 | 16.7 | CTGAA (20%); CGGAA (20%); CAGAT (20%) |
| TTCTT | 43 | 52 | 45.0 | GAGAA (36%); AAGTA (27%); AAGAG (9%) |
| TTGAA | 80 | 19 | 81.0 | TTAAA (25%); GTCAA (25%); ATCAA (25%) |
| TTGAC | 14 | 76 | 15.8 | GCCAA (19%); ATCAA (19%); GGCAA (19%) |
| TTGAG | 24 | 61 | 27.8 | CTCAT (23%); CTCTA (15%); CCCAA (15%) |
| TTGAT | 14 | 14 | 50.0 | ATCGA (67%); GTCAA (33%) |
| TTGCA | 38 | 85 | 30.8 | AGCAA (22%); CGCAA (17%); GGCAA (17%) |
| TTGCC | 5 | 66 | 6.7 | GGCTA (14%); GGCAT (14%); GTCAA (14%); CGCAA (14%) |
| TTGCG | 5 | 61 | 7.1 | CCCAA (15%); TGCAA (15%); CGCTA (15%); CTCAT (8%) |
| TTGCT | 9 | 52 | 15.4 | AGCTA (18%); AGCGA (18%); AGCAG (18%) |
| TTGGA | 33 | 66 | 33.3 | GCCAA (21%); ACCAA (21%); TTCAA (14%) |
| TTGGC | 5 | 99 | 4.5 | GCCAT (14%); GGCAA (14%); CCCAA (10%); GCCTA (10%) |
| TTGGG | 9 | 38 | 20.0 | CCCGT (12%); CCCAT (12%); CCCGA (12%) |
| TTGGT | 14 | 43 | 25.0 | ACCGA (33%); ACAAA (11%); ACTAA (11%) |
| TTGTA | 19 | 47 | 28.6 | GACAA (20%); TACAG (20%); CACAA (20%) |
| TTGTC | 24 | 80 | 22.7 | GACTA (18%); GCCAA (12%); GATAA (12%) |
| TTGTG | 5 | 57 | 7.7 | CGCAA (17%); TACGA (8%); CACGA (8%); CAAAA (8%) |
| TTGTT | 5 | 47 | 9.1 | AACCA (20%); GACAA (20%); AACAG (20%); AACGA (20%) |
| TTTAA | 52 | 47 | 52.4 | TTAGA (30%); CTAAA (20%); TTAAC (20%) |
| TTTAC | 38 | 52 | 42.1 | GGAAA (27%); GTAGA (18%); GTCAA (18%) |
| TTTAG | 28 | 66 | 30.0 | ATAAA (14%); CTGAA (14%); GTAAA (14%) |
| TTTAT | 24 | 47 | 33.3 | GTAAA (30%); ATAAG (20%); AGAAA (20%) |
| TTTCA | 38 | 43 | 47.1 | TGTAA (33%); GGAAA (22%); TGAAG (11%) |
| TTTCC | 43 | 38 | 52.9 | GGAGA (38%); GGAAG (25%); AGAAA (25%) |
| TTTCG | 28 | 66 | 30.0 | CGATA (29%); CGAAT (21%); AGAAA (14%) |
| TTTCT | 19 | 43 | 30.8 | GGAAA (44%); TGAAA (11%); AGAAT (11%) |
| TTTGA | 52 | 57 | 47.8 | ACAAA (33%); TCGAA (17%); GCAAA (17%) |
| TTTGC | 14 | 52 | 21.4 | GCATA (18%); GCAGA (18%); GAAAA (9%) |
| TTTGG | 5 | 38 | 11.1 | ACAAA (12%); CCGAA (12%); CCAAT (12%); CGAAA (12%) |
| TTTGT | 19 | 28 | 40.0 | ACAAT (17%); ACATA (17%); ACTAA (17%) |
| TTTTA | 52 | 24 | 68.8 | GAAAA (40%); TATAA (20%); TCAAA (20%) |
| TTTTC | 28 | 61 | 31.6 | GTAAA (15%); GGAAA (15%); GAATA (15%) |
| TTTTG | 19 | 52 | 26.7 | CGAAA (27%); CAAAG (18%); CAAGA (9%) |
| TTTTT | 24 | 28 | 45.5 | TAAAA (33%); AAAAG (17%); GAAAA (17%) |

[1]Fidelity is calculated as the fraction of correct ligations divided by the total fraction of ligations for a given overhang.
[2]Top 3 or 4 mismatch overhangs are given for each overhang. All overhangs are written in the 5'-to-3' direction. The numbers in parenthesis give the percentage for the given mismatch ligation relative to the total number of mismatch ligations for the overhang.

Example 2: Use of Ligation Fidelity Tables

Example 1 describes how to generate comprehensive ligation fidelity data for all overhang sequences for a given overhang length, using a specific ligase at a specific reaction temperature. Data tables are 16×16 (2-base), 64×64 (3-base) 256×256 (4-base), ×1024×1024 (5-base), 4096×4096 (6-base), etc. The ligation fidelity tables permit testing of substrates that simultaneously measure net effect of cutting, melting, annealing, and ligation for a particular combination of Type IIS restriction enzyme and DNA ligase under a given set of cycling conditions. Relative efficiency and fidelity of every overhang pairing is thus obtained. These data sets allow selection of Watson Crick pairs that ligate with their own partner efficiently but include no overhangs that can form ligation products with any partners containing one or more mismatches. For a given set of conditions, a computer can provide a user an output containing the highest fidelity set with good efficiency for any chosen number of junctions (10 junction pairs, 12 junction pairs, 15 junction pairs, 20 junction pairs, etc.). More pairs mean lower maximal fidelity. If a desired set of junctions have already been selected, the computer can process multiple data sets (for multiple ligases, restriction enzymes, cycling conditions) to choose the set of enzymes and reaction conditions that would give the highest possible fidelity and efficiency for the set of overhangs chosen. Intermediate cases are possible. Some overhangs and some reaction parameters could be defined by the user, while the computer output provided additional overhangs and reaction conditions to give the best efficiency and fidelity possible for the needed number of connections using the data sets that have been experimentally derived.

Users could also provide a gene, gene pathway, plasmid or chromosome sequence and specify it be divided into fragments that could be used to assemble that sequence efficiently with high fidelity. The user could specify the number of fragments, and the algorithm could then divide the master sequence into that number of fragments at the best set of junctions as above. The user could specify the minimum acceptable fidelity and the program could divide the sequence into the maximum number of sequences possible with junctions that provide that fidelity or better.

Example: 3: Selection of Parameters in Addition to the Sequence of Overhangs Desirable for Ordered Assembly of a Target Nucleic Acid from a Large Number of Polynucleotides Ligation Protocols Relating to Temperature A set of parameters were tested that related to the temperature at which ligation occurred. Ligation reactions were carried using three different protocols. These were (i) static ligation at a fixed temperature; (ii) drop-down ligation that involved cycling between a high temperature and a low temperature (e.g., 30 cycles of 10 minutes each for a total of 5 hours between 37° C. and 16° C.); (iii) touch-down ligation that involved 30 cycles from a high temperature to a low temperature in evenly divided incremental steps in descending order. For example, 30 cycles between a high temperature of 37° C. and a low temperature of 16° C. over 5 hours meant cycling between a step down in temperature in each cycle of a cumulative 0.7° C. followed by a fixed increase to the maximum temperature (37° C.) each for a prescribed time period of 5 minutes (total incubation time/60 cycles). For example, the first cycle would be 37° C. to 36.3° C. to 37° C. (1 cycle) to 35.6° C. to 37° C. and so on for a 21° C. decrease over 30 cycles until the last cycle is 37° C. to 16° C. completed within a 5-hour incubation; and (iv) touch-up ligation. This ligation protocol is the reverse of touch-down starting at the lowest temperature and incrementally cycling to the highest temperature (e.g., 16° C./37° C.). Various upper range temperatures from 37° C. to 50° C. were tested using various ligases and restriction endonucleases and static, drop-down or touch-down incubation conditions.

In detail, the ligation conditions tested are listed below:
(a) Ligation Conditions for Wt T4 DNA Ligase:
For static ligation at a fixed temperature where the ligation reaction was performed at 37° C., 45° C. and 50° C. for 2 fragments with 4-base overhangs over 16 hours and for assembly of large numbers of DNA fragments for extended periods (such as greater than 24 hours) preferably at 37° C.; (ii) ligation under drop-down conditions where the ligation reaction was performed first at 37° C. and then at 16° C. over 5 hours for 30 cycles between the high and the low temperature for joining 2 fragments, 12 fragments and 24 fragments with 4-base overhangs and 2 fragments with 3-base overhangs. Drop-down cycling for 30 cycles was also performed between 50° C. and 16° C. for joining 10 fragment with 3-base overhangs over 16 hours and for joining 52 fragments over 24 hours with 4-base overhangs and cycling between 42° C. and 16° C. for joining 24 and 52 fragments over 5 hours with 4-base overhangs; (iii) ligation under touch-down cycling conditions in which the temperature was cycled in increments from 37° C. for 5 minutes in increments of 0.7° C./cycle at each temperature until a temperature of 16° C. was reached after 30 cycles.

It was found with wt T4 DNA ligase could tolerate a drop-down cycling protocol between 42° C. and 16° C. for less than 24 hours producing ordered assemblies that were visible as blue colonies at these temperatures. In Table 8, no colonies were detected with wt T4 DNA polymerase at cycling temperatures of 50° C./16° C.

(b) Ligation conditions for a thermostable variant of T4 DNA ligase (Hi-T4 DNA ligase, New England Biolabs, Ipswich, MA)

Ligation reactions were carried using three different protocols. These were (i) static; (ii) drop-down; (iii) touch-down; and (iv) touch-up.

(c) Static (at 37° C., 45° C. or 50° C. for 16 hours (2 fragments with 4-base overhang or 37° C. for >24 hours) or 37° C.-50° C. or 45° C.-50° C. for long incubation times for assembly of large numbers of fragments (e.g. 100 fragments); (ii) drop-down; (37° C./16° C., 40° C./16° C., 42° C./16° C., 45° C./16° C.°, 47° C./16° C., or 50° C./16° C.) for 5 hours (24 fragments with 4-base overhangs) or 50°/16° for 16 hours (10 fragments with 3-base overhangs) and (iii) touch-down (37° C./16° C. and 45° C./16° C. for 5 hours for 12 fragments with 4-base overhangs) and 42° C./16° C. and 50° C./16° C. for 24 hours for 52 fragments with 4-base overhangs.

The use of thermostable T4 DNA ligase variant permitted the elevated upper range cycling temperatures (37° C. to 50° C.) to achieve successful ordered assembly of fragments. The higher the temperature in this range, the greater the accuracy of the ordered assembly of polynucleotide fragments with 4-base overhangs regardless of the restriction endonuclease used with the ligase. Indeed, this benefit was observed with BsaI-HFv2 which is a restriction endonuclease that generally works well at 37° C. BspQI and BsmBI are restriction endonucleases that generally have a preference for a temperature above 37° C. and improved fidelity was also observed with these enzymes at higher upper range temperatures. Depending on the cycling temperatures selected, different restriction endonucleases may be selected for greater assembly efficiency. For example, Esp3I is an isoschizomer of BsmBI. Esp3I prefers a reaction temperature of 37° C. while BsmBI prefers higher temperatures e.g., 45° C., 50° C. or 55° C. Yield was enhanced using a thermostable T4 DNA polymerase compared with wt DNA polymerase. Ratios of restriction endonuclease to ligase were within the range of 1:10-1:1000 regardless of the type of ligase or restriction endonuclease (including BspQI, BsmBI, HgaI, and BsaI-HFv2).

High salt T4 DNA ligase (Salt-T4™, New England Biolabs, Ipswich, MA) enabled an ordered assembly of fragments to occur in a high salt buffer where the restriction endonucleases that favor high salt were able to work optimally. This was demonstrated for BsmB1 using 100 mM salt in a 5-hour incubation using a 4-base overhang on 24 fragments with a drop-down temperature of 42° C./16° C.

Of particular note was the successful 52 fragment ordered assembly of a target polynucleotide using touch-down ligation conditions of 50° C./16° C. where the fragments had 4-base overhangs and the one pot enzyme reaction occurred over 24 hours.

Generally, it was found that the addition of EndoMS repair enzyme reduced the background caused by incorrect assemblies.

In summary, various ligation conditions were tested for ordered assembly of various numbers of polynucleotides (2-52) having 3-base and 4-base overhangs. Additional parameters included the length of the incubation, the amount of ligase and restriction endonuclease, the use of three different ligases: wt T4 DNA ligase; thermostable T4 DNA ligase variant; and a high salt T4 DNA ligase variant and the use of different restriction endonucleases: Bsa-HFv2, BsmBI, BspQI, PaqCI and the use of a repair enzyme (EndoMS). The results are summarized in Table 8 in which yield, fidelity and efficiency was determined for each combination of parameters tested.

Example 4: Experimental Protocol for Testing the Above Parameters to Determine Yield, Efficiency, and Fidelity. Ordered Assembly and Cloning of Lac Cassettes (12, 24 and 52 Fragments) and Virus Genomes (10, 24 and 52 Fragments)

In reactions described in Table 8 as specified, ordered assembly reactions consisted of precloned DNA fragments (3 nM each), PCR fragments (3 nM each), or chemically synthesized fragments (100 nM total) and the indicated amount of restriction enzyme and ligase in T4 DNA ligase buffer or a standard restriction endonuclease buffer e.g., CutSmart® buffer (New England Biolabs, Ipswich, MA). Assembly reactions were incubated as described above using one of the four different ligation protocols, followed by a 5 minute final incubation step at 60° C. then a final 4° C. hold prior to transformation. Transformations were performed using 2 µl of each assembly reaction added to 50 µl competent T7 Express chemically competent E. coli (New England Biolabs, Ipswich, MA) plated on the appropriate growth media, and incubated at 37° C. to form colonies or plaques if the assembled poly nucleotide was an intact phage. Electroporation was used to introduce assembled phage DNA into E. coli. The correctly assembled target polynucleotide coded for the lac operon (about 5 kb) so that blue colonies of correctly assembled fragments could be distinguished from white colonies containing incorrect assemblies on IPTG/Xgal/Chloramphenicol plate.

Colonies were imaged and counted using the aCOLyte 3 automated colony counting system (Synbiosis, Cambridge, UK) or by hand. For each assembly type, total transformants and percentage correct assemblies (blue colonies) were reported as the average result of at least three independent assembly reaction replicates, with the reported error one standard deviation from the mean.

Bacteria containing the correct assembly of the target polynucleotide could be visually identified as blue colonies on the plate versus white colonies which were identified as incorrect assemblies. In the case of phage assembly, since lysis was the end point, it was not possible to obtain fidelity measurements as a ratio of correct/total assemblies. Instead, plaques were identified to provide a measure of yield of correct assemblies.

For viral DNA assembly, a plaque was presumed to be evidence of a successful assembly. Plaques were observed against the lawn of bacteria evenly covering the plate. (In Table 8, Enterobacteria T7 phage genome was successfully assembled from 10 fragments using BspQI or 52 fragments using BsmBI and wt T4 DNA ligase or a thermostable T4 DNA ligase).

Accuracy was determined by sequence analysis of 2 fragment assemblies that were inserted into a SMRT Bell configuration for sequencing.

Selection of Overhang Length

Overhang lengths selection was subjected to at least one of the following parameters:

availability of enzymes that can generate a chosen overhang length;

number of fragments needed where longer overhangs allow for more possible fragments;

desired efficiency of ligation (longer overhangs ligate more efficiently);

desired efficiency of melting/annealing (shorter overhangs melt and anneal faster where longer overhangs require higher melting temperatures).

TABLE 7

Examples of computer-generated optimized overhang sets according to the methods herein.

| Set | #overhangs | Overhang sequences-one sequence/pair is shown. |
|---|---|---|
| 1 | 10 | AAC, ACT, AGA, ATA, CAA, CCA, CGA, CTC, GCA, GCC |
| 2 | 12 | GGAG, GGTC, AGCA, CAGT, GGTA, GAAT, GGTT, TCTT, GGTG, GCAC, AGCG, GTCT, CCAT |
| 3 | 15 | TGCC, GCAA, ACTA, TTAC, CAGA, TGTG, GAGC, AGGA, ATTC, CGAA, ATAG, AAGG, AACT, AAAA, ACCG |
| 4 | 20 | AGTG, CAGG, ACTC, AAAA, AGAC, CGAA, ATAG, AACC, TACA, TAGA, ATGC, GATA, CTCC, GTAA, CTGA, ACAA, AGGA, ATTA, ACCG, GCGA |
| 5 | 24 | GGAG, GATA, GGCA, GGTC, TCGC, GAGG, CAGT, GTAA, TCCA, CACA, GAAT, ATAG, AGTA, ATCA, TCTT, AGGT, CAAA, AAGC, GCAC, CAAC, CGAA, GTCT, TCAG, CCAT |
| 6 | 24 | GGAG, GATA, GGCA, GGTC, TCGC, GAGG, CAGT, GTAA, TCCA, CACA, GAAT, ATAG, AGTA, ATCA, TCTT, AGGT, CAAA, AAGC, GCAC, CAAC, CGAA, GTCT, TCAG, CCAT |
| 7 | 24 | TTGC, TGGA, TGAG, TAGG, ACAG, AAGC, AGCC, GTCA, CGTT, ATTT, TTCT, GAAA, GATG, GTAT, GCAC, TCGT, GGTC, CGGG, CACT, ACTA, ACCT, TCTC, ATGG, GTAG |
| 8 | 25 | GCCC, CCAA, ATCC, GGTA, ACGG, AAAT, ATAG, CTTA, AGGA, AGTC, ACAC, ATGA, GCGA, CATA, CTGC, AACG, CGCC, AGTG, CCTC, GAAA, CAGA, ACCA, AAGT, CGAA, CAAC |
| 9 | 30 | AAAC, AACA, AAGA, AAGT, AATG, ACAC, ACGA, AGAA, AGCC, AGGG, AGTA, ATAG, ATCA, ATGA, ATTC, CAAA, CACG, CAGA, CCAG, CCTA, CGAA, CGGC, CTCC, CTTA, GAGC, GATA, GCAA, GGGA, GTAA, TCCA |
| 10 | 52 | GGAG, CCAG, ATGT, TACA, GGCA, TATC, TAAG, CAGC, GAAC, CAAC, GCTT, TAGT, CTAT, GGAA, TTCG, AGAC, GTAT, GCGT, GATT, TTAC, TATT, TCGT, CAGA, GGGA, CTCA, GCAA, TGGA, CGTC, AACC, AGTA, TAGA, GAAA, AGGG, TTCT, ACAA, AGGT, TGTT, GAGT, TGGC, ACCG, ATTA, GTGC, AGCG, TCTT, CGTG, CCGA, ATCA, TCTC, CAAA, TTCA, TAGG, TATG, CCAT |

TABLE 7-continued

Examples of computer-generated optimized overhang sets according to the methods herein.

| Set | #over-hangs | Overhang sequences-one sequence/pair is shown. |
|---|---|---|
| 11 | 52 | AAAT, AGAA, AGCG, ATGT, TAGT, TCGC, CTGG, ACAA, AGAC, GCTG, GGCA, ACCC, ACCG, AAGC, TACT, AATC, AAGG, GAAA, GGTT, CAAC, CGTC, CCTA, TGGG, TAAG, TCAT, ACGG, GTAA, CATT, TATC, TGAG, GCAC, CCAC, TTCG, TCTG, AGGA, ACGC, TGGC, GTAT, CGTG, CTAT, GAGA, ACTC, GGTG, TCCA, GGGA, GTTC, TTGC, GAAG, GGAA, CAAA, ATCA, TGTT |
| 12 | 100 | TTAC, CCCA, AACT, TTTT, TGTA, CGAA, GGAG, TAGC, CAAG, ACAA, CTAT, GGTC, TGGC, AGAA, ACTT, AGTG, TCTG, ATGC, AAGG, CAAC, TCTT, GAAG, GTGG, TTGA, TCGG, CTCT, GGTA, GATG, AATC, GACA, ACTA, CGCA, TGAA, ATCG, CCAA, CCAT, CATA, GAGA, TAGA, TCGT, GGTT, CTCG, AAAG, GGAT, TGCT, TATT, CTCA, ATTC, TGAT, CATT, CTGG, GTTA, CTAA, AACG, GTAG, ACGC, TGTG, GCAC, GCAA, ATTT, GGCT, TCCG, CTGC, TCAC, TCAT, TAGG, CCGT, GATA, AGAC, TAAG, TCCC, GGGT, GAGT, ATAC, GTTT, TCCA, ACCG, ACTG, CAAA, GGCG, GACT, TGTT, GAAA, TACG, TCAG, GTTC, GCGA, GCTT, GCTC, TACT, AGAT, TGGT, AGGA, TAAT, GGAA, ACCT, CAAT, CCCC, ATGT, TGAC |

Overhangs were generated as described above using BsaI-HFv2, BsmBI or BspQI: The following are the overhangs used in Table 8.

Overhangs are written here in the 5' to 3' direction with the phosphate omitted.

2-Fragment:

All possible combination of 4-base or 3-base overhangs were tested on 50-base synthetic DNA fragments to create the ligation frequency tables.

10-Fragment Phage Assembly: 3-base overhang (BspQI):
Overhangs:
  AAC, ACT, AGA, ATA, CAA, CCA, CGA, CTC, GCA, GCC 12-Fragment Lac Assembly: 4-Base Overhang (BsaI-HFv2):
Overhangs:
  GGAG, GGTC, AGCA, CAGT, GGTA, GAAT, GGTT, TCTT, GGTG, GCAC, AGCG, GTCT, CCAT
    (Fragment sizes (base pairs): 351, 395, 369, 381, 526, 507, 425, 456, 487, 306, 322, 322)

24-Fragment Lac Assembly: 4-Base Overhang (BsaI-HFv2; BsmBI):
Overhangs:
  GGAG, GATA, GGCA, GGTC, TCGC, GAGG, CAGT, GTAA, TCCA, CACA, GAAT, ATAG, AGTA, ATCA, TCTT, AGGT, CAAA, AAGC, GCAC, CAAC, CGAA, GTCT, TCAG, CCAT
    (Fragment sizes (base pairs): 118, 222, 222, 199, 137, 217, 197, 244, 293, 173, 127, 208, 287, 310, 291, 259, 176, 217, 135, 176, 184, 133, 203, 119)

24-Fragment T4 Phage Assembly (BsmBI):
Overhangs:
  GGAG, GATA, GGCA, GGTC, TCGC, GAGG, CAGT, GTAA, TCCA, CACA, GAAT, ATAG, AGTA, ATCA, TCTT, AGGT, CAAA, AAGC, GCAC, CAAC, CGAA, GTCT, TCAG, CCAT
    (Fragment size: 8 kb)

24-Fragment T4 Phage Assembly (BsmBI):
Overhangs:
  TTGC, TGGA, TGAG, TAGG, ACAG, AAGC, AGCC, GTCA, CGTT, ATTT, TTCT, GAAA, GATG, GTAT, GCAC, TCGT, GGTC, CGGG, CACT, ACTA, ACCT, TCTC, ATGG, GTAG
    (Fragment sizes (base pairs): 4631, 9473, 7031, 7465, 10181, 1595, 8807, 3851, 4152, 10945, 11254, 7290, 1680, 10213, 7152, 6898, 7162, 7104, 6967, 6827, 8052, 8947, 4304, 7018)

30-Fragment All-Purpose Overhang Set (Any 4-cutter):
Overhangs:
  AAAC, AACA, AAGA, AAGT, AATG, ACAC, ACGA, AGAA, AGCC, AGGG, AGTA, ATAG, ATCA, ATGA, ATTC, CAAA, CACG, CAGA, CCAG, CCTA, CGAA, CGGC, CTCC, CTTA, GAGC, GATA, GCAA, GGGA, GTAA, TCCA 52-Fragment Lac Assembly: 4-base overhang (BsaI-HFv2):
Overhangs:
  GGAG, CCAG, ATGT, TACA, GGCA, TATC, TAAG, CAGC, GAAC, CAAC, GCTT, TAGT, CTAT, GGAA, TTCG, AGAC, GTAT, GCGT, GATT, TTAC, TATT, TCGT, CAGA, GGGA, CTCA, GCAA, TGGA, CGTC, AACC, AGTA, TAGA, GAAA, AGGG, TTCT, ACAA, AGGT, TGTT, GAGT, TGGC, ACCG, ATTA, GTGC, AGCG, TCTT, CGTG, CCGA, ATCA, TCTC, CAAA, TTCA, TAGG, TATG, CCAT
    (Fragment sizes (base pairs): 83, 125, 103, 45, 114, 83, 122, 81, 89, 139, 81, 119, 62, 96, 92, 92, 107, 113, 85, 82, 113, 95, 110, 78, 96, 78, 101, 103, 115, 75, 113, 98, 115, 63, 99, 126, 93, 69, 102, 86, 139, 56, 121, 73, 128, 110, 67, 93, 144, 90, 96, 77)

52-Fragment T7 Phage Assembly (BsmBI)
Overhangs:
  AAAT, AGAA, AGCG, ATGT, TAGT, TCGC, CTGG, ACAA, AGAC, GCTG, GGCA, ACCC, ACCG, AAGC, TACT, AATC, AAGG, GAAA, GGTT, CAAC, CGTC, CCTA, TGGG, TAAG, TCAT, ACGG, GTAA, CATT, TATC, TGAG, GCAC, CCAC, TTCG, TCTG, AGGA, ACGC, TGGC, GTAT, CGTG, CTAT, GAGA, ACTC, GGTG, TCCA, GGGA, GTTC, TTGC, GAAG, GGAA, CAAA, ATCA, TGTT
    (Fragment sizes (base pairs): 779, 918, 512, 465, 810, 756, 731, 820, 690, 759, 813, 743, 644, 1043, 494, 887, 526, 918, 854, 837, 540, 880, 678, 812, 732, 802, 976, 530, 745, 568, 885, 1130, 148, 1008, 847, 667, 748, 831, 842, 753, 947, 428, 928, 411, 301, 1383, 424, 1056, 893, 653, 815, 1735)

100-Fragment T4 Phage Assembly (BsmBI):
Overhangs:
  TTAC, CCCA, AACT, TTTT, TGTA, CGAA, GGAG, TAGC, CAAG, ACAA, CTAT, GGTC, TGGC, AGAA, ACTT, AGTG, TCTG, ATGC, AAGG, CAAC, TCTT, GAAG, GTGG, TTGA, TCGG, CTCT, GGTA, GATG, AATC, GACA, ACTA, CGCA, TGAA, ATCG, CCAA, CCAT, CATA, GAGA, TAGA, TCGT, GGTT, CTCG, AAAG, GGAT, TGCT, TATT, CTCA, ATTC, TGAT, CATT, CTGG, GTTA, CTAA, AACG, GTAG, ACGC, TGTG, GCAC, GCAA, ATTT, GGCT, TCCG, CTGC, TCAC, TCAT, TAGG, CCGT, GATA, AGAC, TAAG, TCCC, GGGT, GAGT, ATAC, GTTT, TCCA, ACCG, ACTG, CAAA, GGCG, GACT, TGTT, GAAA, TACG, TCAG, GTTC, GCGA, GCTT, GCTC, TACT, AGAT, TGGT, AGGA, TAAT, GGAA, ACCT, CAAT, CCCC, ATGT, TGAC
    (Fragment sizes (base pairs): 395, 383, 424, 367, 451, 506, 287, 411, 352, 355, 419, 357, 519, 208, 448, 379, 412, 380, 422, 475, 337, 481, 242, 537, 320, 450, 522, 149, 562, 329, 312, 567, 389, 328, 456, 301, 390, 479, 282, 402, 494, 340, 450, 287, 569, 380, 396, 334, 390, 412, 295, 487, 199, 627, 290, 557, 382, 409, 296, 418, 906, 143, 193, 296, 436, 412, 465, 295, 511, 312, 341, 369, 448, 451, 421, 297, 380, 425, 479, 150, 679, 320, 356, 495, 223, 562, 399, 319, 317, 268, 628, 435, 368, 355, 451, 308, 555, 336, 357, 1074)

Choice of Ligase

A ligase can be selected that has been optimized for the ordered assembly of a particular set of polynucleotide fragments. This can depend on temperature and salt tolerance for optimizing function with a selected restriction endonuclease. Various ligases may have a preference for the length of overhang preferring Watson-Crick pairs to pairings with one or more mismatch to produce a high-fidelity product. Other factors may include the number of fragments to be joined and the length of the incubation period required to produce fragments by restriction endonuclease cleavage and to ligate the fragments together with a shared preference by the endonuclease and ligase for buffers and cycling conditions.

An example of a ligase that is suitable for high temperature ligation (greater than 42° C.) and meets minimum criteria for fidelity, efficiency and yield of assembled fragments includes a high temperature mutant of T4 DNA ligase. An example of a ligase that is capable of functioning at high salt concentrations favored by selected Type IIS bacillus restriction endonucleases for efficient cleavage, includes a salt tolerant mutant of T4 DNA Ligase.

Other ligases that are naturally occurring or variants of naturally occurring ligases may include those derived from extremophiles that naturally survive at high temperatures such as archaeal ligases or derived from bacteria that flourish in high salt environments or ligase encoded by the phage that parasitize these organisms. Other phage ligases may be selected that can ligate overhangs containing modified nucleotides that may be desirable in some cases.

The Restriction Endonuclease

A Type IIS restriction endonuclease can be selected that efficiently cleaves DNA outside its recognition sequence to create a 3-base, 4-base or 5-base overhang. Examples of endonucleases that are capable of cleaving a 3-base overhang are BspQI and SapI. Examples of endonucleases that are capable of cleaving a 4-base overhang include BsmBI, BsaI-HFv2 and BsaI and an example of an endonuclease that is capable of creating a 5-base overhang is HgaI. One feature that differentiates various Type IIS restriction endonucleases having the same number of bases in the overhang is the number of bases in the recognition sequence. For example, the BbsI family has a 6 nucleotide recognition sequence with a 4-base overhang whereas the AarI family has a 7 nucleotide recognition sequence with a 4-base overhang. The benefit of a longer recognition sequence is that this reduces the likelihood of internal cleavage sites in fragments that have been selected for joining. Experiments have shown that the longer overhangs (5-base overhangs) result in lower fidelity in joined fragments compared with 3 and 4-base overhangs. Moreover, restriction endonucleases may vary in their activity. While AarI has the desired characteristics of a 7-base recognition sequence and 4-base overhang, PaqCI has been found here to be a more active endonuclease and therefore more suitable for DNA assembly reactions.

All of the Type IIS enzymes described herein are commercially available from New England Biolabs, Ipswich, MA. The unit definition for Hi-T4 and Salt-T4™ ligase (New England Biolabs, Ipswich, MA) are the same as wt T4 DNA ligase (one unit is defined as the amount of enzyme required to give 50% ligation of HindIII fragments of λ DNA (5' DNA termini concentration of 0.12 μM, 300-μg/ml) in a total reaction volume of 20 μl in 30 minutes at 16° C. in 1×T4 DNA Ligase Reaction Buffer.

The results of assembly reactions using a variety of fragments and of parameters is provided in Table 8.

Example 5: Using the Client, Server and Data Base to Design an Assembly of a Large DNA (A) Whole bacteriophage genomes can be assembled with at least 50% ligation assembly fidelity using 50 polynucleotide fragments having 4-base overhangs that are formed as products of BsaI-HFv2 cleavage using the computer system described herein.

(B) Whole chloroplast genomes can be assembled with at least 20% assembly fidelity using 100 polynucleotide fragments having 4-base overhangs that are formed as products of BsaI-HFv2 cleavage using the computer system described herein.

(C) Assembly of a termite ligase capable of digesting lignin efficiently and a termite metabolic pathway for achieving the same with at least 20% assembly fidelity comprising selecting polynucleotide fragments with 4-base overhangs derived from the termite genome for assembly into a target nucleic acid.

In the above cases, the user inputs a Genome sequence into the computer. The computer checks potential insert sequences for internal BsaI-HFv2 sites (or other Type IIS recognition sites according to choice of enzyme). The computer processes the sequences using a database of overhang ligation efficiencies under various experimental conditions and using selected components where the selection is performed by the computer, the user or both in part. The computer outputs a genomic sequence with suggested break points. If these breakpoints are accepted by the user, the computer outputs a set of primer designs to introduce a Type IIS restriction site adjacent to a sequence that can form a unique 4-base overhang. The primers feature 6-bases at the 5'-end flanking the BsaI-HFv2 recognition site, the recognition site itself, plus the 4-base unique overhangs separated from the recognition site by N1 base and determine correct annealing and ligation of the inserts. All overhangs output by the computer are non-palindromic (to eliminate self-insert ligations), unique, and in the correct orientations to ensure correct assembly. The polynucleotides corresponding to the fragments output are synthesized and amplified as needed using the primers to form amplicons that can be purified. Alternatively, polynucleotide fragments can be cloned as inserts into plasmids (see FIG. 2A-2C). Amplicons or pre-cloned inserts can then be treated with a Type IIS restriction enzyme (e.g., BsaI-HFv2) and a ligase (e.g., T4 DNA ligase) in a single reaction and incubated under predetermined experimental conditions where these have been optimized by the computer or selected by the user. With optimized buffer components and enzyme ratios, a single reaction containing a destination plasmid such as pGGA and inserts (PCR amplicons or precloned) will result in ligation of inserts with complementary cohesive ends and the accumulation of assembled product (target nucleic acid) as a function of time. The final assembly has no BsaI-HFv2 recognition sites, rendering the assembly inert to further digestion by BsaI-HFv2. The product of the reaction is a target nucleic acid which can introduced into a destination vector for transformation into a bacterial cell and cloned on selective media (see for example FIG. 3A-3C). Precloning is recommended for inserts of size greater than 3 kb or those containing repetitive elements that might accumulate errors during PCR amplification to produce amplicon inserts.

Two experimental protocol approaches are described here for assembly of polynucleotides into a target nucleic acid. These are constant 37° C. single temperature incubations, or cycling protocols alternating between 37° C. (optimal temperature for endonuclease digestion within a temperature range for ligase stability), and 16° C. (optimal temperature for ligation). The assembly protocol suggestions were based on the number of inserts in the assembly reaction, but there is considerable flexibility; hence, the computer output provides the optimal experimental conditions for a set of overhangs with selected % ligation fidelity. In the present example:

(a) Assembly of 1-4 inserts did not use cycling; and ligation was achieved at a single temperature of 37° C.
(b) Multiple inserts used cycling assemblies with 1-minute temperature steps.
(c) Cycling assemblies using 5-10-minute temperature steps was also used for larger scale assemblies (>10 inserts) to provide maximal assembly yields and transformation levels.
(d) For convenience, overnight incubations with 30 cycles of 37° C., 5 minutes→16° C., 10 minutes, followed by 60° C., 5 minutes and then 4° C. were also used. This resulted in high levels of accurate assemblies with low background (for 24 fragment assemblies). BsaI-HFv2 and T4 DNA Ligase however are very stable, and they will continue to function at least up to 60 cycles and beyond.

Multiplex PCR: One-Pot PCR Generation of Fragments for Assembly

Gene fragments flanked by selected restriction endonuclease cut sites were individually precloned into pUC57-mini plasmids with any internal restriction sites in the $amp^R$ gene removed through silent mutagenesis. The resulting plasmids (10 ng each) were amplified simultaneously in a single PCR reaction using 1×Q5® Hot Start PCR Master Mix (New England Biolabs, Ipswich, MA) and a common set of two amplification primers (100 uM each). Amplified fragments were then purified using a Monarch® DNA cleanup kit (New England Biolabs, Ipswich, MA) and quantified by capillary electrophoresis using an Agilent Bioanalzyer.

The PCR-amplified fragments (230 ng) were then combined with 1 µL of T4 DNA ligase buffer containing wt T4 DNA ligase (1000 u) and BsaHFv2 restriction endonuclease (30 U) for 5 hours and drop-down cycled between 37° C. and 16° C. Final assembly products were then transformed into chemically competent *E. coli*, plated, and yield, fidelity and efficiency were quantified as described in Table 8.

An Example of a Workflow for Generating an Ordered Assembly of Polynucleotides into a Target Polynucleotide A workflow could be largely or entirely accomplished in a single machine with various component inputs presented together or sequentially. In a hypothetical workflow, a desired sequence is entered into the computer. The computer then provides an output describing the suitable fragments, and overhangs derived from the ligation frequency table to which sets of rules have been attached for ordered assembly of the desired sequence.

The computer output might interface with a lab on a chip or other instrument containing multiple reagent compartments. The regulation of reaction steps may be controlled on a chip by electrowetting based liquid transfer. For example, AQdrop® platform (Sharp Life Sciences, Oxford, UK) enables micro-scale droplets to be electronically manipulated on the "lab-on-a-chip" device. Another platform is an acoustic based-liquid transfer (Beckman Coulter, Brea, CA). Alternatively, the workflow may be performed using magnetic beads to remove unwanted enzymes/primers from a reaction vessel at different stages as needed.

Accordingly, fragments may be synthesized in situ or from a secondary source according to the computer output. The synthesized fragments can be amplified by cloning or by an amplification method such as PCR. The latter may be achieved by combining all the separate synthesized fragments in a single mixture and performing multiplex PCR. The polymerase may be inactivated, and a ligase and a restriction endonuclease added to achieve ordered DNA assembly using the methods described herein. The subsequent assembled target DNA may be (i) incorporated into a vector that in turn is introduced into a host cell by transformation of the vector; (ii) encapsulated into a virus and introduced into a host cell by infection; (iii) in the form of naked DNA or with a chaperone molecule, introduced directly into a eukaryotic cell; (iv) introduced into an in vitro expression system to determine whether the transcript of the assembled DNA is functional. Optionally, a product of the assembly could be moved to a platform location to perform sequencing such as by means of a whole molecule sequencer (Oxford Nanopore or Pacific Biosystems).

Ordered assembly of DNA molecules using the methods described herein, is a powerful tool for synthesizing individual genes or metabolic pathways and also for potentially modifying eukaryotic cells genetically. It also provides a means for synthesizing toxic proteins such as novel nucleases, to determine their specificity and other functions. Ordered assemblies encoding toxic proteins may be transcribed using an in vitro transcription system (New England Biolabs, Ipswich, MA) and then tested for DNA cleavage to determine whether a desired function is achieved. The selected positive proteins can then be manufactured in cells under specialized conditions.

In one example of an automated workflow where a large molecule is built from small fragments, a first step would be to synthesize a set of fragments of at least 20 bases in length enzymatically (e.g., using a terminal transferase) or by chemical synthesis or as a product of PCR from a larger substrate or a set of overlapping fragments.

These fragments can be assembled using the protocols described herein. An assembly of 50 fragments of 25-bases would generate a target polynucleotide of 1000 bases. The restriction endonuclease and ligase can optionally be heat killed at 60° C. prior to the next assembly step.

The assembly process may be repeated again with the newly created polynucleotide fragments. For example, primers, aptamers and polymerases for amplifying newly formed polynucleotide fragments from the previous step can then be generated by multiplex PCR. Subsequently, the amplified polynucleotide fragments are subjected to restriction endonuclease cleavage and ligation to generate a 12,500 bp fragment from 50×250 bp polynucleotides or a 50,000 bp polynucleotide from 50×1000 bp fragments.

The assembly can then be repeated for example by combining 50×12,500 (625 Kb) fragments or the 50×50,000 bp fragments (2.5 Mb), followed by cleavage and ligation to generate a 625 kb or 2.5 Mb target polynucleotide.

Another example of a workflow would be a one-step DNA assembly using a large number of DNA fragments of a size ranging from 200-1000 bp.

The efficiency of ligation of fragments depends on the overhangs, enzymes and experimental conditions but does not depend on the length of the polynucleotide fragments used in assembly at least up to 1 kb. The assembly of large number of fragments used in the assembly beyond 24 fragments may be preferentially accomplished by extended incubation periods. Where these incubation periods exceed 24 hours, it may be preferable to use a static ligation protocol instead of touch-down or drop-down protocol. The wt T4 ligase may be used in thermocycling up to temperatures defined by drop-down conditions of 42° C./16° C. Above 42° C., a thermostable ligase is preferable.

Proposed Uses of the Workflow Described Herein

One tube, multiple constructs: emulsified ordered assembly workflow could enable users to generate different constructs from multiple fragment in a small droplet-based format where "positive" drops can be sorted for downstream applications by FACS. Mismatch connections during ordered assembly could enable users to generate different variations of constructs in one tube by the purposeful use of an overhang(s) that pair well with multiple partners. For example, a user could generate the same genetic circuit with several different promoters in one tube and identify the best construct through genetic screening.

Assembly of higher order DNA structures (using non-standard DNA parts). DNA Origami could enable users to assemble DNA structures to facilitate transfection and consistent genetic regulation by controlling shape of assembled molecule. Branched Construct Generation could enable users to create futuristic constructs with branched configurations for parallel regulation. For example, use of a non-standard part assembly fragments (1 duplex to 2 duplex connectors etc.) could position to coding sequence close to the same insulator element.

Mixed overhang length for ordered assembly resulting from the use of more than one Type IIS enzyme could enable maximizing fragments numbers for assembly and permit users to increase the numbers of overhangs possible in a single reaction by mixing orthogonal sets of overhangs with different lengths. This approach could also generate a final construct with a bubble to facilitate downstream applications (including strand invasion or cleavage of the product by nucleases (e.g., T7 endo I)).

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

TABLE 8

| Test System | Cycling | Temps ° C. | Ligase | Type IIS | Overhang | Time | Additive | Yield | Fidelity % | Efficiency | [Protein] |
|---|---|---|---|---|---|---|---|---|---|---|---|
| Touch-down Cycling increases assembly fidelity and reduces background colonies >2-fold ||||||||||||
| 12-Fragment | Drop-down | 37/16 | wt T4 | BsaI-HFv2 | 4 bp | 5 hr | No | 3760 | 55 | 752 | 500/15 |
| | Touch-up* | 37/16 | wt T4 | BsaI-HFv2 | 4 bp | 5 hr | No | 2860 | 51 | 572 | 500/15 |
| | Touch-down | 37/16 | wt T4 | BsaI-HFv2 | 4 bp | 5 hr | No | 2660 | 76 | 532 | 500/15 |
| Touch-down cycling increases assembly fidelity over drop-down cycling ||||||||||||
| 2-Fragment | Drop-down | 37/16 | wt T4 | BsaIHFv2 | 4 bp | 5 hr | No | 43.18 | 58 | 8.6 | 2000/15 |
| | Touch-down | 37/16 | wt T4 | BsaIHFv2 | 4 bp | 5 hr | No | 48.43 | 77 | 9.7 | 2000/15 |
| High temp touch-down increases assembly fidelity compared to a lower temperature touch-down protocol ||||||||||||
| 12-Fragment | Touch-down | 37/16 | Hi-T4 | BsaIHFv2 | 4 bp | 5 hr | No | 5600 | 64 | 1120 | 500/15 |
| | Touch-down | 45/16 | Hi-T4 | BsaIHFv2 | 4 bp | 5 hr | No | 4520 | 74 | 904 | 500/15 |
| Salt increases assembly yield >2-fold in the optimized concentration range ||||||||||||
| 24-Fragment | Drop-down | 42/16 | wt T4 | BsmBI | 4 bp | 5 hr | No | 51 | 55 | 10 | 1000/30 |
| | Drop-down | 42/16 | wt T4 | BsmBI | 4 bp | 5 hr | Salt (100 mM) | 2.5 | 8 | 1 | 1000/30 |
| | Drop-down | 42/16 | Salt-T4 Ligase | BsmBI | 4 bp | 5 hr | Salt (100 mM) | 148 | 66 | 30 | 1000/30 |
| High Temperature increases assembly yield and accuracy using BsmBI ||||||||||||
| 24-Fragment | Drop-down | 37/16 | wt T4 | BsaI-HFv2 | 4 bp | 5 hr | No | 114 | 88 | 23 | 1000/30 |
| | Drop-down | 37/16 | wt T4 | BsmBI | 4 bp | 5 hr | No | 1 | 15 | 0 | 1000/30 |
| | Drop-down | 40/16 | wt T4 | BsmBI | 4 bp | 5 hr | No | 7 | 18 | 1 | 1000/30 |
| | Drop-down | 42/16 | wt T4 | BsmBI | 4 bp | 5 hr | No | 56 | 48 | 11 | 1000/30 |
| | Drop-down | 45/16 | wt T4 | BsmBI | 4 bp | 5 hr | No | 2 | 27 | 0 | 1000/30 |
| | Drop-down | 47/16 | wt T4 | BsmBI | 4 bp | 5 hr | No | 0 | N/A | 0 | 1000/30 |
| | Drop-down | 50/16 | wt T4 | BsmBI | 4 bp | 5 hr | No | 0 | N/A | 0 | 1000/30 |
| | Drop-down | 37/16 | Hi-T4 | BsmBI | 4 bp | 5 hr | No | 0 | N/A | 0 | 1000/30 |
| | Drop-down | 40/16 | Hi-T4 | BsmBI | 4 bp | 5 hr | No | 6 | 11 | 1 | 1000/30 |
| | Drop-down | 42/16 | Hi-T4 | BsmBI | 4 bp | 5 hr | No | 40 | 44 | 8 | 1000/30 |
| | Drop-down | 45/16 | Hi-T4 | BsmBI | 4 bp | 5 hr | No | 182 | 70 | 36 | 1000/30 |
| | Drop-down | 47/16 | Hi-T4 | BsmBI | 4 bp | 5 hr | No | 282 | 82 | 56 | 1000/30 |
| | Drop-down | 50/16 | Hi-T4 | BsmBI | 4 bp | 5 hr | No | 380 | 88 | 76 | 1000/30 |
| 52-fragments (4 bp overhangs) are assembled in one-pot using a high temp touch-down protocol (lac cassette) ||||||||||||

| Test System | Cycling | Temps ° C. | Ligase | Type IIS | Overhang | Time | Additive | Yield | Fidelity | Efficiency | [Protein] |
|---|---|---|---|---|---|---|---|---|---|---|---|
| 52-Fragment | Touch-down | 50/16 | wt T4 | BsaI-HF | 4 bp | 24 hr | No | 0 | N/A | N/A | 1000/30 |
| | Touch-down | 50/16 | Hi-T4 | BsaI-HF | 4 bp | 24 hr | No | 1.1 | N/A | 2.2 | 1000/30 |

TABLE 8-continued

| Test System | Cycling | Temps ° C. | Ligase | Type IIS | Overhang | Time | Additive | Yield | Fidelity % | Efficiency | [Protein] |
|---|---|---|---|---|---|---|---|---|---|---|---|
| T7 Phage genome assembled from 10-fragments (3-base overhang) in one-pot using a high temp digestion protocol ||||||||||||
| 10-Fragment | Drop-down | 50/16 | wt T4 | BspQI | 3 bp | 16 hr | No | 0 | N/A | 0 | 500/15 |
|  | Drop-down | 50/16 | Hi-T4 | BspQI | 3 bp | 16 hr | No | 1768 | N/A | 110.5 | 500/15 |
| T7 Phage genome assembled from 52 fragments (4-base overhang) in one-pot using a high temp drop-down cycling ||||||||||||
| 52-Fragment | Drop-down | 42/16 | wt T4 | BsmBI | 4 bp | 5 hr | No | 11 | N/A | 2.2 | 1000/30 |
|  | Drop-down | 42/16 | Wt T4 | BsmBI | 4 bp | 16 hr | No | 141 | N/A | 8.8 | 1000/30 |

| Test System | Cycling | Temps ° C. | Ligase | Type IIS | Overhang | Time | Additive | Yield* | Fidelity % | Efficiency | [Protein] |
|---|---|---|---|---|---|---|---|---|---|---|---|
| Assembly at high temperatures with BsaI-HFv2 ||||||||||||
| 2-Fragment | Static | 37 | wt T4 | BsaI-HFv2 | 4 bp | 16 hr | No | 38.3 | 83 | 2.39 | 2000/15 |
|  | Static | 45 | wt T4 | BsaI-HFv2 | 4 bp | 16 hr | No | 0 | N/A | 0 | 2000/15 |
|  | Static | 50 | wt T4 | BsaI-HFv2 | 4 bp | 16 hr | No | 0 | N/A | 0 | 2000/15 |
|  | Static | 37 | Hi-T4 | BsaI-HFv2 | 4 bp | 16 hr | No | 36.6 | 81 | 2.29 | 2000/15 |
|  | Static | 45 | Hi-T4 | BsaI-HFv2 | 4 bp | 16 hr | No | 25.9 | 93 | 1.62 | 2000/15 |
|  | Static | 50 | Hi-T4 | BsaI-HFv2 | 4 bp | 16 hr | No | 14 | 96 | 0.87 | 2000/15 |

| Test System | Cycling | Temps ° C. | Ligase | Type IIS | Overhang | Time | Additive | Yield* | Accuracy % | Efficiency | [Protein] |
|---|---|---|---|---|---|---|---|---|---|---|---|
| Assembly at high temperatures (thermostable BspQI) increases assembly accuracy ||||||||||||
| 2-Fragment | Static | 37 | wt T4 | BspQI | 3 bp | 16 hr | No | 38 | 95 | 2.38 | 500/15 |
|  | Static | 45 | wt T4 | BspQI | 3 bp | 16 hr | No | 0 | N/A | 0 | 500/15 |
|  | Static | 50 | wt T4 | BspQI | 3 bp | 16 hr | No | 0 | N/A | 0 | 500/15 |
|  | Static | 37 | Hi-T4 | BspQI | 3 bp | 16 hr | No | 40.85 | 95 | 2.55 | 500/15 |
|  | Static | 45 | Hi-T4 | BspQI | 3 bp | 16 hr | No | 38.8 | 97 | 2.43 | 500/15 |
|  | Static | 50 | Hi-T4 | BspQI | 3 bp | 16 hr | No | 11.96 | 98 | 0.75 | 500/15 |

| Test System | Cycling | Temps ° C. | Ligase | Type IIS | Overhang | Time | Additive | Yield | Fidelity % | Efficiency | [Protein] |
|---|---|---|---|---|---|---|---|---|---|---|---|
| Multiplex PCR - Decreases time/effort required to generate assembly parts: Demonstrates Successful 24-Fragment Assembly from One-Pot PCR Method ||||||||||||
| 24-Fragment | Drop-down | 37/16 | wt T4 | BsaI-HFv2 | 4 bp | 5 hr | No | 9.2 | 92 | 2 | 1000/30 |
| 12-Fragment Assembly from One-Pot PCR Method ||||||||||||
| 12-Fragment | Drop-down | 37/16 | wt T4 | BsaI-HFv2 | 4 bp | 5 hr | No | 792 | 97 | 158 | 500/15 |
| EndoMS Cleanup - Increases assembly fidelity: EndoMS reduces background colonies >2-fold ||||||||||||
| 12-Fragment | Drop-down | 37/16 | wt T4 | BsaI-HFv2 | 4 bp | 5 hr | No | 3260 | 59 | 652 | 500/15 |
|  | Drop-down | 37/16 | wt T4 | BsaI-HFv2 | 4 bp | 5 hr | EndoMS | 3090 | 84 | 618 | 500/15 |
| EndoMS reduces background colonies >2-fold ||||||||||||
| 12-Fragment | Drop-down | 37/16 | wt T4 | BsaI-HFv2 | 4 bp | 5 hr | No | 7075 | 45 | 1415 | 500/15 |
|  | Drop-down | 37/16 | wt T4 | BsaI-HFv2 | 4 bp | 5 hr | EndoMS | 7150 | 70 | 1430 | 500/15 |
| EndoMS treatment improves fidelity of touch-down cycling assembly protocol ||||||||||||
| 12-Fragment | Touch-down | 37/16 | wt T4 | BsaIHFv2 | 4 bp | 5 hr | No | 270 | 68 | 54 | 500/15 |
|  | Touch-down | 37/16 | wt T4 | BsaIHFv2 | 4 bp | 5 hr | EndoMS | 810 | 89 | 162 | 500/15 |

| Test System | Cycling | Temps ° C. | Ligase | Type IIS | Overhang | Time | Additive | Yield* | Accuracy % | [Protein] |
|---|---|---|---|---|---|---|---|---|---|---|
| EndoMS treatment increases assembly accuracy |||||||||||
| 2-Fragment | Drop-down | 37/16 | wt T4 | BsaI-HFv2 | 4 bp | 5 hr | No | N/A | 58 | 2000/15 |
|  | Drop-down | 37/16 | wt T4 | BsaI-HFv2 | 4 bp | 5 hr | EndoMS | N/A | 72 | 2000/15 |
| EndoMS treatment increases assembly accuracy |||||||||||
| 2-Fragment | Drop-down | 37/16 | wt T4 | SapI | 3 bp | 5 hr | No | N/A | 88 | 1000/15 |
|  | Drop-down | 37/16 | wt T4 | SapI | 3 bp | 5 hr | EndoMS | N/A | 95 | 1000/15 |

Yield—Total amount of positive assemblies or plaques. For the 2-fragment assembly, yield is ng product.
Fidelity—Yield/total assemblies or product (blue colonies/white colonies)
Efficiency—Yield/hour
[Protein]—Ligase concentration (units) and Type IIS concentration (units)/20 μl reaction
Accuracy—Number of correct end joining of fragments over number of total assemblies
Hi-T4—Thermostable T4 DNA ligase variant
Salt-T4—Salt tolerant T4 DNA ligase variant
EndoMS was used at a concentration of 3.4 μg/20 μl reaction

Example 6: Rapid One-Pot DNA Molecule Construction from 50 Fragments of 40 Kb T7 Phage DNA and from 52 Fragments of the 4.9 Kb Lac Operon with High Fidelity Enzymes, buffers, and media were obtained from New England Biolabs, Ipswich, MA (NEB), unless otherwise noted. Synthetic oligonucleotides were obtained from either Integrated DNA Technologies (IDT) or Sigma Aldrich (Sigma).

DNA Sequencing Assay

Substrates for the DNA sequencing assay were prepared as previously described. Golden Gate assembly reactions (20 µL final volume) to generate sequencing libraries were carried out in 1×T4 DNA ligase buffer by combining: 100 nM of DNA substrate (final concentration) with 2 µL of NEB Golden Gate Enzyme Mix (BsaI-HFv2 or BsmBI-v2). Reactions were carried out for 16 hours at 37° C. (BsaI-HFv2) or 42° C. (BsmBI-v2). Reactions were then quenched by the addition of 25 mM EDTA and column purified (Monarch PCR & DNA Cleanup Kit). The resulting assembly products were further purified to remove un-ligated substrate by treatment with Exonuclease III (50 U) and Exonuclease VII (5 U) in 1× Standard Taq Polymerase buffer (final concentration) for 1 hour at 37° C. in a 50 µL reaction volume. The assembly products were then re-purified using the Monarch PCR & DNA Cleanup Kit and quantified by Agilent Bioanalyzer (DNA 1000).

Pacific Biosciences Single-Molecule Real-Time (SMRT) sequencing was performed as described previously. The libraries were prepared for sequencing using the PacBio Binding Calculator Version 2.3.1.1 and the DNA/Polymerase Binding Kit P6 v2 with a custom library concentration on the plate of 0.3375 nM. Sequencing was carried out using the PacBio RSII instrument with at least 2 SMRT cells per library and a 3 hour data collection time per cell with 'stage start' off. Consensus sequences for each assembly product were generated as described previously. Full results from each experiment are supplied in the supporting data files (S1-S2 Tables).

Golden Gate Assembly Reactions

Assembly fragments were generated by PCR (Q5 hot-start high-fidelity 2× master mix) with oligonucleotide primers (IDT) and purified using the Monarch PCR & DNA Cleanup Kit. Fragment quality was evaluated using the Agilent Bioanalyzer 2100 and each assembly part was quantified using the Qubit assay (Thermo Fisher Scientific, Waltham, MA). Golden Gate assembly reactions (5 µL final volume) were carried out with 3 nM of each DNA fragment and 0.5 µL of the appropriate NEB Golden Gate Assembly Mix in 1×T4 DNA ligase buffer; the BsaI-HFv2 mix was used to reconstitute the lac operon cassette and the BsmBI-v2 mix was used to assemble the T7 phage genome. Reactions to reconstitute the lac operon cassette were incubated for 48 hours at 37° C. and then subjected to a final heat-soak step at 60° C. for 5 minutes before being incubated at 4° C. prior to transformation. Reactions to produce the T7 bacteriophage genome were cycled between 42° C. and 16° C. for 5 minutes at each temperature for 96 cycles, and then subjected to a 60° C. incubation for 5 minutes and finally a 4° C. hold until transformation.

Clonogenic Assays

Assembly reactions to reconstruct the lac operon cassette were transformed into chemically competent *E. coli* cells, and colony forming units were scored as harboring correctly or erroneously assembled constructs by a reverse blue-white screen as described previously. Briefly, transformations were performed using 2 µL of each assembly reaction added to 50 µL of T7 express competent cells as per manufacturer's instructions. The resulting outgrowth was plated onto agar plates (Luria-Bertani broth supplemented with 1 mg/mL dextrose, 1 mg/mL MgCl2, 30 µg/mL Chloramphenicol, 200 µM IPTG and 80 µg/mL X-gal). Importantly, transformants harboring correctly assembled constructs turn blue after incubation on media containing IPTG and X-Gal, while transformants harboring constructs with assembly errors form white colonies.

Plaque Assays

Reactions to construct the T7 phage genome were transformed into NEB 10-beta cells as per the manufacturer's instructions, using 1 µL of the reaction mixture into 25 µL of competent cells. The transfection mixture was recovered in 975 µL of NEB 10-beta/stable outgrowth media and then combined with 3 mL of 50° C. molten top-agar (Luria broth containing 0.7% agar). Finally, the mixture was plated on LB agar plates and the molten agar was allowed to cool and solidify on the benchtop for 20 m. The resulting pates were inverted and incubated at 37° C. for ~5 h until the *E. coli* lawn and phage plaques were visible by eye.

The Impact of Reaction Temperature on Golden Gate Assembly Fidelity

Golden Gate assembly typically utilizes two step cycling protocols, alternating between a 16° C. incubation step to maximize DNA ligation efficiency and a 37-42° C. incubation step to maximize fragment digestion efficiency.

The omission of 16° C. incubation was tested to determine the effect on Golden Gate assembly fidelity, as higher reaction temperatures have been shown to improve DNA ligase fidelity. The frequency of Golden Gate assembly errors at 37° C. or 42° C. was quantified in a multiplex high throughput DNA sequencing assay, and the results compared to reactions using traditional thermocycling protocols of 37/16° C. or 42/16° C. The reactions carried out at constant incubation temperatures were incubated for an extended duration, 16 hours, to compensate for decreased ligation efficiency. The results showed that the frequency of ligation errors was diminished >2-fold when the 16° C. incubation step was omitted, with every mismatch pair appearing less frequently.

We found that the capacity of Golden Gate assembly reactions could exceed 50 fragments per reaction using a single temperature incubation (static). In this example using BsaI or BsmBI restriction endonuclease, the estimated assembly fidelity for traditional 37/16° C. or 42/16° C. cycling conditions dropped below 10% at 50 fragments, but the 37° C. or 42° C. static incubation protocols could allow >50 fragment to be assembled with >40% accuracy. The static 37° C. or 42° C. static temperature utilized longer incubation times to compensate for the efficiency loss caused by omitting the 16° C. incubation step.

Mismatch frequencies for assembly reactions were grouped according to nucleotide mispair (A:A, A:C, A:G, C:C, C:T, G:G, G:T, T:T). Assembly reactions were carried out with T4 DNA ligase and either BsaI-HFv2 at 37° C. or BsmBI-v2 at 42° C. For comparison, mismatch frequencies are shown for assembly reactions using traditional thermocycling protocols with T4 DNA ligase and either BsaI-HFv2 at 37° C. and 16° C. or BsmBI-v2 at 42° C. and 16° C. Mismatch frequency was significantly lower using BsaI-HFv2 (37° C.) or BsmBI-v2 (42° C.) at a single temperature than observed for cycling.

Verification of the 52 Fragment Lac Operon Cassette Assembly

Plasmid DNA was isolated from 18 blue colonies using the Monarch Plasmid Miniprep kit (New England Biolabs, Ipswich, MA). Twelve of the resulting constructs were subjected to PCR with amplification primers that flank the desired insertion site. Every construct yielded an amplicon size consistent with assembly of all 52 fragments, demonstrating that blue colonies contained the desired number of inserts. Six of the isolated constructs were sequenced using nine different sequencing primers to cover the entire 4.9 kb expected insert. All 6 constructs contained ordered error-free assembly of all 52-inserts.

Verification of 50 Fragment T7 Phage gDNA Assembly

Plaque PCR was carried out using 4 sets of amplification primers (A-D) that together span the 38 kb phage genome. Amplicon lengths were resolved by Agilent Bioanalzyer 2100, using a DNA 10000 assay. Amplicons from phage plaques were compared to the parental T7 phage genome after restriction enzyme digest with NdeI or undigested. In all cases, the phage plaques produced a pattern identical to the parental T7 genome DNA. To confirm that the assembled genome harbored the desired silent mutations that remove native BsmBI restriction sites and verify that the observed plaques were not the results of carryover-contamination from the parental T7 phage gDNA, we also carried out amplicon digestion of the parental T7 phage genome and plaques with BsmBI. We showed that an amplicon from the parental T7 phage genome is digested by BsmBI to produce the bands of expected size, whereas the amplicons from the assembled phage genomes were inert to cleavage by BsmBI.

To test the predictions made herein, we carried out the most complex assembly reaction to-date and cloned a 4.9 kb cassette of the lac operon into an E. coli destination vector from 52 constituent parts in a single assembly round. Importantly, the lac operon cassette system used here mimics a traditional cloning reactions wherein, upon transformation of the assembly reaction into E. coli cells, we can observe colonies harboring correctly or incorrectly assembled constructs. This test system provides a colorimetric readout to differentiate transformants harboring correctly and incorrectly assembled products. We found that 49% of the observed transformants harbored correctly assembled constructs, in close agreement with our predicted fidelity of 40% (FIG. 21A-21B). To further confirm successful assembly of all 52 inserts, we purified constructs from a subset of colonies and analyzed the inserts by PCR and Sanger sequencing; all colonies subjected to additional screening were found to harbor constructs with inserts of the anticipated size and sequence.

Next, to test assembly of large targets in a single round from many small fragments, we designed a GGA reaction to construct the 38 kb T7 bacteriophage genome from 50 parts. As the phage genome contains many genes that are toxic to E. coli cells, we reconstructed the phage gDNA from PCR-generated DNA fragments to avoid subcloning toxic genes. Moreover, this strategy enabled us to easily introduce 16 silent mutations in the phage genome to remove pre-existing BsmBI Type IIS restriction sites within the genome. These changes serve dual purpose to both permit Type IIS assembly, and to act as marker mutations for assembly verification. Assembly reactions were carried out and transformed into NEB 10-beta electrocompetent cells; successful assembly of the T7 phage genome was assessed by plaque forming assay. Bacteriophage plaques were observed upon electroporation of the genome assembly reactions into E. coli cells, indicating successful assembly of the phage genome (FIG. 20A-20B). Several phage plaques were selected for additional screening by plaque PCR and restriction enzyme digest to ensure they contained a complete and properly ordered copy of the T7 phage genome; all plaques subjected to additional screening contained the expected genome arrangement and harbored the intended silent mutations. Moreover, to ensure the observed phage plaques were the result of in vitro assembly and not assembly of the DNA fragments within the E. coli by cellular DNA repair mechanisms, we carried out control reactions lacking T4 DNA ligase and did not observe phage plaques upon transformation of these control reactions. Of note, we found that the high-temperature assembly protocol variations were not necessary to produce infectious phage plaques; presumably due to the more stringent selection of the plaque forming assay, as improperly assembled variants of the T7 phage genome are unlikely to produce viable phage and thus there is no background from incorrectly assembled products as in the lac operon cassette test system. Taken together, these results demonstrate rapid assembly of a phage genome, and suggest that the methods developed here could be applied to other large and/or complex DNA targets.

In summary, our work demonstrates an efficient and cost-effective means to create and engineer variants of large/complex DNA constructs that are difficult to obtain and manipulate by current cloning and gene synthesis methodologies. Our results show that GGA could be used to rapidly assemble toxic and/or high molecular weight DNA constructs from dozens of smaller constituent parts that are easily manipulated and propagated using standard molecular biology techniques. These findings dramatically reduce the number of hierarchical assembly rounds required to produce large constructs by in vitro assembly and can be utilized to assemble entire metabolic pathways and even small genomes in a single reaction.

Example 7: Aprataxin/5'Deadenylase and PEG in Golden Gate Assembly

In reactions described in the Tables below as specified, ordered assembly reactions consisted of precloned DNA fragments (3 nM each) or PCR fragments (3 nM each) and the indicated amount of restriction enzyme and ligase in T4 DNA ligase buffer or Blunt T/A ligase buffer (New England Biolabs, Ipswich, MA). Assembly reactions were incubated as described in Example 3, using one of the three different ligation protocols, followed by a 5 minute final incubation step at 60° C. then a final 4° C. hold prior to transformation. Transformations were performed using 2 µl of each assembly reaction added to 50 µl competent T7 Express chemically competent E. coli (New England Biolabs, Iswich, MA) plated on the appropriate growth media, and incubated at 37° C. to form colonies.

The correctly assembled target polynucleotides coded for a cassette of the lac operon (about 5 kb) so that blue colonies of correctly assembled fragments could be distinguished from white colonies containing incorrect assemblies on IPTG/Xgal/Chloramphenicol plates.

Generally, it was found that the addition of a 5' Deadenylase enzyme or PEG 600-6000 increased the yield of correct assemblies.

| Test System | Cycling | Temps | Ligase | Type IIS | Overhang | Time | Additive | Yield | Efficiency | [Protein] |
|---|---|---|---|---|---|---|---|---|---|---|
| 5' Deadenylase increases assembly yield >2-fold in the optimized concentration range (dropdown cycling) | | | | | | | | | | |
| 24-Fragment | Drop-down | 37/16 | wt T4 | BsaI-HFv2 | 4 bp | 5 hr | No | 60 | 12 | 1000/30 |
| | Drop-down | 37/16 | wt T4 | BsaI-HFv2 | 4 bp | 5 hr | 5'De-ad (1.5 U) | 87 | 17.4 | 1000/30 |
| | Drop-down | 37/16 | wt T4 | BsaI-HFv2 | 4 bp | 5 hr | 5'De-ad (5 U) | 109 | 21.8 | 1000/30 |
| | Drop-down | 37/16 | wt T4 | BsaI-HFv2 | 4 bp | 5 hr | 5'De-ad (25 U) | 154 | 30.8 | 1000/30 |
| 5'Deadenylase increases assembly yield ~7-10-fold (Static cycling) | | | | | | | | | | |
| 24-Fragment | Static | 37 | wt T4 | BsaI-HFv2 | 4 bp | 24 hr | No | 12 | 0.5 | 1000/30 |
| | Static | 37 | wt T4 | BsaI-HFv2 | 4 bp | 24 hr | 5'De-ad (25 U) | 94 | 3.91 | 1000/30 |
| | Static | 42 | Hi T4 | BsaI-HFv2 | 4 bp | 24 hr | No | 2 | 0.08 | 1000/30 |
| | Static | 42 | Hi T4 | BsaI-HFv2 | 4 bp | 24 hr | 5'De-ad (25 U) | 20 | 0.83 | 1000/30 |
| 5' Deadenylase increases assembly yield >3-fold (Touch-down cycling) | | | | | | | | | | |
| 52-Fragment | Touch-down | 50/16 | Hi T4 | BsaI-HFv2 | 4 bp | 24 hr | No | 1.1 | 0.05 | 1000/30 |
| | Touch-down | 50/16 | Hi T4 | BsaI-HFv2 | 4 bp | 24 hr | 5'De-ad (25 U) | 4.3 | 0.18 | 1000/30 |
| PEG 600-6000 increases assembly yield ~2-5-fold | | | | | | | | | | |
| 24-Fragment | Drop-down | 37/16 | wt T4 | BbsI-HF | 4 bp | 10 hr | No | 296 | 29.6 | 1000/60 |
| | Drop-down | 37/16 | wt T4 | BbsI-HF | 4 bp | 10 hr | PEG 600 (6.8%) | 557 | 55.7 | 1000/60 |
| | Drop-down | 37/16 | wt T4 | BbsI-HF | 4 bp | 10 hr | PEG 3350 (6.8%) | 1421 | 142.1 | 1000/60 |
| | Drop-down | 37/16 | wt T4 | BbsI-HF | 4 bp | 10 hr | PEG 6000 (6.8%) | 1157 | 115.7 | 1000/60 |
| Ratio of T4 ligase to BbsI-HF impacts assembly yield | | | | | | | | | | |
| 24-Fragment | Drop-down | 37/16 | wt T4 | BbsI-HF | 4 bp | 10 hr | No | 425 | 4.25 | 400/60 |
| | Drop-down | 37/16 | wt T4 | BbsI-HF | 4 bp | 10 hr | No | 1120 | 112 | 1000/60 |
| | Drop-down | 37/16 | wt T4 | BbsI-HF | 4 bp | 10 hr | No | 1130 | 113 | 2000/60 |

Yield—Total amount of positive assemblies or plaques.
Fidelity—Yield/total assemblies or product (blue colonies/white colonies)
Efficiency—Yield/hour
[Protein]—Ligase concentration (units) and Type IIS concentration (units)/20 μl reaction
Accuracy—Number of correct end joining of fragments over number of total assemblies
Hi-T4—Thermostable T4 DNA ligase variant
5' De-ad—5' Deadenylase and protein concentration in units (U)

Example 8: Synthesis and Engineering of a Viral Genome for Research and Vaccine Development Reverse genetic systems that rely on in vitro ligation offer researchers a relatively fast/efficient way to generate variants of RNA viruses for research purposes and vaccine development efforts. This methodology has worked for manipulation of several viruses but has not yet been successfully applied to many high-value targets, including coronaviruses (despite several attempts). It is likely that the large size and inherently toxic/repetitive nature of some viral genomes prohibits maintenance of the viral genomic DNA in *E. coli* cells by traditional techniques. However, efficient assembly of the viral genome from many parts can be accomplished using the methods described herein. Toxic viral genomes can be sub-divided into small fragments for easy manipulation in *E. coli* cells, permitting one-tube assembly of the viral cDNA in a few hours. As an example, we demonstrate below the designs of a 12-fragment, 24-fragment, and 50-fragment linear viral genome assembly (Genbank ID: NC_045512, from severe acute respiratory syndrome coronavirus 2 isolate Wuhan-Hu-1, complete genome).

| Fragment # | Range | Length | 5' End | 3'End |
|---|---|---|---|---|
| Segments of a 12-Fragment viral genome (Genbank ID: NC_045512) | | | | |
| 1 | 1-2501 | 2531 bp | | AGTG |
| 2 | 2502-4993 | 2522 bp | CACT | TAAT |
| 3 | 4994-7479 | 2516 bp | ATTA | TGAA |
| 4 | 7480-9967 | 2518 bp | TTCA | TTGC |
| 4 | 9968-12468 | 2531 bp | GCAA | TTTG |
| 5 | 12469-14945 | 2507 bp | CAAA | ACCA |
| 6 | 14946-17436 | 2521 bp | TGGT | GGTC |
| 7 | 17437-19926 | 2520 bp | GACC | TAGA |
| 8 | 19927-22437 | 2541 bp | TCTA | AAGT |
| 9 | 22438-24912 | 2505 bp | ACTT | GTCT |
| 11 | 24913-27405 | 2523 bp | AGAC | AAAG |
| 12 | 27406-29903 | 2528 bp | CTTT | |
| Segments of a 24-Fragment viral genome (Genbank ID: NC_045512) | | | | |
| 1 | 1-1245 | 1275 bp | | TTCA |
| 2 | 1246-2500 | 1285 bp | TGAA | GTGT |
| 3 | 2501-3735 | 1265 bp | ACAC | AGGG |
| 4 | 3736-4985 | 1280 bp | CCCT | TCTA |
| 5 | 4986-6234 | 1279 bp | TAGA | AACA |
| 6 | 6235-7470 | 1266 bp | TGTT | ACCG |
| 7 | 7471-8729 | 1289 bp | CGGT | GTAG |
| 8 | 8730-9964 | 1265 bp | CTAC | CGAG |
| 9 | 9965-11220 | 1286 bp | CTCG | GACC |
| 10 | 11221-12468 | 1278 bp | GGTC | TTTG |
| 11 | 12469-13713 | 1275 bp | CAAA | AATC |
| 12 | 13714-14949 | 1266 bp | GATT | GAAA |

| Fragment # | Range | Length | 5' End | 3'End |
|---|---|---|---|---|
| 13 | 14950-16201 | 1282 bp | TTTC | TCAT |
| 14 | 16202-17451 | 1280 bp | ATGA | CAGG |
| 15 | 17452-18690 | 1269 bp | CCTG | TGGA |
| 16 | 18691-19939 | 1279 bp | TCCA | GCTA |
| 17 | 19940-21190 | 1281 bp | TAGC | TCAG |
| 18 | 21191-22437 | 1277 bp | CTGA | AAGT |
| 19 | 22438-23680 | 1273 bp | ACTT | AGTA |
| 20 | 23681-24921 | 1271 bp | TACT | AAAT |
| 21 | 24922-26157 | 1266 bp | ATTT | TAAC |
| 22 | 26158-27405 | 1278 bp | GTTA | AAAG |
| 23 | 27406-28649 | 1274 bp | CTTT | TTGT |
| 24 | 28650-29903 | 1284 bp | ACAA | |
| Segments of a 50-Fragment viral genome (Genbank ID: NC_045512) | | | | |
| 1 | 1-595 | 625 bp | | CCAC |
| 2 | 596-1194 | 629 bp | GTGG | TTCA |
| 3 | 1195-1784 | 620 bp | TGAA | TTAC |
| 4 | 1785-2395 | 641 bp | GTAA | GCGT |
| 5 | 2396-2996 | 631 bp | ACGC | CCAG |
| 6 | 2997-3594 | 628 bp | CTGG | AGCA |
| 7 | 3595-4189 | 625 bp | TGCT | TAGT |
| 8 | 4190-4792 | 633 bp | ACTA | AGGA |
| 9 | 4793-5387 | 625 bp | TCCT | TTAG |
| 10 | 5388-5989 | 632 bp | CTAA | GCTC |
| 11 | 5990-6579 | 620 bp | GAGC | AGTA |
| 12 | 6580-7170 | 621 bp | TACT | AGAA |
| 13 | 7171-7781 | 641 bp | TTCT | TTAT |
| 14 | 7782-8366 | 615 bp | ATAA | TGCG |
| 15 | 8367-8965 | 629 bp | CGCA | GTTT |
| 16 | 8966-9561 | 626 bp | AAAC | GAAT |
| 17 | 9562-10166 | 635 bp | ATTC | GGAC |
| 18 | 10167-10759 | 623 bp | GTCC | ACTT |
| 19 | 10760-11364 | 635 bp | AAGT | ATAC |
| 20 | 11365-11968 | 634 bp | GTAT | CTTT |
| 21 | 11969-12557 | 619 bp | AAAG | TGGA |
| 22 | 12558-13159 | 632 bp | TCCA | TACA |
| 23 | 13160-13754 | 625 bp | TGTA | TATT |
| 24 | 13755-14351 | 627 bp | AATA | TCTG |
| 25 | 14352-14946 | 625 bp | CAGA | AACC |
| 26 | 14947-15539 | 623 bp | GGTT | CGTG |
| 27 | 15540-16154 | 645 bp | CACG | CATA |
| 28 | 16155-16749 | 625 bp | TATG | TAGG |
| 29 | 16750-17343 | 624 bp | CCTA | CTAT |
| 30 | 17344-17937 | 624 bp | ATAG | TTGC |
| 31 | 17938-18543 | 636 bp | GCAA | ACAT |
| 32 | 18544-19129 | 616 bp | ATGT | TCTT |
| 33 | 19130-19743 | 644 bp | AAGA | ACAA |
| 34 | 19744-20324 | 611 bp | TTGT | AACG |
| 35 | 20325-20936 | 642 bp | CGTT | CAGC |
| 36 | 20937-21526 | 620 bp | GCTG | GAAA |
| 37 | 21527-22131 | 635 bp | TTTC | TTCC |
| 38 | 22132-22724 | 623 bp | GGAA | TCAT |
| 39 | 22725-23320 | 626 bp | ATGA | TAAT |
| 40 | 23321-23915 | 625 bp | ATTA | TTGA |
| 41 | 23916-24514 | 629 bp | TCAA | TGTC |
| 42 | 24515-25117 | 633 bp | GACA | TGAG |
| 43 | 25118-25706 | 619 bp | CTCA | GAGA |
| 44 | 25707-26310 | 634 bp | TCTC | CGAA |
| 45 | 26311-26909 | 629 bp | TTCG | TGGT |
| 46 | 26910-27511 | 632 bp | ACCA | TCGT |
| 47 | 27512-28115 | 634 bp | ACGA | TATC |
| 48 | 28116-28703 | 618 bp | GATA | TGAT |
| 49 | 28704-29303 | 630 bp | ATCA | TTTG |
| 50 | 29304-29903 | 630 bp | CAAA | |

---

What is claimed is:

1. A method comprising:
   (a) obtaining a reaction mixture comprising:
      (i) a synthetic self-complementary oligonucleotide comprising a double-stranded region and a loop, wherein the double-stranded region contains a binding sequence for PacCI and wherein the oligonucleotide comprises unligatable 3' and 5' ends and cannot be cleaved by PaqCI;
      (ii) PaqCI;
      (iii) a ligase; and
      (iv) a library of DNA substrates each having at least one PaqCI recognition sequence and a cleavage site;
   (b) cleaving the library of DNA substrates with PaqCI to generate fragments that have 4-base overhangs; and
   (c) ligating complementary 4-base overhangs together to produce an ordered assembly of the fragments.

2. The method according to claim 1, wherein the DNA substrates in the library are selected from one or more of the group consisting of: a PCR products, plasmids, genomes or chromosomes.

3. The method according to claim 1, wherein (c) further comprises ligating the ordered assembly into a destination vector or viral genome.

4. The method according to claim 3, wherein the destination vector is a plasmid, or a chromosome.

5. The method according to claim 1, wherein the ligase is selected from the group consisting of: T4 DNA ligase, T7 DNA ligase, PBCV-1 and human ligase3 (hLig3).

6. The method according to claim 1, wherein there are 10-100 DNA substrates having unique sequences and the ordered assembly comprises 10-100 fragments that are ligated together in step (c).

7. The method according to claim 1, wherein there are at least 5 DNA substrates having unique sequences and the ordered assembly comprises at least 5 fragments that are ligated together in step (c).

8. The method according to claim 1, wherein there are at least 20 DNA substrates having unique sequences and the ordered assembly comprises at least 20 fragments that are ligated together in step (c).

9. The method according to claim 1, wherein the reaction mixture further comprises one or more of: a DNA repair enzyme, a deadenylase, and/or a crowding agent.

10. The method of claim 9, wherein the crowding agent is polyethylene glycol (PEG) having a molecular weight in the range of 600-8000.

11. The method of claim 9, wherein the deadenylase is a yeast deadenylase.

12. The method of claim 9, wherein the DNA repair enzyme is EndoMS.

* * * * *